US012340911B2

(12) United States Patent
Singh et al.

(10) Patent No.: US 12,340,911 B2
(45) Date of Patent: Jun. 24, 2025

(54) FUEL RACK APPARATUS HAVING STORAGE TUBES COMPRISING INTERIOR FLUX TRAP CHAMBERS

(71) Applicant: Holtec International, Camden, NJ (US)

(72) Inventors: Krishna P. Singh, Jupiter, FL (US); P. Stefan Anton, Southampton, NJ (US)

(73) Assignee: Holtec International

( * ) Notice: Subject to any disclaimer, the term of this patent is extended or adjusted under 35 U.S.C. 154(b) by 0 days.

(21) Appl. No.: 17/981,978

(22) Filed: Nov. 7, 2022

(65) Prior Publication Data

US 2023/0082771 A1    Mar. 16, 2023

Related U.S. Application Data

(60) Continuation of application No. 17/088,960, filed on Nov. 4, 2020, now Pat. No. 11,515,054, which is a
(Continued)

(51) Int. Cl.
*G21C 19/07* (2006.01)
*G21C 19/06* (2006.01)
(Continued)

(52) U.S. Cl.
CPC ............ *G21C 19/07* (2013.01); *G21C 19/06* (2013.01); *G21C 19/40* (2013.01); *G21F 5/012* (2013.01)

(58) Field of Classification Search
CPC ........ G21C 19/07; G21C 19/40; G21C 19/06; G21F 5/012
(Continued)

(56) References Cited

U.S. PATENT DOCUMENTS 3,111,586 A    11/1963  Rogers
3,414,727 A *  12/1968  Bonilla .................. G21F 5/005
                                                    376/288
(Continued)

FOREIGN PATENT DOCUMENTS

CN         1208495       2/1999
CN         102084433     6/2011
(Continued)

OTHER PUBLICATIONS

IAEA, Management of Spent Fuel from Nuclear Power Reactors, Jun. 22, 2006, Retrieved from the Internet: <URL:http://www-pub.iaea.org/MTCD/publications/PDF/Pub1295_web.pdf> pp. 343-344.
(Continued)

*Primary Examiner* — Jinney Kil
(74) *Attorney, Agent, or Firm* — The Belles Group, P.C.

(57) ABSTRACT

A fuel rack apparatus includes a base plate having an upper surface and a lower surface; and a plurality of rectangular storage tubes coupled to and extending upward from the upper surface of the base plate, the storage tubes arranged in a side-by-side arrangement to form an array of the storage tubes. Each storage tube extends vertically along a longitudinal axis and includes an outer tube defining an inner cavity, and a neutron-absorbing inner plate-assemblage positioned within the outer tube that divides the inner cavity into a plurality of interior flux trap chambers and a fuel storage cell. The inner plate assembly includes a pair of angled chevron plates comprising boron. The chevron plates are arranged to define a hexagonal-shaped fuel storage cell forming triangular-shaped interior flux trap spaces between the chevron plates and the outer tube.

20 Claims, 92 Drawing Sheets

Related U.S. Application Data continuation-in-part of application No. 16/902,387, filed on Jun. 16, 2020, now abandoned, which is a continuation of application No. 15/689,571, filed on Aug. 29, 2017, now Pat. No. 10,692,617, which is a continuation of application No. 14/239,752, filed as application No. PCT/US2012/051634 on Aug. 20, 2012, now Pat. No. 9,748,009, said application No. 17/088,960 is a continuation-in-part of application No. 16/729,654, filed on Dec. 30, 2019, now abandoned, which is a division of application No. 15/596,444, filed on May 16, 2017, now Pat. No. 10,535,440, which is a division of application No. 13/925,585, filed on Jun. 24, 2013, now Pat. No. 9,685,248, said application No. 17/088,960 is a continuation-in-part of application No. 15/973,966, filed on May 8, 2018, now Pat. No. 11,017,908, which is a continuation of application No. 14/424,149, filed as application No. PCT/US2013/057115 on Aug. 28, 2013, now Pat. No. 9,991,010, said application No. 17/088,960 is a continuation-in-part of application No. 16/401,891, filed on May 2, 2019, now Pat. No. 10,867,714, which is a continuation of application No. 15/584,692, filed on May 2, 2017, now Pat. No. 10,297,356, which is a continuation of application No. 14/912,754, filed as application No. PCT/US2015/027455 on Apr. 24, 2015, now Pat. No. 9,640,289, said application No. 17/088,960 is a continuation-in-part of application No. 16/022,935, filed on Jun. 29, 2018, now abandoned, which is a continuation of application No. 14/811,454, filed on Jul. 28, 2015, now Pat. No. 10,037,826, said application No. 17/088,960 is a continuation-in-part of application No. 16/584,892, filed on Sep. 26, 2019, now abandoned, which is a continuation of application No. 14/877,217, filed on Oct. 7, 2015, now Pat. No. 10,468,145, said application No. 17/088,960 is a continuation-in-part of application No. 16/871,221, filed on May 11, 2020, now abandoned, which is a continuation of application No. 14/935,221, filed on Nov. 6, 2015, now Pat. No. 10,650,933, said application No. 17/088,960 is a continuation-in-part of application No. 16/513,815, filed on Jul. 17, 2019, now Pat. No. 10,910,119, which is a continuation of application No. 15/634,408, filed on Jun. 27, 2017, now Pat. No. 10,418,137.

(60) Provisional application No. 62/355,057, filed on Jun. 27, 2016, provisional application No. 62/076,138, filed on Nov. 6, 2014, provisional application No. 62/061,089, filed on Oct. 7, 2014, provisional application No. 62/029,931, filed on Jul. 28, 2014, provisional application No. 61/983,606, filed on Apr. 24, 2014, provisional application No. 61/694,058, filed on Aug. 28, 2012, provisional application No. 61/663,316, filed on Jun. 22, 2012, provisional application No. 61/525,583, filed on Aug. 19, 2011.

(51) Int. Cl.
*G21C 19/40* (2006.01)
*G21F 5/012* (2006.01)

(58) Field of Classification Search
USPC ................................ 376/272; 250/507.1
See application file for complete search history.

(56) References Cited

U.S. PATENT DOCUMENTS

| | | |
|---|---|---|
| 3,444,725 A | 5/1969 | Chave |
| 3,725,635 A | 4/1973 | Fink et al. |
| 3,886,368 A | 5/1975 | Rollins et al. |
| 3,934,152 A | 1/1976 | Alleaume |
| 3,962,587 A | 6/1976 | Dufrane et al. |
| 4,010,375 A | 3/1977 | Wachter et al. |
| 4,044,267 A | 8/1977 | Bevilacqua |
| 4,096,392 A | 6/1978 | Rubinstein et al. |
| 4,115,700 A | 9/1978 | Groves |
| 4,119,859 A | 10/1978 | Karzmar et al. |
| 4,152,602 A | 5/1979 | Kaminski et al. |
| 4,156,147 A | 5/1979 | Dooher et al. |
| 4,171,002 A | 10/1979 | Smith |
| 4,187,433 A * | 2/1980 | Zezza ................... G21C 19/07 976/DIG. 248 |
| 4,198,322 A | 4/1980 | Storm |
| 4,203,038 A * | 5/1980 | Takahashi .............. G21C 19/07 976/DIG. 341 |
| 4,213,883 A | 7/1980 | Owens |
| 4,218,622 A | 8/1980 | Forsyth et al. |
| 4,225,467 A | 9/1980 | McMurtry et al. |
| 4,243,886 A | 1/1981 | Untermyer, II |
| 4,248,668 A | 2/1981 | Dixon et al. |
| 4,273,838 A | 6/1981 | Biemiller |
| 4,287,145 A | 9/1981 | McMurtry et al. |
| 4,292,528 A | 9/1981 | Shaffer et al. |
| 4,308,460 A | 12/1981 | Groh et al. |
| 4,313,973 A | 2/1982 | McMurtry et al. |
| 4,382,060 A | 5/1983 | Holtz et al. |
| 4,399,366 A | 8/1983 | Bucholz |
| 4,457,888 A | 7/1984 | Vickrey |
| 4,474,727 A | 10/1984 | Kmonk et al. |
| 4,594,216 A | 6/1986 | Feutrel |
| 4,657,732 A | 4/1987 | Schoening |
| 4,706,366 A | 11/1987 | Madiot et al. |
| 4,738,388 A | 4/1988 | Bienek et al. |
| 4,765,525 A | 8/1988 | Popp et al. |
| 4,781,883 A | 11/1988 | Daugherty et al. |
| 4,803,042 A | 2/1989 | Gilmore et al. |
| 4,820,472 A | 4/1989 | Machado et al. |
| 4,827,139 A | 5/1989 | Wells et al. |
| 4,857,263 A | 8/1989 | Machado et al. |
| 4,865,804 A | 9/1989 | McGeary et al. |
| 4,874,573 A | 10/1989 | Wood et al. |
| 4,896,046 A | 1/1990 | Efferding |
| 4,900,505 A | 2/1990 | Machado et al. |
| 4,925,620 A | 5/1990 | Aiello et al. |
| 4,929,412 A | 5/1990 | Dixon et al. |
| 4,960,560 A | 10/1990 | Machado et al. |
| 4,961,900 A | 10/1990 | Hummel |
| 4,980,535 A | 12/1990 | Aiello et al. |
| 4,983,352 A | 1/1991 | Efferding |
| 4,997,618 A | 3/1991 | Efferding |
| 5,063,299 A | 11/1991 | Efferding |
| 5,102,615 A | 4/1992 | Grande et al. |
| 5,121,849 A | 6/1992 | Ellingson et al. |
| 5,184,504 A | 2/1993 | Spring |
| 5,245,641 A | 9/1993 | Machado et al. |
| 5,361,281 A | 11/1994 | Porowski |
| 5,381,919 A | 1/1995 | Griffin et al. |
| 5,384,813 A | 1/1995 | Loftis et al. |
| 5,438,597 A | 8/1995 | Lehnert et al. |
| 5,479,463 A | 12/1995 | Roberts |
| 5,550,882 A | 8/1996 | Lehnert |
| 5,602,885 A | 2/1997 | Ahmed et al. |
| 5,625,657 A | 4/1997 | Gallacher |
| 5,629,964 A | 5/1997 | Roberts |
| 5,674,411 A | 10/1997 | Hanson et al. |
| 5,787,140 A | 7/1998 | Dunlap et al. |
| 5,841,825 A | 11/1998 | Roberts |
| 6,064,710 A | 5/2000 | Singh |
| 6,114,710 A | 9/2000 | Contrepois et al. |
| 6,118,838 A | 9/2000 | Robert et al. |
| 6,216,877 B1 | 4/2001 | Lindstrom |
| 6,223,587 B1 | 5/2001 | Chiocca |

(56) References Cited

U.S. PATENT DOCUMENTS

| | | |
|---|---|---|
| 6,256,363 B1 | 7/2001 | Methling et al. |
| 6,393,086 B1 | 5/2002 | Iacovino, Jr. et al. |
| 6,442,227 B1 | 8/2002 | Iacovino et al. |
| 6,630,100 B1 | 10/2003 | Murakami et al. |
| 6,665,365 B2 | 12/2003 | Dallongeville et al. |
| 6,741,669 B2 | 5/2004 | Lindquist |
| 7,096,600 B2 | 8/2006 | Singh |
| 7,210,247 B2 | 5/2007 | Singh |
| 7,707,741 B2 | 5/2010 | Singh |
| 7,715,517 B2 | 5/2010 | Singh et al. |
| 8,067,659 B2 | 11/2011 | Singh et al. |
| 8,139,706 B2 | 3/2012 | Singh et al. |
| 8,158,962 B1 | 4/2012 | Rosenbaum et al. |
| 8,266,823 B2 | 9/2012 | Singh |
| 8,548,112 B2 | 10/2013 | Singh et al. |
| 8,576,976 B2 | 11/2013 | Singh et al. |
| 8,681,924 B2 | 3/2014 | Rosenbaum et al. |
| 8,712,001 B2 | 4/2014 | Singh et al. |
| 8,718,221 B2 | 5/2014 | Singh et al. |
| 9,640,289 B2 | 5/2017 | Springman et al. |
| 9,685,248 B2 | 6/2017 | Agace et al. |
| 9,748,009 B2 | 8/2017 | Singh |
| 9,865,363 B2 | 1/2018 | Singh et al. |
| 9,896,352 B2 | 2/2018 | Barker et al. |
| 9,991,010 B2 | 6/2018 | Singh et al. |
| 10,037,826 B2 | 7/2018 | Singh et al. |
| 10,297,356 B2 | 5/2019 | Springman et al. |
| 10,418,137 B2 | 9/2019 | Singh et al. |
| 10,468,145 B2 | 11/2019 | Singh |
| 10,535,440 B2 | 1/2020 | Agace et al. |
| 10,650,933 B2 | 5/2020 | Singh |
| 10,692,617 B2 | 6/2020 | Singh |
| 10,867,714 B2 | 12/2020 | Springman et al. |
| 10,910,119 B2 | 2/2021 | Singh et al. |
| 11,017,908 B2 | 5/2021 | Singh et al. |
| 2001/0016026 A1 | 8/2001 | Tennie |
| 2002/0069936 A1 | 6/2002 | Shaw et al. |
| 2002/0152841 A1 | 10/2002 | Ohsono et al. |
| 2003/0081714 A1 | 5/2003 | Lindquist |
| 2003/0194042 A1 | 10/2003 | Singh et al. |
| 2004/0020919 A1 | 2/2004 | Hirano et al. |
| 2004/0025560 A1 | 2/2004 | Funakoshi et al. |
| 2004/0062338 A1 | 4/2004 | Ohsono et al. |
| 2004/0141579 A1 | 7/2004 | Methling et al. |
| 2004/0156466 A1 | 8/2004 | Lindquist |
| 2005/0061853 A1 | 3/2005 | Packer et al. |
| 2005/0117687 A1 | 6/2005 | Carver et al. |
| 2005/0224729 A1 | 10/2005 | Tamaki |
| 2006/0215803 A1 | 9/2006 | Singh |
| 2006/0222139 A1 | 10/2006 | Pennington |
| 2006/0251201 A1 | 11/2006 | Singh |
| 2006/0288607 A1 | 12/2006 | Singh |
| 2007/0041789 A1 | 2/2007 | Monroe et al. |
| 2007/0153965 A1 | 7/2007 | Choi et al. |
| 2008/0017644 A1 | 1/2008 | Wickland |
| 2008/0049886 A1 | 2/2008 | Lahille et al. |
| 2008/0197302 A1 | 8/2008 | Fago et al. |
| 2008/0260088 A1 | 10/2008 | Singh et al. |
| 2009/0158614 A1 | 6/2009 | Singh et al. |
| 2009/0175404 A1 | 7/2009 | Singh et al. |
| 2009/0207962 A1 | 8/2009 | Maeda |
| 2009/0320566 A1 | 12/2009 | Russell |
| 2010/0014623 A1* | 1/2010 | Gauthier ............ G21F 5/008 376/272 |
| 2010/0027733 A1 | 2/2010 | Cantonwine et al. |
| 2010/0061502 A1 | 3/2010 | Yamasaki et al. |
| 2010/0122449 A1 | 5/2010 | Simon |
| 2010/0177858 A1 | 7/2010 | Kielbowicz |
| 2010/0212182 A1 | 8/2010 | Singh |
| 2010/0232563 A1 | 9/2010 | Singh et al. |
| 2011/0033019 A1 | 2/2011 | Rosenbaum et al. |
| 2011/0051883 A1 | 3/2011 | McInnes et al. |
| 2011/0108746 A1 | 5/2011 | Bara et al. |
| 2011/0142189 A1 | 6/2011 | Foussard et al. |
| 2011/0150164 A1 | 6/2011 | Singh et al. |
| 2011/0172484 A1 | 7/2011 | Singh et al. |
| 2012/0037632 A1 | 2/2012 | Singh et al. |
| 2012/0067005 A1 | 3/2012 | Argoud |
| 2012/0128114 A1 | 5/2012 | Iwasaki et al. |
| 2012/0187316 A1 | 7/2012 | Mayfield et al. |
| 2013/0077728 A1 | 3/2013 | Scaglione et al. |
| 2013/0343503 A1 | 12/2013 | Agace et al. |
| 2014/0039235 A1 | 2/2014 | Subiry |
| 2014/0105347 A1 | 4/2014 | Singh et al. |
| 2014/0192946 A1 | 7/2014 | Singh |
| 2014/0219408 A1 | 8/2014 | Singh |
| 2014/0219411 A1 | 8/2014 | Dederer et al. |
| 2014/0270043 A1 | 9/2014 | Lehnert et al. |
| 2015/0155064 A1 | 6/2015 | Leleu et al. |
| 2015/0211954 A1 | 7/2015 | Agace |
| 2015/0221402 A1 | 8/2015 | Singh |
| 2016/0005501 A1 | 1/2016 | Singh et al. |
| 2016/0196887 A1 | 7/2016 | Singh et al. |
| 2017/0110210 A1 | 4/2017 | Singh |
| 2018/0301231 A1 | 10/2018 | Singh et al. |
| 2018/0322970 A1 | 11/2018 | Singh et al. |
| 2020/0035370 A1 | 1/2020 | Singh |
| 2020/0243209 A1 | 7/2020 | Agace et al. |
| 2020/0312473 A1 | 10/2020 | Singh |
| 2020/0373031 A1 | 11/2020 | Singh |
| 2021/0074444 A1 | 3/2021 | Singh et al. |

FOREIGN PATENT DOCUMENTS

| | | |
|---|---|---|
| DE | 3430180 | 2/1986 |
| DE | 4402282 | 4/1995 |
| DE | 19632678 | 2/1998 |
| DE | 19640393 | 4/1998 |
| DE | 102012212006 | 9/2013 |
| EP | 0684611 | 11/1995 |
| EP | 1439547 | 7/2004 |
| EP | 2146353 | 1/2010 |
| FR | 2840723 | 12/2003 |
| GB | 1378681 | 12/1974 |
| JP | 5757233 | 4/1982 |
| JP | 59209487 | 11/1984 |
| JP | 63250600 | 10/1988 |
| JP | 06234070 | 8/1994 |
| JP | 2000321392 | 11/2000 |
| JP | 3231190 | 11/2001 |
| JP | 2011149904 | 8/2011 |
| KR | 900008687 | 11/1990 |
| KR | 20100111495 | 10/2010 |
| RU | 2127656 | 3/1999 |
| SU | 1408829 | 9/1990 |
| WO | WO97/39456 | 10/1997 |
| WO | WO98/53460 | 11/1998 |
| WO | WO2013/055445 | 4/2013 |
| WO | WO2013/096966 | 6/2013 |
| WO | WO2013/155520 | 10/2013 |
| WO | WO2014/036158 | 3/2014 |
| WO | WO2014/117082 | 7/2014 |
| WO | WO2014/153570 | 9/2014 |
| WO | WO2015/164705 | 10/2015 |

OTHER PUBLICATIONS

ML080800477 excerpt pp. 1-45; full document is 152 pages. New and Spent Fuel Storage Racks for Calvert Cliffs Unit 3 U.S. EPR Topical Report. Holtec Report No. HI-2083956. Available online: Mar. 28, 2008 at <https://adamswebsearch2.nrc.gov/webSearch2/main.jsp?AccessionNumber=ML080800477>.

Precision Steel technical manual. 2008. pp. 51-56. Full version available online: <http://www.precisionsteel.com/media/files/PSW%20Tech%20Handbook.pdf>.

U.S. Appl. No. 17/088,960, filed Nov. 4, 2020.
U.S. Appl. No. 16/902,387, filed Jun. 16, 2020.
U.S. Appl. No. 16/871,221, filed May 11, 2020.
U.S. Appl. No. 16/513,815, filed Jul. 17, 2019;.
U.S. Appl. No. 16/729,654, filed Dec. 30, 2019.
U.S. Appl. No. 16/584,892, filed Sep. 26, 2019.

(56) References Cited

OTHER PUBLICATIONS

U.S. Appl. No. 16/401,891, filed May 2, 2019.
U.S. Appl. No. 16/022,935, filed Jun. 29, 2018.
U.S. Appl. No. 15/973,966, filed May 8, 2018.
U.S. Appl. No. 15/689,571, filed Aug. 29, 2017.
U.S. Appl. No. 15/634,408, filed Jun. 27, 2017.
U.S. Appl. No. 15/596,444, filed May 16, 2017.
U.S. Appl. No. 15/584,692, filed May 2, 2017.
U.S. Appl. No. 14/912,754, filed Feb. 18, 2016.
U.S. Appl. No. 14/935,221, filed Nov. 6, 2015.
U.S. Appl. No. 14/877,217, filed Oct. 7, 2015.
U.S. Appl. No. 14/811,454, filed Jul. 28, 2015.
U.S. Appl. No. 14/424,149, filed Feb. 26, 2015.
U.S. Appl. No. 14/239,752, filed Mar. 21, 2014.
U.S. Appl. No. 13/925,585, filed Jun. 24, 2013.

\* cited by examiner

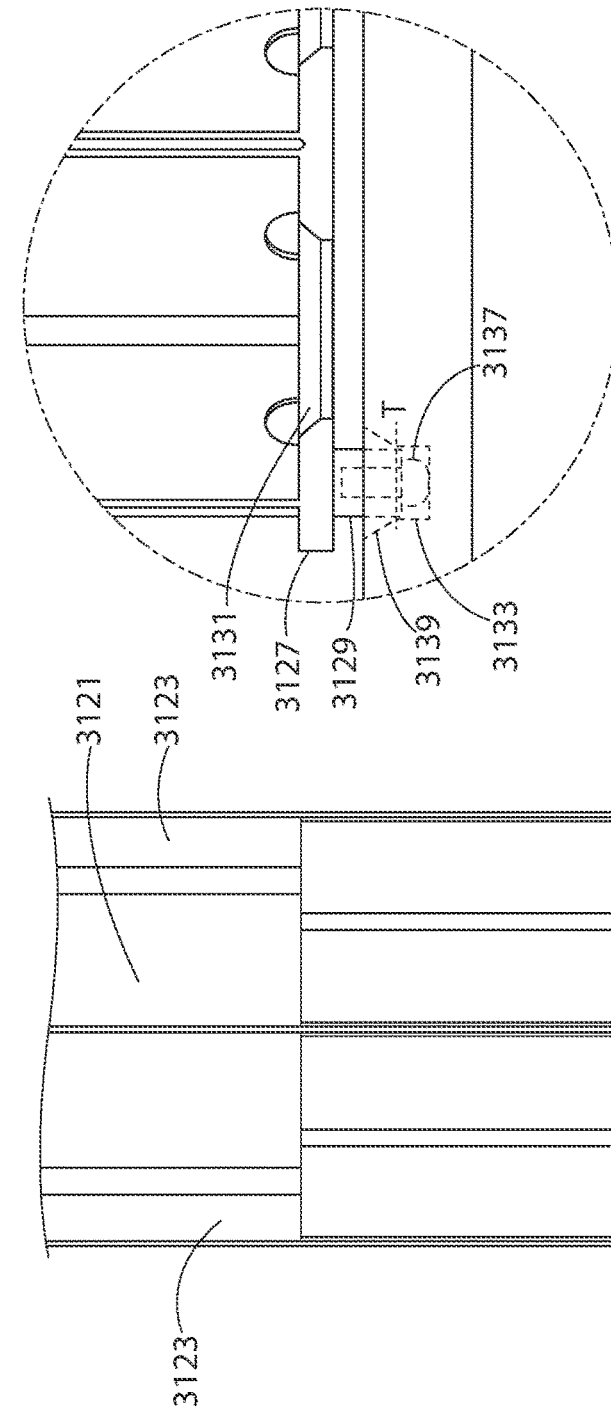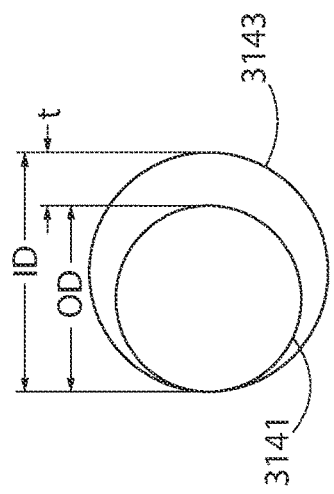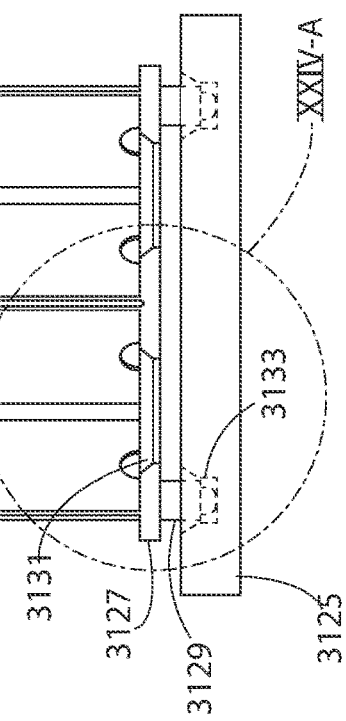

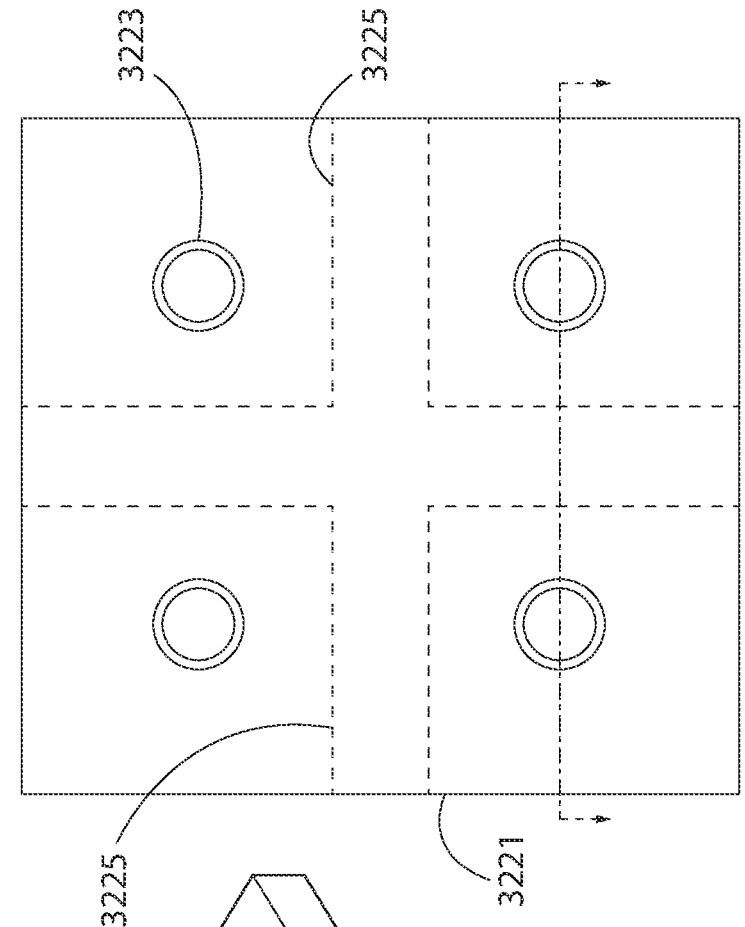
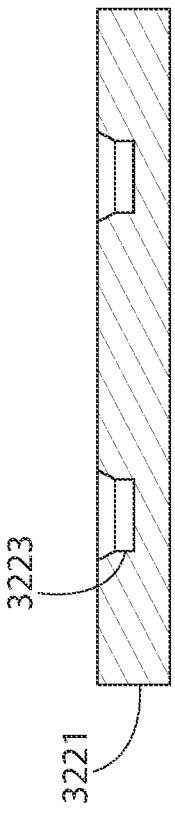

FUEL RACK APPARATUS HAVING STORAGE TUBES COMPRISING INTERIOR FLUX TRAP CHAMBERS

CROSS-REFERENCE TO RELATED PATENT APPLICATIONS

The present application is a continuation of U.S. patent application Ser. No. 17/088,960 filed Nov. 4, 2020.

U.S. patent application Ser. No. 17/088,960 filed Nov. 4, 2020 is a continuation-in-part of U.S. patent application Ser. No. 16/902,387, filed Jun. 16, 2020, which is a continuation of U.S. patent application Ser. No. 15/689,571, filed Aug. 29, 2017, now U.S. Pat. No. 10,692,617, which is a continuation of U.S. patent application Ser. No. 14/239,752, filed Mar. 21, 2014, now U.S. Pat. No. 9,748,009, which is a national stage entry under 35 U.S.C. § 371 of PCT/US2012/051634, filed Aug. 20, 2012, which claims priority to U.S. Provisional Patent Application Ser. No. 61/525,583, filed Aug. 19, 2011.

U.S. patent application Ser. No. 17/088,960 filed Nov. 4, 2020 is also a continuation-in-part of U.S. patent application Ser. No. 16/729,654, filed Dec. 30, 2019, which is a divisional of U.S. patent application Ser. No. 15/596,444, filed May 16, 2017, now U.S. Pat. No. 10,535,440, which is a divisional of U.S. patent application Ser. No. 13/925,585, filed Jun. 24, 2013, now U.S. Pat. No. 9,685,248, which claims priority to U.S. Provisional Patent Application Ser. No. 61/663,316, filed Jun. 22, 2012.

U.S. patent application Ser. No. 17/088,960 filed Nov. 4, 2020 is also a continuation-in-part of U.S. patent application Ser. No. 15/973,966, filed May 8, 2018, now U.S. Pat. No. 11,017,908, which is a continuation of U.S. patent application Ser. No. 14/424,149, filed Feb. 26, 2015, now U.S. Pat. No. 9,991,010, which is a national stage entry under 35 U.S.C. § 371 of PCT/US2013/057115, filed Aug. 28, 2013, which claims priority to U.S. Provisional Patent Application Ser. No. 61/694,058, filed Aug. 28, 2012.

U.S. patent application Ser. No. 17/088,960 filed Nov. 4, 2020 is also a continuation-in-part of U.S. patent application Ser. No. 16/401,891, filed May 2, 2019, now U.S. Pat. No. 10,867,714, which is a continuation of U.S. patent application Ser. No. 15/584,692, filed May 2, 2017, now U.S. Pat. No. 10,297,356, which is a continuation of U.S. patent application Ser. No. 14/912,754, filed Feb. 18, 2016, now U.S. Pat. No. 9,640,289, which is a national stage entry under 35 U.S.C. § 371 of PCT/US2015/027455, filed Apr. 24, 2015, which claims priority to U.S. Provisional Patent Application Ser. No. 61/983,606, filed Apr. 24, 2014.

U.S. patent application Ser. No. 17/088,960 filed Nov. 4, 2020 is also a continuation-in-part of U.S. patent application Ser. No. 16/022,935, filed Jun. 29, 2018, which is a continuation of U.S. patent application Ser. No. 14/811,454, filed Jul. 28, 2015, now U.S. Pat. No. 10,037,826, which claims priority to U.S. Provisional Patent Application Ser. No. 62/029,931, filed Jul. 28, 2014.

U.S. patent application Ser. No. 17/088,960 filed Nov. 4, 2020 is also a continuation-in-part of U.S. patent application Ser. No. 16/584,892, filed Sep. 26, 2019, which is a continuation of U.S. patent application Ser. No. 14/877,217, filed Oct. 7, 2015, now U.S. Pat. No. 10,468,145, which claims priority to U.S. Provisional Patent Application Ser. No. 62/061,089, filed Oct. 7, 2014.

U.S. patent application Ser. No. 17/088,960 filed Nov. 4, 2020 is also a continuation-in-part of U.S. patent application Ser. No. 16/871,221, filed May 11, 2020, which is a continuation of U.S. patent application Ser. No. 14/935,221, filed Nov. 6, 2015, now U.S. Pat. No. 10,650,933, which claims priority to U.S. Provisional Patent Application Ser. No. 62/076,138, filed Nov. 6, 2014.

U.S. patent application Ser. No. 17/088,960 filed Nov. 4, 2020 is also a continuation-in-part of U.S. patent application Ser. No. 16/513,815, filed Jul. 17, 2019, now U.S. Pat. No. 10,910,119, which is a continuation of U.S. patent application Ser. No. 15/634,408, filed Jun. 27, 2017, now U.S. Pat. No. 10,418,137, which claims priority to U.S. Provisional Patent Application Ser. No. 62/355,057, filed Jun. 27, 2016.

The foregoing applications are all incorporated herein by reference in their entireties.

BACKGROUND

Damaged nuclear fuel is nuclear fuel that is in some way physically impaired. Such physical impairment can range from minor cracks in the cladding to substantial degradation on various levels. When nuclear fuel is damaged, its uranium pellets are no longer fully contained in the tubular cladding that confines the pellets from the external environment. Moreover, damaged nuclear fuel can be distorted from its original shape. As such, special precautions must be taken when handling damaged nuclear fuel (as compared to handling intact nuclear fuel) to ensure that radioactive particulate matter is contained. Please refer to USNRC's Interim Staff Guidance #2 for a complete definition of fuel that cannot be classified as "intact" and, thus, falls into the category of damaged nuclear fuel for purposes of this application. As used herein, damaged nuclear fuel also includes nuclear fuel debris.

Containers and systems for handling damaged nuclear fuel are known. Examples of such containers and systems are disclosed in U.S. Pat. No. 5,550,882, issued Aug. 27, 1996 to Lehnart et al., and U.S. Patent Application Publication No. 2004/0141579, published Jul. 22, 2004 to Methling et al. While the general structure of a container and system for handling damaged nuclear fuel is disclosed in each of the aforementioned references, the containers and systems disclosed therein are less than optimal for a number of reasons, including inferior venting capabilities of the damaged nuclear fuel cavity, difficulty of handling, inability to be meet tight tolerances dictated by existing fuel basket structures, lack of adequate neutron shielding, and/or manufacturing complexity or inferiority.

Thus, a need exists for an improved container and system for handling damaged nuclear fuel, and methods of making the same.

Nuclear power plants currently store their spent fuel assemblies on site for a period after being removed from the reactor core. Such storage is typically accomplished by placing the spent fuel assemblies in closely packed fuel racks located at the bottom of on-site storage pools. The storage pools provide both radiation shielding and much needed cooling for the spent fuel assemblies.

Fuel racks often contain a large number of closely arranged adjacent storage cells wherein each cell is capable of accepting a spent fuel assembly. In order to avoid criticality, which can be caused by the close proximity of adjacent fuel assemblies, a neutron absorbing material is positioned within the cells so that a linear path does not exist between any two adjacent cells (and thus the fuel assemblies) without passing through the neutron absorbing material.

Early fuel racks utilized a layer of neutron absorbing material attached to the cell walls of the fuel rack. However, these neutron absorbing materials have begun to deteriorate as they have been submerged in water for over a decade. In order to either extend the period over which the fuel assemblies may be stored in these fuel racks, it is necessary to either replace the neutron absorber in the cell walls or to add an additional neutron absorber to the cell or the fuel assembly.

In an attempt to remedy the aforementioned problems with the deteriorating older fuel racks, the industry developed removable neutron absorbing assemblies, such as those disclosed in U.S. Pat. Nos. 5,841,825; 6,741,669; and 6,442,227. Neutron absorbing assemblies such as these have become the primary means by which adjacent fuel assemblies are shielded from one another when supported in a submerged fuel rack. Thus, newer fuel racks are generally devoid of the traditional layer of neutron absorbing material built into the structure of the fuel rack itself that can degrade over time. Instead, fuel assembly loading and unloading procedures utilizing neutron absorbing assemblies have generally become standard in the industry. In older racks, the neutron absorbing assemblies are added over the older, often degrading, layer of neutron absorbing material.

While the neutron absorbing assemblies disclosed in the prior art have proved to be preferable to the old fuel racks having the neutron absorbing material integrated into the cell walls, these neutron absorbing assemblies are less than optimal for a number of reasons, including without limitation complexity of construction, the presence of multiple welds, complicated securing mechanisms, and multi-layered walls that take up excessive space within the fuel rack cells. Additionally, with existing designs of neutron absorbing assemblies, the inserts themselves must be removed prior to or concurrently with the fuel assemblies in order to get the fuel assemblies out of the fuel rack. This not only complicates the handling procedure but also leaves certain cells in a potentially unprotected state.

A freestanding fuel rack includes an array of vertical storage cavities used to store nuclear fuel in an upright configuration. Each storage cavity generally provides a square prismatic opening to store one spent nuclear or fresh (unburned) fuel. The cross section of the openings is slightly larger than that of the fuel assembly to facilitate the latter's insertion or withdrawal. From the structural standpoint, the fuel rack is a cellular structure supported on a number of pedestals that transfer the dead load of the rack and its stored fuel to the pool's slab. It is preferable to install the racks in a freestanding configuration to minimize cost and dose (if the pool is populated with irradiated fuel).

The rack modules in a fuel pool typically have the appearance of a set of rectangular cavities arranged in a rectilinear array. The racks are typically separated by small gaps. Freestanding racks, however, are liable to slide or rotate during seismic event. If the plant's design basis is moderate then the kinematic movement of the racks may not be enough to cause inter-rack collisions or rack-to-wall impacts. However, if the seismic event is strong then the response of the racks may be too severe (e.g., large displacements, significant rack impact forces, etc.) to be acceptable. Reducing the kinematic response of the racks under strong seismic events (e.g., earthquakes) while preserving their freestanding disposition is therefore desirable.

The present invention relates, in one aspect, generally to nuclear fuel containment, and more particularly to a capsule and related method for storing or transporting individual nuclear fuel pins or rods including damaged rods. Reactor pools store used fuel assemblies after removal and discharge from the reactor. The fuel assemblies and individual fuel rods therein may become damaged and compromised during the reactor operations, resulting in cladding defects, breaking, warping, or other damage. The resulting damaged fuel assemblies and rods are placed into the reactor pools upon removal and discharge from the reactor core. Eventually, the damaged fuel assemblies, rods, and/or fuel debris must be removed from the pools, thereby allowing decommissioning of the plants.

The storage and transport regulations in many countries do not allow storage or transport of damaged fuel assemblies without encapsulation in a secondary capsule that provides confinement. Due to the high dose rates of used fuel assemblies post-discharge, encapsulating fuel assemblies is traditionally done underwater. Furthermore, some countries may require removal of individual damaged fuel rods from the fuel assembly and separate storage in such secondary capsules. Processes already exist for removing single rods from a used fuel assembly and encapsulation. Subsequent drying of damaged fuel after removal from the reactor pool using traditional vacuum drying is exceedingly challenging because water can penetrate through cladding defects and become trapped inside the cladding materials.

An improved fuel storage system and method for drying, storing, and transporting damaged fuel rods is desired.

In the nuclear power industry, the nuclear energy source is in the form of hollow zircaloy tubes filled with enriched uranium, known as fuel assemblies. Upon being depleted to a certain level, spent fuel assemblies are removed from a reactor. At this time, the fuel assemblies not only emit extremely dangerous levels of neutrons and gamma photons (i.e., neutron and gamma radiation) but also produce considerable amounts of heat that must be dissipated.

It is necessary that the neutron and gamma radiation emitted from the spent fuel assemblies be adequately contained at all times upon being removed from the reactor. It is also necessary that the spent fuel assemblies be cooled. Because water is an excellent radiation absorber, spent fuel assemblies are typically submerged under water in a pool promptly after being removed from the reactor. The pool water also serves to cool the spent fuel assemblies by drawing the heat load away from the fuel assemblies. The water may also contain a dissolved neutron shielding substance.

The submerged fuel assemblies are typically supported in the fuel pools in a generally upright orientation in rack structures, commonly referred to as fuel racks. It is well known that neutronic interaction between fuel assemblies increases when the distance between the fuel assemblies is reduced. Thus, in order to avoid criticality (or the danger thereof) that can result from the mutual inter-reaction of adjacent fuel assemblies in the racks, it is necessary that the fuel racks support the fuel assemblies in a spaced manner that allows sufficient neutron absorbing material to exist between adjacent fuel assemblies. The neutron absorbing material can be the pool water, a structure containing a neutron absorbing material, or combinations thereof.

Fuel racks for high density storage of fuel assemblies are commonly of cellular construction with neutron absorbing plate structures (i.e., shields) placed between the storage cells in the form of solid sheets. For fuel assemblies that have a square horizontal cross-sectional profile, the storage cells are usually long vertical square tubes which are open at the top through which the fuel elements are inserted. In order to maximize the number of fuel assemblies that can be stored in a single rack, the fuel racks for these square tubes are formed by a rectilinear array of the square tubes. Similarly, for fuel assemblies that have a hexagonal horizontal cross-sectional profile, the storage cells are usually long vertical hexagonal tubes which are open at the top through which the fuel elements are inserted. For such storage cells, in order to maximize the number of fuel assemblies that can be stored in a single rack, the fuel racks for these hexagonal tubes are formed by a honeycomb array of the hexagonal tubes.

Regardless of whether the storage cells are square tubes or hexagonal tubes, the storage cells of some fuel racks may include double walls that can serve two functions. The first function of a double cell wall may be to encapsulate neutron shield sheets to protect the neutron shield from corrosion or other deterioration resulting from contact with water. The second function of a double cell wall may be to provide flux traps to better prevent undesirable heat build-up within the array of storage cells. When both of these double-wall functions are incorporated into a fuel rack array, it necessarily decreases the storage density capability. Thus, improvements are desired in design a fuel racks that provide both these functions and improve the overall storage density capability.

The present invention generally relates, in one embodiment, to storage of nuclear fuel assemblies, and more particularly to an improved spent fuel pool for wet storage of such fuel assemblies.

A spent fuel pool (sometimes, two or more) is an integral part of every nuclear power plant. At certain sites, stand-alone wet storage facilities have also been built to provide additional storage capacity for the excess fuel discharged by the reactors. An autonomous wet storage facility that serves one or more reactor units is sometimes referred to by the acronym AFR meaning "Away-from-Reactor." While most countries have added to their in-plant used fuel storage capacity by building dry storage facilities, the French nuclear program has been the most notable user of AFR storage.

As its name implies, the spent fuel pool (SFP) stores the fuel irradiated in the plant's reactor in a deep pool of water. The pool is typically 40 feet deep with upright Fuel Racks positioned on its bottom slab. Under normal storage conditions, there is at least 25 feet of water cover on top of the fuel to ensure that the dose at the pool deck level is acceptably low for the plant workers. Fuel pools at most (but not all) nuclear plants are at grade level, which is desirable from the standpoint of structural capacity of the reinforced concrete structure that forms the deep pond of water. To ensure that the pool's water does not seep out through the voids and discontinuities in the pool slab or walls, fuel pools in nuclear plants built since the 1970s have always been lined with a thin single-layer stainless steel liner (typically in the range of 3/16 inch to 5/16 inch thick). The liner is made up of sheets of stainless steel (typically ASTM 240-304 or 304L) seam welded along their contiguous edges to form an impervious barrier between the pool's water and the undergirding concrete. In most cases, the welded liner seams are monitored for their integrity by locating a leak chase channel underneath them (see, e.g. FIG. 57). The leak chase channels' detection ability, however, is limited to welded regions only; the base metal area of the liner beyond the seams remains un-surveilled.

The liners have generally served reliably at most nuclear plants, but isolated cases of water seepage of pool water have been reported. Because the pool's water bears radioactive contaminants (most of it carried by the crud deposited on the fuel during its "burn" in the reactor), leaching out of the pool water to the plant's substrate, and possibly to the underground water, is evidently inimical to public health and safety. To reduce the probability of pool water reaching the ground water, the local environment and hence some AFR pools have adopted the pool-in-pool design wherein the fuel pool is enclosed by a secondary outer pool filled with clean water. In the dual-pool design, any leakage of water from the contaminated pool will occur into the outer pool, which serves as the barrier against ground water contamination. The dual pool design, however, has several unattractive aspects, viz.: (1) the structural capacity of the storage system is adversely affected by two reinforced concrete containers separated from each other except for springs and dampers that secure their spacing; (2) there is a possibility that the outer pool may leak along with the inner pool, defeating both barriers and allowing for contaminated water to reach the external environment; and (3) the dual-pool design significantly increases the cost of the storage system.

Prompted by the deficiencies in the present designs, a novel design of a spent nuclear fuel pool that would guarantee complete confinement of pool's water and monitoring of the entire liner structure including seams and base metal areas is desirable.

High density spent fuel racks are used in Light Water Reactor (LWR) installations to store nuclear fuel assemblies underwater in deep ponds of water known as Spent Fuel Pools. The current state-of-the-art in the design of Fuel Racks is described in "Management of Spent Nuclear Fuel," Chapter 53, by Drs. Tony Williams and Kris Singh in the ASME monograph Companion Guide to the ASME Boiler & Pressure Vessel Code, Third (3rd) Edition, edited by K. R. Rao (2009). As described in the above mentioned chapter, contemporary fuel racks are cellular structures mounted on a common Baseplate supported on four or more pedestals and made up of a rectangular assemblage of "storage cells" with plates (or panels) of neutron absorber affixed to the walls separating each cell. The neutron absorber serves to control the reactivity of the fuel assemblies arrayed in close proximity to each other. The neutron absorber is typically made of a metal matrix composite such as aluminum and boron carbide, the boron serving to capture the thermalized neutrons emitted by the fuel to control reactivity. Typical areal density of the B-10 isotope (the neutron capture agent in boron carbide) in the absorber plates used in BWR and PWR racks are 0.02 and 0.03 gm/sq. cm, respectively.

The overwhelming majority of fuel racks in use in the United States have discrete panels of neutron absorber secured to the side walls of the storage cell boxes. To eliminate the separate neutron absorber panels that must be affixed to the cell walls, an alternative design that uses borated stainless steel that renders both neutron capture and structural function, has been used in the industry but failed to gain wide acceptance because of the limited quantity of boron that can be introduced in the stainless steel grain structure and other structural limitations. In view of the shortcomings of the alternative designs using borated stainless steel, different alternative designs are needed to fuel racks in order to eliminate the need to use separate neutron absorber panels.

A conventional free-standing, high density nuclear fuel storage rack is a cellular structure typically supported on a set of pedestals from the floor or bottom slab of the water-filled spent fuel pool. The bottom extremity of each fuel storage cell is welded to a common baseplate which serves to provide the support surface for the upwardly extending vertical storage cells and stored nuclear fuel therein. The cellular region comprises an array of narrow prismatic cavities formed by the cells which are each sized to accept a single nuclear fuel assembly comprising a plurality of new or spent nuclear fuel rods. The term "active fuel region"

denotes the vertical space above the baseplate within the rack where the enriched uranium is located.

High density fuel racks used to store used nuclear fuel employ a neutron absorber material to control reactivity. The commercially available neutron absorbers are typically in a plate or sheet form and are either metal or polymer based. The polymeric neutron absorbers commonly used in the industry were sold under trade names Boraflex and Tetrabor, with the former being the most widely used material in the 1980s. The neutron absorber panels have been typically installed on the four walls of the storage cells encased in an enveloping sheathing made of thin gage stainless steel attached to the cell walls in the active fuel region. Unfortunately, the polymeric neutron absorbers have not performed well in service. Widespread splitting and erosion of Boraflex and similar degradation of Tetrabor have been reported in the industry, forcing the plant owners to resort to reducing the density of storage (such as a checkered board storage arrangement) thereby causing an operational hardship to the plant.

A neutron absorber apparatus is desired which can be retrofit in existing fuel racks suffering from neutron absorber material degradation in order to fully restore reactivity reduction capacity of the storage cells.

SUMMARY

In one embodiment, the invention can be a method of forming an elongated tubular container for receiving damaged nuclear fuel, the method comprising: a) extruding, from a material comprising a metal and a neutron absorber, an elongated tubular wall having a container cavity; b) forming, from a material comprising a metal that is metallurgically compatible with the metal of the elongated tubular wall, a bottom cap comprising a first screen having a plurality of openings; and c) autogenously welding the bottom cap to a bottom end of the elongated tubular wall, the plurality of openings of the first screen forming vent passageways to a bottom of the container cavity.

In another embodiment, the invention can be a container for receiving damaged nuclear fuel, the method comprising: an extruded tubular wall forming a container cavity about a container axis, the extruded tubular wall formed of a metal matrix composite having neutron absorbing particulate reinforcement; a bottom cap coupled to a bottom end of the extruded tubular wall; a top cap detachably coupled to a top end of the extruded tubular wall; a first screen comprising a plurality of openings that define lower vent passageways into a bottom of the container cavity; and a second screen comprising a plurality of openings that define upper vent passageways into a top of the container cavity.

In yet another embodiment, the invention can be a system for storing and/or transporting nuclear fuel comprising: a vessel comprising defining a vessel cavity and extending along a vessel axis; a fuel basket positioned within the vessel cavity, the fuel basket comprising a grid forming a plurality of elongated cells, each of the cells extending along a cell axis that is substantially parallel to the vessel axis; and at least one elongated tubular container comprising a container cavity containing damaged nuclear fuel positioned within one of the cells, the elongated tubular container comprising: an extruded tubular wall forming a container cavity about a container axis, the extruded tubular wall formed of a metal matrix composite having neutron absorbing particulate reinforcement; a bottom cap coupled to a bottom end of the extruded tubular wall; a top cap detachably coupled to a top end of the extruded tubular wall; a first screen comprising a plurality of openings that define lower vent passageways into a bottom of the container cavity; and a second screen comprising a plurality of openings that define upper vent passageways into a top of the container cavity.

In still another embodiment, the invention can be a system for storing and/or transporting nuclear fuel comprising: a vessel defining a vessel cavity and extending along a vessel axis; a fuel basket positioned within the vessel cavity, the fuel basket comprising a plurality of elongated cells; an elongated tubular container positioned within one of the cells, the elongated tubular container comprising: an elongated tubular wall forming a container cavity about a container axis, the tubular wall comprising a top portion having a plurality of locking apertures and a top edge defining a top opening into the container cavity; a bottom cap coupled to a bottom end of the elongated tubular wall; a top cap comprising a plurality of locking elements that are alterable between a retracted state and an extended state, the locking elements biased into the extended state; a first screen comprising a plurality of openings that define lower vent passageways between the vessel cavity and a bottom of the container cavity; a second screen comprising a plurality of openings that define upper vent passageways between the vessel cavity and a top of the container cavity; and the top cap and the elongated tubular wall configured so that upon the top cap being inserted through the top opening, contact between the locking element and the elongated tubular wall forces the locking elements into a retracted state, and wherein upon the locking element becoming aligned with the locking apertures, the locking elements automatically returning the extended state such that the locking member protrude into the locking apertures, thereby detachably coupling the top cap to elongated tubular wall.

In a further embodiment, the invention can be a system for storing and/or transporting nuclear fuel comprising: a vessel defining a vessel cavity and extending along a vessel axis; a fuel basket positioned within the vessel cavity, the fuel basket comprising a plurality of elongated cells; an elongated tubular container comprising a container cavity for containing damaged nuclear fuel positioned within one of the cells, the elongated tubular container comprising: a first screen comprising a plurality of openings that define lower vent passageways between the vessel cavity and a bottom of the container cavity, the plurality of openings of the first screen comprising a lowermost opening that is a first distance from a floor of the vessel cavity and an uppermost opening that is a second distance from the floor of the vessel cavity, the second distance being greater than the first distance; and a second screen comprising a plurality of openings that define upper vent passageways between the vessel cavity and a top of the container cavity.

In an even further embodiment, the invention can be a system for storing and/or transporting nuclear fuel comprising: a vessel defining a vessel cavity and extending along a vessel axis; a fuel basket positioned within the vessel cavity, the fuel basket comprising a plurality of elongated cells; an elongated tubular container comprising a container cavity for containing damaged nuclear fuel positioned within one of the cells, the elongated tubular container comprising: a first screen comprising a plurality of openings that define lower vent passageways between the vessel cavity and a bottom of the container cavity, the first screen located on an upstanding portion of the elongated tubular container that is substantially non-perpendicular to the vessel axis; and a second screen comprising a plurality of openings that define upper vent passageways between the vessel cavity and a top of the container cavity.

In a still further embodiment, the invention can be a damaged fuel container, or system incorporating the same, in which the one or more of the screens of the container are integrally formed into the body of the container.

In another aspect of the present invention, a neutron absorbing apparatus includes a corner spine and first and second walls, each affixed to the corner spine to form a chevron shape. Each wall includes an absorption sheet and a guide sheet. The absorption sheet is formed from a metal matrix composite having neutron absorbing particulate reinforcement and is affixed to the corner spine. The guide sheet is affixed to and covers an upper portion of the absorption sheet, and it also extends over a top of the absorption sheet. The absorption sheet extends along the corner spine along a greater length than the guide sheet.

In yet another aspect of the present invention, a neutron absorbing apparatus includes a corner spine and first and second walls, each affixed to the corner spine to form a chevron shape. Each wall includes an absorption sheet and a guide sheet. The absorption sheet is formed from a metal matrix composite having neutron absorbing particulate reinforcement and is affixed to the corner spine. The guide sheet is affixed to and covers an upper portion of the absorption sheet, and it also extends over a top of the absorption sheet. At least one of the walls also includes a locking protuberance coupled to the respective guide sheet and protruding through an opening formed in the respective absorption sheet.

In still another aspect of the present invention, a system for supporting spent nuclear fuel in a submerged environment includes a fuel rack, a fuel assembly, and a neutron absorbing apparatus. The fuel rack includes an array of cells, with each cell being separated from adjacent cells by a cell wall. The fuel assembly is positioned within one of the cells, and the neutron absorbing apparatus is also disposed within that cell. The neutron absorbing apparatus includes a corner spine and first and second walls, each affixed to the corner spine to form a chevron shape. Each wall includes an absorption sheet and a guide sheet. The absorption sheet is formed from a metal matrix composite having neutron absorbing particulate reinforcement and is affixed to the corner spine. The guide sheet is affixed to and covers an upper portion of the absorption sheet, and it also extends over a top of the cell wall in which the fuel assembly is disposed, adjacent the first wall or the second wall of the neutron absorbing apparatus, and the first wall or the second wall include a locking protuberance positioned to retain the neutron absorbing apparatus in the first cell during removal of the fuel assembly from the first cell.

In another aspect of the present invention, a method of retrofitting a spent nuclear fuel cell storage system includes inserting a neutron absorbing apparatus into one cell of an array of cells, wherein each cell is separated from each adjacent cell by a cell wall. The neutron absorbing apparatus includes a corner spine and first and second walls, each affixed to the corner spine to form a chevron shape. Each wall includes an absorption sheet and a guide sheet. The absorption sheet is formed from a metal matrix composite having neutron absorbing particulate reinforcement and is affixed to the corner spine. The guide sheet is affixed to and covers an upper portion of the absorption sheet, and it also extends over a top of the absorption sheet. At least one of the walls also includes a first locking protuberance coupled to the respective guide sheet and protruding through an opening formed in the respective absorption sheet. The method further includes creating a second locking protuberance in a first cell wall adjacent the neutron absorbing apparatus, wherein the first locking protuberance and the second locking protuberance are positioned to interlock to retain the neutron absorbing apparatus in the one cell.

In yet another aspect of the present invention, any of the foregoing aspects may be employed in combination. Accordingly, an improved neutron absorption apparatus for spent nuclear fuel pools and casks is disclosed. Advantages of the improvements will be apparent from the drawings and the description of the preferred embodiment.

In another embodiment, the present invention is directed toward a system and method for minimizing lateral movement of one or more nuclear fuel storage racks in a storage pool during a seismic event. In both the system and the method. Lateral movement of a storage rack may be limited either by limiting lateral movement of the rack toward the side wall of the storage pool, or by limiting lateral movement of a first storage rack with respect to another object.

In another aspect of the present invention, a system for storing nuclear fuel includes a nuclear fuel storage rack and a bearing pad. The storage rack includes an array of cells, each cell configured to receive and store nuclear fuel rods, a base plate configured to support the array of cells, and a support structure configured to support the base plate and to allow cooling fluid to circulate under and up through apertures in the base plate. The bearing pad is coupled to the support structure and configured to limit lateral movement of the storage rack independent from lateral movement of the bearing pad. The base plate defines a base plate profile in a horizontal plane of the base plate, and the bearing plate defines a bearing pad profile in the horizontal plane of the base plate, wherein the bearing pad profile extends outside of the base plate profile.

In another aspect of the present invention, the system for storing nuclear fuel includes first and second adjacent storage racks and a bearing pad. Each storage rack includes, respectively, an array of cells, each cell configured to receive and store nuclear fuel rods, a base plate configured to support the array of cells, and a support structure configured to support the base plate and to allow cooling fluid to circulate under and up through apertures in the base plate. The bearing pad is coupled to the support structure of each of the storage racks, and it is configured to limit lateral movement of each storage rack independent from lateral movement of the bearing pad.

In a further aspect of the present invention, a method of placing a nuclear fuel storage rack into a storage pool includes placing a bearing pad on the bottom of the storage pool, then placing a storage rack into the storage pool. The storage rack includes an array of cells, a base plate configured to support the array of cells, and a support structure configured to support the base plate, wherein each cell of the array of cells being configured to receive and store nuclear fuel rods. In placing the storage rack, the bearing pad is coupled to the support structure, and the bearing pad is configured to limit lateral movement of the storage rack independent from lateral movement of the bearing pad. The base plate defines a base plate profile in a horizontal plane of the base plate, the bearing pad defines a bearing pad profile in the horizontal plane of the base plate, and the bearing pad profile extends outside of the base plate profile.

In another aspect of the present invention, a method of placing a first nuclear fuel storage rack and a second nuclear fuel storage rack into a storage pool includes placing a bearing pad on a bottom of a storage pool, placing the first storage rack into the storage pool, then placing the second storage rack into the storage pool. Each storage rack includes, respectively, an array of cells, each cell configured to receive and store nuclear fuel rods, a base plate configured to support the array of cells, and a support structure configured to support the base plate and to allow cooling fluid to circulate under and up through apertures in the base plate. The first storage rack is placed into the storage pool so that the bearing pad is coupled to the respective support structure of the first storage rack. The second storage rack is placed into the storage pool so that the bearing pad is coupled to the respective support structure of the second storage rack. The bearing pad is configured to limit lateral movement of each storage rack independent from lateral movement of the bearing pad.

In yet another aspect of the present invention, any of the foregoing aspects may be employed in combination.

Accordingly, an improved system and method for minimizing lateral movement of one or more nuclear fuel storage racks in a storage pool during a seismic event are disclosed. Advantages of the improvements will be apparent from the drawings and the description of the preferred embodiment.

A nuclear fuel storage system and related method are provided that facilitates drying and storage of individual fuel rods, which may be used for damaged and intact fuel rods and debris. The system includes a capsule that is configured for holding a plurality of fuel rods, and further for drying the internal cavity of the capsule and fuel rods stored therein using known inert forced gas dehydration (FGD) techniques or other methods prior to long term storage. Existing forced gas dehydration systems and methods that may be used with the present invention can be found in commonly owned U.S. Pat. Nos. 7,096,600, 7,210,247, 8,067,659, 8,266,823, and 7,707,741, which are all incorporated herein by reference in their entireties.

In one embodiment, a storage capsule for nuclear fuel rods includes: an elongated body defining a vertical centerline axis, the body comprising an open top end, a bottom end, and sidewalls extending between the top and bottom ends; an internal cavity formed within the body; a lid attached to and closing the top end of the body; and an array of axially extending fuel rod storage tubes disposed in the cavity; wherein each storage tube has a transverse cross section configured and dimensioned to hold no more than one fuel rod.

In one embodiment, a fuel storage system for storing nuclear fuel rods includes: an elongated capsule defining a vertical centerline axis, the capsule comprising a top end, a bottom end, and sidewalls extending between the top and bottom ends; an internal cavity formed within the capsule; a lid attached to the top end of the capsule, the lid including an exposed top surface and a bottom surface; an upper tubesheet and a lower tubesheet disposed in the cavity; a plurality of vertically oriented fuel rod storage tubes extending between the upper and lower tubesheets; and a central drain tube extending between the upper and lower tubesheets; wherein each storage tube has a transverse cross section configured and dimensioned to hold no more than one fuel rod.

A method for storing nuclear fuel rods is provided. The method includes: providing an elongated vertically oriented capsule including an open top end, a bottom end, and an internal cavity, the capsule further including a plurality of vertically oriented fuel rod storage tubes each having a top end spaced below the top end of the capsule, the storage tubes each having a transverse cross section configured and dimensioned to hold no more than a single fuel rod; inserting a first fuel rod into a first storage tube; inserting a second fuel rod into a second storage tube; attaching a lid to the top end of the capsule; and sealing the lid to the capsule to form a gas tight seal.

A method for storing and drying nuclear fuel rods includes: providing an elongated vertically oriented capsule including an open top end, a bottom end, and an internal cavity, the capsule further including a plurality of vertically oriented fuel rod storage tubes each having a top end spaced below the top end of the capsule, the storage tubes each having a transverse cross section configured and dimensioned to hold no more than a single fuel rod; inserting a fuel rod into each of the storage tubes; attaching a lid to the top end of the capsule, the lid including a gas supply flow conduit extending between top and bottom surfaces of the lid and a gas return flow conduit extending between the top and bottom surfaces of the lid; sealing the lid to the capsule to form a gas tight seal; pumping an inert drying gas from a source through the gas supply conduit into the cavity of the capsule; flowing the gas through each of the storage tubes; collecting the gas leaving the storage tubes; and flowing the gas through the gas return conduit back to the source.

The present invention is directed to an apparatus for supporting spent nuclear fuel. Specifically, the apparatus enables the high density storage of spent nuclear fuel.

In one aspect of the invention, a fuel rack apparatus includes: a base plate having an upper surface and a lower surface; and a plurality of storage tubes coupled to the upper surface of the base plate in a side-by-side arrangement to form a rectilinear array of the storage tubes. Each of the storage tubes extends along a longitudinal axis and includes: a rectangular outer tube having an inner surface defining an inner cavity; a first chevron plate comprising a first wall plate and a second wall plate; and a second chevron plate comprising a first wall plate and a second wall plate. The first and second chevron plates are positioned in the inner cavity in opposing relation to divide the inner cavity into: (1) a first chamber formed between the first wall plate of the first chevron plate and a first corner section of the rectangular outer tube; (2) a second chamber formed between the second wall plate of the first chevron plate and a second corner section of the rectangular outer tube; (3) a third chamber formed between the first wall plate of the second chevron plate and a third corner section of the rectangular outer tube; (4) a fourth chamber formed between the second wall plate of the second chevron plate and a fourth corner section of the rectangular outer tube; and (5) a fuel storage cell having a hexagonal transverse cross-section and configured to receive a fuel assembly containing spent nuclear fuel.

In another aspect of the invention, a fuel rack apparatus for storing spent nuclear fuel includes: a base plate having an upper surface and a lower surface; and a plurality of storage tubes coupled to and extending upward from the upper surface of the base plate, the storage tubes arranged in a side-by-side arrangement to form an array of the storage tubes. Each of the storage tubes extend along a longitudinal axis and include: an outer tube having an inner surface defining an inner cavity; and an inner plate-assemblage positioned within the outer tube that divides the inner cavity into a plurality of interior flux trap chambers and a fuel storage cell.

In yet another aspect of the invention, a fuel rack apparatus includes: a base plate having an upper surface and a lower surface; and a plurality of storage tubes coupled to the upper surface of the base plate in a side-by-side arrangement to form a rectilinear array of the storage tubes. Each of the storage tubes extends along a longitudinal axis and includes: a rectangular outer tube having an inner surface defining an inner cavity; and a plurality of wall plates positioned in the inner cavity that divide the inner cavity into: (1) a first interior flux chamber formed between a first one of the wall plates and a first corner section of the rectangular outer tube; (2) a second interior flux chamber formed between a second one of the wall plates and a second corner section of the rectangular outer tube; (3) a third interior flux chamber formed between a third one of the wall plates and a third corner section of the rectangular outer tube; (4) a fourth interior flux chamber formed between a fourth one of wall plates and a fourth corner section of the rectangular outer tube; and (5) a fuel storage cell having a hexagonal transverse cross-section and configured to receive a fuel assembly containing spent nuclear fuel.

In an embodiment, the present invention provides an environmentally sequestered spent fuel pool system having a dual impervious liner system and leak detection/evacuation system configured to collect and identify leakage in the interstitial space formed between the liners. The internal cavity of the pool has not one but two liners layered on top of each other, each providing an independent barrier to the out-migration (emigration) of pool water. Each liner encompasses the entire extent of the water occupied space and further extends above the pool's "high water level." The top of the pool may be equipped with a thick embedment plate (preferably 2 inches thick minimum in one non-limiting embodiment) that circumscribes the perimeter of the pool cavity at its top extremity along the operating deck of the pool. Each liner may be independently welded to the top embedment plate. The top embedment plate features at least one telltale hole, which provides direct communication with the interstitial space between the two liner layers. In one implementation, a vapor extraction system comprising a vacuum pump downstream of a one-way valve is used to draw down the pressure in the inter-liner space through the telltale hole to a relatively high state of vacuum. The absolute pressure in the inter-liner space ("set pressure") preferably should be such that the pool's bulk water temperature is above the boiling temperature of water at the set pressure as further described herein.

In one embodiment, an environmentally sequestered nuclear spent fuel pool system includes: a base slab; a plurality of vertical sidewalls extending upwards from and adjoining the base slab, the sidewalls forming a perimeter; a cavity collectively defined by the sidewalls and base slab that holds pool water; a pool liner system comprising an outer liner adjacent the sidewalls, an inner liner adjacent the outer liner and wetted by the pool water, and an interstitial space formed between the liners; a top embedment plate circumscribing the perimeter of the pool at a top surface of the sidewalls adjoining the cavity; and the inner and outer sidewalls having top terminal ends sealably attached to the embedment plate.

In another embodiment, an environmentally sequestered nuclear spent fuel pool with leakage detection system includes: a base slab; a plurality of vertical sidewalls extending upwards from and adjoining the base slab, the sidewalls forming a perimeter; a cavity collectively defined by the sidewalls and base slab that holds pool water; at least one fuel storage rack disposed in the cavity that holds a nuclear spent fuel assembly containing nuclear fuel rods that heat the pool water; a pool liner system comprising an outer liner adjacent the sidewalls and base slab, an inner liner adjacent the outer liner and wetted by the pool water, and an interstitial space formed between the liners; a top embedment plate circumscribing the perimeter of the pool, the embedment plate embedded in the sidewalls adjoining the cavity; the inner and outer liners attached to the top embedment plate; a flow plenum formed along the sidewalls that is in fluid communication with the interstitial space; and a vacuum pump fluidly coupled to the flow plenum, the vacuum pump operable to evacuate the interstitial space to a negative set pressure below atmospheric pressure.

A method for detecting leakage from a nuclear spent fuel pool is provided. The method includes: providing a spent fuel pool comprising a plurality of sidewalls, a base slab, a cavity containing cooling water, and a liner system disposed in the cavity including an outer liner, an inner liner, and an interstitial space between the liner; placing a fuel storage rack in the pool; inserting at least one nuclear fuel assembly into the storage rack, the fuel assembly including a plurality of spent nuclear fuel rods; heating the cooling water in the pool to a first temperature from decay heat generated by the spent nuclear fuel rods; drawing a vacuum in the interstitial space with a vacuum pump to a negative pressure having a corresponding boiling point temperature less than the first temperature; collecting cooling water leaking from the pool through the liner system in the interstitial space; converting the leaking cooling water into vapor via boiling; and extracting the vapor from the interstitial space using the vacuum pump; wherein the presence of vapor in the interstitial space allows detection of a liner breach. The method may further include discharging the vapor extracted by the vacuum pump through a charcoal filter to remove contaminants. The method may further include: monitoring a pressure in the interstitial space; detecting a first pressure in the interstitial space prior to collecting cooling water leaking from the pool through the liner system in the interstitial space; and detecting a second pressure higher than the first pressure after collecting cooling water leaking from the pool through the liner system in the interstitial space; wherein the second pressure is associated with a cooling water leakage condition.

In another embodiment, the present invention is directed toward a fuel rack for the storage of spent nuclear fuel. The rack employs a plurality of slotted plates to form an array of cells for storing nuclear fuel assemblies. The slotted plates are constructed from two different types of materials which are metallurgically incompatible, one which provides strength to the array of cells and the other which is a neutron absorber. The design reduces the complexity of the design for fuel racks, while at the same time still providing the necessary safety systems for the long term storage of nuclear fuel.

In one aspect, the invention may be a fuel rack for nuclear fuel assemblies, the fuel rack including a base plate and an array of cells for holding the fuel assemblies. The array of cells includes: a plurality of first slotted plates slidably interlocked with one another to form a top portion of the array of cells, the plurality of first slotted plates formed of a first material; a plurality of second slotted plates slidably interlocked with one another to form a middle portion of the array of cells, the plurality of second slotted plates formed of a second material, the first and second materials being metallurgically incompatible; and a plurality of third slotted plates slidably interlocked with one another to form a bottom portion of the array of cells, the plurality of third slotted plates formed of the first material and connected to a top surface of the base plate.

In another aspect, the invention may be a nuclear fuel storage apparatus including: a fuel assembly and a fuel rack. The fuel assembly has a top section, a middle section, and a bottom section, with nuclear fuel being stored within the middle section. The fuel rack includes a base plate and an array of cells, with the fuel assembly located in a first cell of the array of cells. The array of cells includes: a plurality of first slotted plates slidably interlocked with one another to form a top portion of the array of cells, the plurality of first slotted plates formed of a first material; a plurality of second slotted plates slidably interlocked with one another to form a middle portion of the array of cells, the plurality of second slotted plates formed of a second material, the first and second materials being metallurgically incompatible, and the middle section of the fuel assembly located entirely within the middle portion of the first cell of the array of cells; and a plurality of third slotted plates slidably interlocked with one another to form a bottom portion of the array of cells, the plurality of third slotted plates formed of the first material and connected to a top surface of the base plate.

In still another aspect, the invention may be a fuel rack for nuclear fuel assemblies, the fuel rack including: a base plate; an array of cells for holding fuel assemblies, the array of cells including: a plurality of first slotted plates slidably interlocked with one another to form a top portion of the array of cells, the plurality of first slotted plates welded together and formed of a first material; a plurality of second slotted plates slidably interlocked with one another to form a middle portion of the array of cells, the plurality of second slotted plates formed of a second material, the first and second materials being metallurgically incompatible; and a plurality of third slotted plates slidably interlocked with one another to form a bottom portion of the array of cells, the plurality of third slotted plates formed of the first material and welded to a top surface of the base plate; and a plurality of tie members, each tie member welded to each of the top and bottom portions of the array of cells.

Embodiments of the present invention provide a neutron absorber insert system which can be readily added in situ to existing storage cells of the fuel rack having degraded neutron absorbers and reduced reactivity reduction capacity. The system comprises a plurality of neutron absorber apparatuses which may be in the form of absorber inserts configured for direct insertion into and securement to the fuel storage cells. The inserts have a low-profile small and thin cross sectional footprint which does not significantly reduce the storage capacity of each storage cell. A fuel assembly may be inserted into a central longitudinally-extending cavity of the insert and removed therefrom without first removing the insert. The inserts include a locking feature which is automatically deployed and secures the insert in the cell, as further described herein. Advantageously, the absorber insert may utilize an available edge surface on an existing storage tube of the fuel rack which can be engaged by the locking feature of the absorber tube. This eliminates the need for modifying the existing fuel rack in order to accommodate the insert, thereby saving time and expense. In one embodiment, the edge surface may be part of an existing neutron absorber sheathing structure on the fuel storage tube. The inserts may advantageously be deployed in the existing fuel rack storage cells via remote handling equipment such as cranes while the rack remains submerged underwater in the spent fuel pool.

In one aspect, a neutron absorber apparatus for a nuclear fuel storage system includes: a fuel rack comprising a vertical longitudinal axis and plurality of longitudinally-extending storage cells, each cell comprising a plurality of cell sidewalls defining a cell cavity configured for storing nuclear fuel therein; a sheath integrally attached to a first cell sidewall of a first cell and defining a sheathing cavity configured for holding a neutron absorber material; an absorber insert comprising plural longitudinally-extending neutron absorber plates each comprising a neutron absorber material, the insert disposed in the first cell; and an elastically deformable locking protrusion disposed on one of the absorber plates, the locking protrusion resiliently movable between an outward extended position and an inward retracted position; the locking protrusion lockingly engaging the sheath to axially restrain the insert and prevent removal of the insert from the first cell.

In another aspect, a neutron absorber apparatus for a nuclear fuel storage system includes: a fuel rack comprising a vertical longitudinal axis and plurality of longitudinally-extending storage tubes each defining a cell, each storage tube comprising a plurality of tube sidewalls defining a primary cavity; an absorber insert insertably disposed in the primary cavity of a first storage tube, the absorber insert comprising a plurality of absorber plates arranged to form a longitudinally-extending neutron absorber tube having an exterior and an interior defining a secondary cavity configured for storing a nuclear fuel assembly therein, each absorber plate formed of a neutron absorber material; an upper stiffening band extending perimetrically around an upper end of the absorber tube, the upper stiffening band attached to the exterior of the absorber tube and protruding laterally outwards beyond the absorber plates to engage the tube sidewalls of the first storage tube; a lower stiffening band extending perimetrically around a lower end of the absorber tube and disposed at least partially inside the secondary cavity, the lower stiffening band attached to the interior of the absorber tube; wherein the absorber plates of the insert assembly are spaced laterally apart from the tube sidewalls of the first storage tube by the upper stiffening band forming a clearance gap therebetween.

In another aspect, a neutron absorber apparatus for a nuclear fuel storage system includes: a fuel rack comprising a plurality of longitudinally-extending storage cells, each cell comprising a plurality of cell walls defining a cell cavity for storing nuclear fuel; a longitudinally-extending absorber tube insertably disposed in a first cell of the fuel rack and having an exterior and an interior, the absorber tube comprising: an elongated chevron-shaped first absorber plate comprising a first section and a second section angularly bent to the first section along a bend line of the first absorber plate; an elongated chevron-shaped second absorber plate comprising a third section and a fourth section angularly bent to the third section along a bend line of the second absorber plate; an upper stiffening band extending perimetrically around upper ends of the first and second absorber plates and coupling the first and second absorber plates together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 23 is a plan view of a bottom portion of a fuel rack;

FIG. 24A is a detailed view of the portion XXIV of FIG. 23;

FIG. 24B shows the lateral tolerance of a support pedestal with relation to a recess cavity;

FIGS. 30A-C are various views of an alternative embodiment of a bearing pad;

All drawings are schematic and not necessarily to scale. Parts shown and/or given a reference numerical designation in one figure may be considered to be the same parts where they appear in other figures without a numerical designation for brevity unless specifically labeled with a different part number and described herein. References herein to a figure number (e.g. FIG. 1) shall be construed to be a reference to all subpart figures in the group (e.g. FIGS. 1A, 1B, etc.) unless otherwise indicated.

DETAILED DESCRIPTION OF THE DRAWINGS

Figure 1:
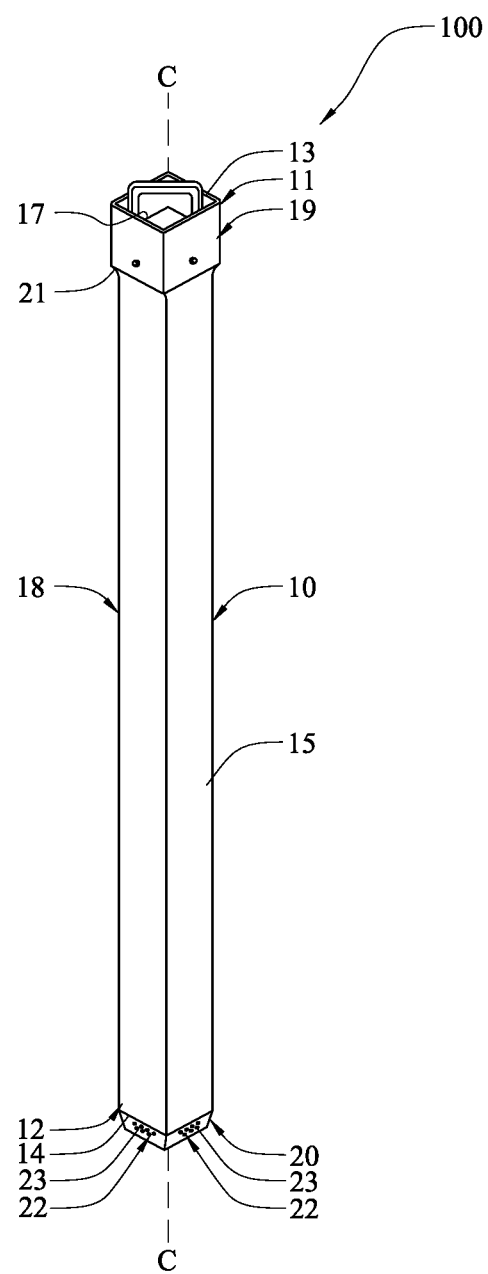
FIG. 1 is an isometric view of a damaged fuel container according to an embodiment of the present invention.

The following description of the illustrated embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Multiple inventive concepts are described herein and are distinguished from one another using headers in the description that follows. Specifically, FIGS. 1-12 are relevant to a first inventive concept, FIGS. 13-20 are relevant to a second inventive concept, FIGS. 21-31 are relevant to a third inventive concept, FIGS. 32-49 are relevant to a fourth inventive concept, FIGS. 50-56 are relevant to a fifth inventive concept, FIGS. 57-63 are relevant to a sixth inventive concept, FIGS. 64-73 are relevant to a seventh inventive concept, and FIGS. 74-85 are relevant to an eighth inventive concept. The first through eighth inventive concepts should be considered in isolation from one another. It is possible that there may be conflicting language or terms used in the description of the first through eighth inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed.

Similarly, the section of the description describing a particular inventive concept being claimed should be used to interpret claim language when necessary.

I. Inventive Concept 1

With reference to FIGS. 1-12, a first inventive concept will be described.

Referring first to FIGS. 1-4 concurrently, a damaged fuel container ("DFC") 100 according to an embodiment of the present invention is illustrated. The DFC 100 incorporates an inventive design (and is formed by an inventive method) that allows high density packaging of damaged fuel in pressure vessels, such as metal casks or multi-purpose canisters (described in greater detail below). The DFC 100 can be used to package damaged nuclear fuel at nuclear reactors, such as the Fukushima Daiichi site. The DFC 100 can be used to safely containerize nuclear fuel of compromised cladding integrity and is a unitary waste package for the fuel that may be in various stages of dismemberment ranging from minor cracks in the cladding to its substantial degradation. As described in greater detail below, the DFC 100 is designed to be loaded with damaged nuclear fuel and positioned within a fuel basket which, in turn, is housed in a pressure vessel such as a metal cask or a multi-purpose canister.

The DFC 100 is an elongated tubular container that extends along a container axis C-C. As will become more apparent from the description below, the DFC 100 is specifically designed so as to not form a fluid-tight container cavity 101 therein. This allows the container cavity 101 of the DFC 100, and its damaged nuclear fuel payload, to be adequately dried for dry storage using standard dry storage dehydration procedures. Suitable dry storage dehydration operations and equipment that can be used to dry the DFC 100 (and the system 999) are disclosed in, for example: U.S. Patent Application Publication No. 2006/0288607, published Dec. 28, 2006 to Singh; U.S. Patent Application Publication No. 2009/0158614, published Jun. 2, 2009 to Singh et al.; and U.S. Patent Application Publication No. 2010/0212182, published Aug. 22, 2010 to Singh. While a fluid-tight boundary is not formed by the DFC 100, the DFC 100 (when fully assembled as shown in FIGS. 1-4) creates a particulate confinement boundary for its damaged nuclear fuel payload, thereby preventing radioactive particles and debris from escaping the container cavity 101.

The DFC 100 generally comprises an elongated tubular wall 10, a bottom cap 20 and a top cap 30. In one embodiment, the elongated tubular wall 10 is formed of a material comprising a metal and a neutron absorber. As used herein the term "metal" includes metals and metal alloys. In certain embodiments, suitable metals may include without limitation aluminum, steel, lead, and titanium while suitable neutron absorbers may include without limitation boron, boron carbide and carborundum. As used herein, the term "aluminum" includes aluminum alloys. In one specific embodiment, the metal is an aluminum and the neutron absorber material is boron or boron carbide. In other embodiments, the elongated tubular wall 10 is formed entirely of a metal matrix composite having neutron absorbing particulate reinforcement. Suitable metal matrix composites having neutron absorbing particulate reinforcement include, without limitation, a boron carbide aluminum matrix composite material, a boron aluminum matrix composite material, a boron carbide steel matrix composite material, a carborundum aluminum matrix composite material, a carborundum titanium matrix composite material and a carborundum steel matrix composite material. Suitable aluminum boron carbide metal matrix composites are sold under the name Metamic® and Boralyn®. The use of an aluminum-based metal matrix composite ensures that the DFC 100 will have good heat rejection capabilities.

Figure 10:
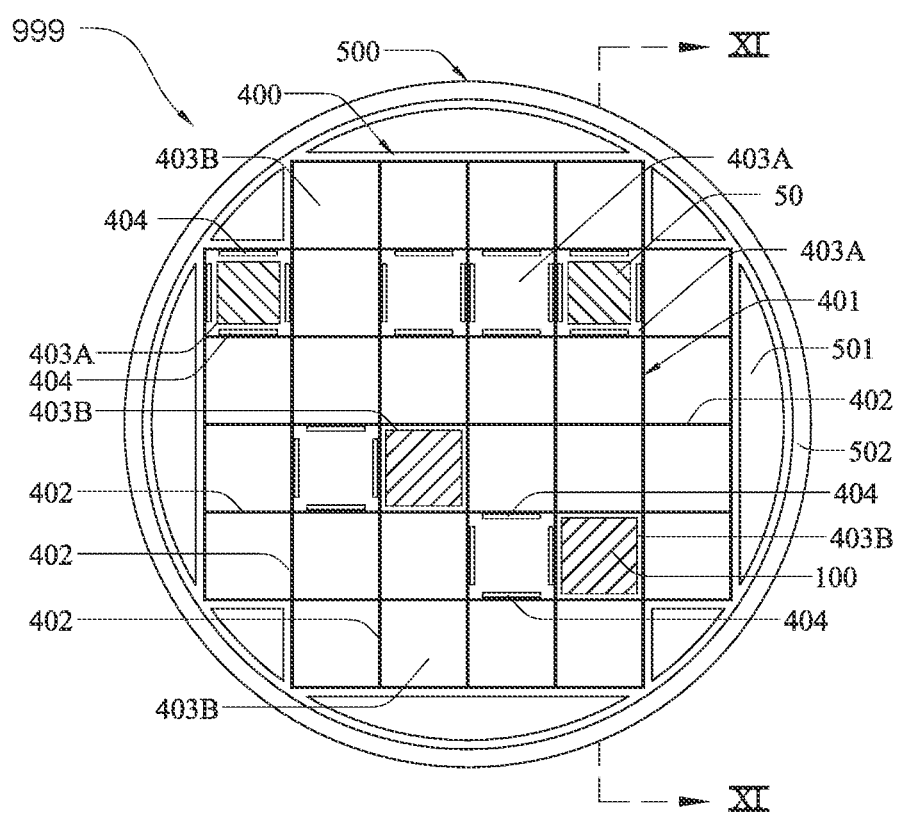
FIG. 10 is a top view of a system according to an embodiment of the present invention, wherein a loaded damaged fuel container of FIG. 1 and intact fuel assemblies are schematically illustrated therein.

The boron carbide aluminum matrix composite material of which the elongated tubular wall 10 is constructed, in one embodiment, comprises a sufficient amount of boron carbide so that the elongated tubular wall 10 can effectively absorb neutron radiation emitted from the damage nuclear fuel loaded within the container cavity 101, thereby shielding adjacent nuclear fuel (damaged or intact) in the fuel basket 400 from one another (FIG. 10). In one embodiment, the elongated tubular wall 10 is constructed of an aluminum boron carbide metal matrix composite material that is greater than 25% by volume boron carbide. In other embodiments, the elongated tubular wall 10 is constructed of an aluminum boron carbide metal matrix composite material that is between 20% to 40% by volume boron carbide, and more preferably between 30% to 35%. Of course, the invention is not so limited and other percentages may be used. The exact percentage of neutron absorbing particulate reinforcement required to be in the metal matrix composite material will depend on a number of factors, including the thickness of the elongated tubular wall 10, the spacing/pitch between adjacent cells within the fuel basket 400 (FIG. 10), and the radiation levels of the damaged nuclear fuel. As will be discussed in greater detail below, the elongated tubular wall 10 is formed by an extrusion process in certain embodiments and, thus, the DFC 100 can be considered an extruded tubular container in such embodiments. Extrusion is preferred because it results in an elongated tubular wall 10 that is free of bending or warping that can be caused by welding processes that are used to create tubes.

The elongated tubular wall 10 extends along the container axis C-C from a top end 11 to a bottom end 12. The top end 11 terminates in a top edge 13 while the bottom end 12 terminates in a bottom edge 14. The elongated tubular wall 10 also comprises an outer surface 15 and an inner surface 16 that forms a container cavity 101. The top edge 13 defines a top opening 17 that leads into the container cavity 101.

The elongated tubular wall 10 comprises a top portion 18 and a bottom portion 19. In the exemplified embodiment, the bottom portion 19 extends from the bottom edge 14 to a transition shoulder 21 while the top portion 18 extends from the transition shoulder 21 to the top edge 13. The top portion 19, in the exemplified embodiment, is an upper section of the elongated tubular wall 10 that flares slightly outward moving from the transition shoulder 21 to the top edge 13. Thought of another way, the top portion 19 of the elongated tubular wall 10 has a transverse cross-section that gradually increases in size moving from the transition shoulder 21 to the top edge 13. The bottom portion 18, in the exemplified embodiment, has a substantially constant transverse cross-section along its length, namely from the bottom edge 14 to the transition shoulder 21. In other embodiments, the top portion 19 can also have a transverse cross-section that is substantially constant along its length from the transition shoulder 21 to the top edge 13. In such an embodiment, the transverse cross-section of the top portion can be larger than the transverse cross-section of the bottom portion 18. In still other embodiments, the elongated tubular wall 10 may have a substantially constant transverse cross-section along its entire length from the bottom edge 14 to the top edge 13. In such an embodiment, the elongated tubular wall 10 will be devoid of a transition shoulder 21 and the top and bottom portions 18, 19 would have no physical distinction.

In the exemplified embodiment, the elongated tubular wall 10 has a substantially constant thickness along its entire length. In one embodiment, the elongated tubular wall 10 has a wall thickness between 1 mm to 3 mm, with about 2 mm being preferred. Of course, the invention is not so limited and the elongated tubular wall 10 can have wall thickness that is variable and of different empirical values and ranges.

The inner surface 16 of the elongated tubular wall 10 defines the container cavity 101. In the exemplified embodiment, the portion of the container cavity 101 defined by the bottom portion 18 has a transverse cross-section that is substantially constant in size while the portion of the container cavity 101 defined by the top portion 19 has a transverse cross-section that increases in size moving from the transition shoulder 21 to the top edge 13.

In the exemplified embodiment, the elongated tubular wall 10 has a transverse cross-section that is substantially rectangular in shape along its entire length from the bottom edge 14 to the top edge 13. Similarly, the container cavity 101 also has a transverse cross-section that is substantially rectangular in shape along its entire length. Of course, the transverse cross-sections can be other shapes in other embodiments, and can even be dissimilar shapes between the top and bottom portions 18, 19.

The bottom cap 20 is fixedly coupled to the bottom end 12 of the elongated tubular wall 10 while the top cap 30 is detachably coupled to the top end 11 of the elongated tubular wall 10. More specifically, the bottom cap 20 is coupled to the bottom edge 14 of the elongated tubular wall 10. As will be described in greater detail below, in the exemplified embodiment, the bottom cap 20 is fixedly coupled to the bottom end 12 of the elongated tubular wall 10 by an autogenous welding technique, such as by friction stir welding. In other embodiments, the bottom cap 20 is fixedly coupled to the bottom end 12 of the elongated tubular wall 10 using other connection techniques.

The bottom cap 20, in certain embodiments, is formed of a material comprising a metal that is metallurgically compatible with the metal of the elongated tubular wall 10 for welding. In one embodiment, the bottom cap is formed of aluminum. The bottom cap 20, in a preferred embodiment, is formed by a casting process.

The bottom cap 20 comprises a plurality of first screens 22. Each of the first screens 22 comprises a plurality of openings 23 that define lower vent passageways into a bottom 102 of the container cavity 101. While in the exemplified embodiment the first screens 22 are incorporated into the bottom cap 20, the first screens 22 can be incorporated into the bottom end 12 of the elongated tubular wall 10 in other embodiments. Furthermore, while the exemplified DFC 100 comprises four first screens in the exemplified embodiment, more or less first screens 22 can be included in other embodiments.

In one embodiment, the openings 23 of the first screens 22 are small enough so that radioactive particulate matter cannot pass therethrough but are provided in sufficient density (number of openings/area) to allow sufficient venting of air, gas or other fluids through the container cavity 101. In one embodiment, the openings 23 have a diameter in a range of 0.03 mm to 0.1 mm, and more preferably a diameter of about 0.04 mm. The openings 23 may be provided for each of the first screens 22, in certain embodiments, to have a density of 200 to 300 holes per square inch. The invention, however, is not limited to any specific dimensions or hole density unless specifically claimed.

In the exemplified embodiment, the first screens 22 are integrally formed into a body 24 of the bottom cap 20 by creating the openings 23 directly into the body 24 of the bottom cap 20. The openings 23 can be formed into the body 24 of the bottom cap 20 by punching, drilling or laser cutting techniques. In one embodiment, it is preferred to form the openings using a laser cutting technique. Laser cutting allows very fine openings 23 to be formed with precision and efficiency. In alternate embodiments, the openings of the first screens 22 may not be integrally formed into the bottom cap 20 (or the elongated tubular wall 10). Rather, larger through holes can be formed in the bottom cap 20 that are then covered by separate first screens 22, such as wire mesh screens.

Figure 2:
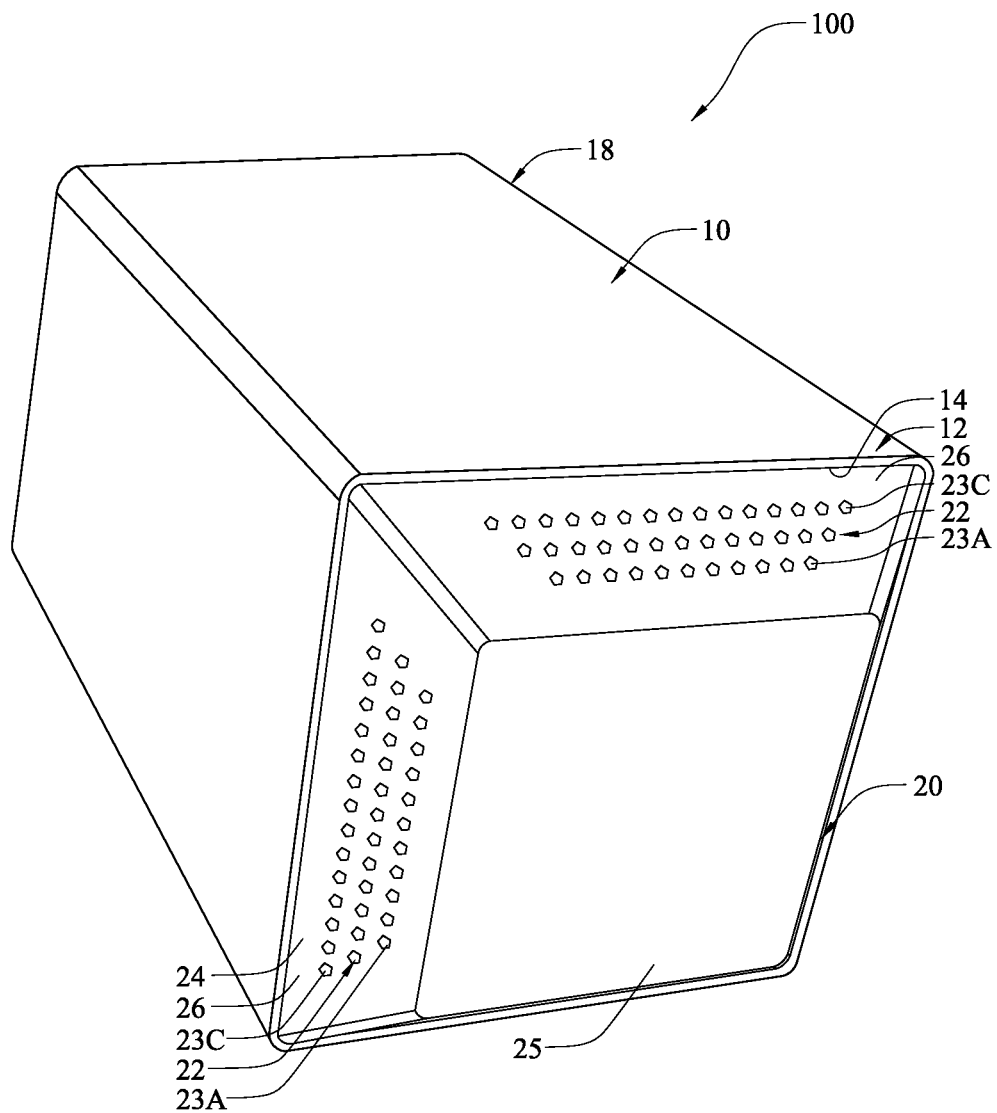
FIG. 2 a bottom perspective view of a bottom portion of the damaged fuel container of FIG. 1.
Figure 5:
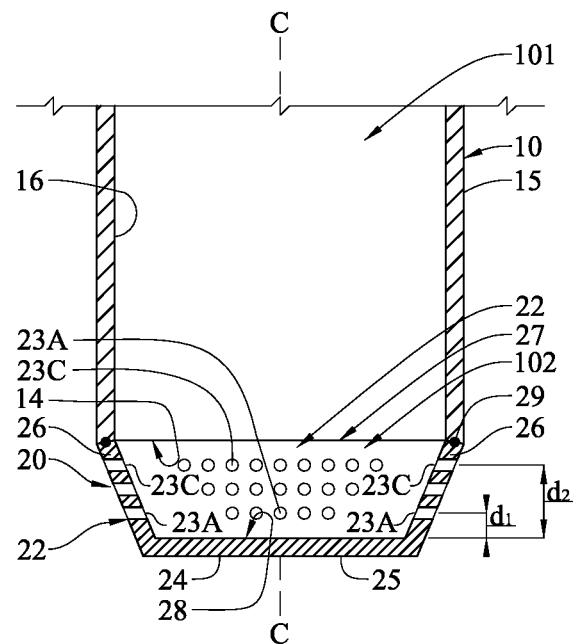
FIG. 5 is a close-up longitudinal cross-sectional schematic of the bottom portion of the damaged fuel container of FIG. 1.
Figure 11:
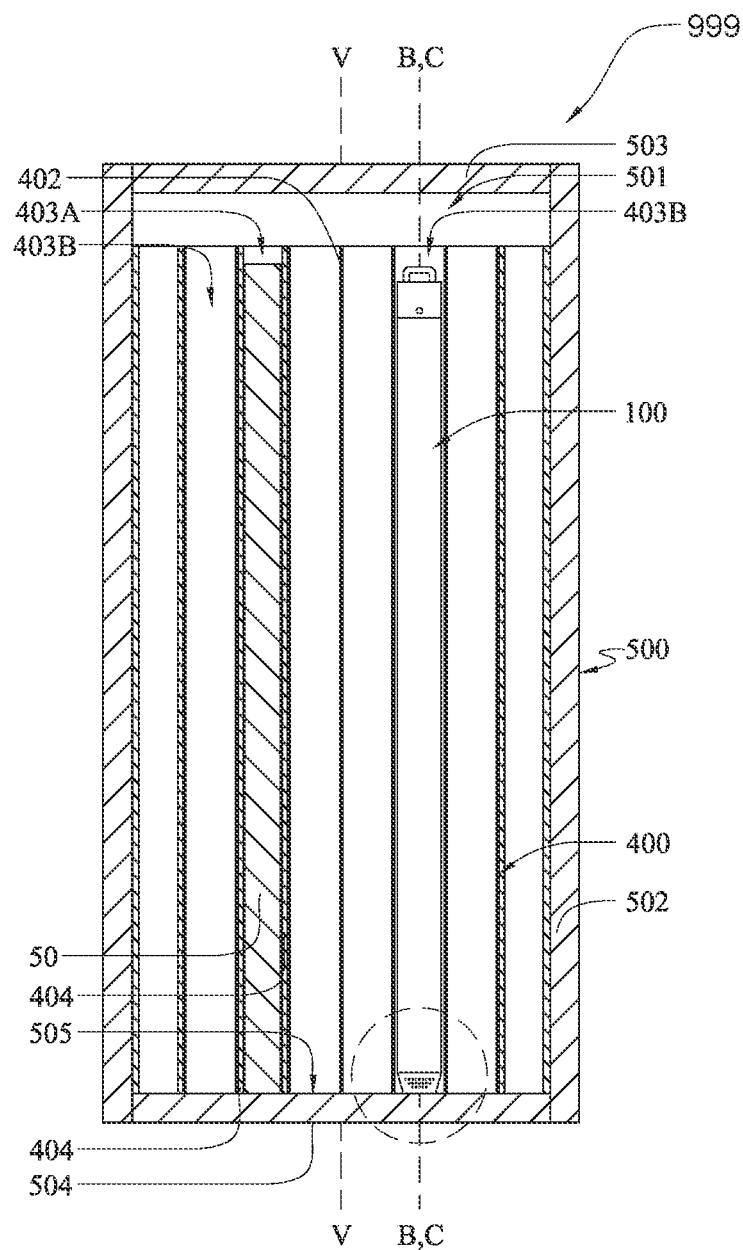
FIG. 11 is cross-sectional view taken along view XI-XI of FIG. 10.

Referring now to FIGS. 2 and 5 concurrently, the bottom cap 20 generally comprises a floor plate 25 and an oblique wall 26 extending upward from a perimeter of the floor plate 25. In the exemplified embodiment, the oblique wall 26 is integrally formed with the floor plate 25, for example, during the casting formation process. The oblique wall 26 is a rectangular annular wall that forms a tapered end of the DFC 100, which helps with inserting the DFC 100 into a cell 403B of the fuel basket 400 (FIGS. 10 and 11). The oblique wall 26 extends oblique to the container axis C-C and terminates in an upper edge 27. The upper edge 27 of the oblique wall 26 is coupled to the bottom edge 14 of the elongated tubular wall 10 by an autogenous butt weld 29 that seals the interface and integrally couples the components together so as to produce a junction that is smooth with the outer surface 15.

Figure 12:
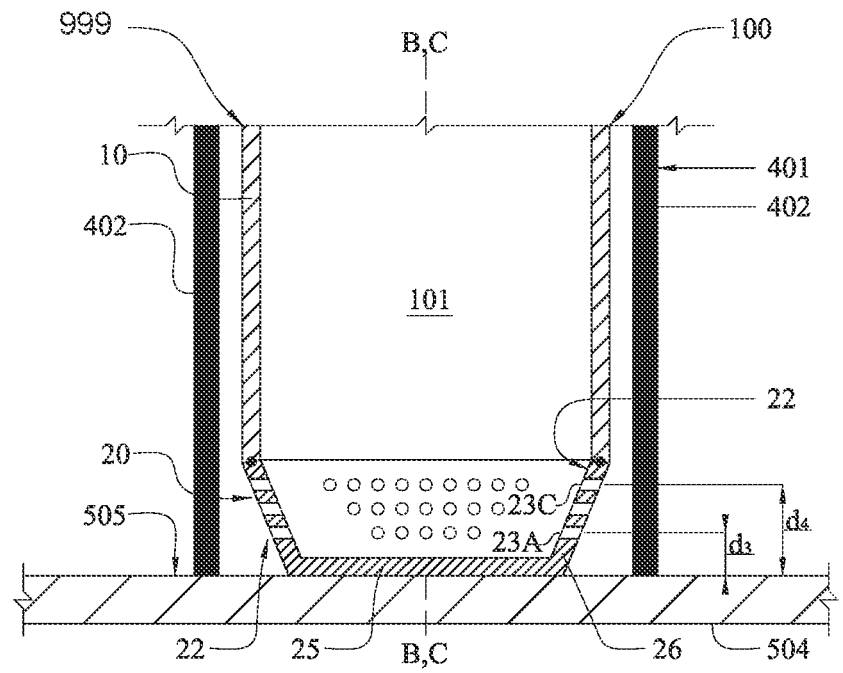
FIG. 12 is a close-up view of area XII-XII of FIG. 11.

The floor plate 25 comprises a top surface 28 that forms a floor of the container cavity 101. As can be seen in FIG. 5, one of the first screens 22 is located on each of the four sections of the oblique wall 26, which collectively form its rectangular transverse cross-sectional shape. The oblique wall 26 is an upstanding portion of the DFC 100. By locating the first screens 22 on an upstanding portion of the DFC 100 (rather than a portion that only has a horizontal component, such as the floor plate 25), the openings 23 of the first screens 23 are less susceptible to becoming clogged from particulate matter from the damaged nuclear fuel. Moreover, the openings 23 do not become choked-off (i.e., blocked) when the DFC 100 is supported upright in a fuel basket 400 and the floor plate 25 is in surface contact with a floor 505 of the vessel 500 (FIG. 12). In certain embodiments, an additional first screen 22 may be added to the floor plate 25 of the bottom cap 20 to ensure adequate leakage of retained water.

The openings 23 of each of the first screens 22 comprise a lowermost opening(s) 23A and an uppermost opening(s) 23C. The lowermost opening 23A is located a first axial distance $d_1$ above the floor 28 of the container cavity 101 while the uppermost most opening 23C is located a second distance $d_2$ above the floor 28 of the container cavity 101. The second distance $d_2$ is greater than the first distance $d_1$. As discussed below, the DFC 100, in certain embodiments, is intended to be oriented so that the container axis C-C is substantially vertical when the DFC 100 is positioned within the fuel basket 400 of the vessel 500 for transport and/or storage. Thus, in the exemplified embodiment, both the lowermost and uppermost openings 23A, C are located a vertical distance above the floor 28 of the container cavity 101. As a result, the first screens 22 are unlikely to become clogged by settling particulate debris as each of $d_1$ and $d_2$ are vertical distances.

As mentioned above, it is beneficial to have the first screens 22 located on an upstanding portion of the DFC 100, which in the exemplified embodiment is the oblique wall 26 of the bottom cap 20. In other embodiments, the bottom cap 20 is designed so that the wall 26 is not oblique to the container axis C-C but rather substantially parallel thereto. In such and embodiment, the first screens 22 are located on this vertical annular wall of the bottom cap 20. In still another embodiment, the bottom cap 20 may simply be a floor plate without any significant upstanding portion. In such an embodiment, the first screens 22 can be located on the bottom end 12 of the elongated tubular wall 10 itself, which would be considered the upstanding portion that is substantially parallel to container axis C-C. Of course, in such embodiments, the upstanding portion of the elongated tubular wall 10 on which the first screens 22 are located can be oriented oblique to the container axis C-C.

Figure 3:
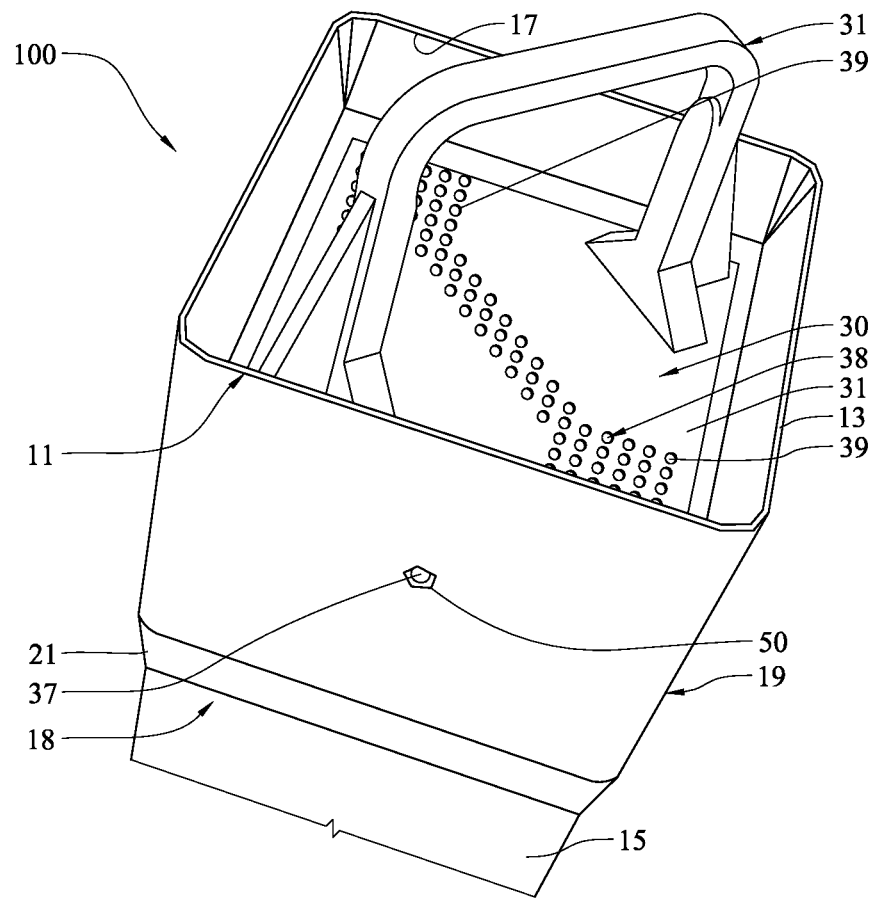
FIG. 3 is a top perspective view of a top portion of the damaged fuel container of FIG. 1.
Figure 4:
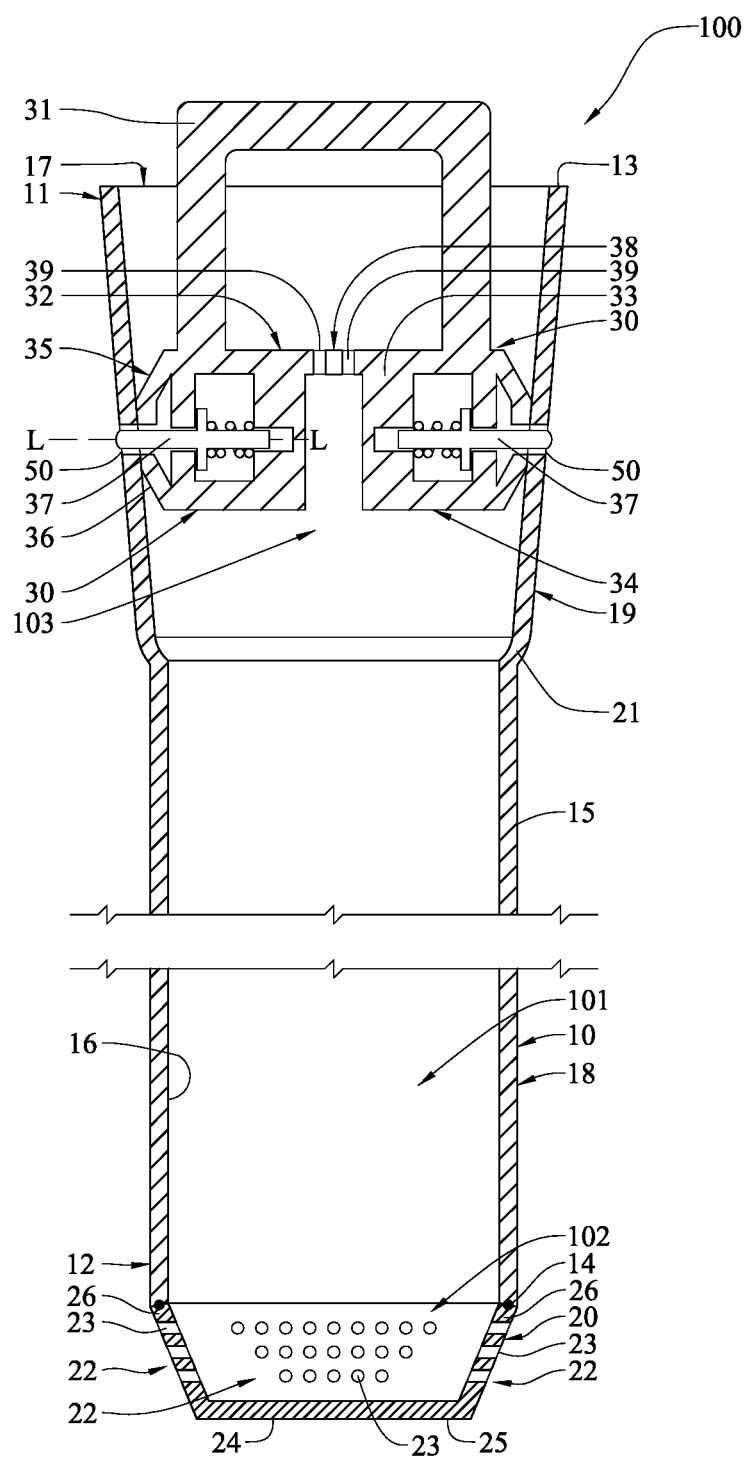
FIG. 4 is a longitudinal cross-sectional schematic of the damaged fuel container of FIG. 1 taken along the container axis, wherein a middle portion of the damaged fuel container has been omitted.
Figure 6:
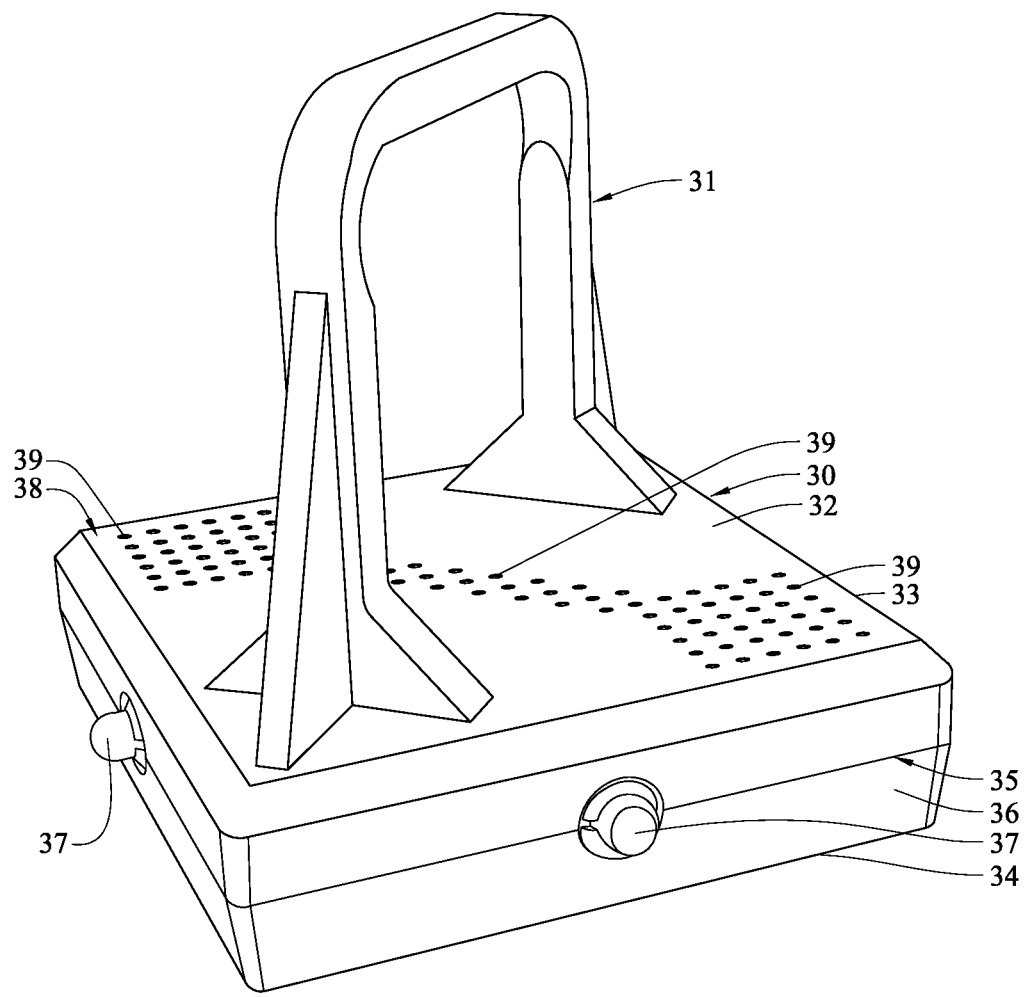
FIG. 6 is an isometric view of the top cap of the damaged fuel container of FIG. 1, wherein the top cap has been removed.

Referring now to FIGS. 3-4 and 6 concurrently, the details of the top cap 30, along with its detachable coupling to the elongated tubular body 10 will be discussed in greater detail. The top cap 30 is shaped to provide a strong attachment location for lifting the loaded DFC 100. A handle 31 is fixedly coupled to the top cap 30 and extends upward from a top surface 32 of the top cap 30 so that the DFC 100 can be easily handled by a crane or other handling equipment. As can be seen, when the top cap 30 is detachably coupled to the elongated tubular wall 10 (shown in FIGS. 3-4), the entirety of the top cap 30 is disposed within the top portion 19 of the elongated tubular wall 10. A portion of the handle 31, however, protrudes axially from the top edge 13 of the elongated tubular wall 13. Nonetheless, the entirety of the handle 31 is located fully within a transverse perimeter defined by the top edge 13 of the elongated tubular wall 10 (viewed from a plane that is substantially perpendicular to the container axis C-C). As a result, the handle 31 can be easily grabbed by lifting mechanisms when the DFC 100 is fully inserted into a fuel cell of a fuel rack, without the grid 401 of the fuel basket 400 interfering with the lifting mechanism (FIGS. 10 and 11).

The top cap 30 comprises a body 33. In one embodiment, the body 33 is formed of any of the materials described above for the elongated tubular wall 10. In another embodiment, the body 33 is formed of any of the materials described above for the bottom cap 20.

The top cap 30 has a bottom surface 34, a top surface 32 and a peripheral sidewall 35. The peripheral sidewall 35 comprises a chamfered portion 36 at a lower edge thereof to facilitate insertion into the top opening 17 of the elongated tubular wall 10. The top cap 30 has a transverse cross-sectional shape that is the same as the transverse cross-sectional shape of the container cavity 101.

A plurality of locking elements 37 protrude from the peripheral sidewall 35 of the top cap 30 and, as discussed in greater below, are alterable between a fully extended state (shown in FIGS. 3-4 and 6) and a fully retracted state (shown in FIG. 9) to facilitate repetitive coupling and uncoupling of the top cap 30 to the elongated tubular wall 10. In the exemplified embodiment, the locking elements 37 are spring-loaded pins. In other embodiments, the locking elements 37 can be tabs, protuberances, clamps, tangs, and other known mechanisms for locking components together.

The top cap 30 also comprises a second screen 38. The second screen 38 comprises a plurality of openings 39 that define upper vent passageways into a top 103 of the container cavity 101. While in the exemplified embodiment the second screen 38 is incorporated into the top cap 30, the second screen 38 can be incorporated into the elongated tubular wall 10 at a position below where the top cap 30 couples to the elongated tubular wall 10 in other embodiments.

In one embodiment, the openings 39 of the top cap are small enough so that radioactive particulate matter cannot pass therethrough but are provided in sufficient hole density (number of openings/area) to allow sufficient venting of air and gases (or other fluids) through the container cavity 101. In one embodiment, the openings 39 have a diameter in a range of 0.03 mm to 0.1 mm, and more preferably a diameter of about 0.04 mm. The openings 39 may be provided for the second screen 38, in certain embodiments, to have a density of 200 to 300 holes per square inch. The invention, however, is not limited to any specific dimensions or hole density of the openings 39 unless specifically claimed.

In the exemplified embodiment, the second screen 38 is integrally formed into the body 33 of the top cap 30 by creating the openings 39 directly into the body 33 of the bottom cap 20. The openings 39 can be formed into the body 33 of the top cap 30 by punching, drilling or laser cutting techniques. In one embodiment, it is preferred to form the openings 39 using a laser cutting technique. Laser cutting allows very fine openings 39 to be formed with precision and efficiency. In alternate embodiments, the openings 39 of the second screen 38 may not be integrally formed into the top cap 30 (or the elongated tubular wall 10). Rather, larger through holes can be formed in the top cap 30 that are then covered by a separate second screen(s), such as a wire mesh screen(s).

Figure 7:
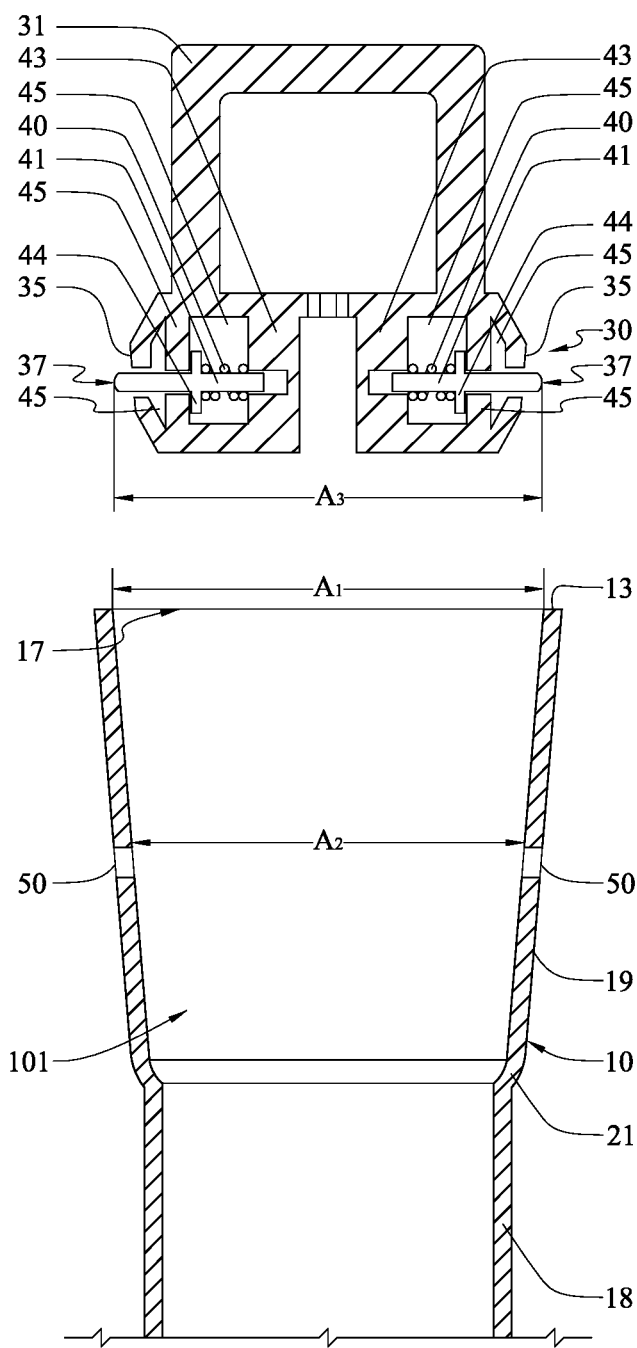
FIG. 7 is a longitudinal cross-sectional schematic of the top cap of FIG. 5 positioned above the elongated tubular wall of the damaged fuel container for detachable coupling thereto.
Figure 8:
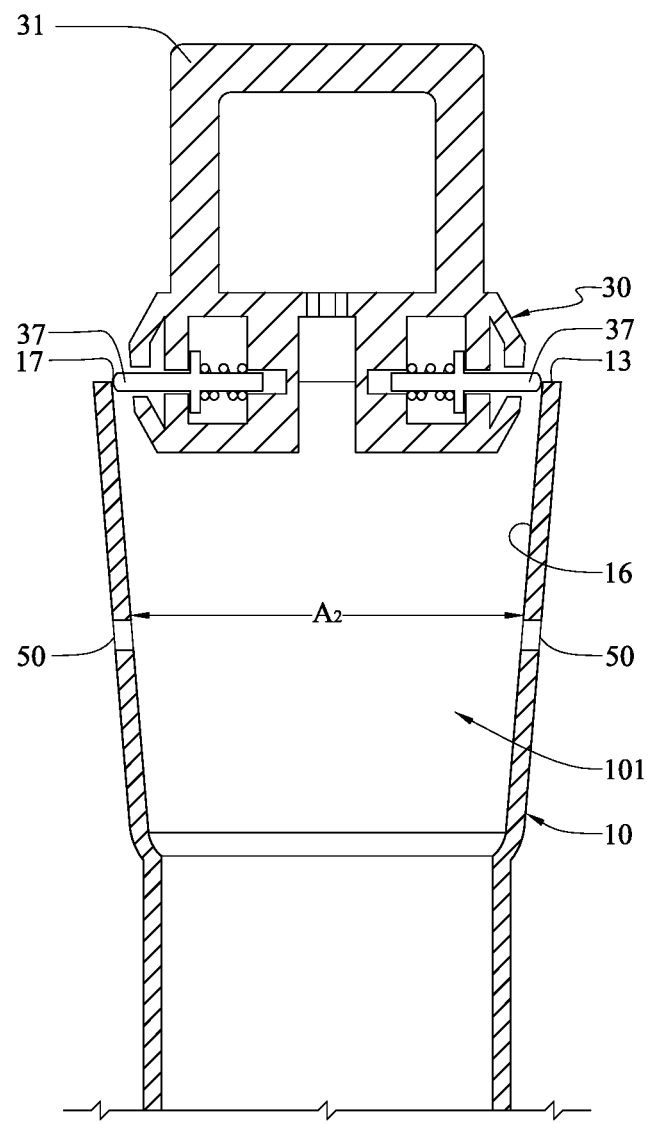
FIG. 8 is a longitudinal cross-sectional schematic wherein the top cap of FIG. 5 has been partially inserted through a top opening of the elongated tubular wall of the damaged fuel container.
Figure 9:
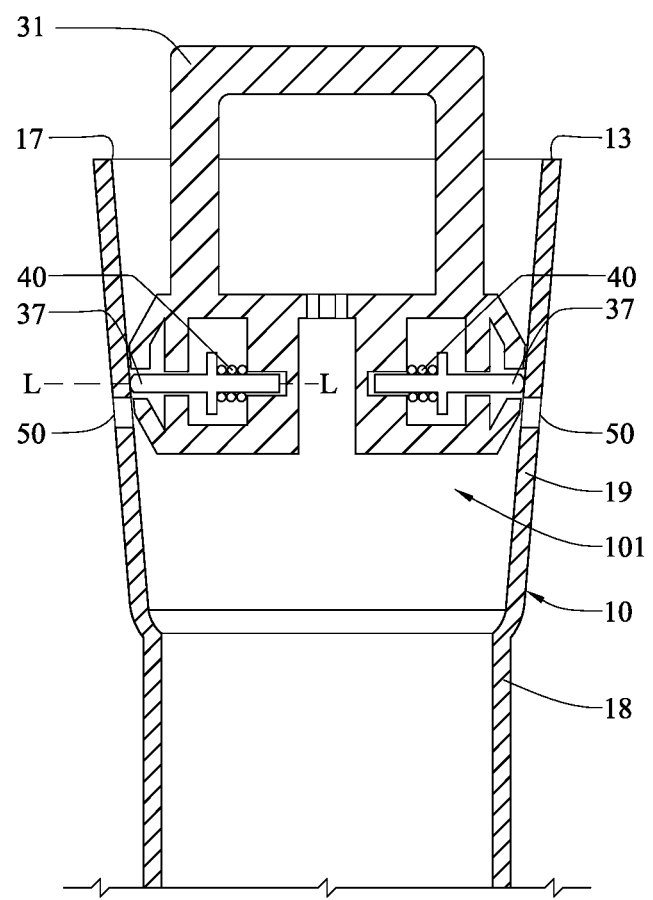
FIG. 9 is a longitudinal cross-sectional schematic wherein the top cap of FIG. 5 has been slidably inserted into the container cavity of the elongated tubular wall, and wherein the locking elements of the top cap have been forced into a fully retracted state due to contact with the elongated tubular wall.

Referring now to FIGS. 7-9, additional details of the locking elements 37 of the top cap 30, and the coupling of the top cap 30 to the elongated tubular wall 10, will be described. As mentioned above, the locking elements 37 are alterable between a fully extended state (FIG. 7) and a fully retracted state (FIG. 9).

Referring solely now to FIG. 7, each of the locking elements 37 is biased into the fully extended state by a resilient element 40, which in the exemplified embodiment is a coil spring that is fitted over a shaft portion 41 of the locking element 37. In the exemplified embodiment, the springs 40 bias the locking elements 37 into the extended state through contact with a first wall 43 of the top cap 30 on one end and a flange 44 of the shaft portion 41 of the locking element 37 on the other end. Overextension of the locking elements 37 out of the peripheral sidewall 35 is prevented by contact interference between the flanges 44 of the shaft portions 41 and second walls 45 of the top cap. Upon the application of adequate force to the locking elements 37, the spring force of the springs 40 is overcome and each of the locking elements 37 will translate along its locking element axis L-L (FIG. 4) to the fully retracted state. In the exemplified embodiment, the locking element axes L-L are substantially perpendicular to the container axis C-C. In certain embodiments, the internal chambers 45 in which the springs 40 and portions of the locking elements 37 nest are hermetically sealed. This can be accomplished by incorporating a suitable gasket about the shaft portion 41 of the locking element at the peripheral sidewall 35. In the exemplified embodiment, a locking element 37 is provided on each one of the four sections of the peripheral sidewall 35 and are centrally located thereon at the cardinal points.

As described in greater detail below, the locking elements 37 are forced from the fully extended state to the fully retracted state due to contact between the extruded tubular wall 10 and the locking elements 37 during insertion of the top cap 30 into the container cavity 101. As can be seen in FIG. 7, the portion of the container cavity 101 defined by the top portion 19 of extruded tubular wall has a transverse cross-section that gradually tapers (i.e. decreases in size) moving away (i.e., downward in the illustration) from a top edge 13 of the elongated tubular wall 10. Thus, the container cavity 101 has a transverse cross-section $A_1$ at the top opening 17 that is greater than the transverse cross-section $A_2$ of the container cavity 101 at an axial position immediately above locking apertures 50 formed into the elongated tubular wall 10.

As mentioned above, the locking elements 37 are biased into a fully extended state and, thus, protrude from all four sections of the peripheral sidewall 35. As a result of the protruding locking elements 37, the top cap 37 has an effective transverse cross-section $A_3$ when the locking elements 37 are in the fully extended state. The DFC 100 is designed, in the exemplified embodiment, so that the effective transverse cross-section $A_3$ of the top cap 30 is the same as or smaller than the transverse cross-section $A_1$ of the top opening 17 of the internal cavity 101. The effective transverse cross-section $A_3$ of the top cap 30, however, is greater than the transverse cross-section $A_2$ of the container cavity 101 at the axial position immediately above locking apertures 50.

Referring now to FIG. 8, as a result of the relative dimensions described immediately above, when the top cap 30 is initially aligned with and lowered into the top opening 17 of the container cavity 101, the top cap 70 (including the locking elements 70) can pass through the top opening 17 while the locking elements 37 remain in the fully extended state. Thought of another way, the top edge 13 defines the top opening 17 so as to have a transverse cross-section through which the top cap 30 can be inserted while the locking elements 37 are in the fully extended state.

As the top cap 30 continues to be inserted (i.e., lowered in the illustration), the locking elements 37 come into contact with the inner surface 16 of the top portion 19 of the elongated tubular wall 10 that defines that portion of the container cavity 101. Due to the fact that the inner surface 16 is sloped such that the transverse cross-section of the container cavity 101 continues to decrease with distance from the top edge 13, the locking elements 37 are further forced into retraction by the inner surface 16 of the elongated tubular wall 10 until a fully retracted state is achieved at the axial position immediately above locking apertures 50 (FIG. 9).

Referring to FIG. 9, the locking elements 37 are at the axial position immediately above locking apertures 50 of the elongated tubular wall 10 and are in the fully retracted state. In the fully retracted state, the springs 40 are fully compressed and the locking elements 37 have been translated inward along the locking element axis L-L. As lowering of the top cap 30 is continued, the locking elements 37 become aligned with the locking apertures 50 of the elongated tubular wall 10 and are automatically returned back into the fully extended state in which the locking elements 37 protrude into the locking apertures 50 due to the bias of the springs 40 (shown in FIG. 4). As a result of the locking elements 37 protruding into the locking apertures 50, the top cap 30 is coupled to the elongated tubular wall 10 so that the DFC 100 can be lifted by the handle 31. The locking elements 37 cannot be forced back into the retracted state due to contact with the edges that define the locking apertures 50. In other words, once the top cap 30 is coupled to the elongated tubular wall 10 as described above, the locking elements 37 cannot be retracted by applying a lifting or pulling force (i.e. an axial force along the container axis C-C) to the top cap 30. Thus, a secure connection between the top cap 30 and the elongate tubular wall 10 is provided. In order to remove the top cap 30 from the elongated tubular wall 10, a tool is required to unlock the top cap 30 from the elongated tubular wall 10 by pressing the locking elements 37 radially inward along their locking element axes L-L. In the exemplified embodiment, the locking apertures 50 are through-holes and, thus, the locking elements 37 can be pressed inward by the access provided to the locking elements 37 by the locking apertures 50.

The exemplified embodiment is only one structural implementation in which the top cap 30 and the elongated tubular wall 10 are configured so that upon the top cap 30 being inserted through the top opening 17, contact between the locking elements 37 and the elongated tubular wall 10 forces the locking elements 37 into a retracted state. In other embodiments, the effective transverse cross-section $A_3$ of the top cap 30 may be larger than the transverse cross-section $A_1$ of the top opening 17 of the internal cavity 101. In such an embodiment, the lower edges of the locking elements 37 can be appropriately chamfered and/or rounded so that upon coming into contact with the top edge 13 of the elongated tubular wall 10 during lowering, contact between the lower edges of the locking elements 37 and the top edge 13 of the elongated tubular wall 10 forces the locking elements 37 to translate inward along their locking element axes L-L. In other embodiments, the top edge 13 of the elongated tubular wall 10 may be appropriately chamfered to achieve the desired translation of the locking elements 37.

Referring now to FIGS. 10-12 concurrently, a system 999 for storing and/or transporting damaged nuclear fuel is illustrated according to an embodiment of the present invention. The system 999 generally comprises a vessel 500, a fuel basket 400 and at least one of the DFCs 100 described above. The vessel 500, when fully assembled, forms a fluid-tight vessel cavity 501 in which the fuel basket 400, the DFC 100 containing damaged nuclear fuel and intact nuclear fuel 50 are housed (in FIG. 10, the loaded DFC 100 and the intact nuclear fuel 50 are schematically illustrated for simplicity). Thus, the vessel 500 can be considered a pressure vessel that forms a fluidic containment boundary about the vessel cavity 501. In the exemplified embodiment, the vessel 500 is a canister, such as a multi-purpose canister. In embodiments, where the vessel is an MPC, the system 100 may also comprises an overpack cask, such as an aboveground or below-ground ventilated vertical overpack. In other embodiments, the vessel 500 may be a metal cask.

The vessel 500 comprises a cylindrical shell 502, a lid plate 503 and a floor plate 504. The lid plate 503 and the floor plate 504 are seal welded to the cylindrical shell 502 so to form the hermetically sealed vessel cavity 501. A top surface 505 of the floor plate 504 forms a floor of the vessel cavity 501. The vessel 500 extends along a vessel axis V-V, which is arranged substantially vertical during normal operation and handling procedures.

The fuel basket 400 is positioned within the vessel cavity 502 and comprises a gridwork 401 forming a plurality of elongated cells 403A-B. In the exemplified embodiment, the gridwork 401 is formed by a plurality of intersecting plates 402 that form the cells 403A-B. In one embodiment, the plates 402 that form the gridwork 401 are formed of stainless steel. Because the elongated tubular wall 10 of the DFC 100 is made of a boron carbide aluminum matrix composite material, or a boron aluminum matrix composite material, and the gridwork 401 is made of stainless steel, there is no risk of binding from the cohesion effect of materials of identical genre.

Each of the elongated cells 403A-B extend along a cell axis B-B that is substantially parallel to the vessel axis V-V. The plurality of cells 403A-B comprises a first group of cells 403A that are configured to receive intact nuclear fuel 50 and a second group of cells 403B configured to receive DFCs 100 containing damage nuclear fuel. Each of the cells 403A of the first group comprise neutron absorbing liner panels 404 while the each of the cells 403B of the second group are free of the neutron absorbing liner panels 404. In one embodiment, the neutron absorbing liner panels 404 can be constructed of the same material that is described above for the elongated tubular wall 10.

Because the elongated tubular wall 10 of the DFC 100 incorporate neutron absorber as described above, the cells 403B of the fuel basket 400 that are to receive the DFCs 100 do not require such neutron absorber plates 404, leading to an increased cell cavity size which is large enough to enable free insertion or extraction of the DFC 100 from the fuel basket 400. In certain embodiments, the cell opening of the cells 403B is 6.24 inches, which means that there is a ¼ inch lateral gap between the DFC 100 and the grid that forms the storage cell 403B. Moreover, because the DFC 100 is extruded and the cells 403A-B of the fuel basket 400 are of honeycomb construction made of thick plate stock (¼ inch wall), there is a high level of confidence that the DFCs 100 can be inserted into the storage cells 403B without interference. In the exemplified embodiment, all of the cells 403A-B have the same pitch therebetween.

Referring now to FIGS. 11 and 12, each of the DFCs 100 is loaded into one of the cells 403B by aligning the DFC 100 with the cell 403B and lowering the DFC 100 therein until the floor plate 25 of the DFC 100 comes into surface contact with and rests on the top surface 505 of the floor plate 504 of the vessel 500. When positioned within the cell 403B, the container axis C-C of the DFC 100 is substantially parallel to the cell axis B-B and, in certain embodiments, substantially coaxial therewith.

As mentioned above, the cell axis B-B is substantially parallel to the vessel axis V-V. Thus, when the DFC 100 is loaded within the cell 403B, the oblique wall 26 of the bottom cap 20 is oblique to both the cell axis B-B and the vessel axis V-V. As mentioned above, the top surface 505 of the floor plate 504 forms a floor of the vessel cavity 501. Thus, when the DFC 100 is loaded within the cell 403B, the lowermost opening(s) 23A of the first vent(s) 22 is a distance $d_3$ above the floor 505 of the vessel 500 while the uppermost opening(s) 23C of the first vent(s) 22 is a distance $d_4$ above the floor 505 of the vessel 500.

In summary, the DFC 100 of the present invention fits in the storage cell 403B with adequate clearance. The DFC 100 also provides adequate neutron absorption to meet regulatory requirements. The DFC 100 also confines the particulates but allow water and gases to escape freely. The DFC 100 also features a robust means for handling and includes a smooth external surface to mitigate the risk of hang up during insertion in or removal from the storage cell 403B. The DFC also provides minimal resistance to the transmission of heat from the contained damaged nuclear fuel. The loaded DFC 100 can be handled by a grapple from the Fuel Handling Bridge. All lifting appurtenances are designed to meet ANSI 14.6 requirements with respect to margin of safety in load handling. Specifically, the maximum primary stress in any part of the DFC 100 will be less than its Yield Strength at 6 times the dead weight of the loaded DFC,W. and less than the Ultimate Strength at 10 times W.

The table below provides design data for one embodiment of the DFC 100.

| DFC: Design Data | |
|---|---|
| Outer Dimension | 152 mm (5.99") |
| Corner Radius | 6 mm (0.24" nominal) |
| Wall Thickness | 2.0 mm (0.079") |
| DFC Cell I.D. | 148 mm (5.83") |
| Total Height | 4680 mm (184.25") |
| Boron Carbide Concentration | 32% (nominal) |
| Empty Weight, Kg | 25 (55 lbs.) |
| Permissible Planar Average Enrichment | 4.8% |

A method of manufacturing the DFC 100 according to an embodiment of the present invention will now be described. First, the elongated tubular wall 10 is formed via an extrusion process using a metal matrix composite having neutron absorbing particulate reinforcement. A boron carbide aluminum matrix composite material is preferred. At this stage, the extruded elongated tubular wall 10 (and the container cavity 101) has a substantially constant transverse cross-section, with the elongated tubular wall 10 also having a substantially uniform wall thickness. The elongated tubular wall 10 is then taken and a portion thereof is expanded so that the container cavity 101 has an increased transverse cross-section, thereby forming the top portion 19 and the bottom portion 18 elongated tubular wall 10. Expansion of the container cavity 101 (which can also be considered expansion of the elongated tubular wall 10) can be accomplished using a swaging process using an appropriate mandrel, die and/or press. Said swaging process can be a hot work in certain embodiments. In an alternate embodiment, the difference sizes in transverse cross-section of the container cavity 101 can be accomplished by performing a drawing process to reduce the bottom portion 18 of the elongate tubular wall 10.

The locking apertures 50 are then formed into the top portion of the elongated tubular wall 10 via a punching, drilling, or laser cutting technique.

The bottom cap 20 is then formed. Specifically, the bottom cap 20 is formed by casting aluminum to form the cap body 24. The plurality of openings 23 are then integrally formed therein using a laser cutting process to form the first screens 22 on the oblique wall 26.

The bottom cap 20 is then autogenously welded to the bottom end 12 of the elongated tubular wall 10. More specifically, the bottom cap 20 is butt welded to the bottom end 12 of the elongated tubular wall 10 to produce a weld junction that is smooth with the outer surface 15 of the elongated tubular wall 10. A friction stir weld technique may be used.

The top cap 30 is then formed and coupled to the elongated tubular wall 10 as described above.

II. Inventive Concept 2

With reference to FIGS. 13-20, a second inventive concept will be described.

Figure 13:
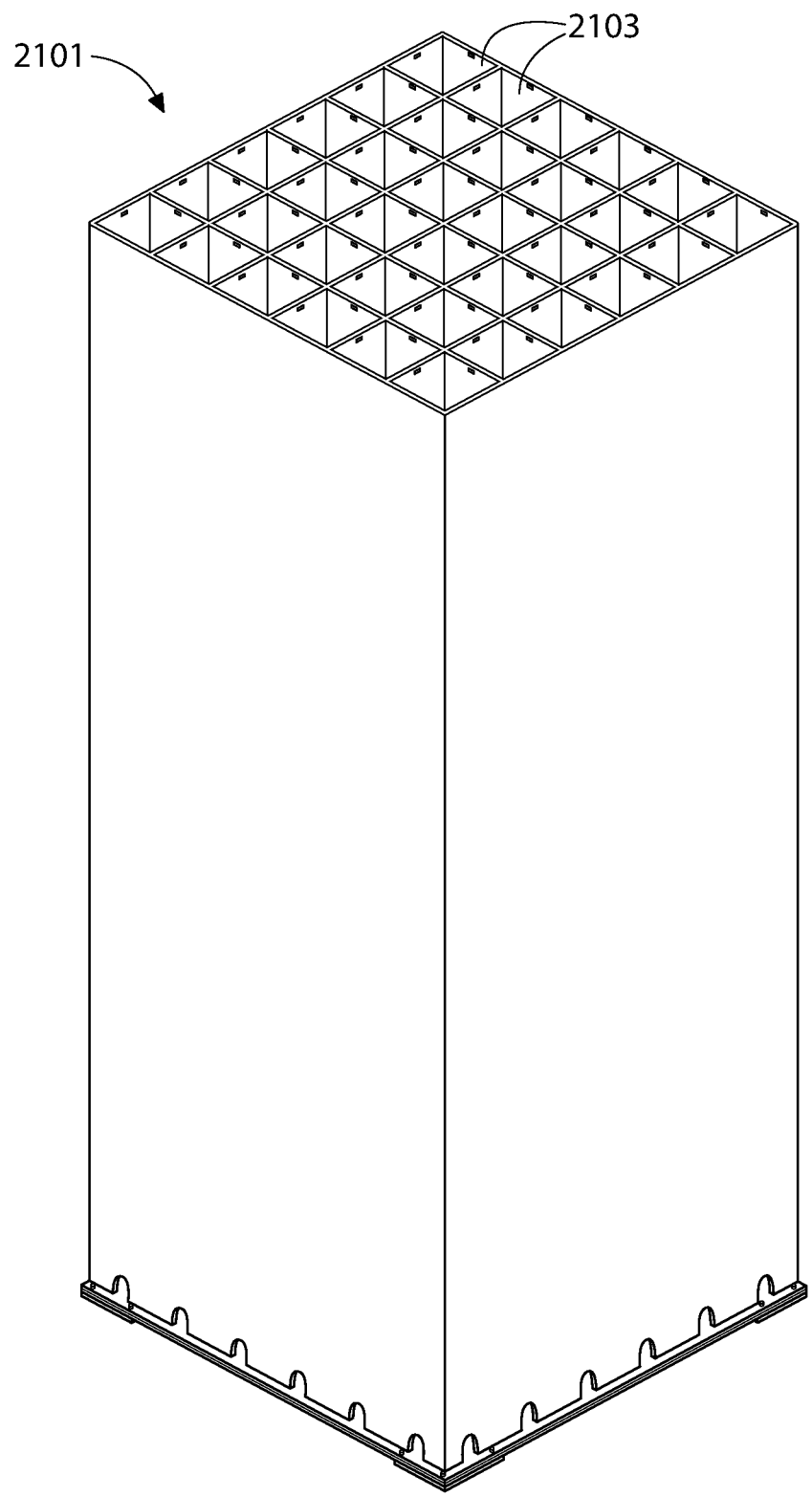
FIG. 13 illustrates a fuel rack having an array of cells to receive fuel assemblies containing spent nuclear fuel.
Figure 14:
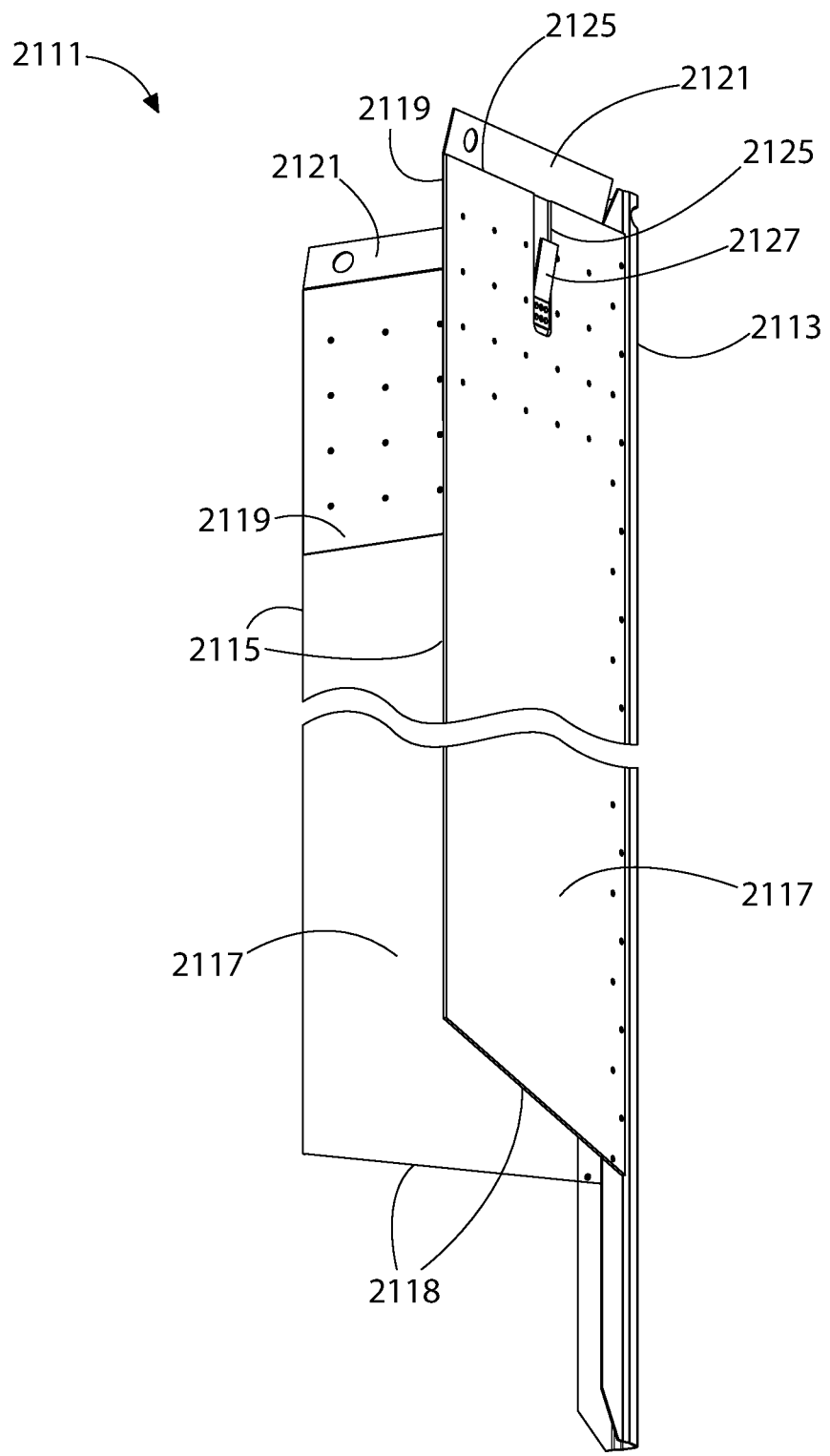
FIG. 14 is a perspective view of a neutron absorbing apparatus.
Figure 15:
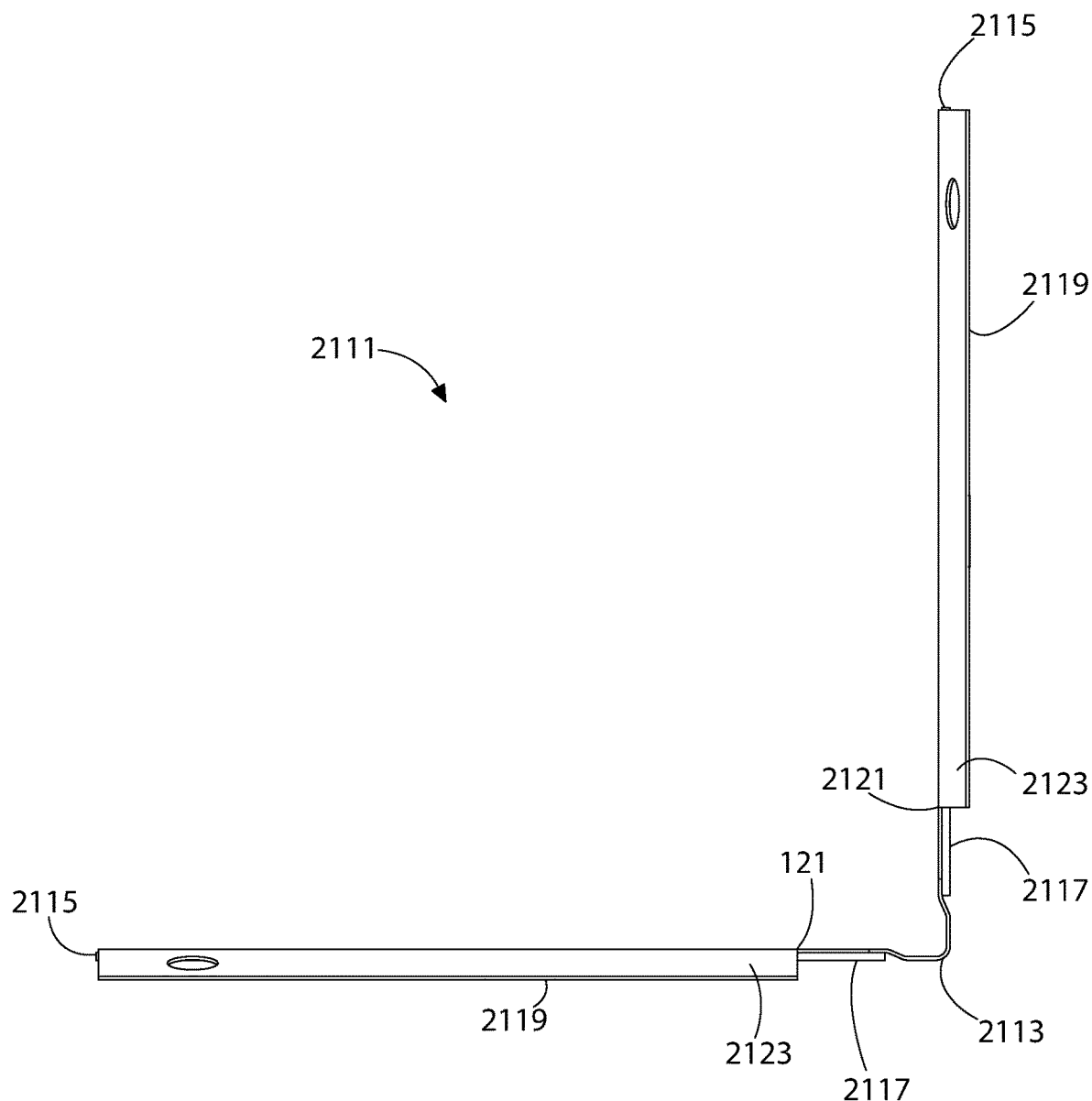
FIG. 15 is a top elevation view of the neutron absorbing apparatus of FIG. 13.
Figure 16:
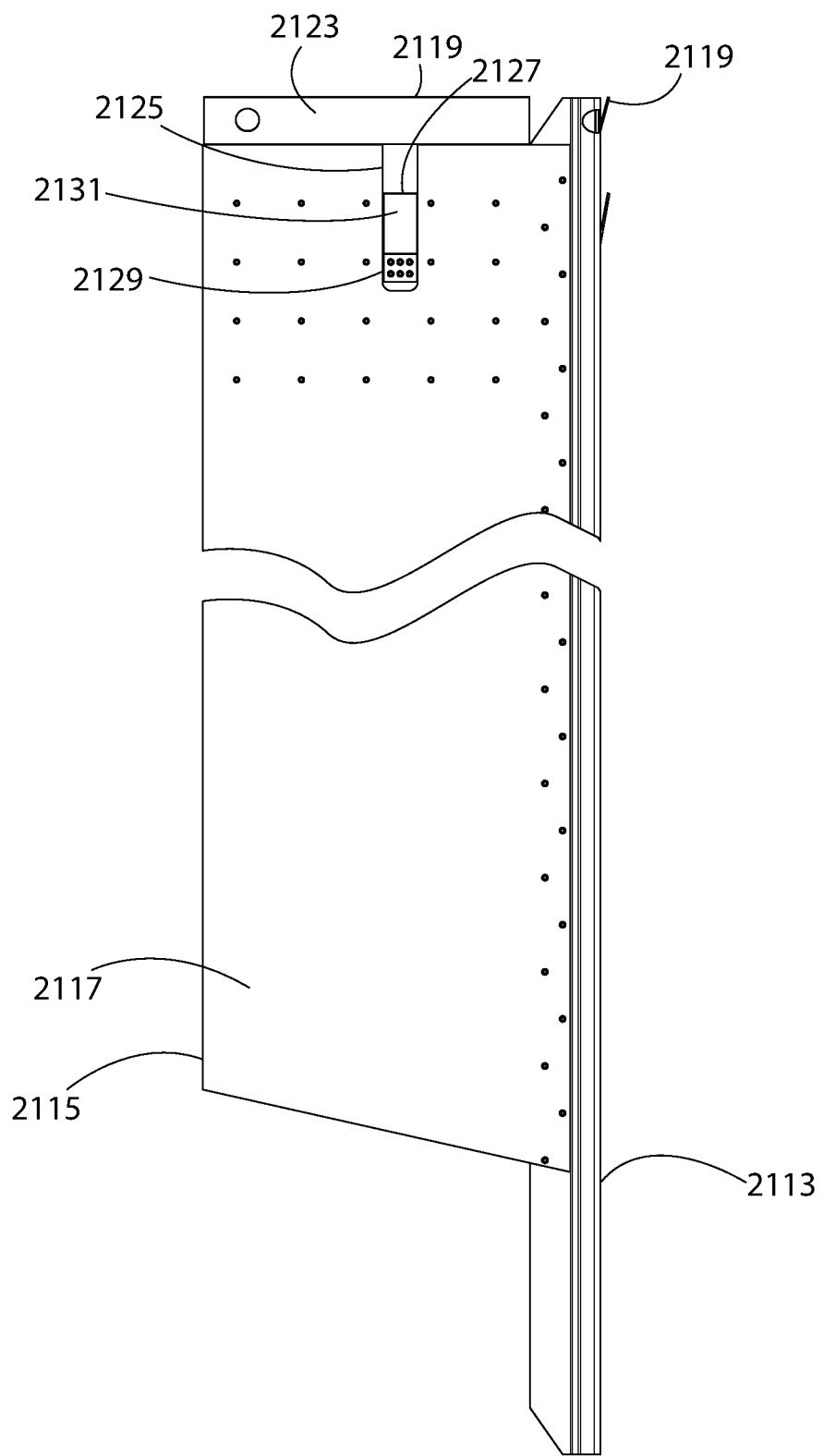
FIG. 16 is a side view of the neutron absorbing apparatus of FIG. 13.

FIG. 13 shows a fuel rack 2101 having an array of cells 2103 into which spent nuclear fuel assemblies may be inserted. The fuel rack 2101 may be part of a submerged storage system for spent nuclear fuel, or it may be part of a transportation system for spent nuclear fuel, such as dry or wet spent fuel casks. As shown, the cell walls include a feature for interlocking with a locking protuberance included as part of a neutron absorbing assembly inserted into one or more of the cells. This feature may be a complementary locking protuberance, or a complementary receptacle to receive the locking protuberance of the neutron absorbing assembly. The feature may be created by bending, punching, welding, riveting, or otherwise permanently deforming the cell walls of the rack or the fuel cask, or by securing attachments to the cell walls, for holding the absorption assembly in place once it is inserted into the fuel cell.

In some embodiments, if the fuel rack 2101 has too small of a cell opening to accommodate thickness of the fuel insert, the insert may be directly inserted into the guide tubes of the fuel assembly.

FIGS. 13-16 show a neutron absorbing assembly 2111 which may be used in conjunction with both PWR or BWR storage requirements. The neutron absorbing assembly 2111 is configured to be slidably inserted at strategic locations within the cell array of a submerged fuel rack. However, the absorbing assembly can be used in any environment (and in conjunction with any other equipment) where neutron absorption is desirable. Furthermore, based on the disclosed process for bending a metal matrix composite having neutron absorbing particulate reinforcement (or the resulting angled plate structure), an absorbing assembly may be configured for use in any environment and/or used to create a wide variety of structures, including without limitation fuel baskets, fuel racks, sleeves, fuels tubes, housing structures, etc.

The neutron absorbing assembly 2111 includes a corner spine 2113, to which are fastened two walls 2115 to form a chevron-shaped structure (when viewed from the top or bottom). For a cell with a square cross-sectional configuration, the corner spine 2113 creates a relative angle between the two walls 2115 of about 90 degrees. Other relative angles may also be used, primarily depending upon the cross-sectional configuration of the cell into which the neutron absorbing assembly 2111 is to be inserted (e.g., triangular, pentagonal, hexagonal, etc.). Each wall has an absorption sheet 2117, constructed from a neutron absorbing material, and a guide sheet 2119. Since the walls may be mirror images of each other, the following addresses the configuration of only one of the walls, with the understanding that the second wall may be similarly configured. However, in one embodiment, one of the walls includes a locking feature, and one does not. In other embodiments, both walls include a locking feature. In certain embodiments, additional corner spines and walls may be added to provide neutron absorption on more than two sides of a cell.

The absorption sheet 2117 is affixed to and extends much the length of the corner spine 2113, and it may extend the entire length or only part of the length, depending upon the requirements for neutron absorption within the cell, e.g., the linear space within the cell occupied by the spent fuel rods. The absorption sheet 2117 may be affixed to the corner spine 2113 using any suitable fastener, such as rivets. The bottom edge 2118 of the absorption sheet 2117 has a skewed shape to facilitate ease of insertion of the neutron absorbing assembly 2111 into a cell of a fuel rack. Specifically, the bottom edge 2118 of the absorption sheet 2117 taper upward and away from the corner spine 2113.

The guide sheet 2119 is affixed to only a top portion of the absorption sheet 2117 by suitable fasteners, such as rivets, and the guide sheet 2119 extends along less of a length of the corner spine 2113 than the absorption sheet 2117. The edge of the guide sheet 2119 abuts up against the edge of the corner spine 2113 along a common edge 2121 to help reduce the overall thickness of the assembly. As shown in FIG. 13, the absorption sheet extends along most of the length of the corner spine 2113, and the guide sheet 2113 extends along a short top portion of the corner spine 2113. The difference in lengths reflects the difference in functions between the absorption sheet 2117 and the guide sheet 2119. Where the absorption sheet 2117 is included for neutron absorption, the guide sheet 2119 is included, at least to aid in guiding a spent nuclear fuel assembly into the cell after the absorption assembly 2111 is in place within the cell, to protect the top edge of the absorption assembly from damage, to provide a support surface for a locking protuberance, and to provide a structure by which the absorption assembly 2111 may be supported during installation into the cell.

The guide sheet also includes an extension portion 2123 which extends over and above the top edge 2125 of the absorption sheet 2117. This extension portion 2123 provides a surface to aid in guiding a spent fuel assembly into a cell in which the absorption assembly is 2111 placed. The extension portion 2123 also protects the top edge 2125 of the absorption sheet 2117 from damage during the process of loading a spent fuel assembly into the cell.

The top portion of each absorption sheet 2117 includes a cut-out 2125, and a tab 2127 (which is a locking protuberance in the embodiment shown) extends from the guide sheet 2119, through the cut-out 2125, and beyond the outer surface of the absorption sheet 2117. The tab 2127 includes a lower part 2129 affixed to the guide sheet, using any suitable fastener, such as rivets, and an upper part 2131 which is bent away from the guide sheet 2119 to extend through the cut-out 2125. A locking protuberance may be formed in any other manner to provide the same locking functionality as described in connection with the tab herein. In addition, a locking protuberance may be included on both the absorption assembly 2111 and the cell wall (See FIG. 18), or in other embodiments it may be included on only one of the absorption assembly 2111 and the cell wall.

Figure 17:
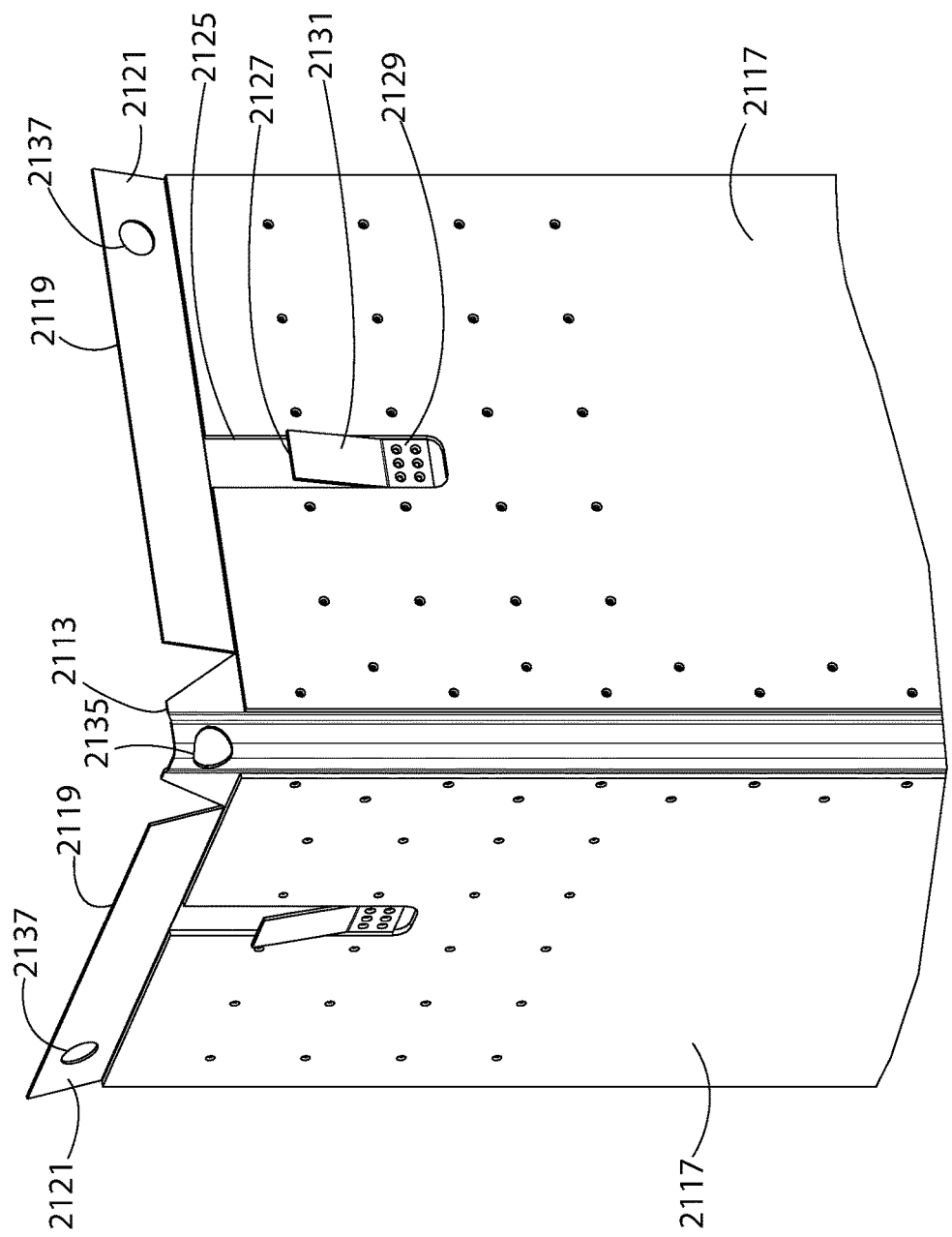
FIG. 17 is partial perspective view of the upper rear portion of the neutron absorbing apparatus of FIG. 13.

As seen in FIG. 17, one suspension aperture 2135 is included at the top of the corner spine 2113, and one suspension aperture 2137 is included in the extension portion 2123 of each guide sheet 2119. These suspension apertures 2135, 2137 are included to facilitate robotically placing the absorption assembly 2111 in a cell within a submerged storage system. The shape and positioning of the suspension apertures is a matter of design choice.

Figure 18:
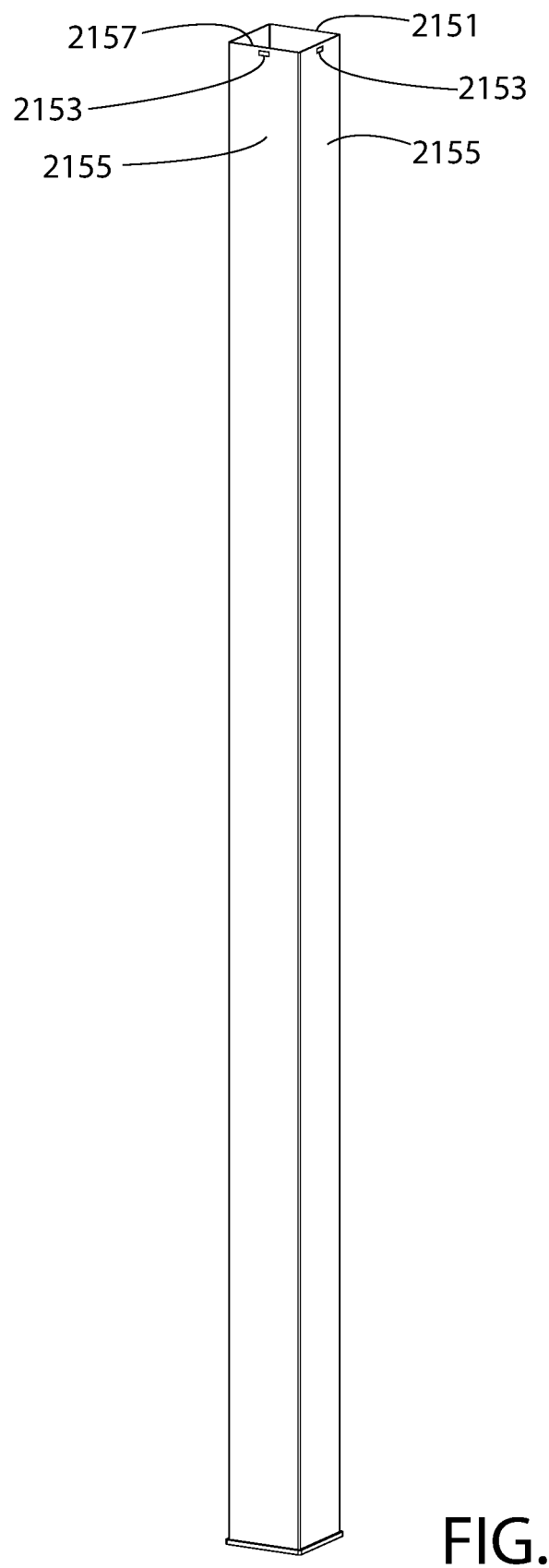
FIG. 18 is a perspective view of one cell in a fuel rack, wherein multiple adjacent cells would form an array of cells for the fuel rack.

A single cell 2151 for receiving a spent nuclear fuel assembly and an absorption assembly is shown in FIG. 18. Two walls of the cell 2151 each include a feature 2153 near the top of the cell wall 2155, and the feature 2153 is configured to engage the absorption assembly to retain the absorption assembly when the spent nuclear fuel assembly is removed from the cell. This feature 2153 may be an indentation, a cut-out, or a protuberance, depending upon what type of corresponding locking feature is included on the absorption assembly. The type of feature and its configuration are a matter of design choice.

Figure 19:
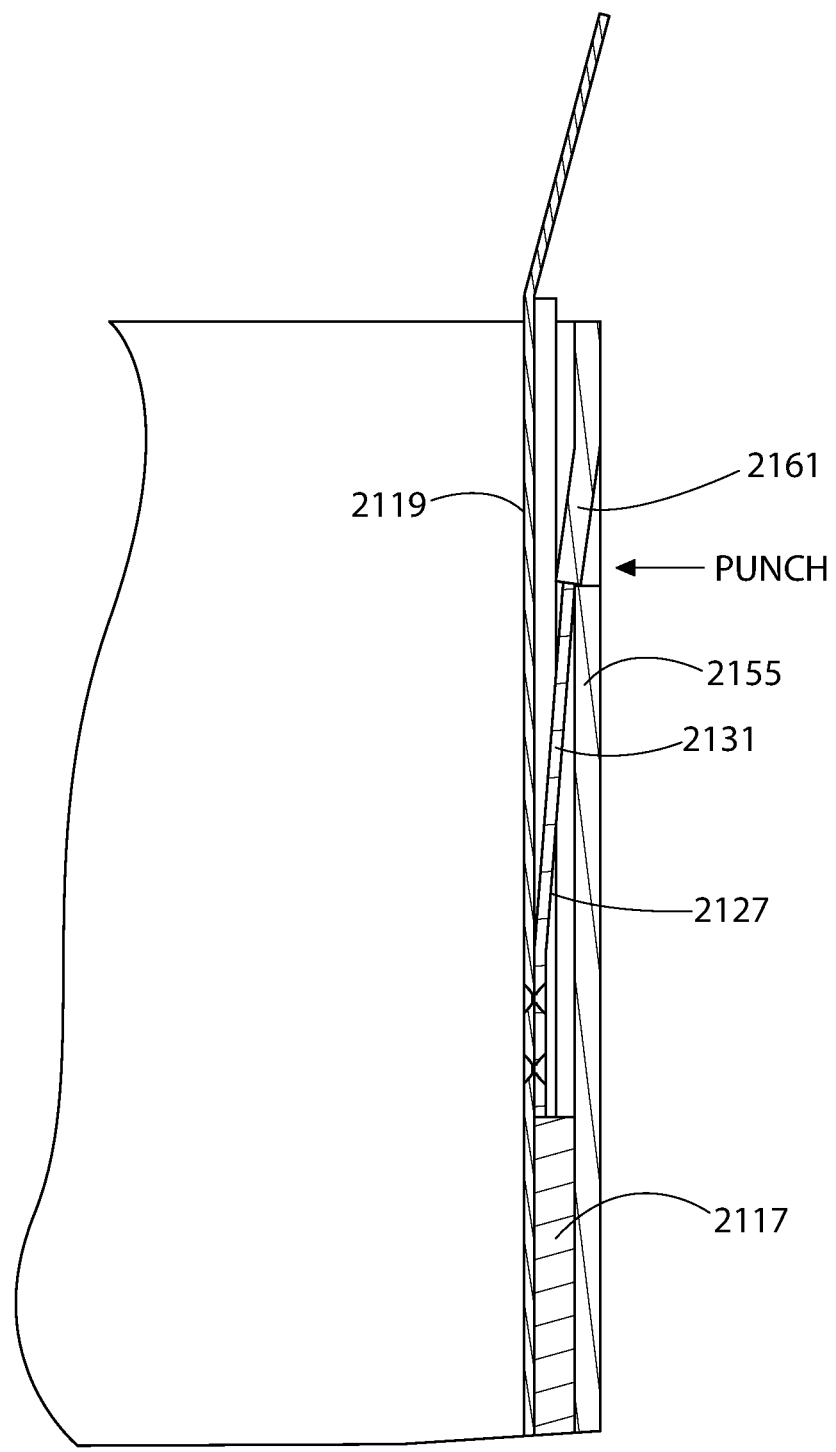
FIG. 19 is a cross sectional view of the interlocking engagement between the neutron absorbing apparatus of FIG. 13 fully inserted into the cell of FIG. 16.

A detailed cross-sectional view of the locking features of the absorption assembly 2111 and the cell 2151 are shown in FIG. 19. As described above, the locking feature may be a tab, and such a tab 2127 is shown with its top portion 2131 in locking engagement with a second tab 2161, this second tab 2161 being formed in the cell wall 2155.

When manufacturing the absorption assembly for a fuel rack that has not yet been placed in service, the order of making the locking protuberances, the type of locking protuberance used, and even whether one or both of the cell wall and the absorption assembly include a locking protuberance, are anticipated to be variables that may be addressed by design decisions for a particular configuration. However, when retrofitting a fuel rack or cask that is already in use, and a tab is used in the cell wall as a locking protuberance, preferably the absorption assembly is first manufactured and placed into the cell before the tab in the cell wall is created. This permits maximization of space use within a pool or cask by minimizing the space requirements of the absorption assembly, because the tab effectively reduces the overall nominal width of the cell.

When retrofitting an existing and in-use fuel rack or cask, the tab 2161 in the cell wall may be formed just above the position of the tab in the absorption assembly as a half-shear using a C-shaped tool which spans the extension portion 2123 of the guide sheet 2119. With such a tool, a double-acting hydraulic cylinder may be used to push a wedge-shaped piece of the tool into the cell wall, thereby creating the half-sheared tab 2161 extending toward the inner space of the cell.

Figure 20:
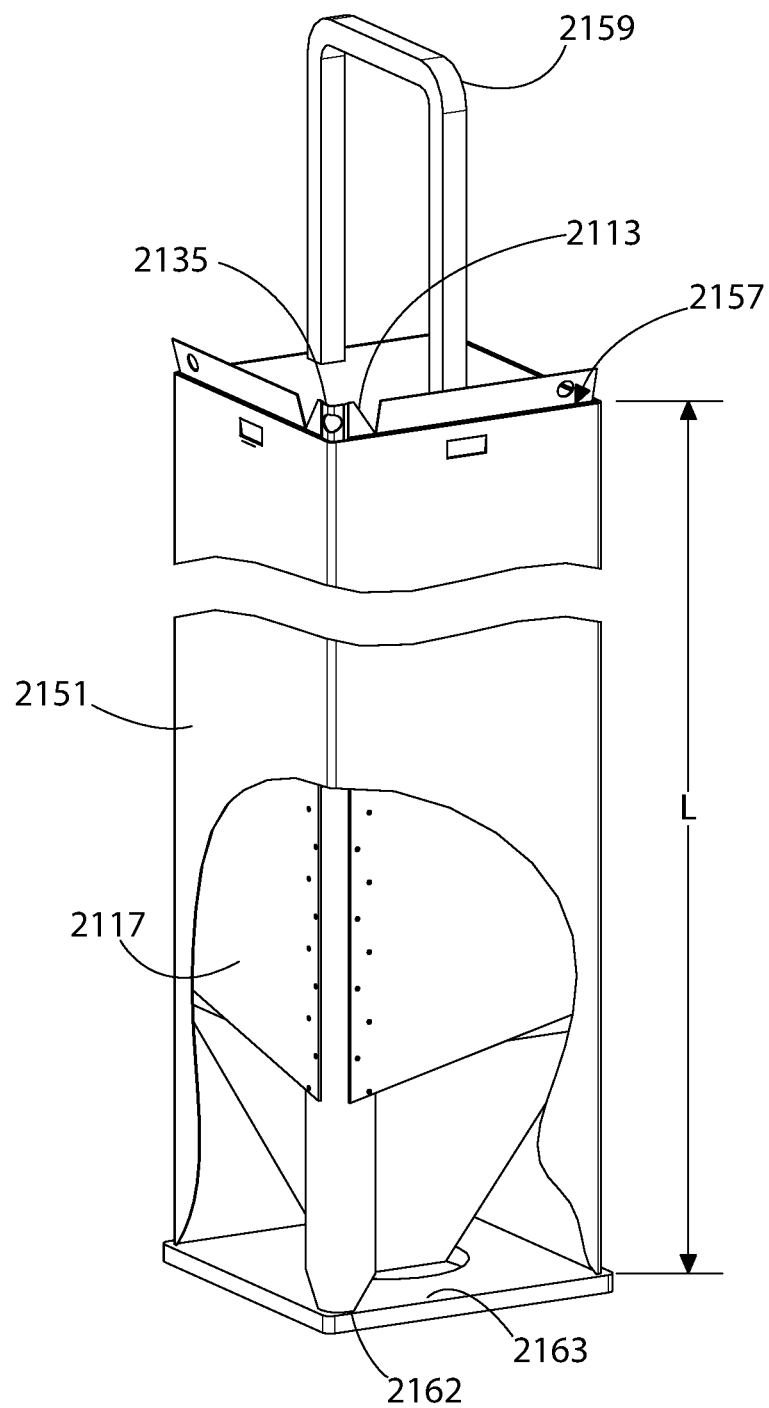
FIG. 20 is a perspective view of a fuel assembly in a cell that is part of an array of cells in a submerged fuel rack, and a fully inserted neutron absorbing apparatus.

The cell 2151 has an overall length L, and the corner spine is configured to have approximately the same length, as shown in FIG. 20. As shown, the corner spine 2113 clears the top 2157 of the cell wall 2159 by a sufficient amount to make the suspension aperture 2135 of the corner spine 2113 accessible, even when the spent nuclear fuel assembly 2159 is placed within the cell 2151. The length of the corner spine 2113 is such that the bottom edge 2162 rests against the bottom 2163 of the cell 2151. The absorption sheet 2117 need not extend all the way to the bottom 2163 of the cell 2151, as the length of the absorption sheet 2117 may extend as far down into the cell as needed so that it shields adjacent fuel assemblies from one another. This is because adjacent spent nuclear fuel rods may not extend the entire length of the cell either, and the length of the absorption sheet 2117 need only be as long as the spent nuclear fuel rods within the spent nuclear fuel assembly 2159, although they may be longer if desired.

Since there is a need to maximize space use within a fuel pond or cask, it is desirable that the absorption assembly 2111 take up as little room as possible in the cell of the fuel rack. To this end, the absorption sheets 2117 are preferably constructed of an aluminum boron carbide metal matrix composite material having a percentage of boron carbide greater than 25%. While the addition of boron carbide particles to the aluminum matrix alloy increases the ultimate tensile strength, increases yield strength, and dramatically improves the modulus of elasticity (stiffness) of the material, it also results in a decrease in the ductility and fracture toughness of the material compared to monolithic aluminum alloys.

The boron carbide aluminum matrix composite material of which the absorption sheets are constructed includes a sufficient amount of boron carbide so that the absorption sheets can effectively absorb neutron radiation emitted from a spent fuel assembly, and thereby shield adjacent spent fuel assemblies in a fuel rack from one another. The absorption sheets may be constructed of an aluminum boron carbide metal matrix composite material that is about 20% to about 40% by volume boron carbide. Of course, other percentages may also be used. The exact percentage of neutron absorbing particulate reinforcement, which is in the metal matrix composite material, in order to make an effective neutron absorber for an intended application, will depend on a number of factors, including the thickness (i.e., gauge) of the absorption sheets 2107, the spacing between adjacent cells within the fuel rack, and the radiation levels of the spent fuel assemblies.

Other metal matrix composites having neutron absorbing particulate reinforcement may also be used. Examples of such materials include, without limitation, stainless steel boron carbide metal matrix composite. Of course, other metals, neutron absorbing particulate and combinations thereof may be used including without limitation titanium (metal) and carborundum (neutron absorbing particulate). Suitable aluminum boron carbide metal matrix composites are sold under the trade names Metamic® and Boralyn®.

The center spine, the guide sheets, and the locking protuberance may be formed from steel or other materials, or they may alternatively be formed from non-metallic materials.

When the locking protuberance is configured as a tab affixed to the guide sheet of the absorption assembly, the tab is preferably formed from a sheet of 2301 stainless spring steel, tempered to about ¾ hard. In a preferred embodiment, the tab is about 0.035 inches thick, about 0.7 inches wide, and about 1.7 inches long, with the upper portion of the tab being about 1.09 inches long and bent to extend beyond the outer side of the absorption layer by between 0.125 inches to 0.254 inches, depending upon how thick the absorption layer is and whether the absorption assembly is being placed over an existing absorption layer within the cell. In the latter instance, the tab should be configured so that the upper portion extends beyond the existing absorption layer. The extent to which the tab extends beyond the absorption layer is a matter of design choice, as it depends upon several factors such as the type of locking feature included on the cell wall, how much the tab needs to deflect upon insertion, and how much removal force the tab should be able to withstand. For example, with a tab extending 0.125 inches beyond the absorption layer, it may be desirable to have the tab be able to deflect by approximately 0.124 inches upon insertion. Such a configuration is anticipated to withstand at least a 200 lb. removal force once the tab is interlocked with a second tab formed in the cell wall. It should be noted that the tab will remain in a substantially deflected state once the absorption assembly is inserted into cell wall

III. Inventive Concept 3

With reference to FIGS. 21-31, a third inventive concept will be described.

Figure 21:
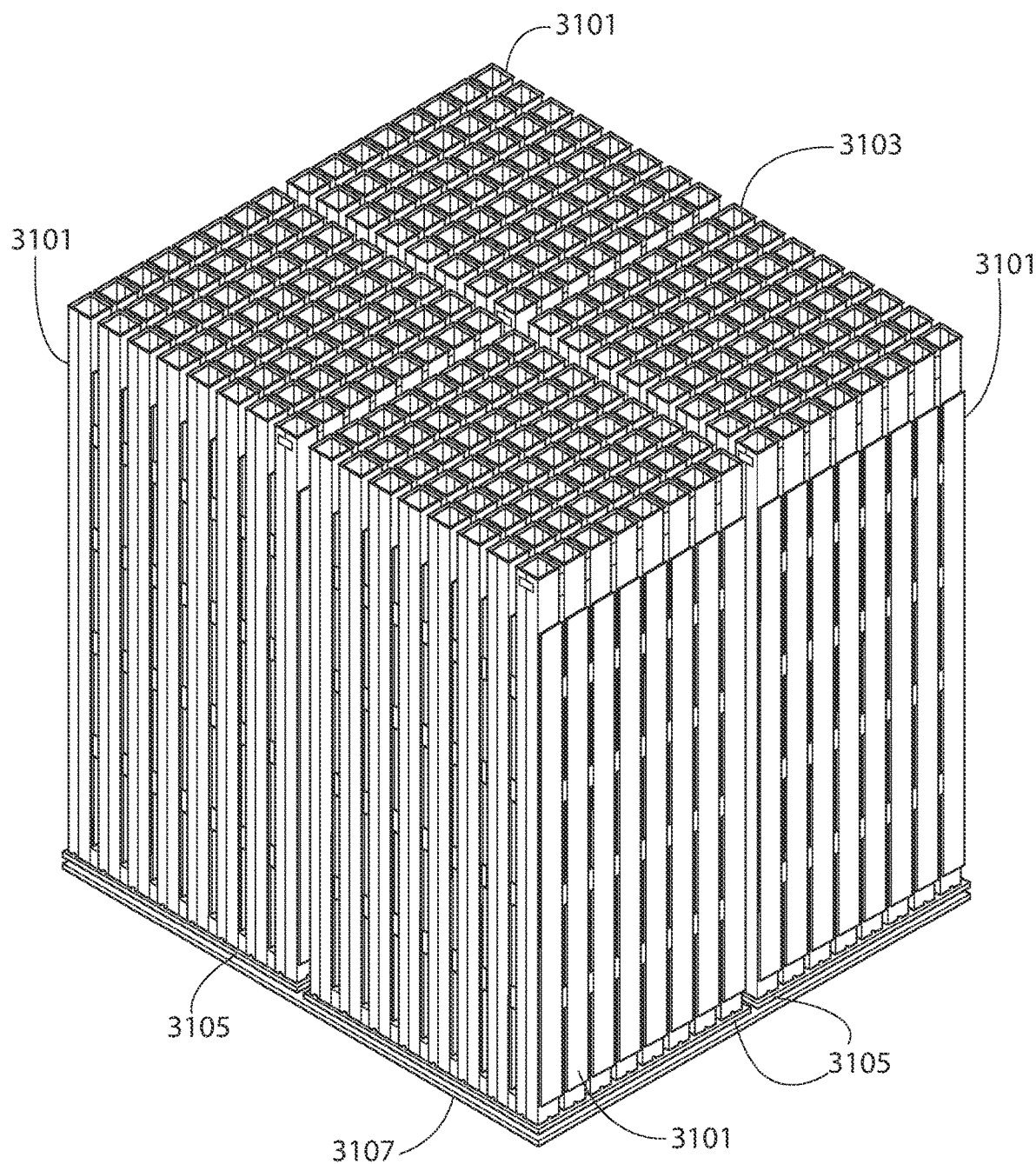
FIG. 21 is a perspective view of an array of fuel racks.

An array of fuel storage racks 3101 is shown in FIG. 21. Each storage rack 3101 is itself an array of fuel cells 3103, and each is generally square in cross section, with each fuel cell 3103 also being square in cross section. Such storage racks, and their construction, are generally known in the art. For example, U.S. Pat. No. 4,382,060 to Holtz et al. describes a storage rack and details how each fuel cell is configured to receive and store nuclear fuel. Typically, the storage racks are used for storing nuclear fuel underwater in storage pools.

Each storage rack 3101 includes a base plate 3105, which may be formed integrally as the bottom of the fuel cells 3103, or it may be coupled with an appropriate fastening system. Each base plate 3105 is disposed atop a bearing pad 3107, with a support structure (not shown in FIG. 21; See, e.g., FIG. 24) providing structural support between, and coupling together, the base plate 3105 and the bearing pad 3107. The bearing pad 3107 may, in certain instances, be considered a coupler pad in that it couples multiple fuel racks together as discussed in greater detail below. The support structure, as is further discussed below, is also constructed to allow cooling fluid (e.g., water, among other liquids) to circulate under the base plate and up through apertures in the base plate. As shown in the embodiment depicted in FIG. 21, the bearing pad 3107 may be a single sheet of material that contiguously extends under all the storage racks 3101 forming the array. When used in this configuration, the bearing pad acts to couple the various racks of the array to each other, so that each storage rack 3101 is limited in the amount of independent lateral movement with respect to both the bearing pad 3107 and each of the other storage racks 3107.

By restricting the lateral movement of the individual storage racks in this manner, the bearing pad causes all the storage racks coupled thereto to move largely in unison in any direction, and significant movement of the entire coupled array occurs only when the bearing pad slides on the bottom surface of the pool. Thus, the bearing pad aids in reducing the kinematic response of individual racks under strong seismic conditions by coupling together the individual racks so that the kinematic responses of all the racks together are effectively coupled together, and the kinematic response of the some racks within the array may serve as at least a partial offset to the kinematic response of other racks within the array. In addition, while the bearing pad serves to could each storage rack in the array of storage racks together, it also enables each storage rack to effectively remain free-standing. Having free-standing storage racks in a pool is important in that each storage rack may be placed and removed individually and separately from each of the other storage racks.

Figure 22:
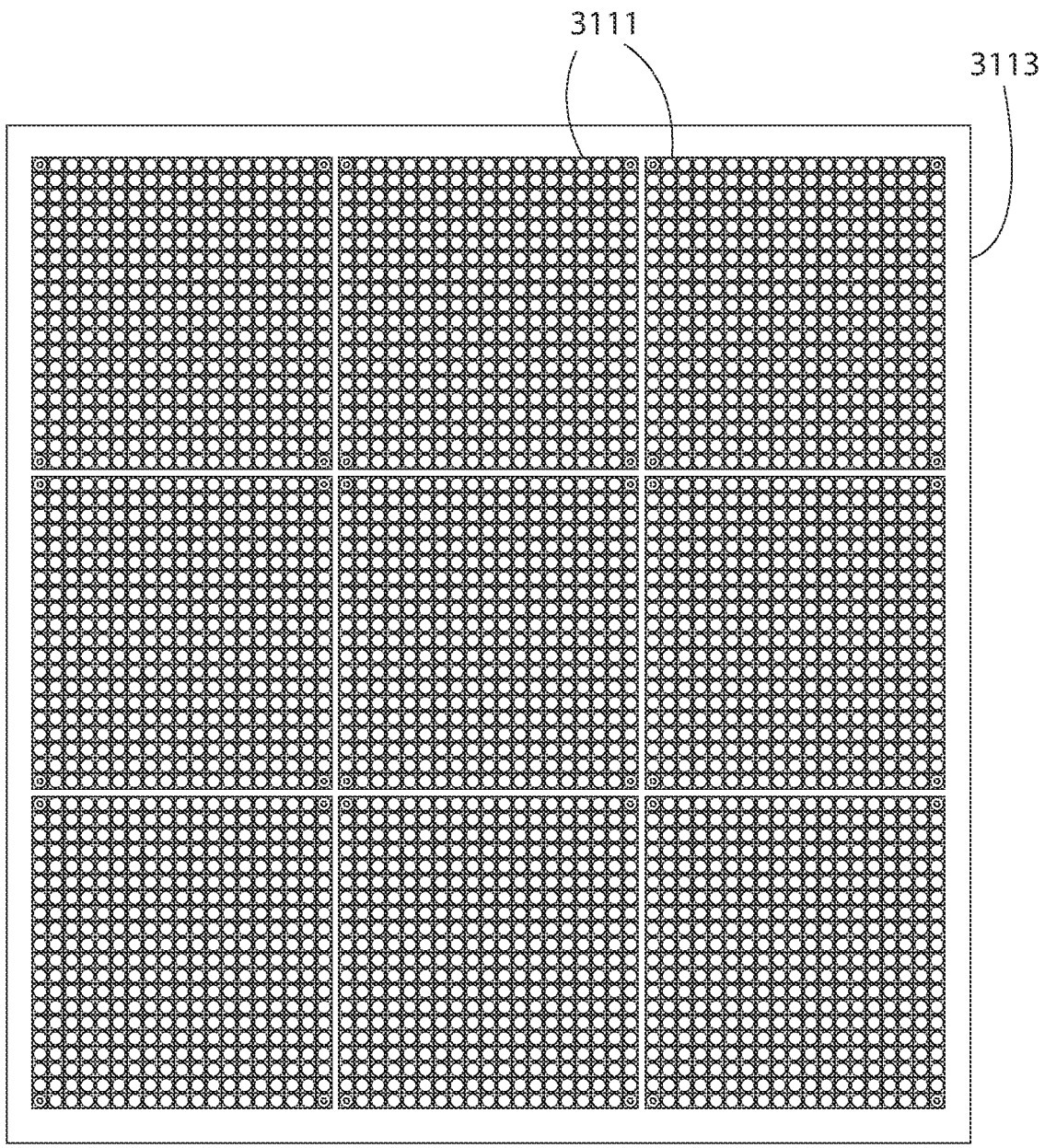
FIG. 22 is a top view of an array of fuel racks.

A top view of an array of storage racks 3111 is shown in FIG. 22. These storage racks 3111 are coupled to a bearing pad 3113 as discussed above. In this embodiment, the bearing pad 3113 extends outward from the periphery of the array of storage racks 3111. This outward extension of the bearing pad 3113 is configured to maintain a predetermined distance between the storage racks and the side of a storage pool (not shown). By maintaining the predetermined distance between the storage racks and the side of a storage pool, the array of storage racks 3111 may be prevented from moving close enough to the side of the storage pool so that an impact between one or more of the storage racks 3111 and the side wall of the storage pool is likely during a seismic incident. This predetermined distance, which is the distance the bearing pad 3113 extends beyond the outer lateral dimensions of the storage racks, may be as little as about ½ inch. Preferably, the largest outer lateral dimension of each storage rack is defined by the base plate for each storage rack. Those of skill in the art will recognize that the size of this predetermined distance may be influenced by many other factors associated with the configuration of storage racks and the configuration of the storage pool.

By coupling multiple storage racks with one or more bearing pads, the movement of the freestanding racks can be significantly reduced, if not minimized, on the pool's surface under a severe earthquake. For purposes of this disclosure, a severe earthquake or seismic event is empirically defined as one in which the seismic accelerations are large enough to move a short square block of steel (i.e., a squat and rigid body) on the pool slab by at least 2 inches. By coupling storage racks together using the bearing pads, the relatively uncoordinated motion of the freestanding storage racks produced by a seismic event is exploited to dissipate dynamic energy of the various individual storage racks. During a seismic event, the fuel modules attempt to move in various different directions and thereby exert the lateral forces on the storage racks, which in turn exert lateral forces on the bearing pad(s). This leads to a reduced net resultant force, when the lateral forces of all coupled storage racks are combined. The bearing pad therefore preferably has a bottom surface which provides sufficient friction, under load, with the bottom of the storage pool. During seismic events that are less than a severe seismic event, the lateral forces generated by coupled storage tanks will generally not exceed the friction force between the loaded bearing pad and the bottom of the storage pool, wherein the load on the bearing pad has contribution from the combined vertical load of all participating pedestals. In such circumstances, the bearing pad should not slide on the bottom of the storage pool, and thus the kinematic movement of the racks will be substantially suppressed.

A seismic analysis of the coupled storage rack array shown in FIG. 22 has been performed, and the under three dimensional seismic motion, the sliding response of the coupled storage rack array may be reduced by an order of magnitude as compared to the sliding response of freestanding storage racks that are not coupled by a bearing pad.

FIGS. 23 and 24 illustrate an embodiment of the support structure that may be used to couple between the base plates of the storage racks and the bearing pad. For simplicity and purposes of illustration, a smaller version of a storage rack 3121 is shown in FIG. 23, having only two fuel cells 3123 per side. In addition, as an alternative embodiment, only one storage rack 3121 is placed on the bearing pad 3125. In this alternative embodiment, the bearing pad 3125 helps to maintain spacing between the storage rack 3121 and the walls of the storage pool, and between other storage racks placed on their own bearing pads that may be placed within the same storage pool. However, by placing each storage rack within a storage pool on its own individual bearing pad, much of the advantage of coupling the storage racks to help offset the kinematic response of individual storage racks may be lost.

The base plate 3127 of the storage rack 3121 has multiple support pedestals 3129 affixed thereto, and these pedestals serve as the support structure between the base plate 3127 and the bearing pad 3125. The spacing between the support pedestals 3129 is provided for liquid to circulate between the base plate 3127 and the bearing pad 3125. The base plate 3127 also includes apertures 3131, which allow the cooling liquid to pass through the base plate 3127 and rise up into the fuel cells 3123.

The support pedestals 3129 in this embodiment are each disposed within a recess cavity 3133 formed in the bearing pad 3125. The support pedestals 3129 and the respective recess cavities 3133 may have any desired shape which enables the support pedestals to couple with the recess cavities. Two design features for a support pedestal and/or a recess cavity are preferably included in the configuration of one or both of the paired support pedestals and the recess cavities. The first feature is the inclusion of a guide surface on one or both of the support pedestal 3129 and the recess cavity 3133. The guide surface aids in guiding one into the other when the storage rack 3121 is lowered onto the bearing pad 3125 within the storage pool. As can be seen in FIG. 24A, the support pedestal 3129 includes a rounded end 3137 to serve as a guide surface, and the recess cavity 3133 includes a beveled edge 3139 to server as a guide surface. Both the rounded end 3137 and the beveled edge 3139 aid in guiding the support pedestal 3129 into the recess cavity 3133 when the storage rack 3121 is lowered into position on the bearing pad 3125 within a storage pool, especially when every support pedestal 3129 and every recess cavity 3133 include such guide surfaces.

The second feature that is included in the pairs of support pedestals and recess cavities is the lateral tolerance, t, between the maximum effective outer dimension of the support pedestal, OD, and the minimum effective inner dimension of the recess cavity, ID. FIG. 24B shows the profile 3141 of the support pedestal 3129 and the profile 3143 of the recess cavity 3133 along the line T. Since each profile 3141, 3143 is round, the maximum effective outer dimension of the support pedestal, OD, is the diameter of the support pedestal, and the minimum effective inner dimension of the recess cavity, ID, is the diameter of the recess cavity, along the line T. When this lateral tolerance, t, for each support pedestal/recess cavity pair is the same, it defines the maximum lateral distance the storage rack 3121 can move laterally independent of the bearing pad 3125. Preferably, this lateral tolerance, t, is no more than the predetermined distance that the bearing pad 3125 extends beyond the outer lateral dimensions of the storage rack, the latter being discussed above. In the case of two storage racks coupled together by a bearing pad, this lateral tolerance is preferably less than or equal to half the predetermined distance separating the base plates of adjacent storage racks. Those of skill in the art will recognize that either or both of the support pedestals and the recess cavities may have profiles that are of any desired geometrical shape that enables coupling between the base plate and the bearing pad, and allows for limited lateral movement of the storage rack with respect to the bearing pad within an established lateral tolerance.

By including the lateral tolerance, t, at the point of coupling between the bearing pad and the storage rack, movement of the storage rack, independent of movement of the bearing pad, is limited by the amount of the lateral tolerance, t. Any lateral movement of the storage rack that is greater than the lateral tolerance, t, will necessarily require either movement of the bearing pad or decoupling of the storage rack from the bearing pad. Due to the weight of a fully loaded storage rack, decoupling is unlikely.

Figure 25:
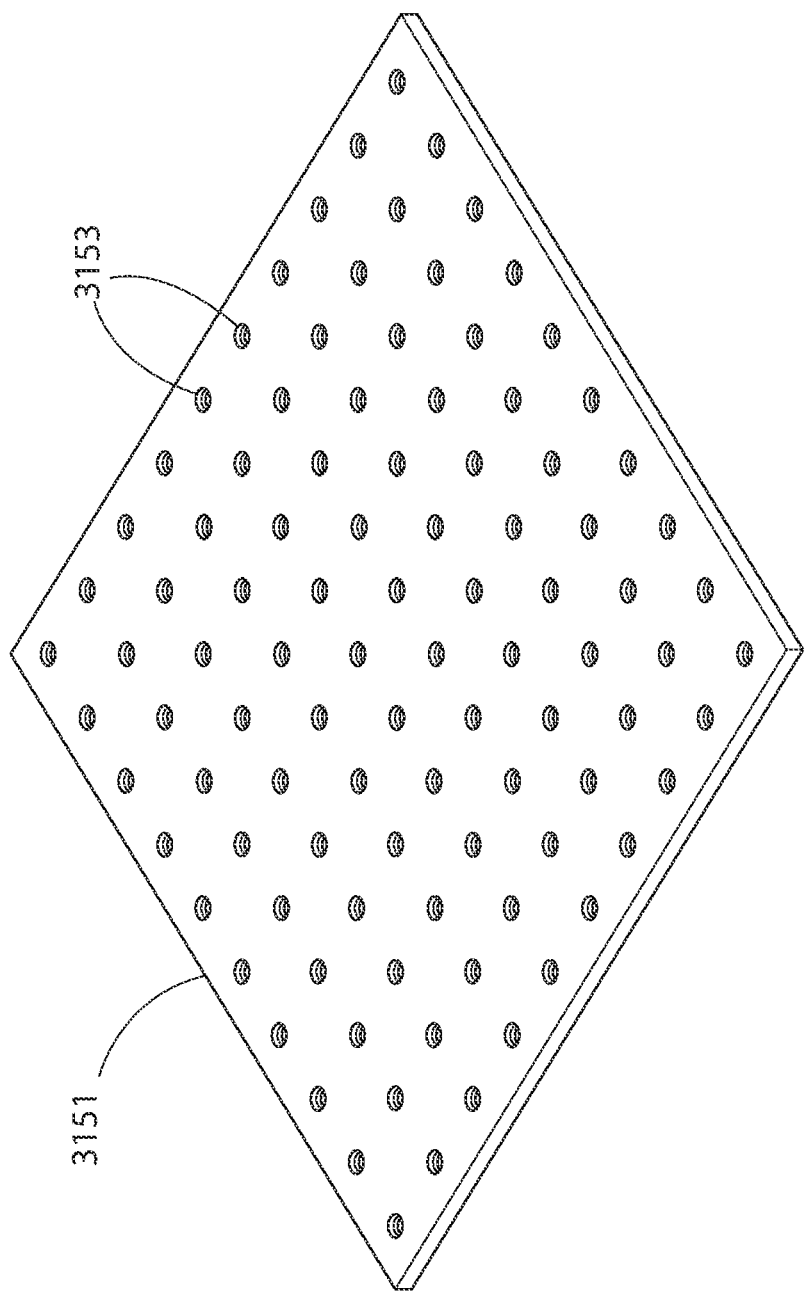
FIG. 25 is a perspective view of a bearing pad which is placed underneath a plurality of fuel racks.

A bearing pad 3151 having multiple recess cavities 3153 is illustrated in FIG. 25. This bearing pad is configured to be placed in the bottom of a storage pool and have a plurality of storage racks lowered into the pool so that each support pedestal of the storage racks couples into one of the recess cavities 3153 of the bearing pad 3151. The bearing pad 3151 may therefore have as many recess cavities as all the storage racks combined have support pedestals. The bearing pad also has a substantially flat bottom, which enables it to slide on the bottom of the pool under the loads that may be caused by a seismic event. The bottom of the bearing pad may also be coated to help control the amount of sliding that may occur.

As an alternative, if the storage racks have support pedestals of different lengths extending from the base plate, then the longer support pedestals may be coupled into recess cavities, and the shorter support pedestals may extend to the top surface of the bearing pad for supporting the storage rack, but such shorter support pedestals would not couple to the bearing pad, in that they would not serve to restrict lateral movement of the storage rack during a seismic event.

Figure 26:
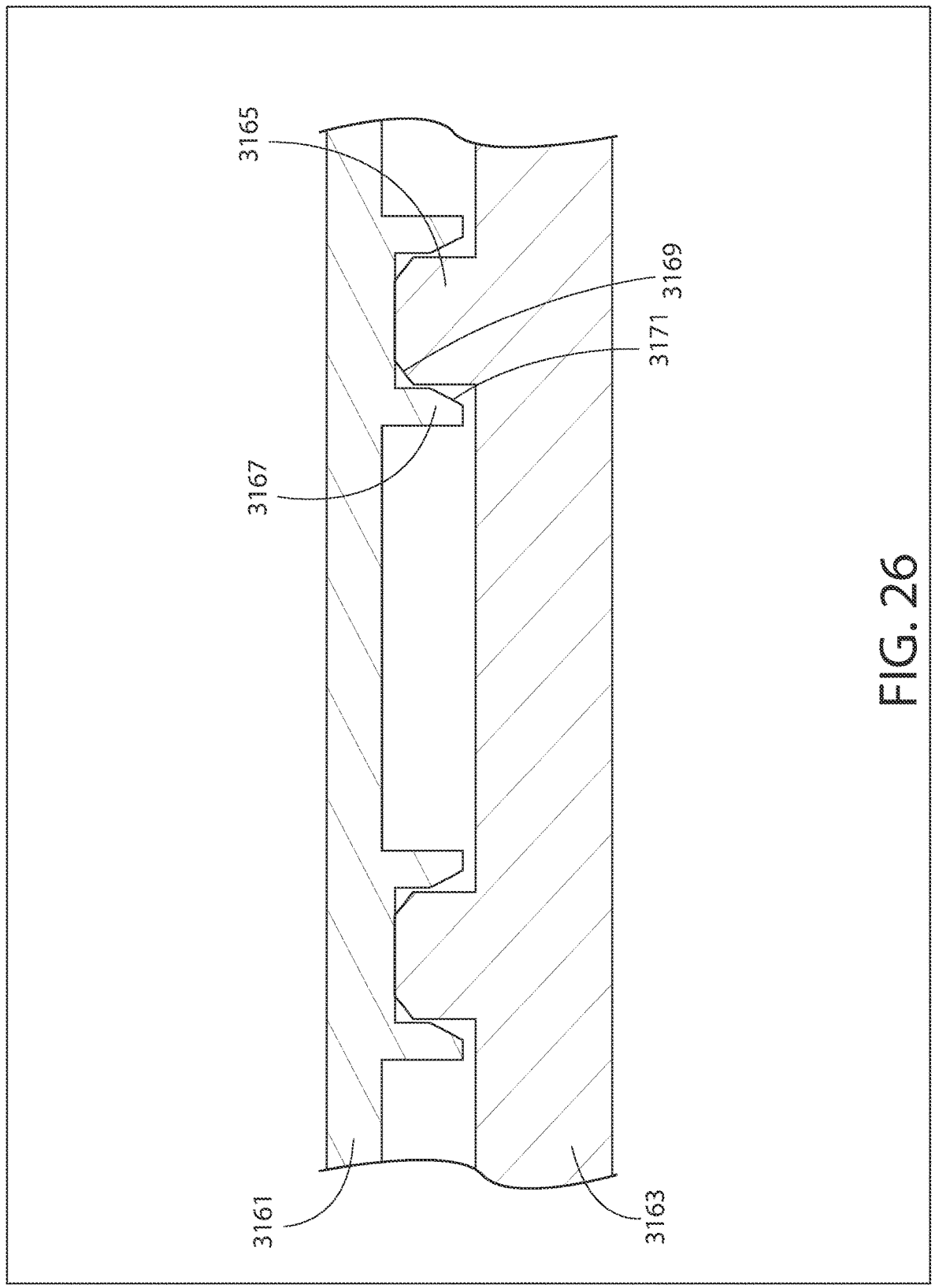
FIG. 26 is a detailed view of an engagement between a support structure of a fuel rack and a bearing pad.

An alternative embodiment for the support structure between the base plate 3161 of a storage rack and a bearing pad 3163 is shown in FIG. 26. In this embodiment, the bearing pad 3163 includes upward-extending support columns 3165, and the base plate 3161 includes downward-extending receptacles 3167 to couple with each support column. The support columns include top beveled edges 3169 to act as a guide surface, and the receptacles include a lower beveled edge 3171 to similarly act as a guide surface.

As should be evident from the different embodiments described, the support structure and the base plate be couple together by forming the support structure as a first engagement feature affixed to the base plate (e.g. support pedestals, receptacles) and coupling the first engagement feature to a second engagement feature formed as part of or affixed to the bearing pad (e.g., recess cavities, support columns). Thus, it should be apparent that the first and second engagement features may take on any desirable configuration, from those described above, to combinations of those described above, and to other structural configurations, with the following concepts generally taken into account: 1) providing appropriate structural support and lift to the storage rack to thereby allow circulation of cooling liquid under and up through the base plate, and 2) limiting lateral movement of the storage rack independent from the bearing pad. The first aforementioned concept allows appropriate circulation of cooling liquid, while the second concept is used to reduce the likelihood of an impact with the wall of a storage pool when the bearing pad is used with a single storage rack, and also to reduce lateral movement of an array of storage racks during a seismic event when the bearing pad couples two or more storage racks together.

Figure 27:
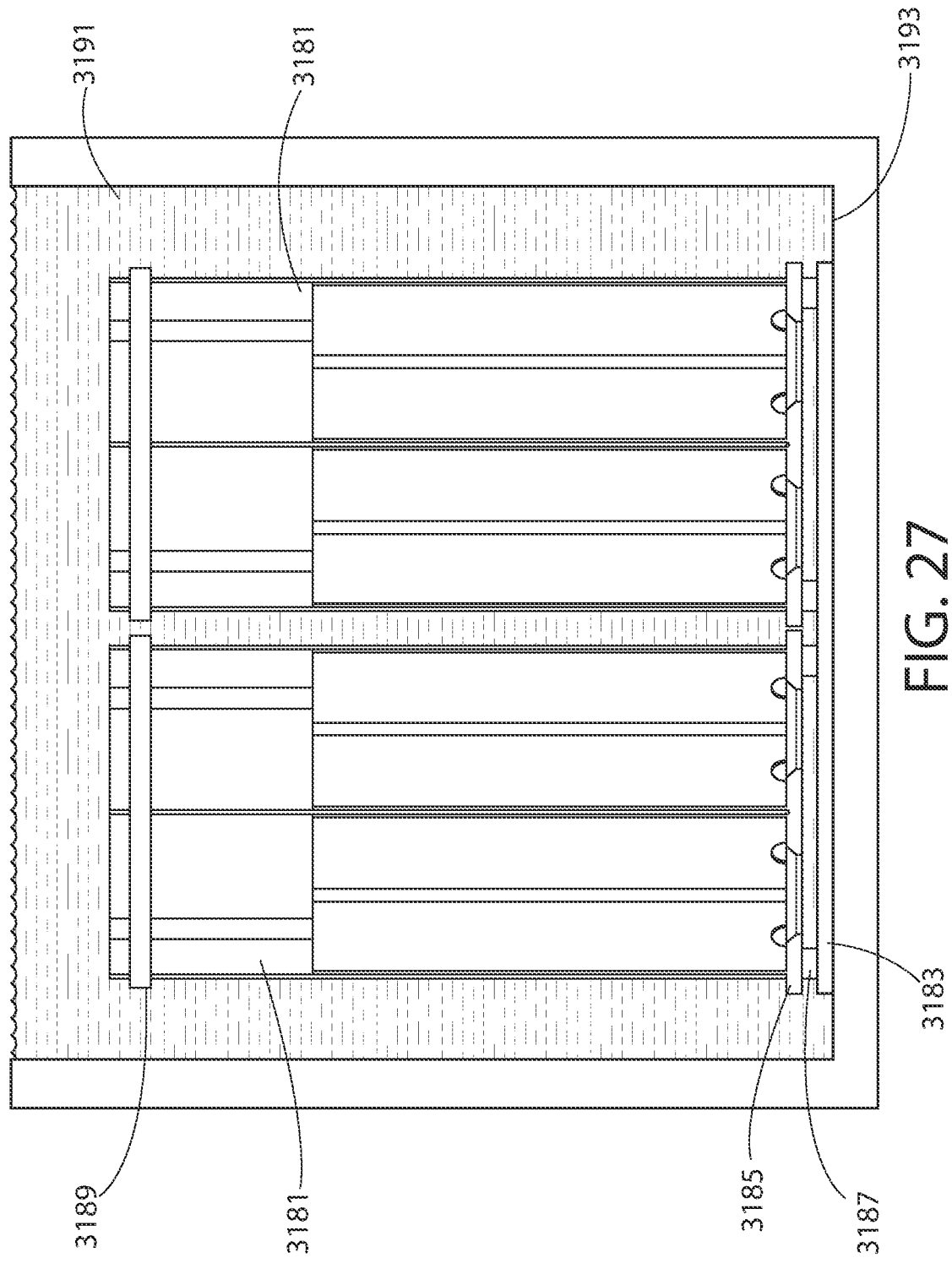
FIG. 27 illustrates a plurality of fuel racks disposed in a pool.

An array of two storage racks 3181 disposed in a storage pool 3191 is shown in FIG. 27. The two storage racks 3181 are coupled together by a single bearing pad 3183, with the base plates 3185 of the storage racks 3181 having support pedestals 3187 that extend down into recess cavities (not shown in this figure) formed in the bearing pad 3183. As an alternative, the bearing pad may be integrally formed in the bottom surface 3193 of the storage pool 3191. Each storage rack 3181 also includes a collar 3189 affixed to a top of and extending around each rack 3181, each collar 3189 forming a spacer at the top of each storage rack 3181. Each collar 3189 extends outward from the sides of the storage rack 3181 to which it is affixed, respectively, toward the collar 3189 on the other storage rack 3181, so that there is a second predetermined distance between the two collars 3189. The base plates 3185 of each storage rack 3181 extends outward from the respective storage rack 3181 further than the collar 3189, such that the predetermined distance between the two base plates 3185 is greater than the predetermined distance between the two collars 3189. Configured in this way, and considering the lateral tolerance of the support pedestals 3187 within the recess cavities, during a seismic event, the support pedestals and the recess cavities form a primary impact zone, the base plates 3185 of the adjacent storage racks 3181 form a secondary impact zone, and the collars 3189 of the adjacent storage racks form a tertiary impact zone.

The spacer for each storage rack may have other configurations, and need not extend around the entire top of the storage rack. For example, the spacers may be formed as individual outcroppings affixed to the storage racks, and set so that the spacers on one storage rack are opposite the spacers on an adjacent storage rack. The purpose is to set spacers between adjacent racks so that the spacers impact each other during a seismic event instead of the fuel cells of the adjacent racks impacting.

Figure 28:
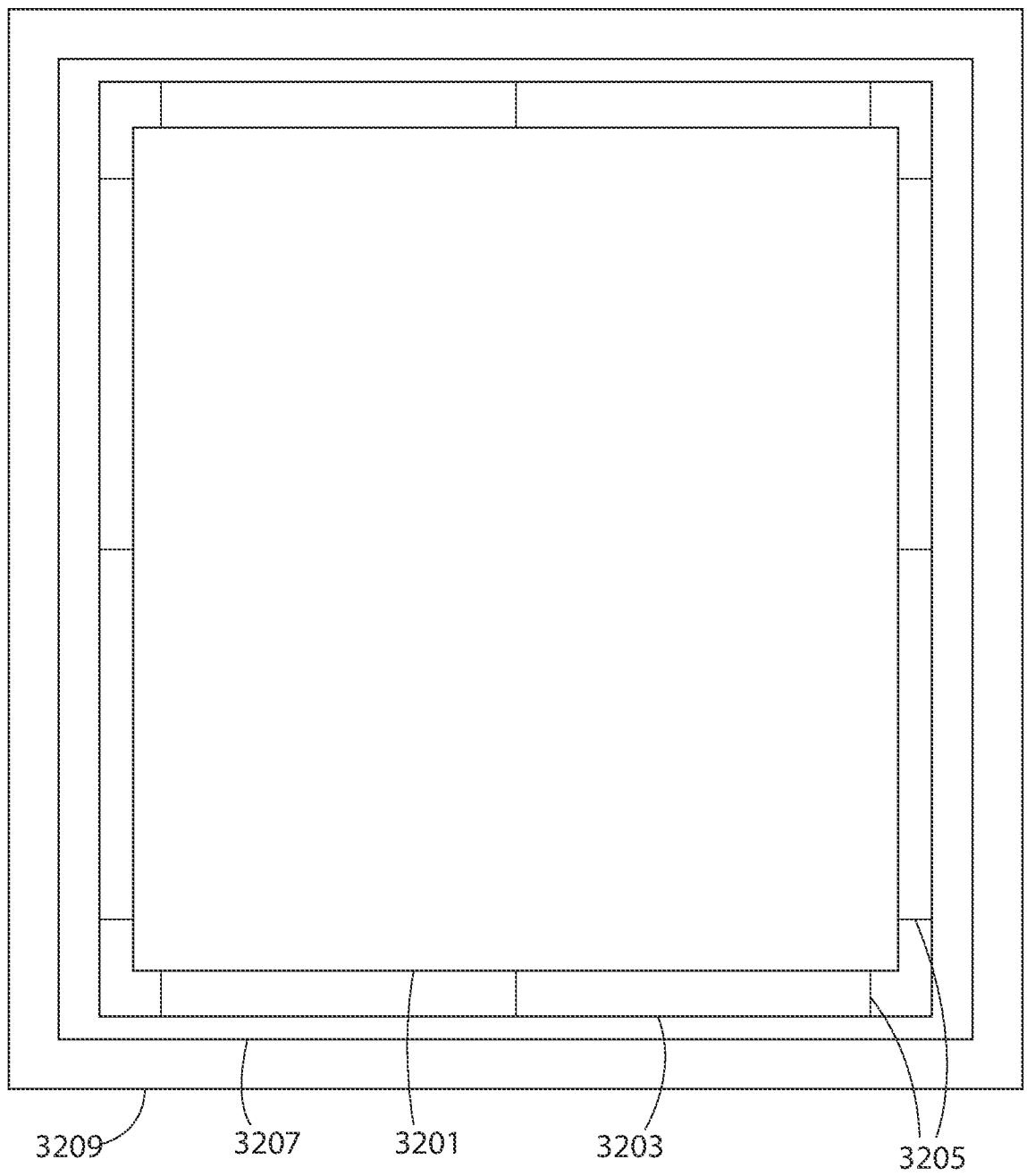
FIG. 28 is a schematic view of a first fuel rack profile in the horizontal plane of the base plate.

FIG. 28 shows profiles of a storage rack and the bearing pad to which it is coupled in the horizontal plane of the base plate of the base plate of the storage rack, to show the difference in sizes, although each profile of each part shown in this figure is not to scale. In the configuration shown, the bearing pad extends entirely under the storage rack. The portion of the storage rack which includes the array of cells is the storage rack profile 3201. The collar profile 3203 is shown, along with the profile of attachment points 3205 to the storage rack profile 3201. The collar profile 3203 is larger than, and extends outside of, the storage rack profile 3201. The base plate profile 3207 is shown, and it is larger than, and extends outside of, both the storage rack profile 3201 and the collar profile 3203. The bearing pad profile 3209 is larger than, and extends outside of, the base plate profile 3207.

Figure 29:
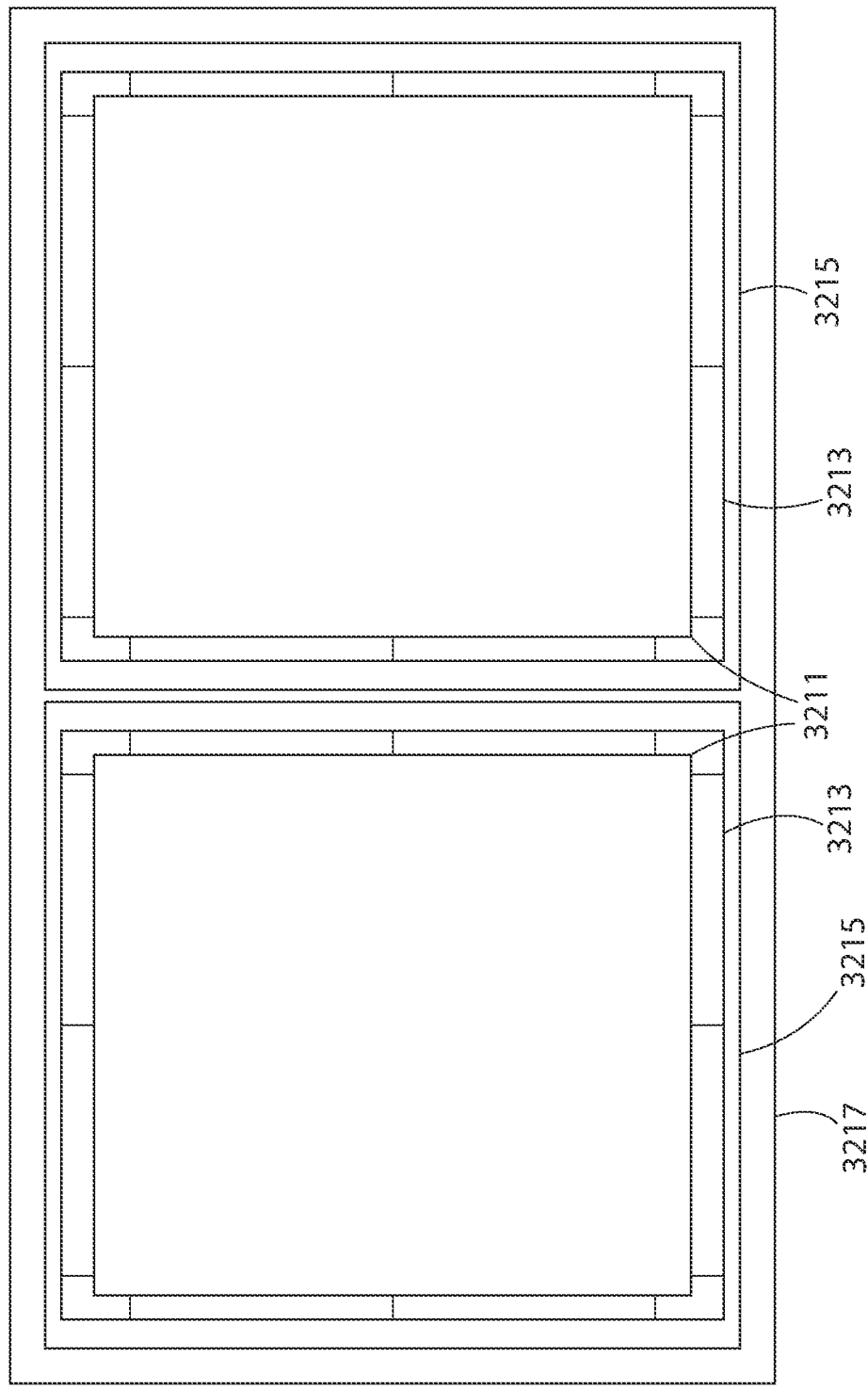
FIG. 29 is a schematic view of a plurality of fuel racks profiled in the horizontal plane of the base plate.

FIG. 29 shows profiles of an array of two storage racks and the associated bearing pad to which both are coupled, with the profiles being shown in the horizontal plane of the base plates of the storage racks. In this configuration, the bearing pad extends entirely under both storage racks. The portion of the storage racks which include the respective arrays of cells are the storage rack profiles 3211. The collar profiles 3213 for each storage rack are larger than the storage rack profile 3211 for each respective storage rack. Similarly, the base plate profiles 3215 for each storage rack are larger than the respective collar profiles 3213. The bearing pad profile 3217 is larger than the combined two base plate profiles 3215, extending outside of both.

An alternative embodiment of a bearing pad 3221 is shown in FIGS. 30A-C. This bearing pad 3221 includes four recess cavities 3223. This bearing pad 3221 may be placed under adjacent sides of two adjacent storage racks, with two support pedestals from each storage rack being placed in the four recess cavities 3223. Alternatively, as illustrated in FIG. 30B, it may be placed under the corners of four adjacent storage racks (the outlines of the corners 3225 are shown), with one support pedestal from each of the four storage racks being placed in the four recess cavities 3223. In either of these embodiments, the support pedestals placed in the recess cavities are adjusted to be shorter than those that extend to the bottom of the storage pool and not placed in recess cavities.

Figure 31:
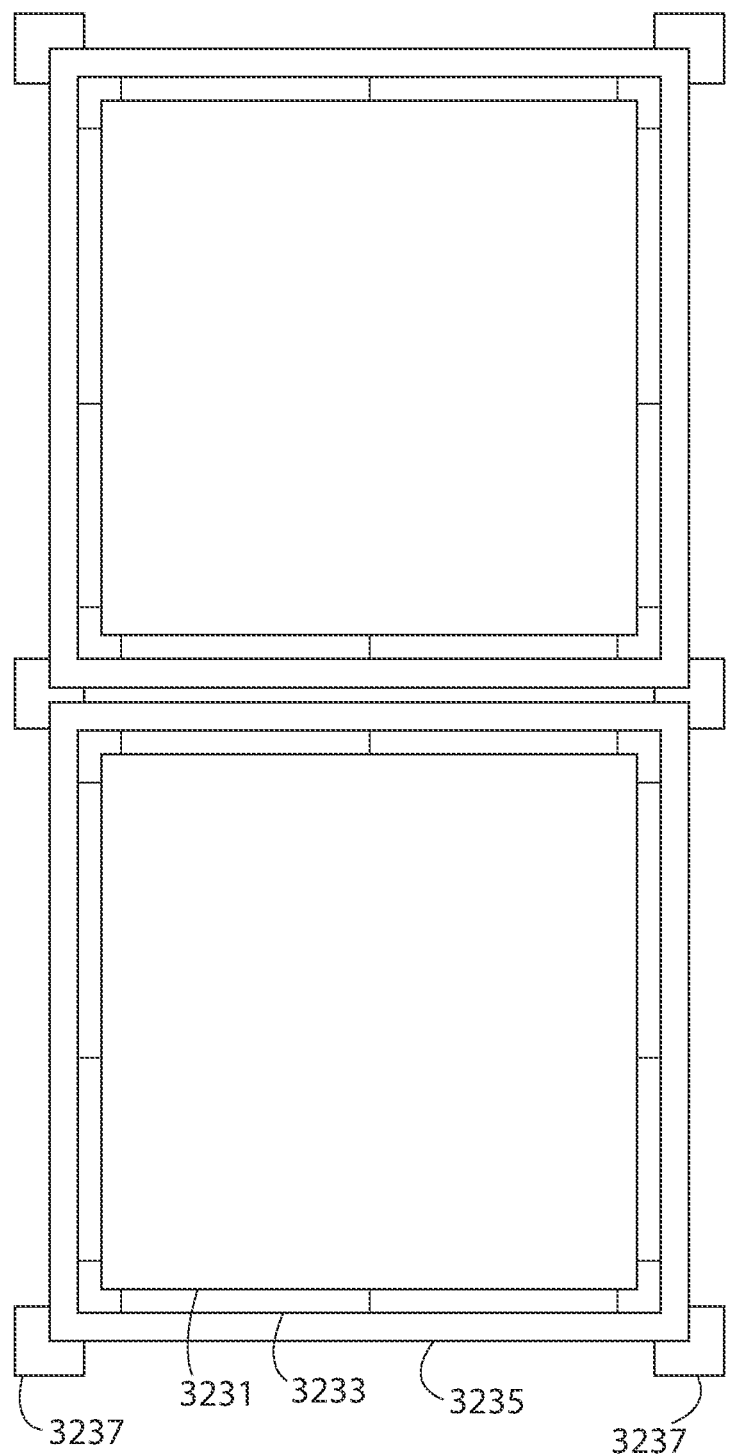
FIG. 31 is a schematic view of a second fuel rack profile in the horizontal plane of the base plate.
Figure 32:
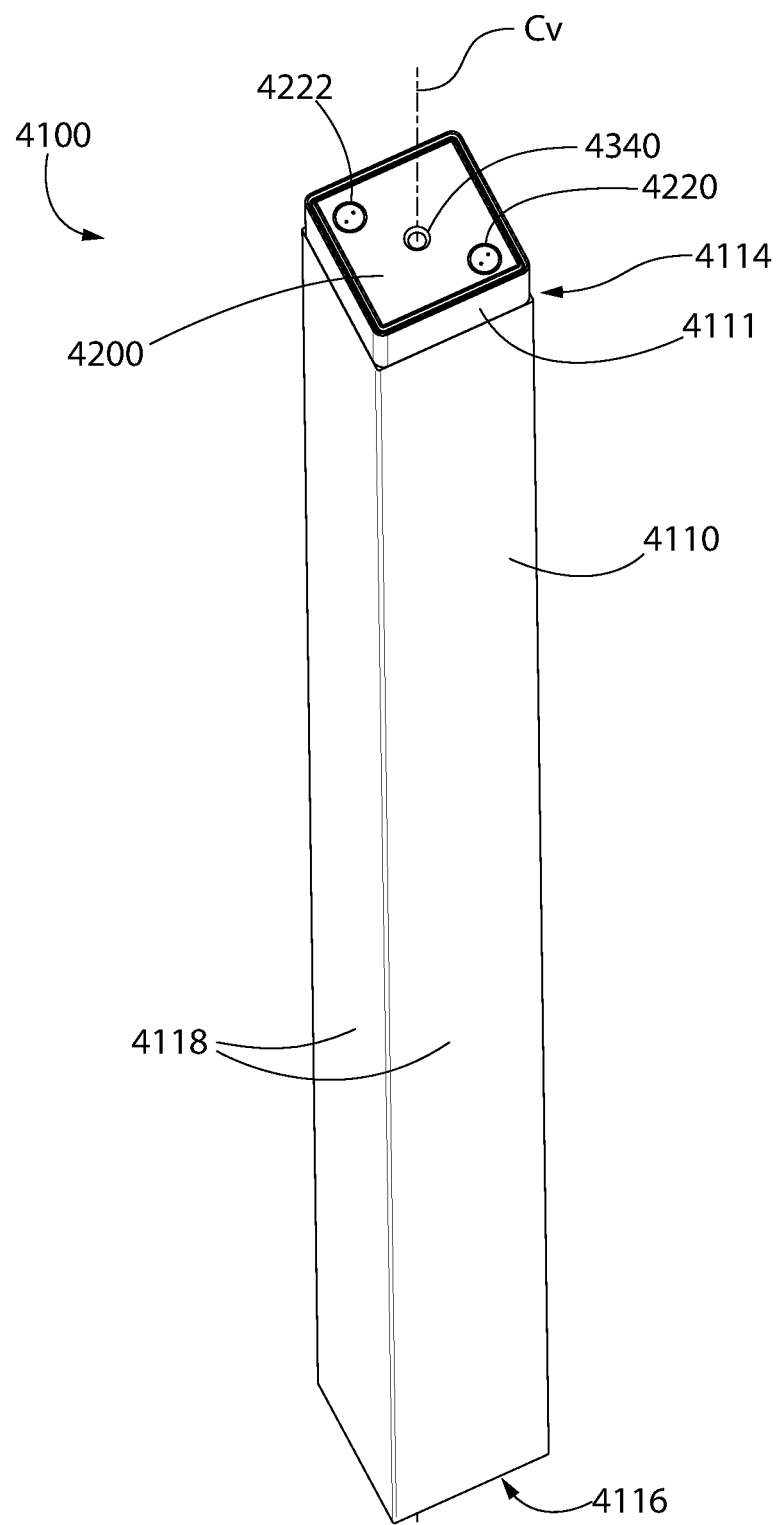
FIG. 32 is a perspective view of a fuel rod storage system comprising a capsule and sealable closure lid.
Figure 33:
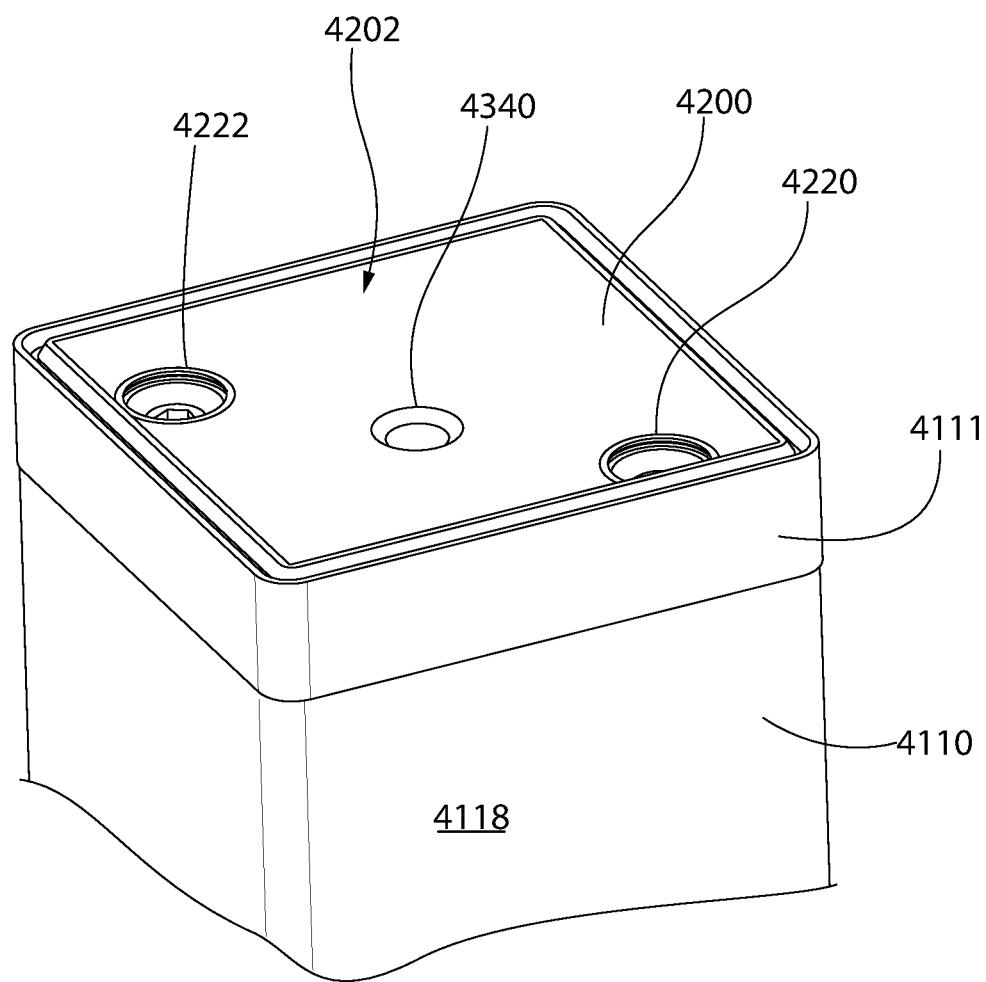
FIG. 33 is an enlarged view thereof showing the top end of the capsule and lid installed.
Figure 34:
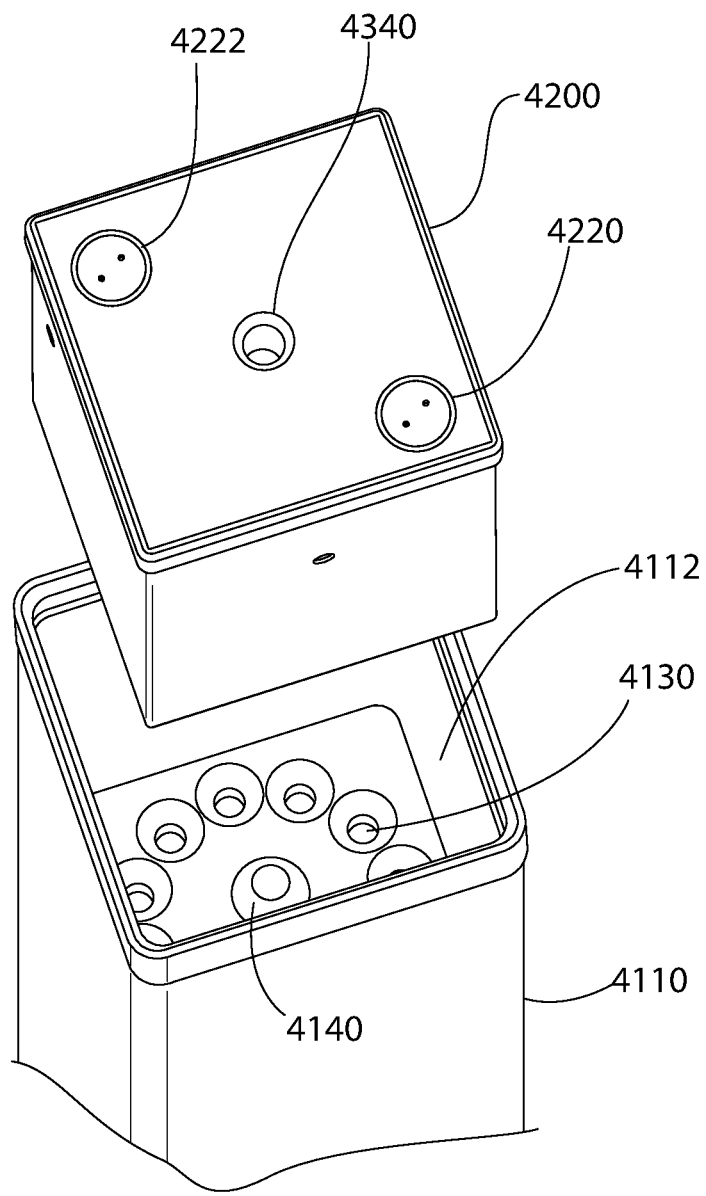
FIG. 34 is an enlarged view thereof showing the top end of the capsule and lid removed.
Figure 35:
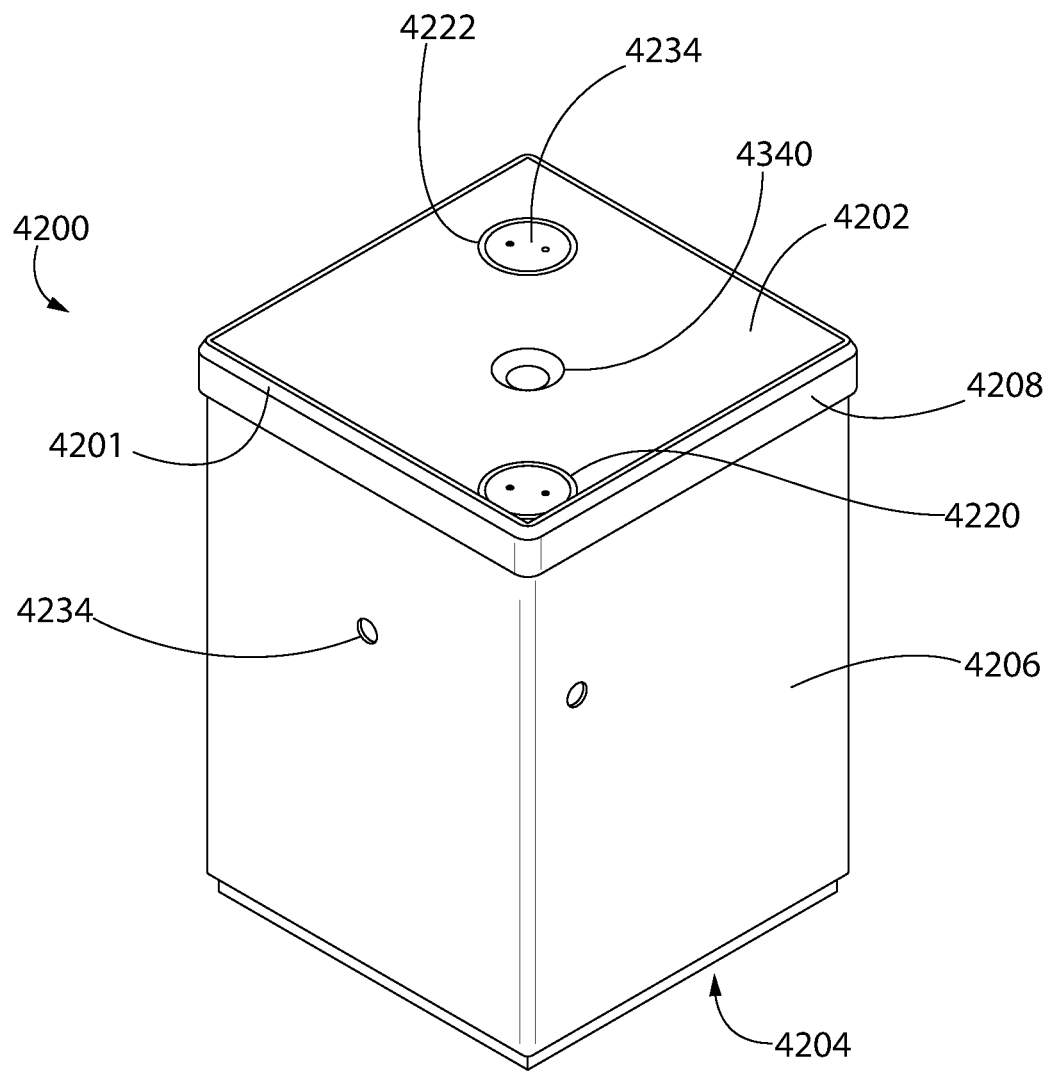
FIG. 35 is a top perspective view of the lid.

FIG. 31 shows profiles of an array of two storage racks and the associated bearing pads, of the type shown in FIGS. 30A-C, to which both the storage racks are coupled, with the profiles being shown in the horizontal plane of the base plates of the storage racks. The portion of the storage racks which include the respective arrays of cells are the storage rack profiles 3231. The collar profiles 3233 for each storage rack are larger than the storage rack profile 3231 for each respective storage rack. Similarly, the base plate profiles 3235 for each storage rack are larger than the respective collar profiles 3233. In this configuration, each base plate is coupled at the corners to one of four separate bearing pads, and the bearing pad profiles 3237 are shown in position with respect to the base plate profile 3235. In this configuration, even though the bearing pads are dimensionally smaller than the base plates, the smaller bearing pad profiles 3237 still extend outside of the base plate profiles 3235, and each bearing pad is also coupled to both storage racks.

As should be understood from the various embodiments of the bearing pad disclosed above, the bearing pad may couple to the entire support structure of a storage rack, or it may couple to only a portion of the support structure. For example, a bearing pad may be configured to couple to just the corners of the support structure, or one may be configured to couple along an entire side of the support structure, but not the support structure nearer the middle of the storage rack.

IV. Inventive Concept 4

With reference to FIGS. 32-49, a fourth inventive concept will be described.

Nuclear fuel assemblies (also referred to as "bundles" in the art) each comprise a plurality of fuel pins or rods mechanically coupled together in an array which is insertable as a unit into a reactor core. The fuel assemblies traditionally have a rectilinear cross-sectional configuration such as square array and contain multiple fuel rods. A reactor core contains multiple such fuel assemblies.

The fuel rods are generally cylindrical elongated metal tubular structures formed of materials such as zirconium alloy. The tubes hold a plurality of vertically-stacked cylindrical fuel pellets formed of sintered uranium dioxide. The fuel rod tubes have an external metal cladding formed of corrosion resistant material to prevent degradation of the tube and contamination of the reactor coolant water. The opposite ends of the fuel rod are sealed.

FIGS. 32-40B show a damaged nuclear fuel storage system 4100 according to the present disclosure. The system includes a vertically elongated fuel rod enclosure capsule 4110 configured to hold multiple damaged fuel rods and a closure lid 4200 mounted thereto. The lid 4200 is configured for coupling and permanent sealing to the capsule 4200, as further described herein.

Capsule 4110 has an elongated and substantially hollow body formed by a plurality of adjoining sidewalls 4118 defining an internal cavity 4112 that extends from a top end 4114 to a bottom end 4116 along a vertical centerline axis Cv. The bottom end 4116 of the capsule is closed by a wall. The top end 4114 of the capsule is open to allow insertion of the damaged rods therein. The sidewalls 4118 are sold in structure so that the cavity 4112 is only accessible through the open top end 4114 before the lid is secured on the capsule.

In one embodiment, capsule 4110 may have a rectilinear transverse cross-sectional shape such as square which conforms to the shape of a typical fuel assembly. This allows storage of the capsule 4110 in the same type of radiation-shielded canister or cask used to store multiple spent fuel assemblies, for example without limitation a multi-purpose canister (MPC) or HI-STAR cask such as those available from Holtec International of Marlton, NJ. Such canisters or casks have an internal basket with an array of rectilinear-shaped openings for holding square-shaped fuel assemblies. It will be appreciated however that other shaped capsules 4110 may be used in other embodiments and applications.

The body of the capsule 4110 may be formed of any suitable preferably corrosion resistant material for longevity and maintenance of structural integrity. In one non-limiting exemplary embodiment, the capsule 4110 may be made of stainless steel and have a nominal wall thickness of 6 mm.

Figure 43:
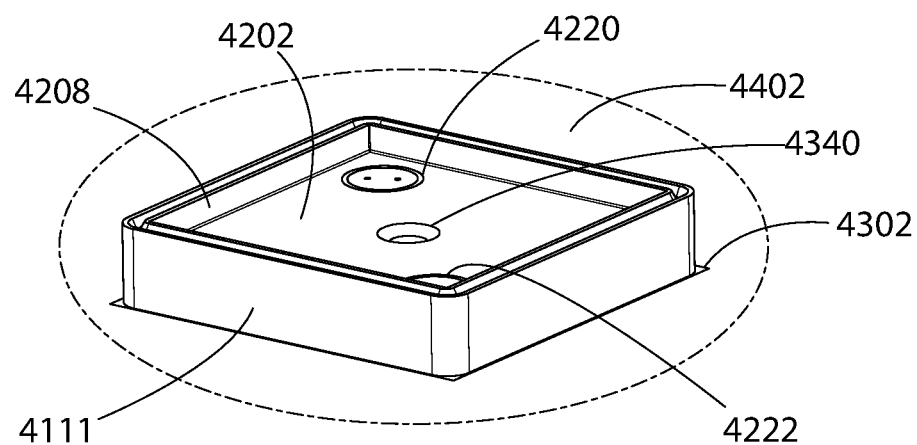
FIG. 43 is an enlarged perspective view of one of the capsules of FIG. 42.
Figure 44:
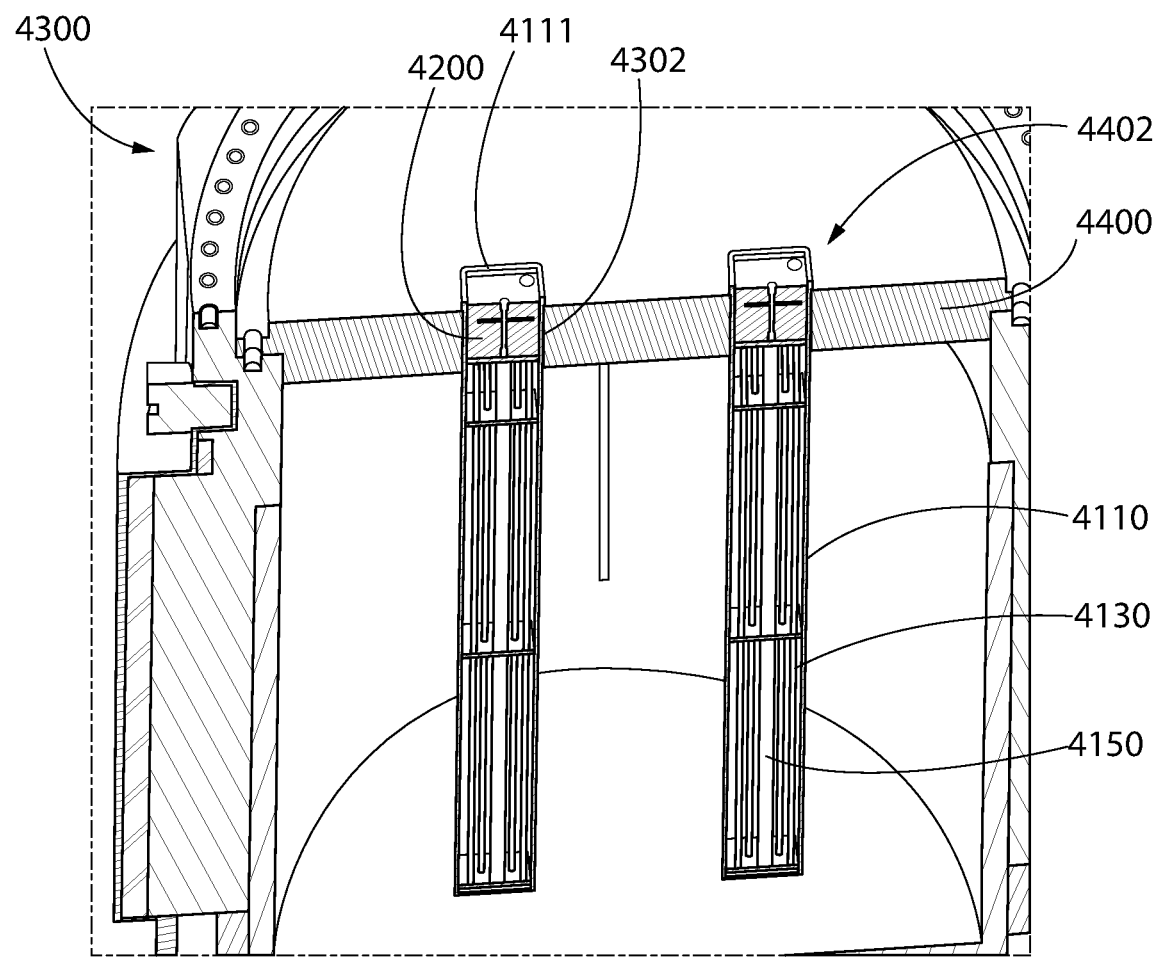
FIG. 44 is a cross-sectional perspective view of the transport cask of FIG. 42 showing the capsules.
Figure 45:
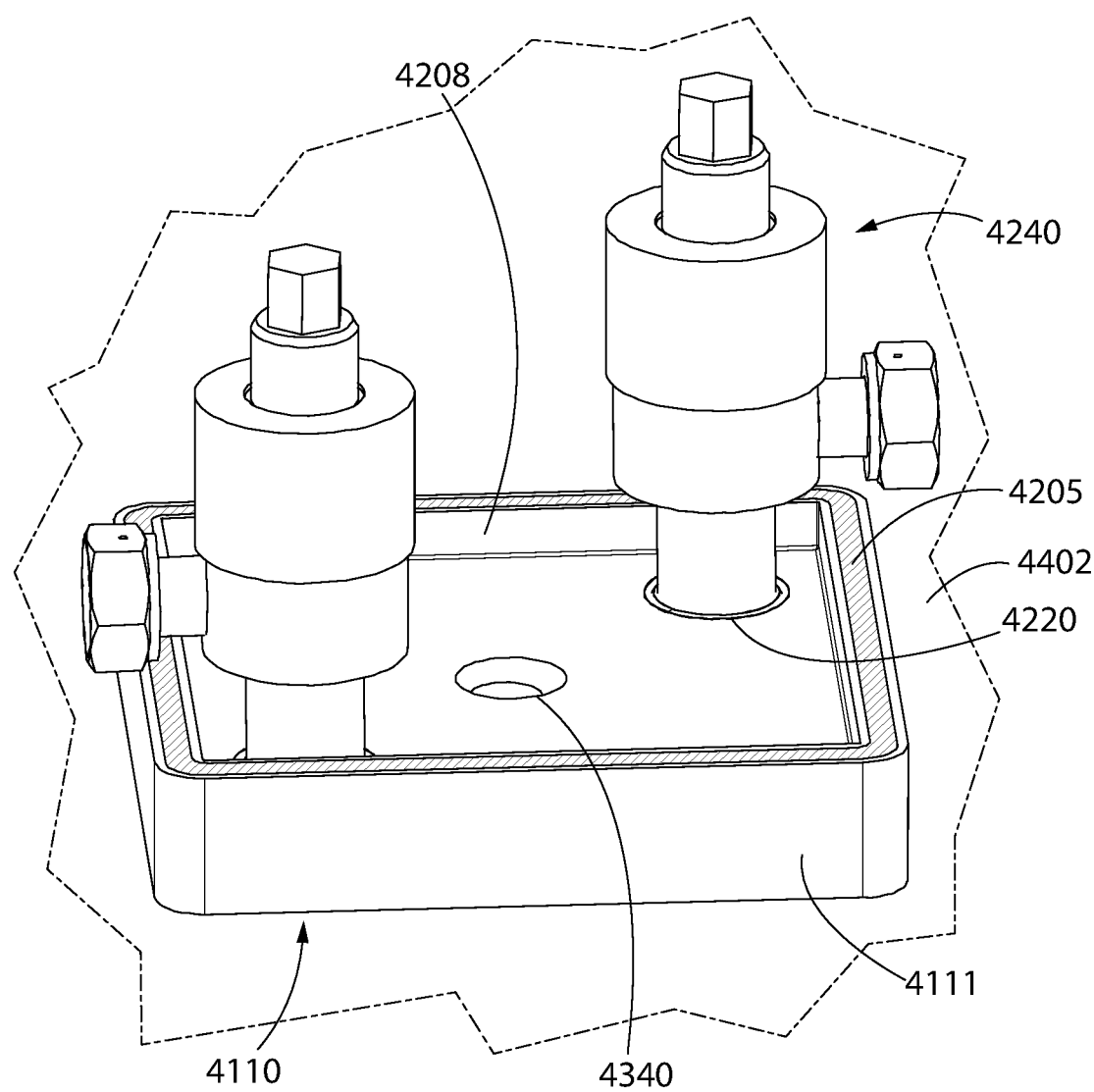
FIG. 45 is an enlarged view from FIG. 42 showing a pair of remote operated valve assemblies installed in the lid of the capsule for gas drying the interior of the capsule.

In certain embodiments, the capsule 4110 may further include a laterally enlarged mounting flange 4111 disposed at and adjacent to the top end 4114, as shown in FIGS. 32-34 and 7-9A. Mounting flange 4111 extends laterally outwards from the sidewalls 4118 on all sides and vertically downwards from top end 4114 along the sidewalls for a short distance. The mounting flange 4111 is configured and dimensioned to engage a mounting opening 4302 formed in a storage canister 4300, thereby supporting the entire weight of a loaded capsule 4110 in a vertically cantilevered manner as shown in FIGS. 43-45 and further describe herein. In other embodiments, different methods may be used to support the capsule 4110 in the storage canister and mounting flange 4111 may be omitted.

Referring now particularly to FIGS. 34, 38, 39 and 40A, the capsule 4110 further includes an internal basket assembly configured to store and support a plurality of damaged fuel rods. The assembly includes an upper tubesheet 4120 and lower tubesheet 4122 spaced vertically apart therefrom. The upper and lower tubesheets are horizontally oriented. The lower tubesheet 4122 is separated from the interior bottom surface 4116a of bottom end 4116 of the capsule 4110 by a vertical gap to form a bottom flow plenum 4124.

Figure 46:
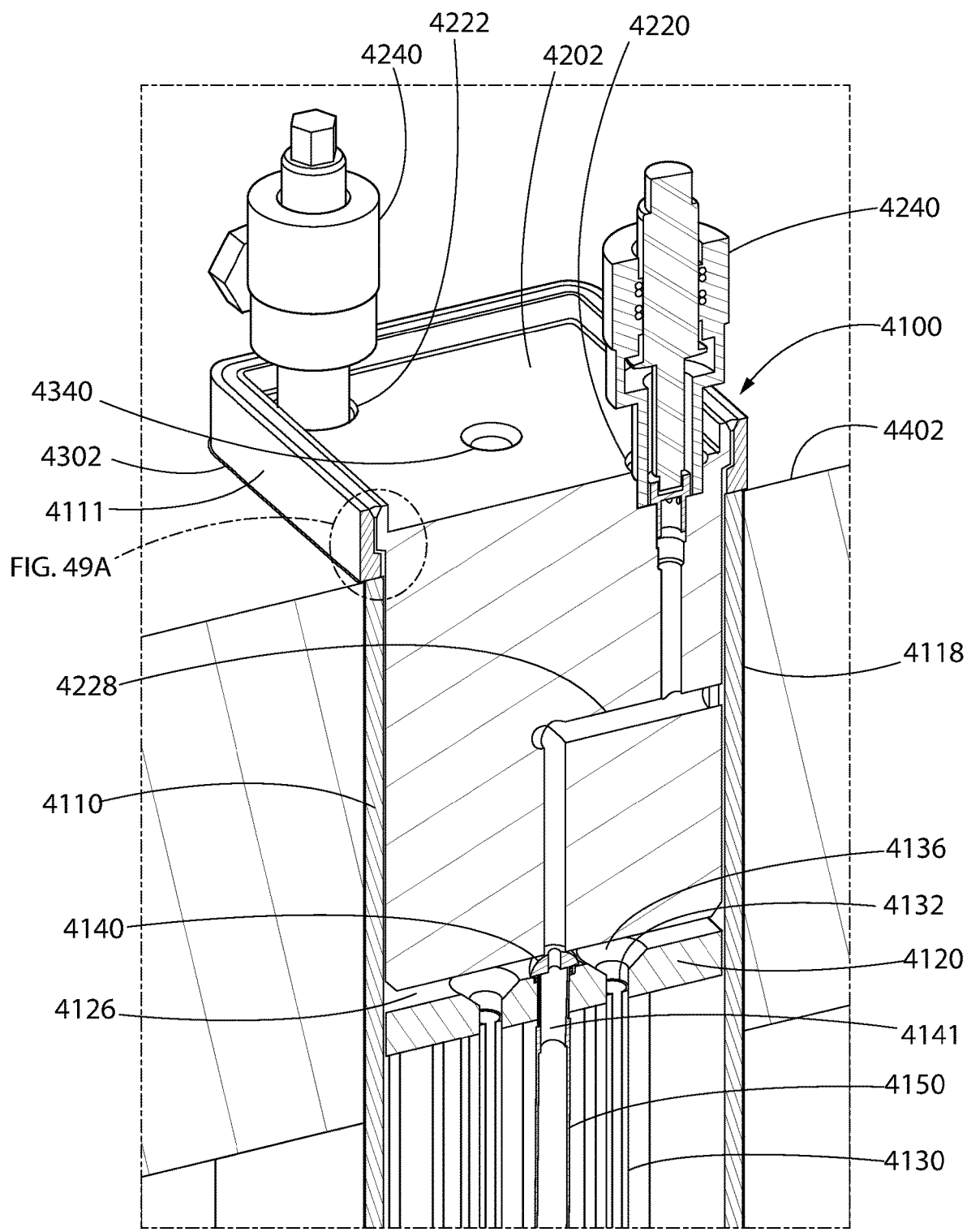
FIG. 46 is cross-sectional perspective view showing of FIGS. 42 and 45 showing one of the capsules mounted in the lid of the transport cask.

The upper tubesheet 4120 is spaced vertically downwards from the top end 4112 of the capsule 4110 by a distance D1 sufficient to form a top flow plenum 4126 when the closure lid 4200 is mounted on the capsule as shown in FIG. 46. Top plenum 4126 is therefore formed between the bottom 4204 of the lid 4200 and top surface 4128 of the upper tubesheet 4120. Both the bottom and top plenums 4124, 4126 are part of flow paths used in conjunction with the gas fuel rod drying/dehydration process after the capsule is closed and sealed, as further described herein.

A plurality of fuel rod storage tubes 4130 are each supported by the upper and lower tubesheets 4120, 4122 for holding the damaged (i.e. broken and/or leaking) fuel rods. In certain embodiments, intermediate supporting tubesheets or other support elements (not shown) may be used to provide supplementary support and lateral stability to the storage tubes 4130 for seismic events. In one embodiment, the storage tubes 4130 each have a diameter and internal cavity 4131 with a transverse cross section configured and dimensioned to hold no more than a single fuel rod. Accordingly, the tubes 4130 extend vertically along and parallel to the vertical centerline axis Cv of the capsule 4110 from the upper tubesheet 4120 to the lower tubesheet 4122. Each of the tubes 4130 is accessible through the upper tubesheet 4120 (see, e.g. FIG. 40A). In one embodiment, the tubes 4130 each have an associated machined lead-in guide in the upper tubesheet 4120 to support the insertion of the fuel rods. An annular tapered or chamfered entrance 4136 is therefore formed in the upper tubesheet 4120 adjacent and proximate to the top open end 4132 of each tube 4130. The obliquely angled surface (with respect to the vertical centerline axis Cv) of the chamfered entranceways 4136 help center and guide loading of the damaged fuel rods into each of the storage tubes 4130. The top end 4132 of the tubes may therefore be spaced slightly below the top surface 4128 of the upper tubesheet 4120 as shown.

The bottom ends 4134 of the fuel rod storage tubes 4130 may rest on the bottom interior surface 4116a of the capsule 4110. Each storage tube 4130 includes one or more flow openings 4133 of any suitable shape located proximate to the bottom ends 4134 of the tubes below the bottom tubesheet 4122. The openings 4133 allow gas to enter the tubes from the bottom plenum 4124 during the forced gas dehydration process and rise upward through the tubes to dry the damaged fuel rods.

The fuel rod storage tubes 4130 may be mounted in the upper and lower tubesheets 4120, 4122 by any suitable method. In certain embodiments, the tubes 4130 may be rigidly coupled to upper and/or lower tubesheets 4120, 4122 such as by welding, soldering, explosive tube expansion techniques, etc. In other embodiments, the tubes 4130 may be movably coupled to the upper and/or lower tubesheets to allow for thermal expansion when heated by waste heat generated from the decaying fuel rods and heated forced gas dehydration. Accordingly, a number of possible rigid and non-rigid tube mounting scenarios as possible and the invention is not limited by any particular one.

The fuel rod storage tubes 4130 may be arranged in any suitable pattern so long as the fuel rods may be readily inserted into each tube within the fuel pool. In the non-limiting exemplary embodiment shown, the tubes 4130 are circumferentially spaced apart and arranged in a circular array around a central drain tube 4150 further described below. Other arrangements and patterns may be used.

Referring now to FIGS. 38, 39, 40A, 40B, and 15, the central drain tube 4150 of the capsule 4110 may be mounted at approximately the geometric center of the upper tubesheet 4120 as shown. The center drain tube 4150 in one arrangement is supported by and extends vertically parallel to and coaxially with centerline axis Cv of the capsule from the upper tubesheet 4120 to the bottom tubesheet 4122. The drain tube 4150 may be rigidly coupled to the tubesheets 4120, 4122 using the same techniques described herein for the fuel rod storage tubes. Drain tube 4150 is a hollow structure forming a pathway for introducing insert drying gas into the tube assembly to dry the interior of capsule 4110 following closure and sealing, as further described herein.

The drain tube 4150 includes an open top end 4151 and an open bottom end 4152. The top end functions as a gas inlet and the bottom end functions as a gas outlet, with respect to the dehydration gas flow path further described herein. The bottom end 4152 is open into and may extend slightly below the bottom surface of the lower tubesheet 4122 to place the drain tube in fluid communication with the bottom plenum 4124 of the capsule 4110, as shown for example in FIGS. 40A-B. This forms a fluid pathway for introducing drying gas into the bottom of the capsule 4110. The outlet end 4152 of the drain tube 4150 is spaced vertically apart from the interior bottom surface 4116a of the capsule 4110.

Drain tube 4150 may include a sealing feature configured to form a substantially gas-tight seal between the closure lid 4200 and drain tube for forced gas dehydration process. In one embodiment, the sealing feature may be a spring-biased sealing assembly 4140 configured to engage and form a seal with the bottom of the closure lid 4200 for gas drying. The sealing assembly 4140 includes a short inlet tube 4141, an enlarged resilient sealing member 4142 disposed on top of the inlet tube, and spring 4143. Inlet tube 4141 has a length less than the length of the drain tube 4150. Spring 4143 may be a helical compression spring in one embodiment having a top end engaging the underside 4142b of the sealing member 4142 which extends laterally (i.e. transverse to vertical centerline axis Cv) and diametrically beyond the inlet tube 4141, and a bottom end engaging the top surface 4128 of the upper tubesheet 4120. The inlet tube 4141 is rigidly coupled to the sealing member 4142 and has a diameter slightly smaller than the drain tube 4150. This allows the lower portion of the inlet tube 4141 to be inserted into the upper portion of the drain tube 4150 through the top inlet end 4151 for upward/downward movement in relation to the drain tube. Spring 4143 operates to bias the sealing member 4142 and inlet tube 4141 assembly into an upward projected inactive position away from the upper tubesheet 4120 ready to engage the closure lid 4200, as further described herein. Accordingly, the sealing assembly 4140 is axially movable along the vertical centerline axis from the upward projected inactive position to a downward active sealing position.

Figure 40A:
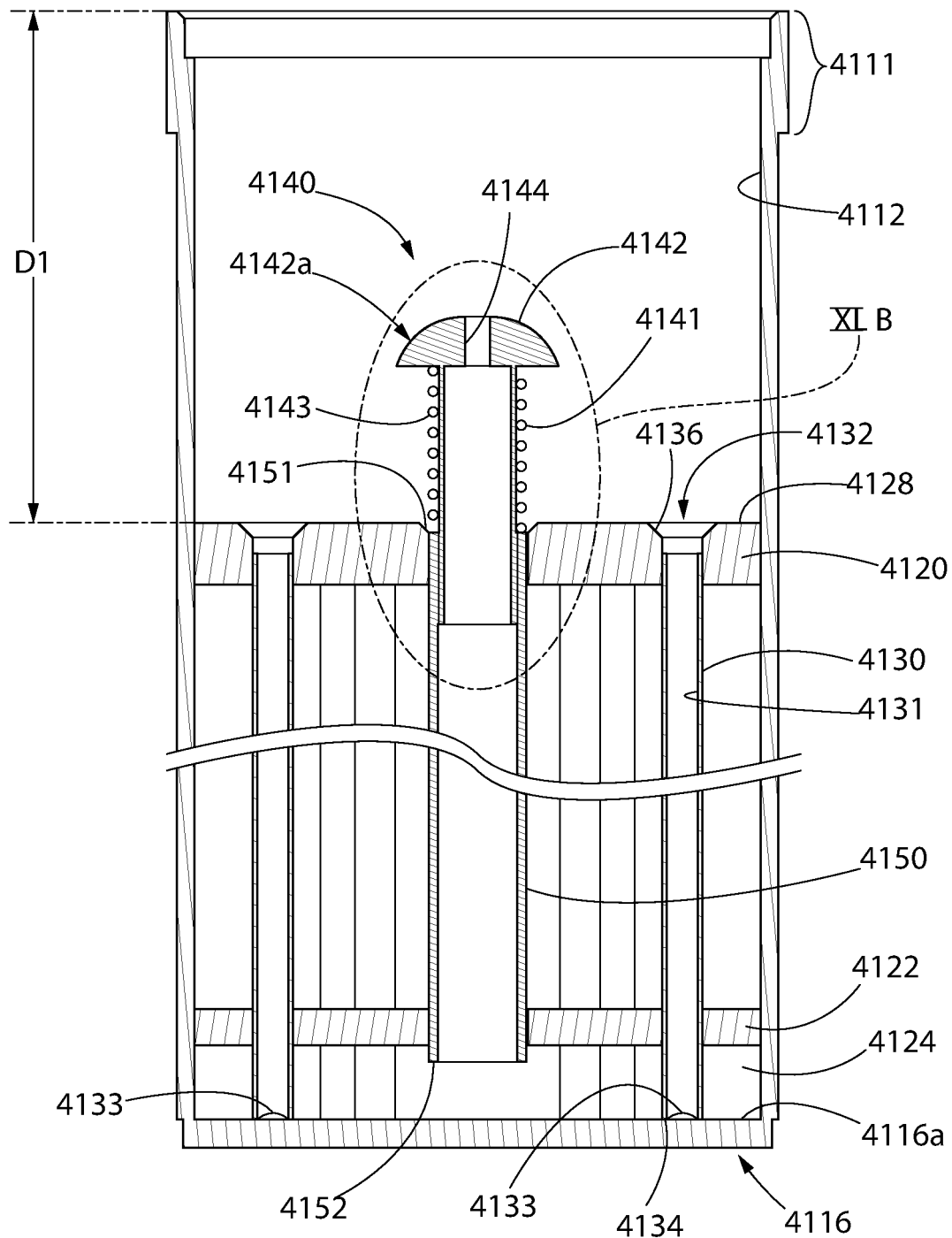
FIG. 40A is a side elevation cross-sectional view thereof.
Figure 40B:
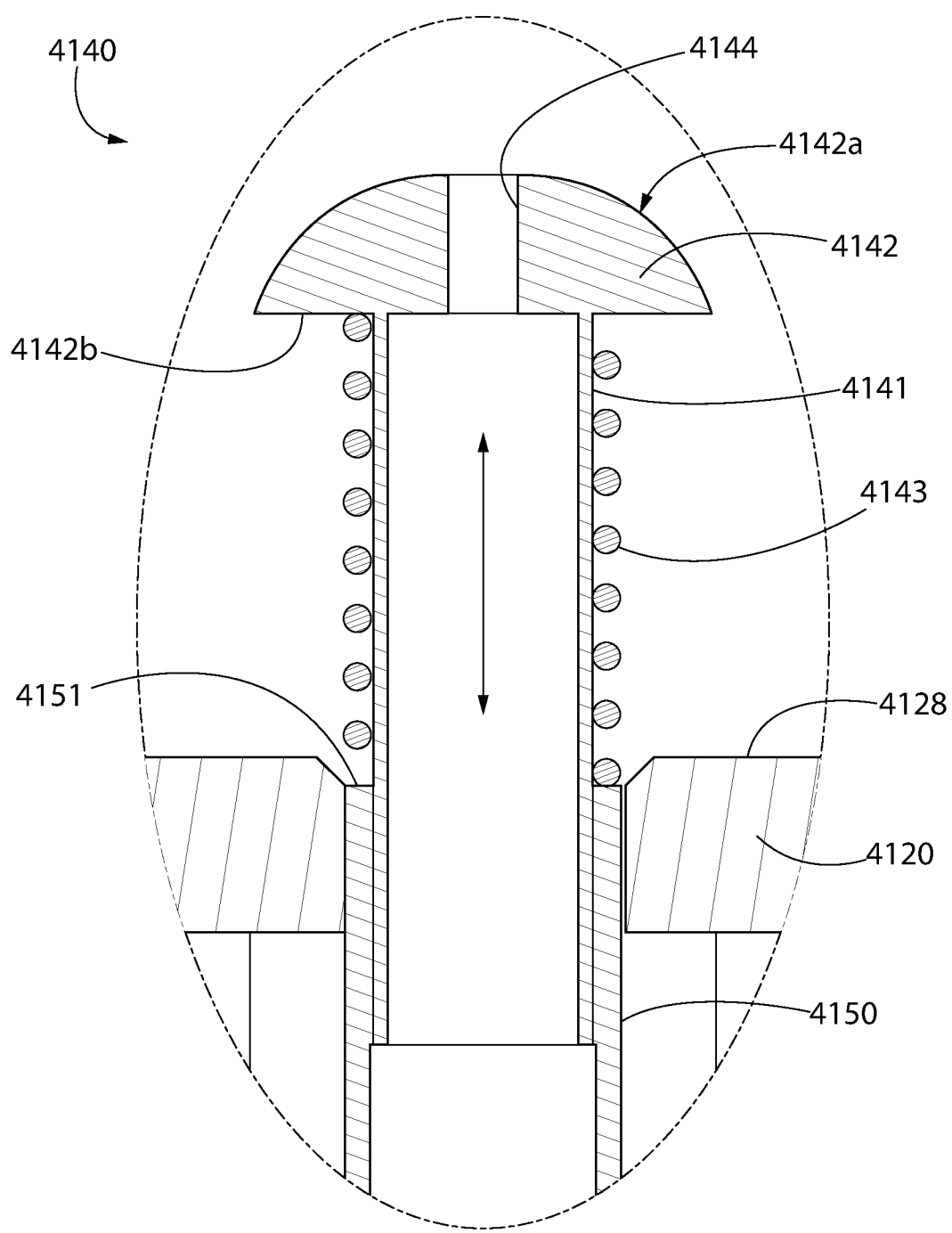
FIG. 40B is an enlarged detail taken from FIG. 40A.

In one embodiment, the sealing member 4142 may have a circular shape in top plan view and a convexly curved or domed sealing surface 4142a in side transverse cross-sectional view (see, e.g. FIGS. 40A and 40B). The curved sealing surface 4142a ensures positive sealing engagement with a gas supply outlet extension tube 4210 in the capsule closure lid 4200 (see FIG. 37) to compensate for irregularities in the extension tube end surface edges and less than exact centering of the extension tube with respect to the sealing member 4142, thereby preventing substantial leakage of drying gas when coupled together. The sealing member 4142 includes a vertically oriented through-hole 4144 to form a fluid pathway through the sealing member to the drain tube 4150.

In one embodiment, the sealing member 4142 may be made of a resiliently deformable elastomeric material suitable for the environment of a radioactive damaged fuel rod storage capsule. The elastomeric seal provides sufficient sealing and a leak-resistant interface between the central drain tube 4150 and closure lid 4200 to allow the inert drying gas (e.g. helium, nitrogen, etc.) to be pumped down the central drain tube to the bottom of the capsule 4110 during the forced gas dehydration process.

It will be appreciated that other types of seals and arrangements may be used. Accordingly, in some embodiments metal or composite metal-elastomeric sealing members may be used. The sealing member may also have other configurations or shapes instead of convexly domed, such as a disk shaped with a flat top surface or other shape. In other embodiments, a non-spring activated sealing assembly may be used. Accordingly, the invention is not limited by the material of construction or design of the seal and sealing assembly so long as a relatively gas-tight seal may be formed between the closure lid gas outlet extension tube 4210 and the drain tube 4150 for forced gas dehydration of the capsule 4110.

The fuel rod basket assembly, including the foregoing tubesheets, rod storage tubes, central drain tube, and sealing assembly may be made of any suitable preferably corrosion resistant material such as stainless steel. Other appropriate materials may be used.

The closure lid 4200 will now be further described.

Referring to FIGS. 32-37 and 46, lid 4200 in one embodiment may have a generally rectilinear cube-shaped body to complement the shape of cavity 4112 in capsule 4110 in which at least a portion of the lid is received. Accordingly, in one embodiment the lid 4200 and capsule 4110 may have a square shape in top plan view. Lid 4200 further has a substantially solid internal structure except for the gas flow conduits formed therein, as further described below. The lid 4200 is formed of a preferably corrosion resistant metal, such as stainless steel. Other materials may be used.

Lid 4200 includes a top surface 4202, bottom surface 4204, and lateral sides 4206 extending between the top and bottom surfaces. The lateral sides 4206 of the lid have a width sized to permit insertion of a majority of the height of the lid into the cavity 4112 of the capsule. The bottom of the lid 4200 includes a peripheral skirt 4212 extending around the perimeter of the bottom surface 4204 that engages and rests on the top surface 4128 of the upper tubesheet 4120 of the capsule 4110 when the lid is mounted in the capsule. In one embodiment, the skirt 4212 is continuous in structure and extends around the entire perimeter without interruption. The skirt 4212 projects downward for a distance from the bottom surface 4204 of the lid which is recessed above the bottom edge 4212a of the skirt. The forms a downwardly open space 4211 having a depth commensurate with the height of the skirt 4212. When the bottom edge 4212a of skirt 4212 rests on top surface 4128 of the upper tubesheet 4120, the top plenum 4126 is formed between the bottom surface 4204 of lid 4200 and the upper tubesheet inside and within the skirt 4212. The bottom edge 4212a of the skirt 4212 thereby forms a seal between the upper tubesheet 4120 and lid 4200 for forced gas dehydration of the capsule 4110.

An enlarged seating flange 4208 extends around the entire perimeter of the lid 4200 adjacent to top surface 4202 and projects laterally beyond the sides 4206. The top surface 4202 may be recessed below the top edge 4208a of the seating flange 4208 as shown. A stepped shoulder 4213 is formed between seating flange 4208 and sides 4206 which engages and seats on a mating shoulder 4113 formed inside the mounting flange 4111 of capsule 4110 in cavity 4112 (see particularly FIG. 46A). Both mating shoulders 4213 and 4113 extend around the entire perimeter regions of the lid 4200 and capsule 4110 respectively and limit the insertion depth of the lid into the capsule.

Figure 41A:
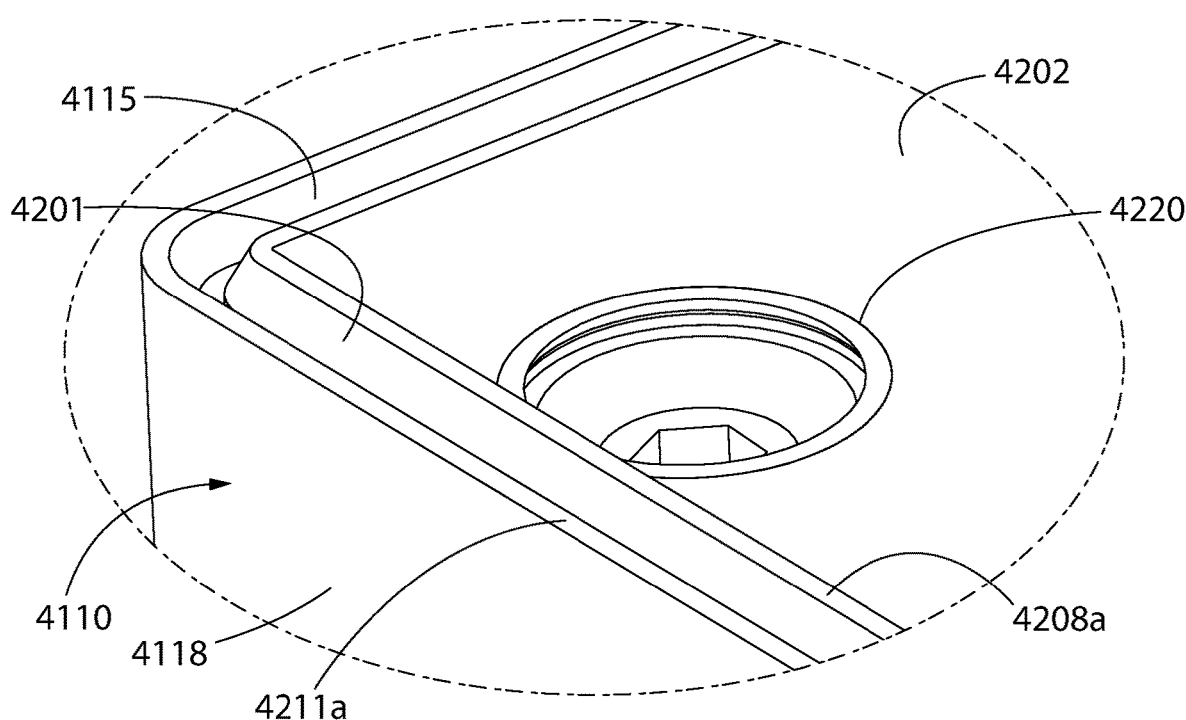
FIG. 41A is a detailed view of a top corner of the capsule showing the lid in place but not sealed and coupled to the capsule.
Figure 41B:
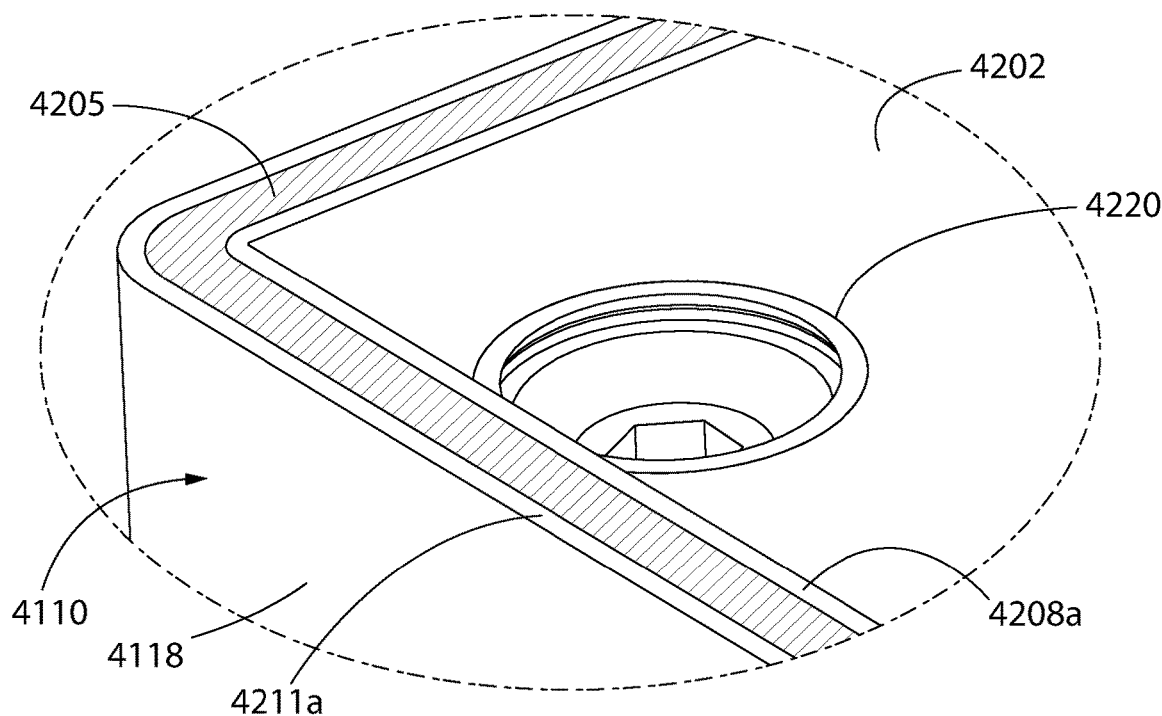
FIG. 41B is a view thereof showing the formation of a seal weld to couple to the lid to the capsule.
Figure 42:
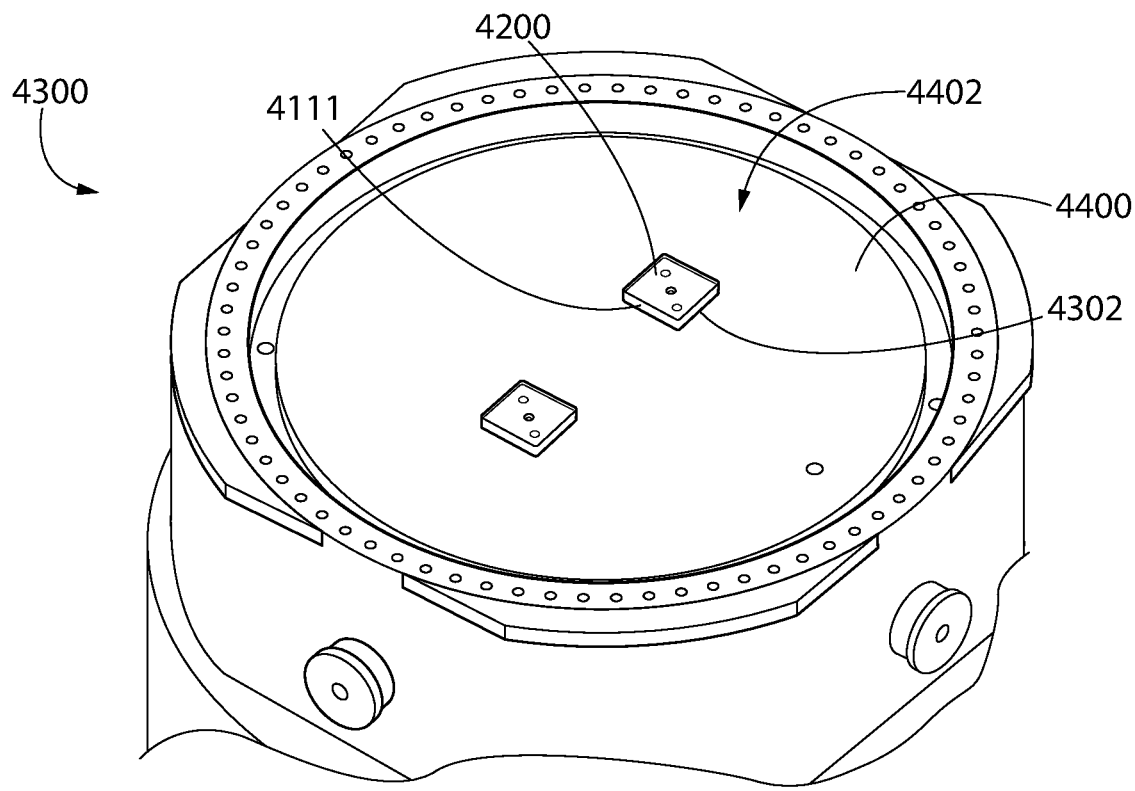
FIG. 42 is top perspective view of a lid of a transport cask with two fuel rod storage capsules mounted therein.
Figure 46A:
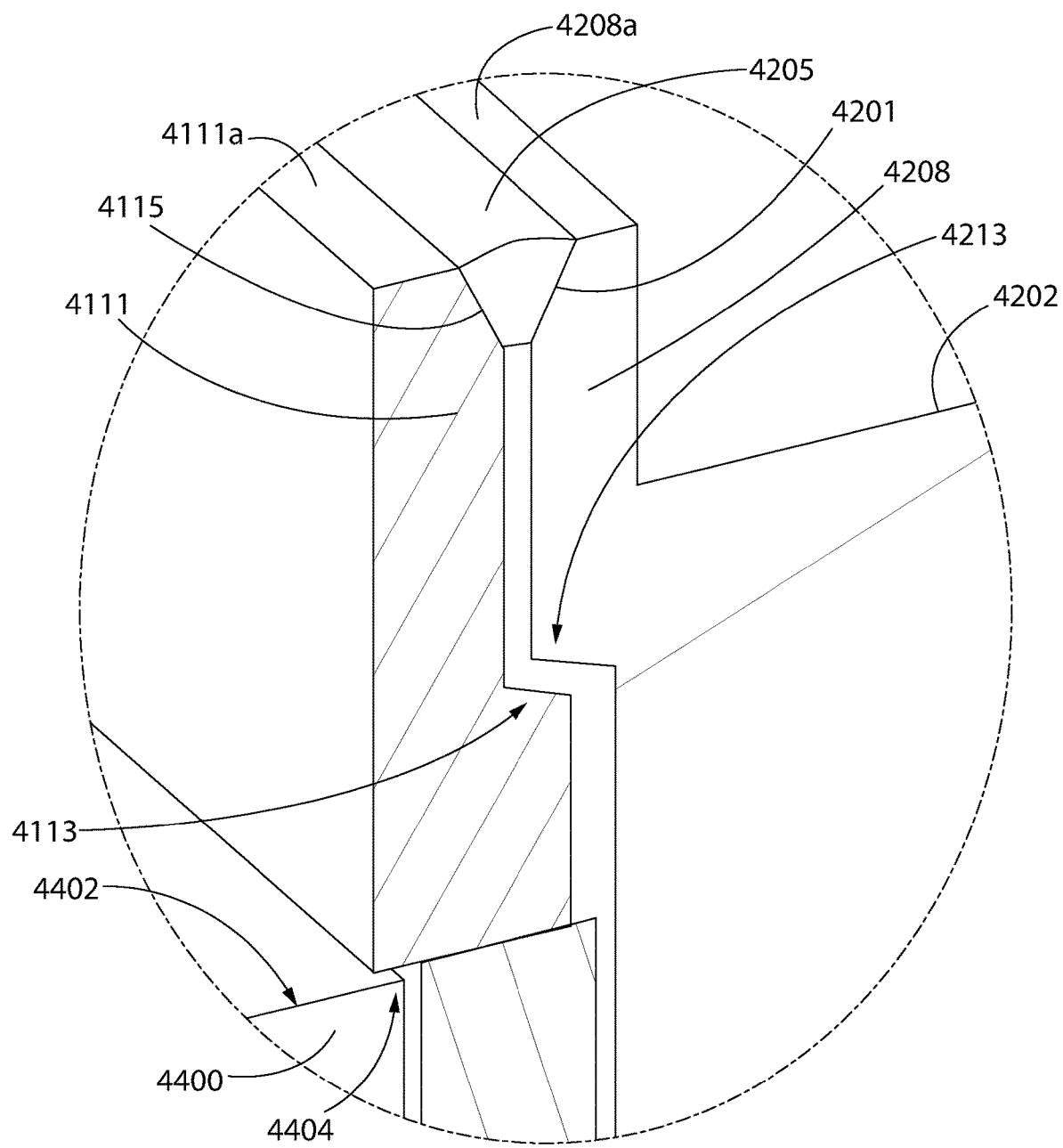
FIG. 46A is an enlarged view from FIG. 46 showing the mounting and weld detail coupling the lid to the top end of the capsule.

In one embodiment, the top edges 4111a and 4208a of the mounting flange 4111 and seating flange 4208 respectively are flush with each other and lie in approximately the same horizontal plane when the closure lid 4200 is fully mounted in the capsule 4110 (see, e.g. FIGS. 41A, 41B, and 46A). This facilitates formation of an open V-groove weld 4205 to hermetically seal the lid to the capsule. The mounting and seating flanges 4111, 4208 each include opposing beveled faces 4115, 4208 respectively to form the V-groove. Because of the recessed top surface 4202 of the lid 4200 and mounting flange 4111, access is available to both sides of finished weld which advantageously permits full volumetric inspection of the weld such as by ultrasonic non-destructive testing or other methods. The source and detector of the ultrasonic test (UT) equipment may therefore be placed on opposite sides of the weld for full examination. A multi-pass welding process may be used which prevents any potential through-cracking of a single weld line in the case of an undetected defect. This parallels welding processes used in the United States for Multi-Purpose Canisters (MPCs), but is modified to allow volumetric weld examination (a key consideration for acceptance of weld integrity by some international regulators). Each pass is followed by a Liquid Penetrant Test (LPT) to identify defects in the weld layer as the weld is formed. The finished weld is then volumetrically tested using UT. Unlike a bolted joint sealed with gaskets, a welded joint with volumetric inspection typically does not require leak-monitoring or checks prior to future transport. FIGS. 41A and 41B show the lid 4200 and capsule 4110 before and after welding, respectively. This does not limit the capsule to having a bolted lid, similar to dual-purpose metal casks used for storage and transport of spent nuclear fuel. In such embodiment, the capsule would have one more seals, for example elastomeric or metallic, that would be compressed during tightening of the lid bolts on the capsule, forming a hermetic seal.

According to another aspect of the invention, the closure lid 4200 is configured to permit forced gas dehydration of the capsule 4110 and plurality of damaged fuel rods contained therein after the lid is seal welded to the capsule. Accordingly, the lid 4200 includes a combination of gas ports and internal fluid conduits to form a closed flow loop through capsule 4110. Referring now to FIGS. 32-37 and 46, lid 4200 includes a gas supply port 4220 and gas return port 4222 formed in the top surface 4202 of the lid, and a gas supply outlet 4224 and gas return inlet 4226 formed in the bottom surface 4204 of the lid. In one configuration, the gas supply outlet 4224 and return inlet 4226 may be located at diagonally opposite corner regions of the top surface 4202 of the lid 4200 proximate to the lateral sides 4206. The gas supply port 4220 is fluidly coupled to the gas supply outlet 4224 via an internal flow conduit 4228. The gas return port 4222 is fluidly coupled to the gas return inlet 4226 via another separate internal flow conduit 4230 which is fluidly isolated from flow conduit 4228.

Figure 36:
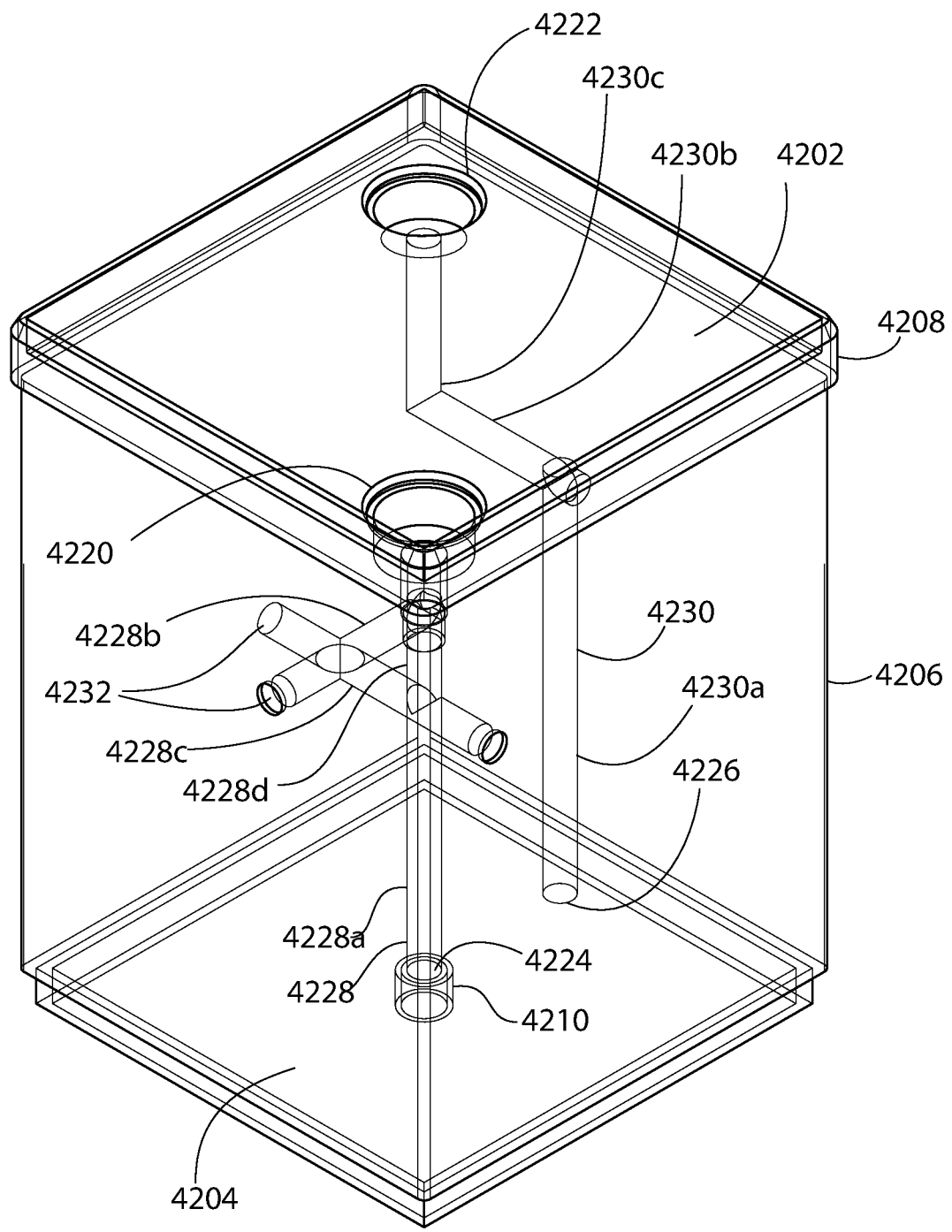
FIG. 36 is a perspective view thereof showing internal flow conduits formed in the lid.
Figure 37:
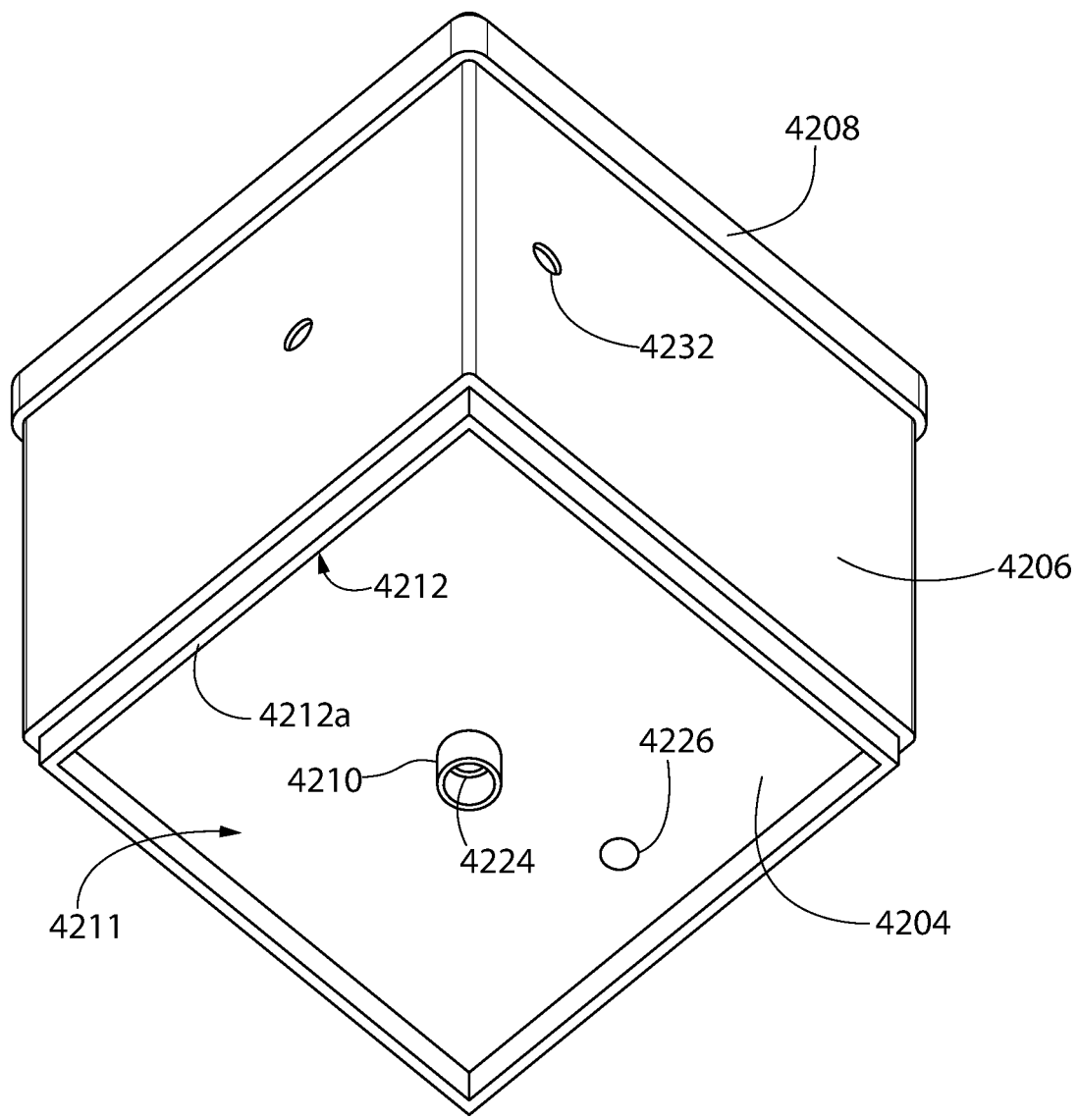
FIG. 37 is a bottom perspective view of the lid.
Figure 38:
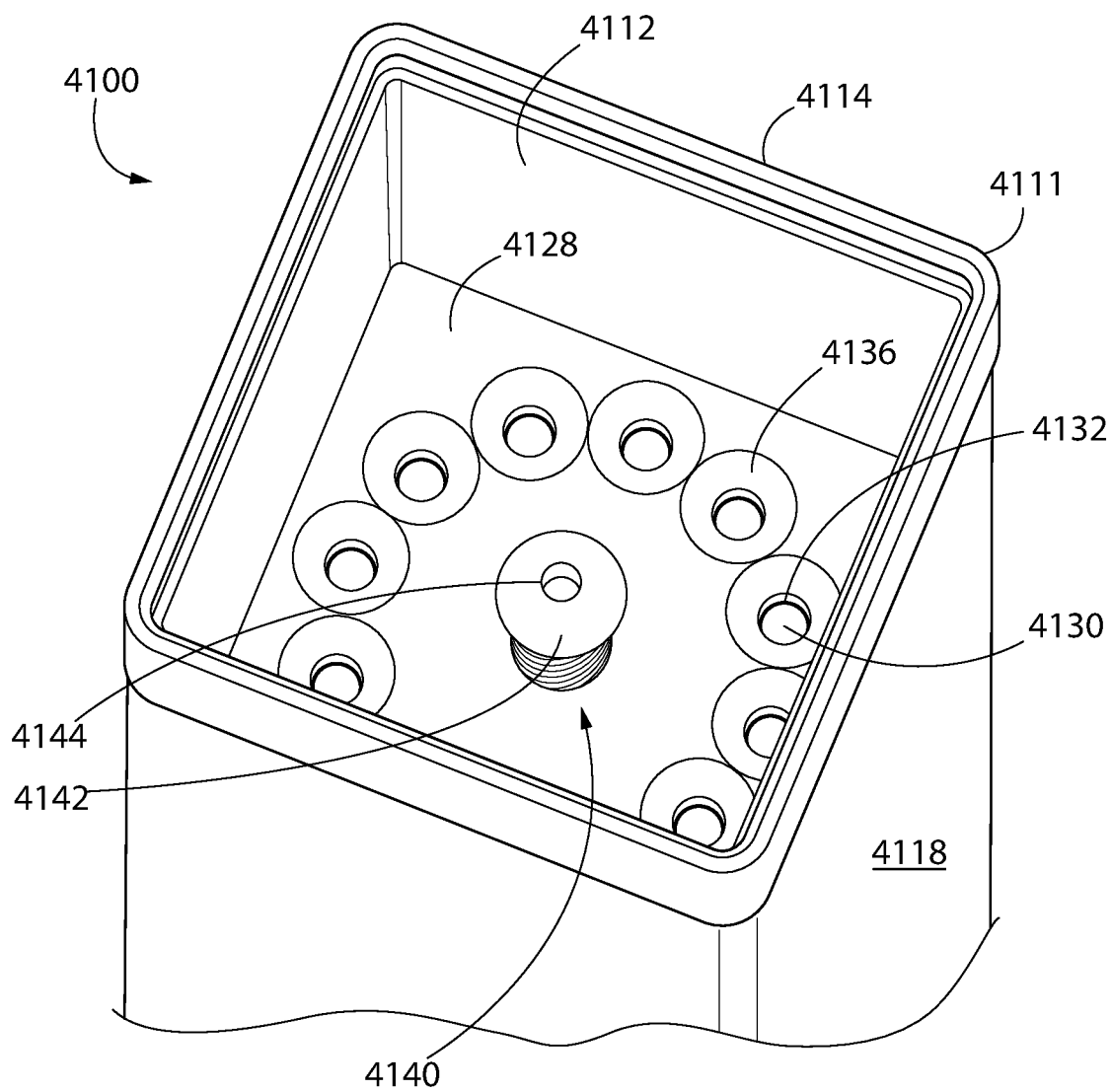
FIG. 38 is a top perspective view showing the inside of the capsule with lid removed, fuel rod storage tubes, and a central drain tube with sealing assembly.
Figure 39:
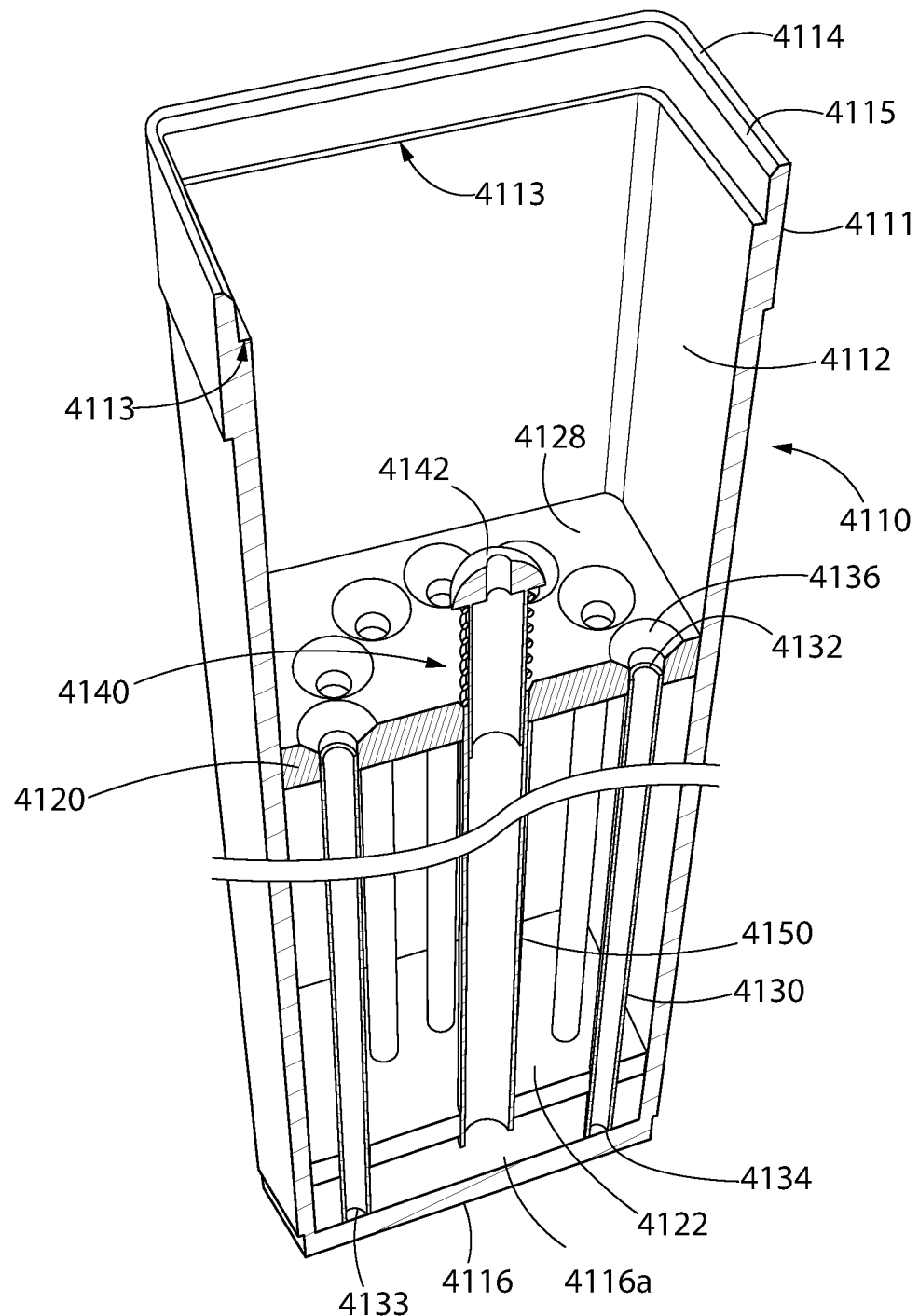
FIG. 39 is a cross-sectional perspective view of the capsule showing the internals.

In one embodiment, the flow conduits 4228, 4230 each follow a torturous multi-directional path through the lid to prevent neutron streaming. In one configuration, flow conduit 4228 includes a vertical section 4222a connected to gas supply outlet 4224, first horizontal section 4228b connected thereto, second horizontal section 4228c connected thereto, and second vertical section 4228d connected thereto and gas supply port 4220. The flow conduit sections 4228*a-d* may be arranged in a rectilinear pattern. Flow conduit 4228 includes a vertical section 4230*a* connected to gas return port 4222, horizontal section 4230*b* connected thereto, and second vertical section 4230*c* connected thereto and gas return inlet 4226. The flow conduit sections 4230*a-c* may also be arranged in a rectilinear pattern. Because the lid 4200 has a solid internal structure, the flow conduits may be formed by drilling or boring holes through the lateral sides 4206 and top and bottom surfaces 4202, 4204 of the lid to points of intersection between the conduits as best shown in FIGS. 36 and 46. After formation of the flow conduits, the penetrations 4232 in the lateral sides 4206 of the lid may be closed using threaded and/or seal welded metal caps applied before mounting and welding the lid 4200 to the capsule 4110. The penetrations 4232 in the bottom surface 4204 of the lid may remain open. The gas supply and return port penetrations 4232 in the top surface 4202 of the lid may be threaded and closed using threaded caps 4234 to permit removal and installation of remote valve operating assemblies 4240 (RVOAs) for forced gas dehydration of the capsule, as shown in FIGS. 45 and 46.

It should be noted that the gas supply outlet 4224 in lid 4200 is fluidly coupled to the gas supply outlet extension tube 4210. The extension tube 4210 compensates for the height of the lid bottom skirt 4212 to allow physical coupling of the tube to the sealing assembly 4140 when the skirt rests on the top surface 4128 of the upper tubesheet 4120. In one embodiment, the extension tube 4210 and gas supply outlet 4224 are centered on the bottom surface 4204 of the lid 4200. In certain other embodiments, the extension tube may be omitted and the gas supply outlet 4224 penetration may be directly coupled to the sealing assembly 4140.

A method for storing and drying fuel rods using capsule 4110 will now be briefly described. The method may be used for storing intact or damaged fuel rods, either of which may be stored in capsule 4110.

The process begins with the top of the capsule 4110 being open so that the storage tubes 4130 are accessible for loading. The loading operation involves inserting the fuel rods into the storage tubes 4130. After the capsule is fully loaded, the lid 4200 is attached to the top end 4114 and sealed to the capsule. In one preferred embodiment, the lid is sealed welded to the capsule as described elsewhere herein to form a gas tight seal After lid 4200 is seal welded to the capsule 4110, the interior of the capsule and fuel rods therein may be dried using heated forced gas dehydration (FGD) system such as those available from Holtec International of Marlton, New Jersey. Commonly owned U.S. Pat. Nos. 7,096,600, 7,210,247, 8,067,659, 8,266,823, and 7,707,741, which are all incorporated herein by reference in their entireties, describe such systems and processes as noted above.

The remote operated valve assemblies 4240 are first installed in the gas supply and gas return ports 4220, 4222. The valves are then connected to the gas supply and return lines from the FGD system. The next steps, described in further detail herein, include pumping the inert drying gas from the FGD system or source through the gas supply conduit into the cavity 4112 of the capsule 4110 and into the bottom plenum 4124, flowing the gas through each of the storage tubes 4130 to dry the fuel rods, collecting the gas leaving the storage tubes in the top plenum 4126, and flowing the gas through the gas return conduit back to the FGD source. The process continues for a period of time until analysis of the drying gas shows an acceptable level of moisture removal from the capsule 4110.

Referring now to FIGS. 36, 40A, 45, and 46, threaded caps 4234 may first be removed from the gas supply and return ports 4220 and 4222 in the lid 4200 which is welded to the capsule 4110. A remote valve operating assembly 4240 is then threadably coupled to each port 4220, 4222. The gas supply and return lines from the FGD skid which holds the dehydration system equipment are then fluidly coupled to the valve assemblies. The dehydration and drying process is now ready to commence by pumping the inert and heat drying gas from the FGD system through the capsule 4110 to dry the fuel rods in the storage tubes 4130, as further described herein.

Gas supplied from the FGD system first flows through the first valve assembly 4240 into the lid 4200 through the gas supply port 4220. The supply gas then flows through flow conduit 4228 to the gas supply outlet 4224 and then into gas supply outlet extension tube 4210. The supply gas enters the sealing assembly 4140 and flows downwards through the central drain tube 4150 into the bottom plenum 4124 of the capsule 4110. The gas in the bottom plenum enters the bottom of the fuel rod storage tubes 4120 through openings 4133 formed in and proximate to the bottom ends 4134 of the tubes. The gas flows and rises upwards through each of the storage tubes 4120 to dry the damaged fuel rods stored therein. The gas then enters the top plenum 4126 above the upper tubesheet 4120 beneath the lid 4200. From here, the gas leaves the top plenum and enters the gas return inlet 4226 in the lid. The gas flows through flow conduit 4230 to the gas return port 4222 and into the remote valve operating assembly 4240 connected thereto. The return gas then flows through the return line back to the FGD system skid to complete the closed flow loop.

Advantageously, the present invention allows drying of multiple damaged fuel rods in the capsule 4110 simultaneously instead of on an individual, piece-meal basis. This saves time, money, and operator dosage of radiation.

According to another aspect of the invention, the lid 4200 includes a threaded lifting port 4340 configured for temporary coupling to a lifting assembly 4342 that may be used for moving and transporting the capsule 4110 around the fuel pool and loading into transport casks or multi-purpose canisters. The lifting assembly 4342 in one embodiment may include a lifting rod 4344 including a bottom threaded end 4346 for rotatable coupling to the threaded lifting port 4340 and an opposite top operating end 4348 configured for rigging to equipment such as a crane that may be used to lift and maneuver the capsule 4110.

According to yet another aspect of the invention, a lid-based capsule storage system is provided which is configured for holding and supporting a plurality of capsules 4110. The capsule storage system includes a cask loading lid 4400 which may be configured to retrofit and replace lids used in existing transport or transfer casks used for loading, storing, and transporting undamaged fuel bundles. Using the temporary lid, the existing casks may be used to provide radiation shielding during the capsule 4110 drying and closure operations described herein.

Referring to FIGS. 42-46, the loading lid 4400 can be designed for any dual-purpose metal casks, such as those supplied by Holtec, TNI, or GNS or transfer casks, such as the HI-STRAC used by Holtec International in Marlton, NJ. Loading lid 4400 may have multiple mounting cutouts or openings 4302 extending completely through the lid each of which are designed to allow insertion of a single capsule 4110. The mounting openings 4302 are sized smaller than the mounting flange 4111 of the capsule 4110 so that the flange remains above the top surface 4402 of the lid 4400.

A shoulder 4404 is formed beneath each mounting flange 4111 between the flange and sidewalls 4118 of the capsule which engages the top surface 4402 of the lid 4400. This allows the capsules to hang from the lid 4400 in a vertically cantilevered manner. The top of the capsule 4110 therefore sites about 10-15 mm above the lid surface 4402 in one representative non-limiting embodiment to enable workers to easily access the top of the capsules to perform the closure operations. The location of the mounting openings 4302 can be optimized to allow easy worker access to the capsules during the drying and closure operations.

Figure 47:
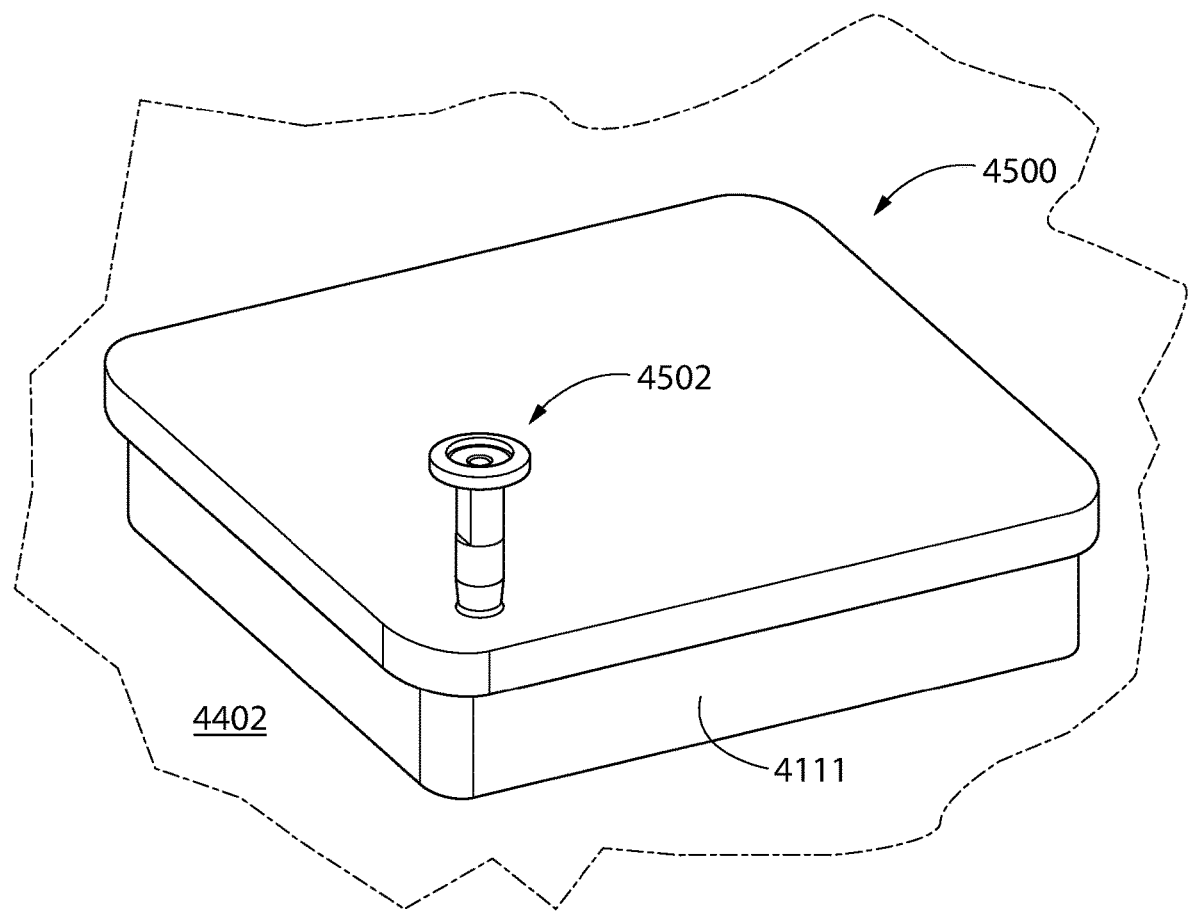
FIG. 47 is a perspective view of a leak testing lid attachable to the capsule.
Figure 48:
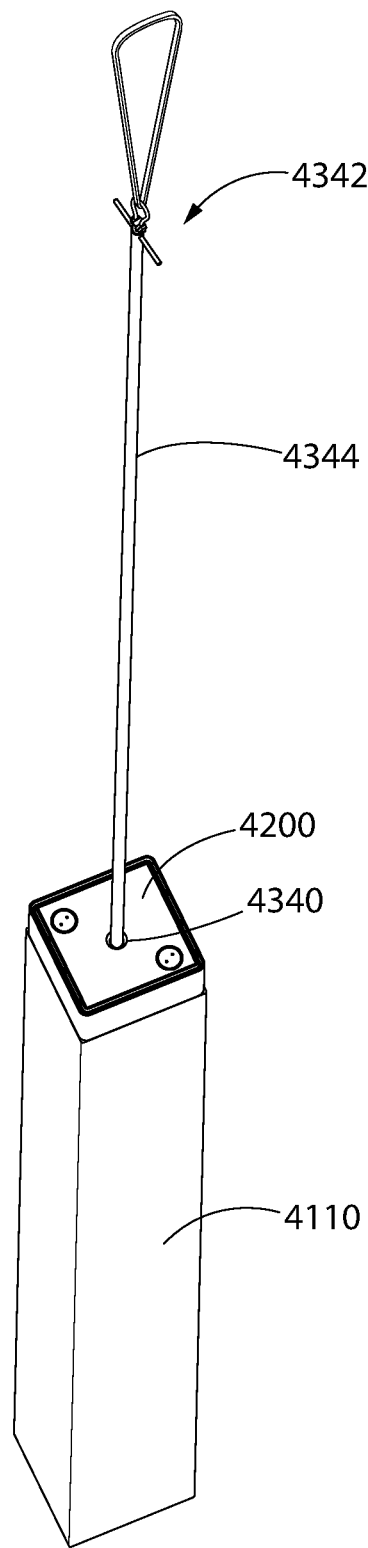
FIG. 48 is a perspective view of the capsule and a lifting assembly.
Figure 49:
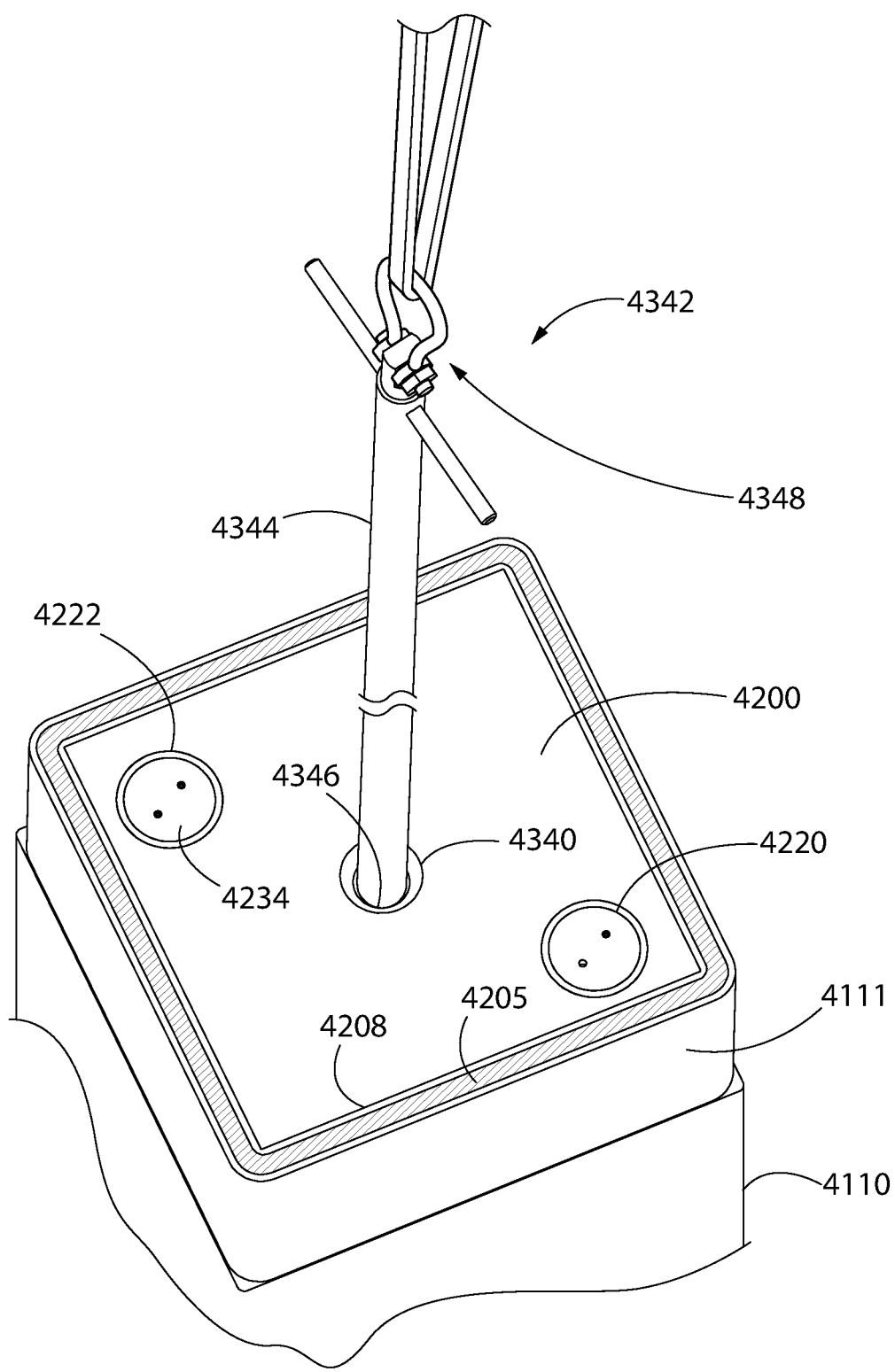
FIG. 49 is an enlarged view thereof of the lid and lifting assembly connection.

According to another aspect of the invention shown in FIG. 47, a leak testing lid 4500 is provided which can be coupled and sealed to the mounting flange 4111 of the capsule 4110. The lid 4500 attached to the mounting flange 4111 of capsule 4110 and includes a piping connection assembly 4502 which allows hook-up to leak testing equipment for performance of an integrated leak test of the entire sealed capsule 4110.

Although the fuel rod encapsulation capsule is described herein for use with damaged fuel rods, it will be appreciated that the capsule has further applicability for use with intact fuel rods or debris storage as well. Accordingly, the invention is expressly not limited for use with damaged fuel rods alone.

V. Inventive Concept 5

With reference to FIGS. 50-56, a fifth inventive concept will be described.

Figure 50:
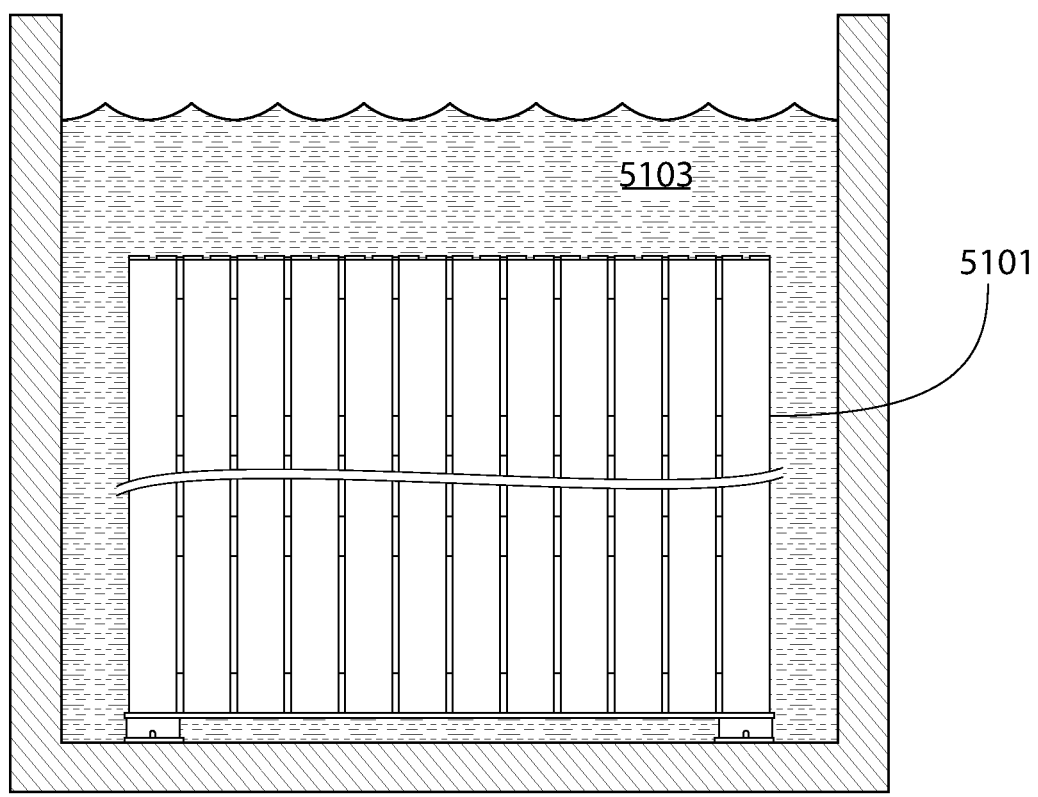
FIG. 50 is a schematic view of a fuel rack within a fuel storage pool.
Figure 51:
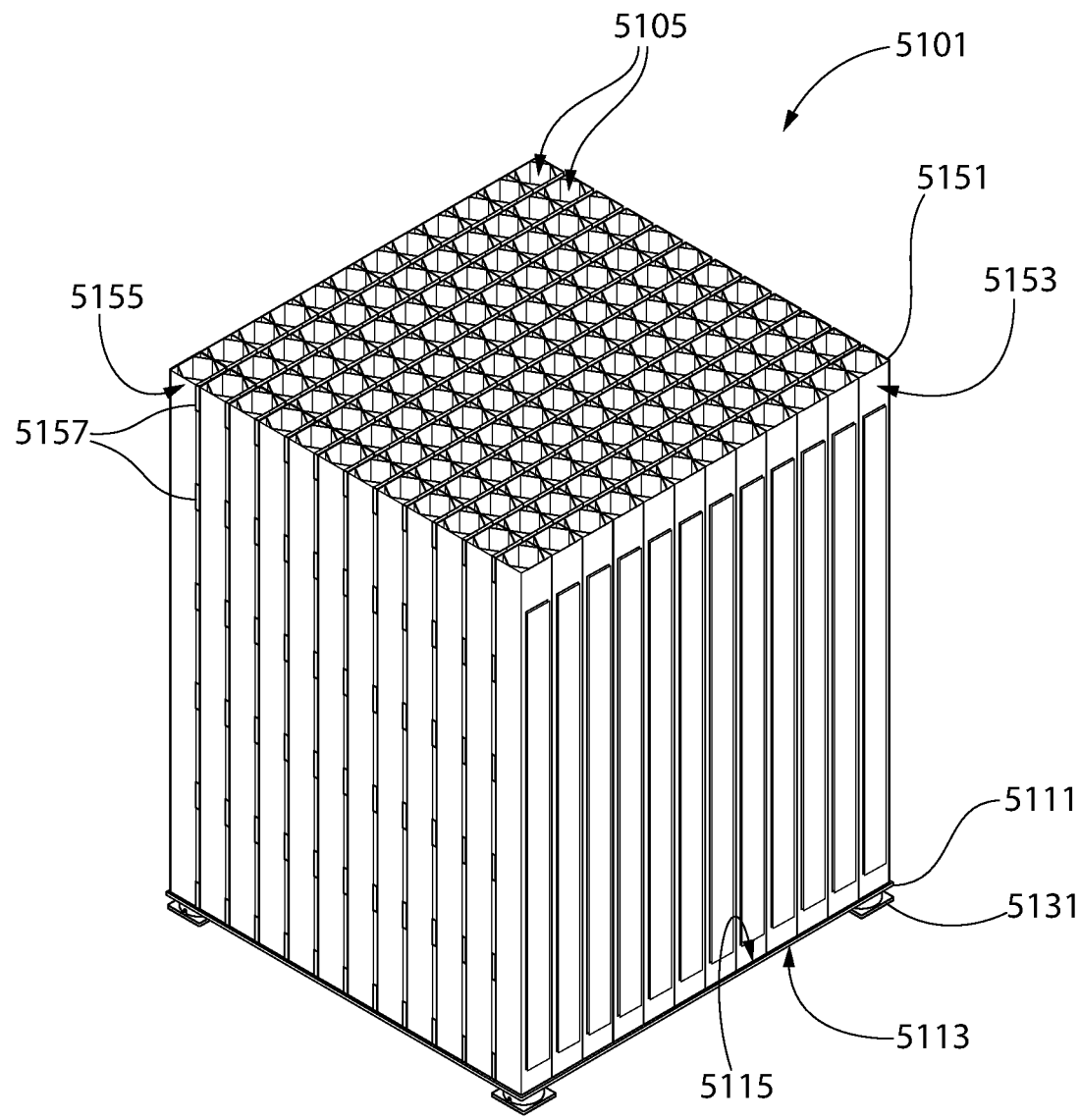
FIG. 51 is a perspective view of a first embodiment of a fuel rack for storing fuel assemblies.

Turning in detail to the drawings, FIG. 50 schematically shows a fuel rack 5101, according to one embodiment of the invention, placed in a cooling pool 5103 for the storage of spent nuclear fuel. As is known in the art, the cooling pool 5103 may include treated water to aid in neutron absorption and heat dispersion, with examples including demineralized water and borated water. The fuel rack 5101, as shown in FIG. 51, includes a rectilinear array of hexagonal fuel storage cells 5105. The fuel rack 5101 is a cellular, upright, prismatic module. The illustrated embodiment of the fuel rack 5101 is specifically designed to accommodate hexagonal fuel assemblies, such as VVER 1000 fuel assemblies. To this extent, each fuel storage cell 5105 of the fuel rack 5101 also has a hexagonal cross-sectional profile so as to geometrically accommodate no more than a single hexagonal fuel assembly. In certain embodiments, the hexagonal cross-sectional profile of the storage cell 5101 may have a shape that is other than a regular hexagon. It is to be understood that the concepts of the present invention can be modified to accommodate any shaped fuel assembly, including rectangular, octagonal, round, among others.

Figure 52A:
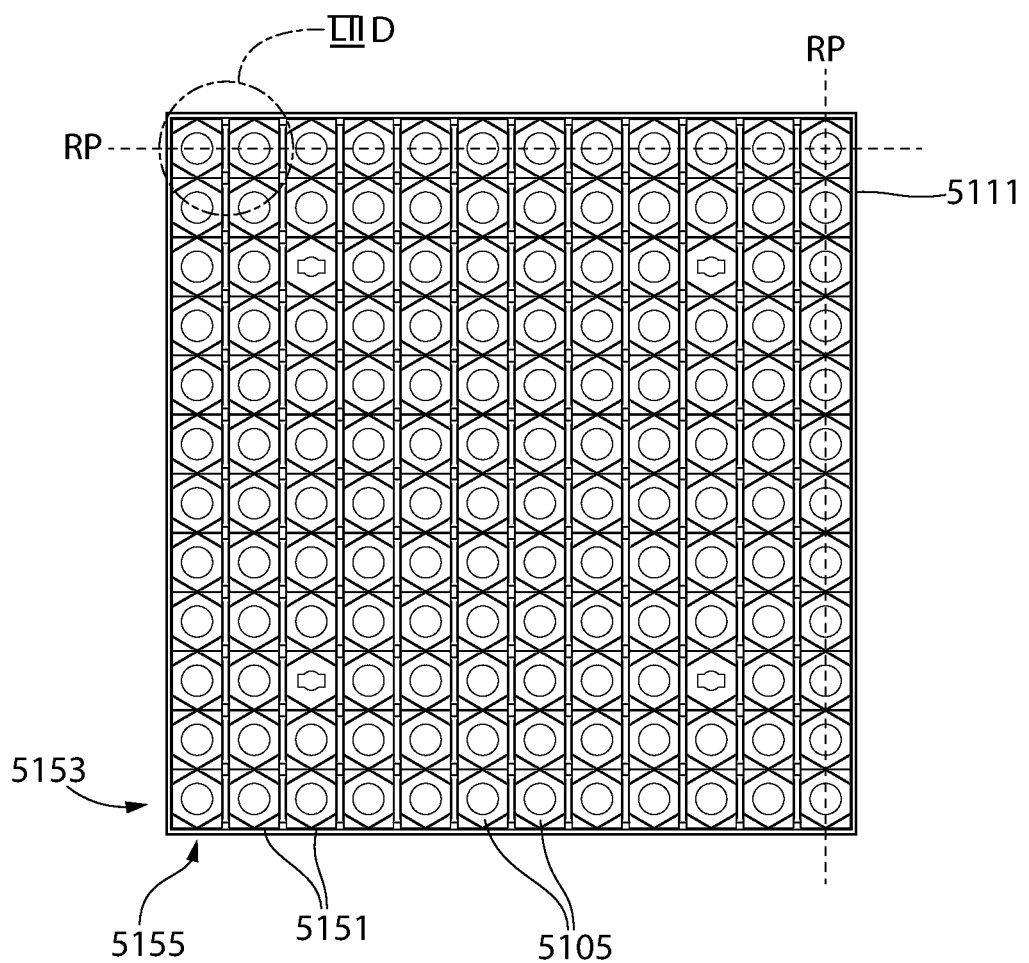
FIG. 52A is a top elevation view of the fuel rack of FIG. 51.

The fuel rack 5101 includes a base plate 5111, support pedestals 5131, and a plurality of storage tubes 5151 placed together in a side-by-side arrangement to form a rectilinear array as shown in FIG. 52A. The support pedestals 5131 are affixed to a bottom surface 5113 of the base plate 5111, and the array of storage tubes 5151 are affixed to the top surface 5115 of the base plate 5111 in a substantially vertical orientation. Each storage tube 5151 extends along its own longitudinal axis LA, and in addition to being substantially vertical, each longitudinal axis LA is also substantially perpendicular to the top surface 5115 of the base plate 5111. The connection between each of the storage tubes 5151 and the base plate 5111 is achieved by welding the bottom edge of each of the storage tubes 5151 to the top surface 5115 of the base plate 5111. Similarly, the connection between each of the support pedestals 5131 and the base plate 5111 is achieved by welding each of the support pedestals 5131 to the bottom surface 5113 of the base plate 5111. By welding the storage tubes 5151 to the base plate 5111, the flexural strength of the base plate 11 may be increased, thereby making it possible to support the combined weight of the fuel rack and fuel assemblies with the support pedestals 5131 located only near the edges of the base plate 5111. Of course, other connection techniques can be utilized for either or both of the storage tubes 5151 and the support pedestals 5131 with minor modification, including mechanical connections such as bolting, clamping, threading, and the like.

As shown in FIGS. 52A-D, the storage tubes 5151 are connected to the base plate 5111 to form a plurality of rows 5153 and a plurality of columns 5155. The storage tubes 5151 within each row 5153 are placed in a spaced apart manner, with the spacing between adjacent storage tubes 5151 in a row 5153 being maintained by spacers 5157. Spacers 5157 are placed between all adjacent storage tubes 5151 within a row 5153, with several spacers 5157 being used to separate two adjacent storage tubes 5151. The spacers 5157 are welded in place to each of the adjacent storage tubes 5151. Several spacers 5157 are placed between each of the aligned longitudinal edges of adjacent storage tubes 5151, with spacers 5157 being placed at the top and bottom of aligned longitudinal edges, and the other spacers being spaced along the aligned longitudinal edges. The number of spacers 5157 included between adjacent storage tubes 5151 may vary depending on factors such as the desired fluid flow between adjacent storage tubes 5151 and/or between adjacent columns 5155, space considerations, and weight of the entire fuel rack, among other considerations.

By having the spacers 5157 distributed in this manner, the space between adjacent columns 5155 forms flux traps 5159, not only between adjacent ones of the storage tubes 5151 within each row 5153, but also between entire columns 5155. These flux traps 5159 are exterior to each of the storage tubes 5151, and because the flux trap 5159 of one row 5153 is not partitioned from the flux trap 5159 of an adjacent row 5153, adjacent ones of the flux traps 5159 effectively separate one column 5155 from another. The width of the spacers 5157, and thus the width of the flux traps 5159, may be selected to tailor the ability to control criticality of the nuclear fuel stored within the fuel rack 5101.

The storage tubes 5151 within each column 5155 are placed adjacent each other so that the outer walls of adjacent storage tubes 5151 within the respective column 5155 are in surface contact with one another. Each of the aligned longitudinal edges of adjacent storage tubes 5151 within a column 5155 may be contiguously welded together to provide additional stability to the overall structure of the fuel rack 5101.

With the rectilinear array of the fuel rack 5101 formed with the plurality of rows 5153 and columns 5155 as described above, the longitudinal axes LA of each of the storage tubes 5151 in each of the rows 5153 and in each of the columns 5155 align to form reference planes RP. Also, the longitudinal axes LA of adjacent storage tubes 5151 in one of the rows 5153 may be separated from one another by a distance D1, and the longitudinal axes LA of adjacent storage tubes 5151 in one of the columns 5155 may be separated from one another by a distance D2, which may be different, and even greater, than the distance D1. The distance D1 separating adjacent storage tubes 5151 within a row 5153 may be controlled within a design by appropriate selection of either the width of the storage tubes 5151 or the width of the spacers 5157. The distance D2 separating adjacent storage tubes 5151 within a column 5155 may be controlled within a design by appropriate selection of the length of the storage tubes 5151.

Figure 53A:
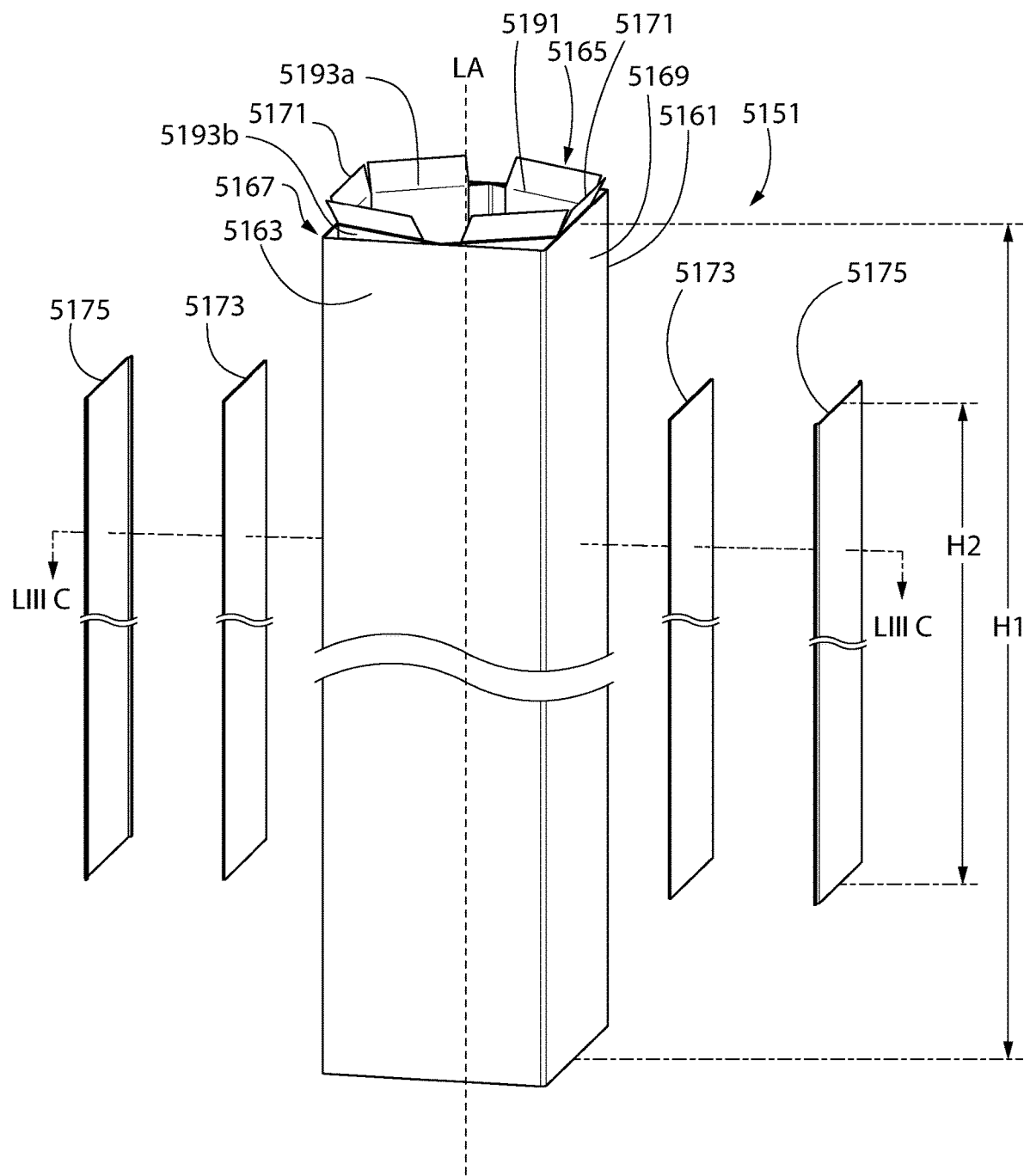
FIG. 53A is an exploded perspective view of a single storage cell.
Figure 53B:
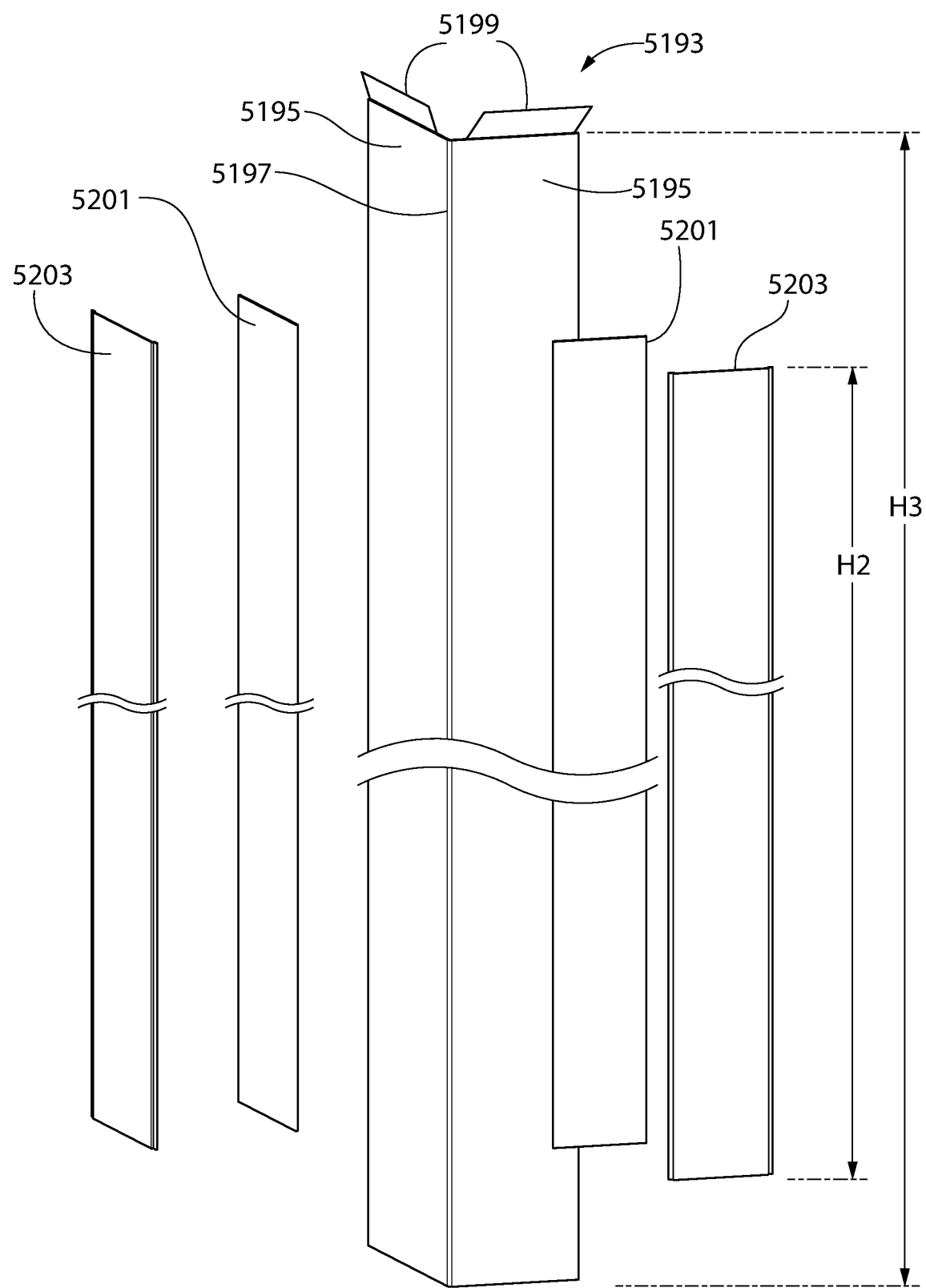
FIG. 53B is an exploded perspective view of a single chevron plate.

An exemplary storage tube 5151 is shown in FIG. 53A. The storage tube 5151 includes an outer tube 5161 having a rectangular cross-section, as can be seen in FIG. 53B. The top end of the storage tube 5151 remains open so that a fuel assembly can be inserted into the hexagonal fuel storage cell 5105 formed therein. The storage tube 5151 includes a first pair of opposing wall plates 5163, 5165 and a second pair of opposing wall plates 5167, 5169. The outer walls of the first pair of wall plates 5163, 5165 are placed into surface contact with respective outer walls of wall plates 5163, 5165 of adjacent storage tubes 5151 to form the columns 5155 of the rectilinear array, as discussed above. The storage tube 5151 defines a longitudinal axis LA, which is the center point of the rectangular cross-section, and the wall plates 5163, 5165, 5167, 5169 each have an overall height H1.

The top of each of the second pair of opposing wall plates 5167, 5169 includes a guide plate 5171. The guide plate 5171 for each wall plate 5167, 5169 extends at an angle up from the respective wall plate 5167, 5169 and away from the longitudinal axis LA of the storage tube 5151. The guide plates 5171 provide a surface to aid in guiding a fuel assembly into the fuel storage cell 5105 formed within the storage tube 5151. The guide plates 5171 also help reduce the amount of wear and/or damage caused to the top edge of the wall plates 5167, 5169 during the process of loading a fuel assembly into the fuel storage cell 5105. The guide plates 5171 may be integrally formed with the wall plates 5167, 5169, or they be mounted as part of a separate structure to the external walls of the wall plates 5167, 5169.

Figure 53C:
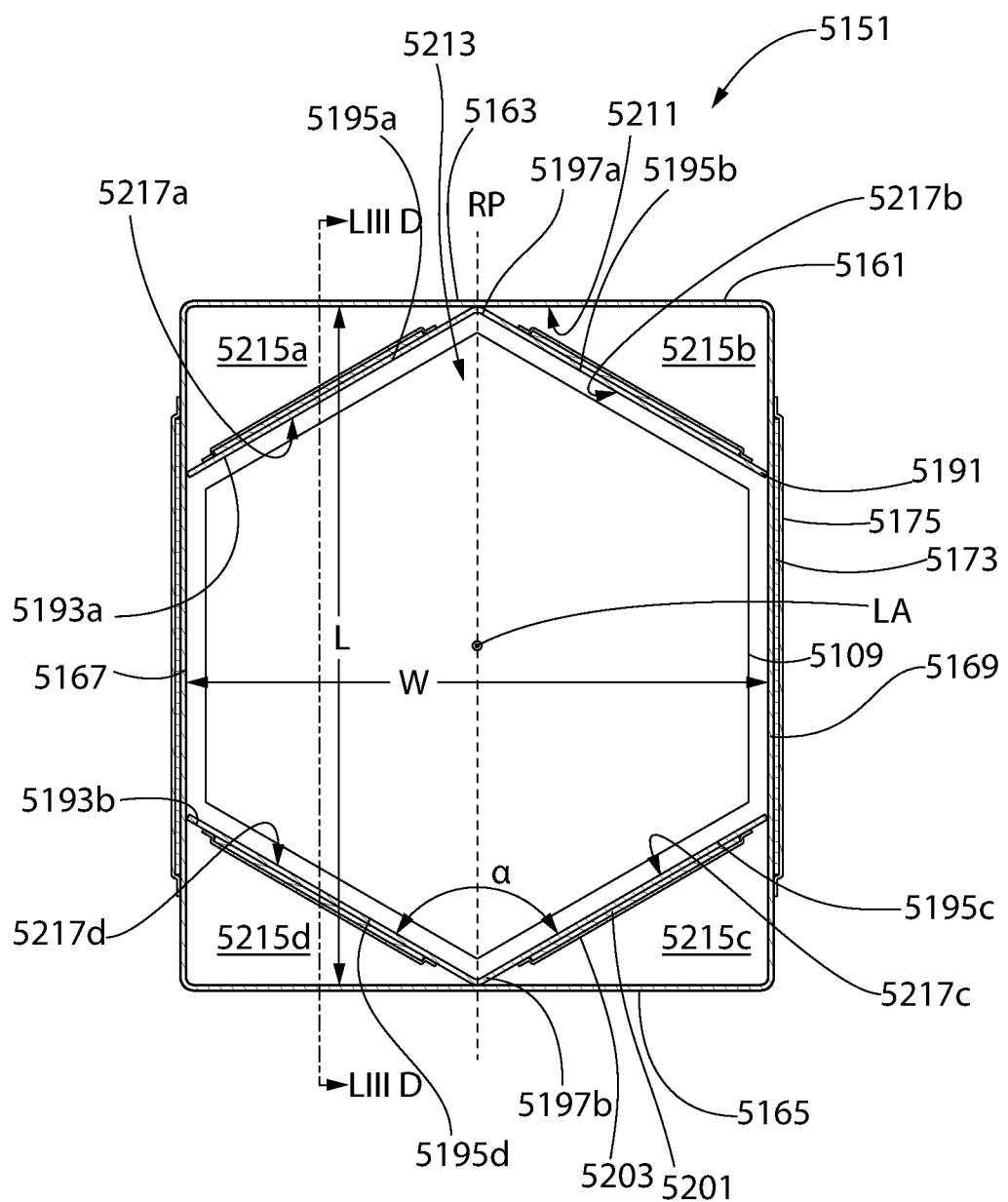
FIG. 53C is cross-sectional view of a single storage cell along the line LIIIC-LIIIC of FIG. 53A.

The outer walls of the second pair of opposing wall plates 5167, 5169 each have a neutron-absorbing plate 5173 coupled thereto, and the neutron-absorbing plate 5173 is secured in place against the outer walls of the second pair of opposing wall plates 5167, 5169 by an outer sheath 5175. The outer sheath 5175 encloses the neutron-absorbing plate 5173 in a pocket 5177, which is also shown in FIG. 53C, to protect the pool water from possible deterioration of the neutron-absorbing plate 5173. The neutron-absorbing plate 5173 and the outer sheath 5175 extend a height H2, which is less than the height H1. The height H2 may be the equivalent of the height of a fuel assembly positioned for storage within the fuel storage cell 5105. Of course, the height H2 of the neutron-absorbing plate 5173 and the outer sheath 5175 may, in certain embodiments, be as great as the height H1 of the outer tube 5161.

Figure 52B:
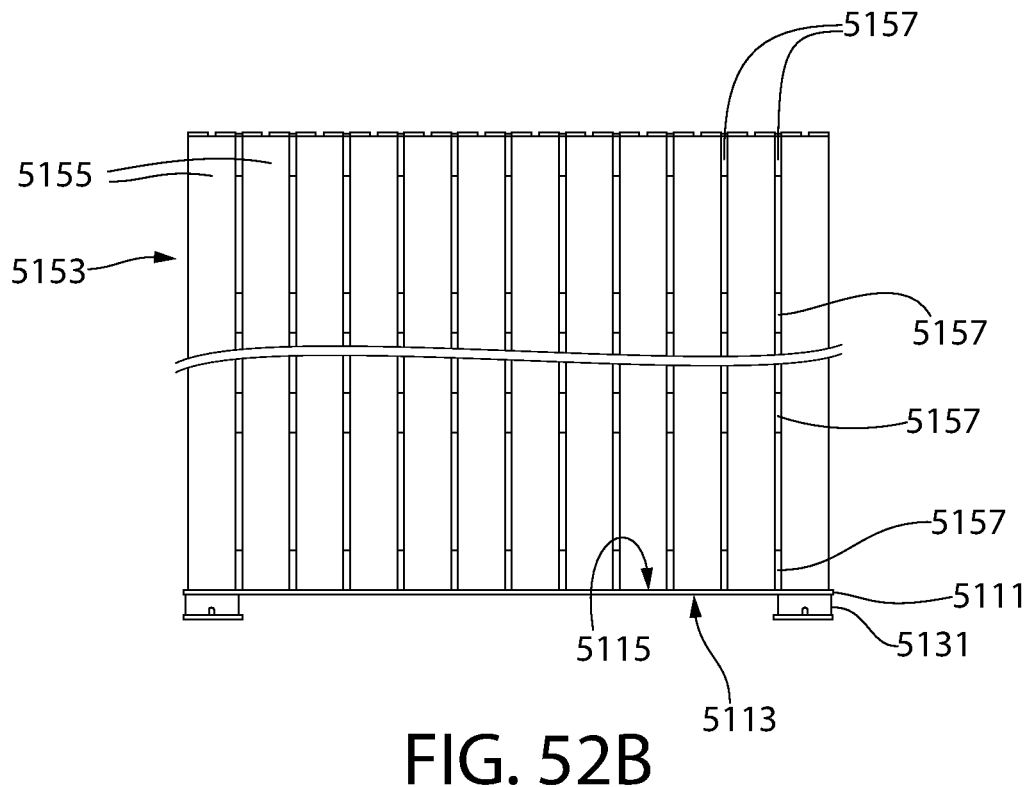
FIG. 52B is a first side elevation view of the fuel rack of FIG. 51.
Figure 52C:
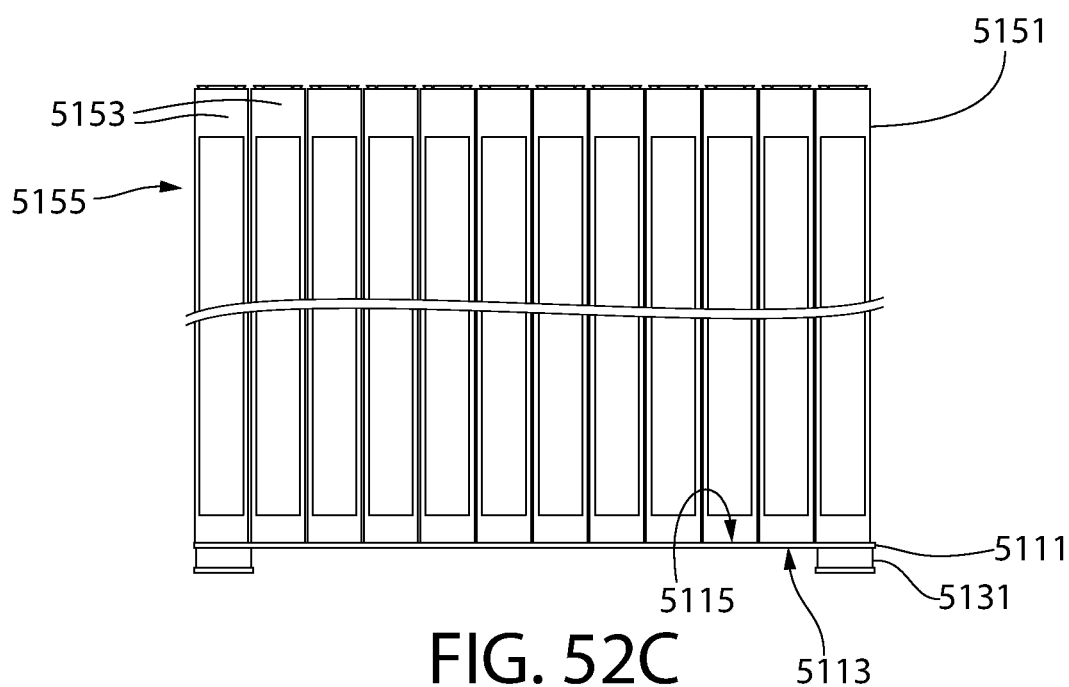
FIG. 52C is a second side elevation view of the fuel rack of FIG. 51.
Figure 52D:
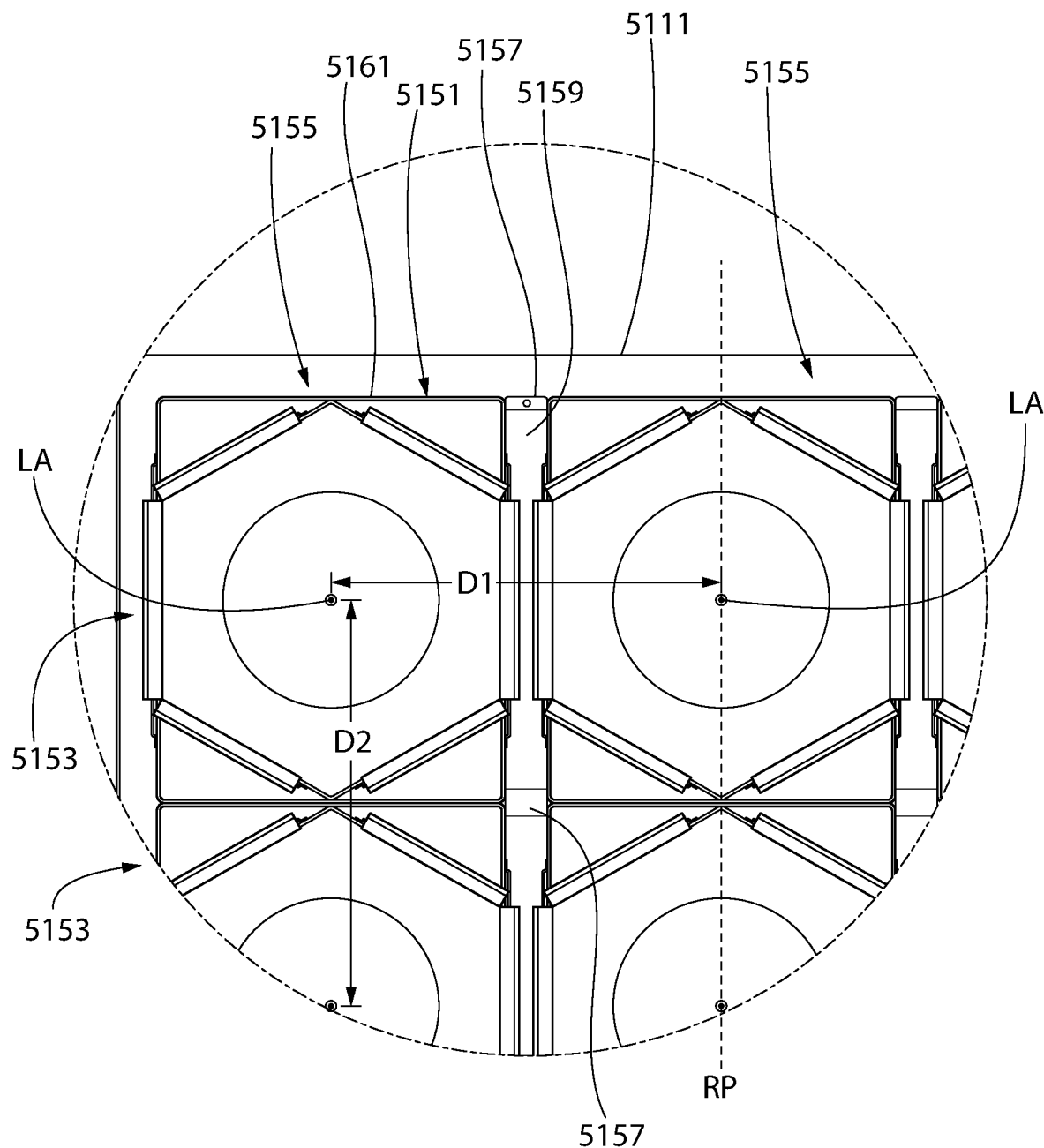
FIG. 52D is a detail view of the portion LIID of FIG. 52A.

An inner plate-assemblage 5191 is positioned within the outer tube 5161 to help form the fuel storage cell 5105. The inner plate-assemblage 5191 includes two chevron plates 5193a, 5193b, which may be of identical design. An exemplary chevron plate 5193, representative of both chevron plates 5193a, 5193b, is shown in FIG. 52B. The chevron plate 5193 includes two wall plates 5195 adjoined at an apex edge 5197, and each wall plate 5195 may have a height H3, which is slightly less than the height H1 of the wall plates 5163, 5165, 5167, 5169 of the storage tube 5151.

The top of each wall plate 5195 includes a guide plate 5199. The guide plate 5199 for each wall plate 5195 extends at an angle up from the respective wall plate 5195, such that when the chevron plate 5193 is in place within the outer tube 5161 of the storage tube 5151, the guide plates 5199 also extend away from the longitudinal axis LA of the storage tube 5151. The guide plates 5199 provide a surface to aid in guiding a fuel assembly into the fuel storage cell 5105 formed within the storage tube 5151. The guide plates 5199 also help reduce the amount of wear and/or damage caused to the top edge of the wall plates 5195 during the process of loading a fuel assembly into the fuel storage cell 5105. The guide plates 5199 may be integrally formed with the wall plates 5195, or they be mounted as part of a separate structure to the external walls of the wall plates 5195.

The outer walls of the wall plates 5195 each have a neutron-absorbing plate 5201 coupled thereto, and the neutron-absorbing plate 5201 is secured in place against the outer walls of the wall plates 5195 by an outer sheath 5203. Each outer sheath 5203 encloses the respective neutron-absorbing plate 5201 in a pocket 5205, which is also shown in FIG. 53C, to protect the pool water from possible deterioration of the neutron-absorbing plate 5201. The neutron-absorbing plate 5201 and the outer sheaths 5203 extend a height H2, which is less than the height H3 of the wall plates 5195. The height H2 may be the equivalent of the height of a fuel assembly positioned for storage within the fuel storage cell 5105. Of course, the height H2 of the neutron-absorbing plate 5201 and the outer sheaths 5203 may, in certain embodiments, be as great as the height H3 of the wall plates 5195.

The dimension and position of the neutron-absorbing plate 5173 on the wall plates 5167, 5169 of the outer tube 5161, and the neutron-absorbing plate 5201 on the wall plates 5195 of the chevron plates 5193, may be determined by the position and dimension of a fuel assembly positioned for storage within the fuel storage cell 5105, and more particularly by the position and dimension of fuel rods contained within any such fuel storage assembly. The neutron-absorbing plates 5173, 5201 are generally placed on the respective wall plates 5167, 5169, 5195 and dimensioned so that the height H2 is at least as great as the height of stored fuel rods within the fuel storage cell 5105. Such dimensioning of the neutron-absorbing plates 5173, 5201 helps ensure that neutron emissions, directed toward any of the wall plates 5167, 5169, 5195 from the fuel assembly within the fuel storage cell 5105, are incident on the neutron-absorbing plates 5173, 5201. The outer sheaths 5175, 5203 on the wall plates 5167, 5169, 5195 are dimensioned to provide a sufficiently large enclosure to secure the neutron-absorbing plates 5173, 5201 to the respective wall plates 5167, 5169, 5195.

The neutron-absorbing plate 5173, 5201 may be formed of a material containing a neutron absorber isotope embedded in the microstructure, such as elemental boron or boron carbide. Metamic, produced by Metamic, LLC, which is made of an aluminum alloy matrix with embedded boron carbide, is an example of an acceptable material. In certain embodiments, the outer sheaths 5175, 5203 may be formed of materials such as stainless steel, borated stainless steel, or any other type of steel appropriate for use in the long term storage environment for spent nuclear fuel.

In certain embodiments, particularly those in which the neutron-absorbing plates 5173, 5201 are not formed of a material which is brittle or becomes brittle over time, thereby presenting a risk of deterioration and contamination of the pool water, the neutron-absorbing plates 5173, 5201 may be secured directly to the respective wall plates 5167, 5169, 5195. In such embodiments, the outer sheaths 5175, 5203 may be omitted, or alternatively, the outer sheaths 5175, 5203 may be configured to couple the neutron-absorbing plates 5173, 5201 to the respective wall plates 5167, 5169, 5195 without enclosing the neutron-absorbing plates 5173, 5201 in an envelope.

FIG. 53C shows a cross-section of an exemplary storage tube 5151. The outer tube 5161 has a width W in the row direction and a length L in the column direction, and the length L in the column direction is greater than the width w in the row direction. The inner surface 5211 of the outer tube 5161 of the storage tube 5151 defines an inner cavity 5213, and a hexagonal fuel storage cell 5105 is formed within the inner cavity 5213 of the storage tube 5151. The profile of a hexagonal fuel assembly 5109 is shown for reference within the fuel storage cell 5105. In certain embodiments, the gap between the fuel assembly 5109 and the walls forming the fuel storage cell 5105 is less than about 4 mm around all sides of the fuel assembly 5109. The inner plate-assemblage 5191 is positioned within the outer tube 5161 to divide the inner cavity 5213 into a plurality of interior flux trap chambers 5215a-d and the fuel storage cell 5105. In the rectilinear array of the storage tubes 5151, these flux trap chambers 5215a-d serve as interior flux trap chambers between the fuel storage cells 5105 of adjacent storage tubes 5151 in the fuel rack 5101. Thus, storage tubes 5151 that are adjacent within a row have their respective fuel storage cells 5105 separated by four flux trap chambers, two from each of the adjacent storage tubes 5151.

The inner plate-assemblage 5191 includes two chevron plates 5193a, 5193b. Each chevron plate 5193a, 5193b includes two wall plates 5195a-d, and each wall plate 5195a-d is oblique to and extends between adjacent sides of the outer tube 5161 to form the plurality of interior flux trap chambers 5215a-d within the inner cavity 5213.

Specifically, the wall plate 5195a of the chevron plate 5193a extends between the wall plate 5167 of the outer tube 5161 and the wall plate 5163 of the outer tube 5161 to form the interior flux trap chamber 5215a. With the wall plate 5195a positioned in this manner, the interior flux trap chamber 5215a is formed between the wall plate 5195a of the chevron plate 5193a and a corner section formed at the intersection of wall plates 5163, 5167 of the outer tube 5161. The wall plate 5195b of the chevron plate 5193a extends between the wall plate 5169 of the outer tube 5161 and the wall plate 5163 of the outer tube 5161 to form the interior flux trap chamber 5215b. With the wall plate 5195b positioned in this manner, the interior flux trap chamber 5215b is formed between the wall plate 5195b of the chevron plate 5193a and a corner section formed at the intersection of wall plates 5163, 5169 of the outer tube 5161. The wall plate 5195a and the wall plate 5195b are joined at an apex edge 5197a of the chevron plate 5193a. The edges of the wall plates 5195a, 5195b that are positioned against the wall plates 5167, 5169, respectively, are contiguously welded to the inner surface 5211 of the rectangular outer tube 5161. Similarly, the wall plate 5195c of the chevron plate 5193b extends between the wall plate 5169 of the outer tube 5161 and the wall plate 5165 of the outer tube 5161 to form the interior flux trap chamber 5215c. With the wall plate 5195c positioned in this manner, the interior flux trap chamber 5215c is formed between the wall plate 5195c of the chevron plate 5193b and a corner section formed at the intersection of wall plates 5165, 5169 of the outer tube 5161. The wall plate 5195d of the chevron plate 5193b extends between the wall plate 5167 of the outer tube 5161 and the wall plate 5165 of the outer tube 5161 to form the interior flux trap chamber 5215d. With the wall plate 5195d positioned in this manner, the interior flux trap chamber 5215d is formed between the wall plate 5195d of the chevron plate 5193b and a corner section formed at the intersection of wall plates 5165, 5167 of the outer tube 5161. The wall plate 5195c and the wall plate 5195d are joined at an apex edge 5197b of the chevron plate 5193a. The edges of the wall plates 5195c, 5195d that are positioned against the wall plates 5167, 5169, respectively, are contiguously welded to the inner surface 5211 of the rectangular outer tube 5161.

With this configuration of the chevron plates 5193a, 5193b within the outer tube 5161, the hexagonal fuel storage cell 5105 is defined by: the inner surface 5217a of the first wall plate 5195a of the first chevron plate 5193a; the inner surface 5217b of the second wall plate 5195b of the first chevron plate 5193a; the inner surface 5217c of the first wall plate 5195c of the second chevron plate 5193b; the inner surface 5217d of the second wall plate 5195d of the second chevron plate 5193b; a portion of the inner surface 5211 of the wall plate 5167 of the outer tube 5161; and a portion of the inner surface 5211 of the wall plate 5169 of the outer tube 5161. Each of the flux trap chambers 5215a-d formed by this configuration of the chevron plates 5193a, 5193b have triangular transverse cross-sections. The size and hexagonal cross-sectional shape of the fuel storage cell 5105 is designed and constructed so that the fuel storage cell 5105 can accommodate no more than one fuel assembly 5109. Due to the different cross-sectional shape of the flux trap chambers 5215a-d, as compared to the cross-sectional shape of the typical fuel storage assembly, the flux trap chambers 5215a-d are not able to accommodate a fuel assembly that has a square or hexagonal transverse cross-section.

The apex edges 5197a, 5197b of each of the chevron plates 5193a, 5193b are located in a reference plane RP that is defined by including the longitudinal axis LA of the storage tube 5151 and being perpendicular to the wall plates 5163, 5165 of the outer tube 5161. The apex edges 5197a, 5197b may form an angle of 5120°, so that the resulting hexagonal cross-sectional shape of the fuel storage cell 5105 forms a regular hexagon. In alternative embodiments, the apex edges 5197a, 5197b may form an angle α of slightly less than 120°, within the range of about 120°-115°, so that the resulting hexagonal cross-sectional shape of the fuel storage cell 5105 varies slightly away from the form of a regular hexagon. When the hexagonal fuel assembly is placed within the fuel storage cell 5105, the fuel assembly may rattle undesirably during a seismic or other rattling event. By having the apex edges 5197a, 5197b forming an angle of slightly less than 120°, the acute edges of the fuel assembly that face the apex edges 5197a, 5197b are prevented from impacting the apex edges 5197a, 5197b during a seismic or other rattling event.

Figure 53D:
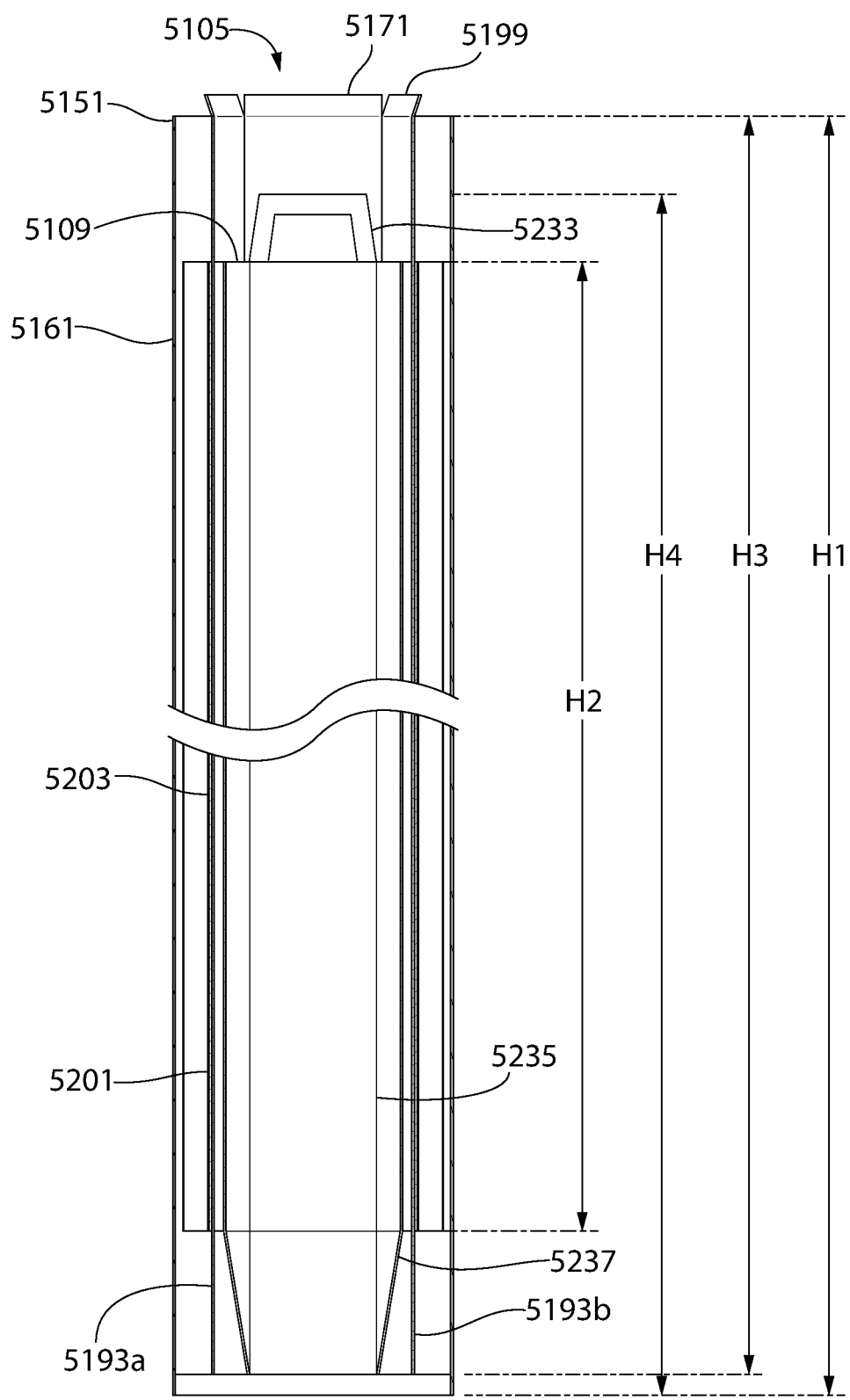
FIG. 53D is a cross-sectional view of a single storage cell along the line LIIID-LIIID of FIG. 53C.

A cross-section of the storage tube 5151 is shown in FIG. 53D with a schematic representation of a fuel assembly 5109 disposed within the fuel storage cell 5105. Similar to hexagonal fuel assemblies commonly in use, the fuel assembly 5109 includes a top handle 5233, a body portion 5235, in which a plurality of nuclear fuel rods (not shown) are housed, and a tapered bottom portion 5237. The handle 5233 and the tapered bottom portion 5237 facilitate inserting the fuel assembly 5109 into the fuel storage cell 5105 of the storage tube 5151. When the fuel assembly 5109 is being inserted into the storage tube 5151, the tapered bottom portion 5237 may engage the guide plates 5171, 5199 to aid in centering the fuel assembly 5109 within the fuel storage cell 5105. As shown, with the fuel assembly 5109 fully inserted into the fuel storage cell 5105, the height H1 of the outer tube 5161 is greater than the overall height H4 of the fuel assembly 5109. The height H3 of the chevron plates 5193a, 5193b is also less than the height H1 of the outer tube 5161. The lower edges of the chevron plates 5193a, 5193b do not extend to the lower edge of the outer tube 5161, so that a gap is formed at the lower end of the storage tube 5151 for cooling fluid to flow into the flux trap chambers 5215a-d. In certain embodiments, the chevron plates 5193a, 5193b may include apertures at their bottom edges for cooling fluid to flow into the flux trap chambers 5215a-d, and in such embodiments, the height H3 of the chevron plates 5193a, 5193b may be the same as the height H1 of the outer tube 5161.

The height H2 of the neutron-absorbing plates 5201 coupled to the chevron plates 5193a, 5193b (and the neutron-absorbing plates 5173 coupled to the outer tube 5161 as shown in FIG. 53C) is substantially the same as the height of the body portion 5235 of the fuel assembly 5109. In certain embodiments, the height H2 of the of the neutron-absorbing plates 5201 (and 5173) may be less than the height of the body portion 5235 of the fuel assembly 5109. The height H2 of the neutron-absorbing plates 5201 (and 5173) may be designed to provide appropriate shielding of adjacent fuel assemblies from one another. This is because adjacent spent nuclear fuel rods may not extend the entire length of the body portion 5235 of the fuel assembly 5109, and the height of the neutron-absorbing plates 5201 (and 5173) need only be high as the nuclear fuel rods when the fuel assembly 5109 is positioned within the storage tube 5151.

Figure 54:
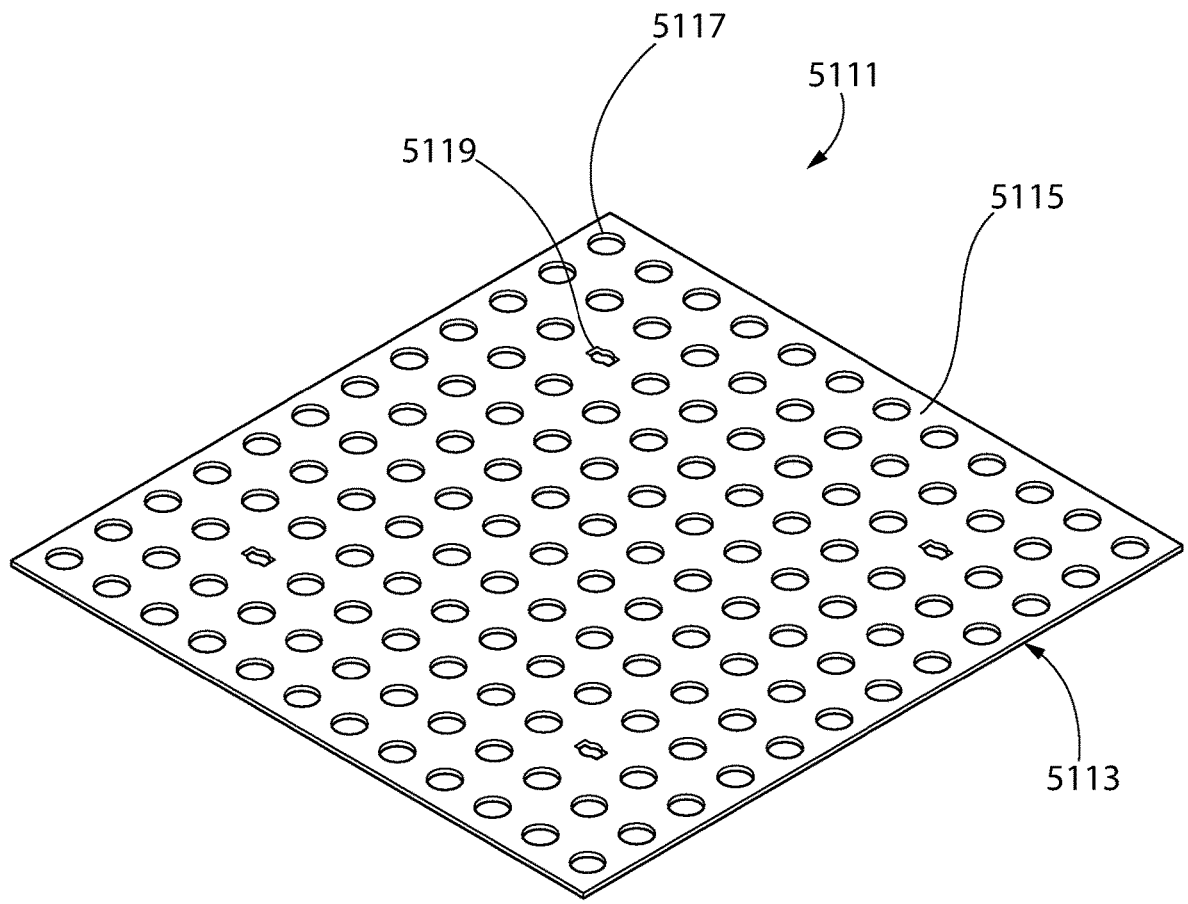
FIG. 54 is a perspective view of the bottom plate of the fuel rack of FIG. 50.

The base plate 5111, which is shown in FIG. 54, includes a plurality of flow holes 5117 extending through the base plate 5111 from the bottom surface 5113 to the top surface 5115. The base plate 5111 also includes four oblong holes 5119 (second row in from the corners) for lifting and installing the fuel rack 5101 within the fuel pool 5103. Typically, a special lifting beam with four long reach rods is used to interact with the oblong holes 5119 to grapple the fuel rack 5101 for transfer into or out of, or movement within, the pool 5103.

The flow holes 5117 (and oblong holes 5119) create passageways from below the base plate 5111 into the bottom ends of the fuel storage cells 5105 formed by the storage assemblies 5151. As shown, a single flow hole 5117 is provided for each storage assembly 5151. In certain embodiments, multiple flow holes 5117 may be provided for each storage assembly 5151 to provide cooling fluid to the fuel storage cell 5105 and each of the flux trap chambers 5215a-d. The flow holes 5117 serve as fluid inlets to facilitate natural thermosiphon flow of pool water through the fuel storage cells 5105 when fuel assemblies having a heat load are positioned therein. More specifically, when heated fuel assemblies are positioned in the fuel storage cells 5105 in a submerged environment, the water within the fuel storage cells 5105, and within the flux trap chambers 5215a-d, surrounding the fuel assemblies becomes heated, thereby rising due to increased buoyancy. As this heated water rises and exits the storage assemblies 5151 via their open top ends, cool water is drawn into the bottom of the fuel storage cells 5105 and the flux trap chambers 5215a-d via the flow holes 5117. This heat induced water flow along the fuel assemblies then continues naturally.

Figure 55:
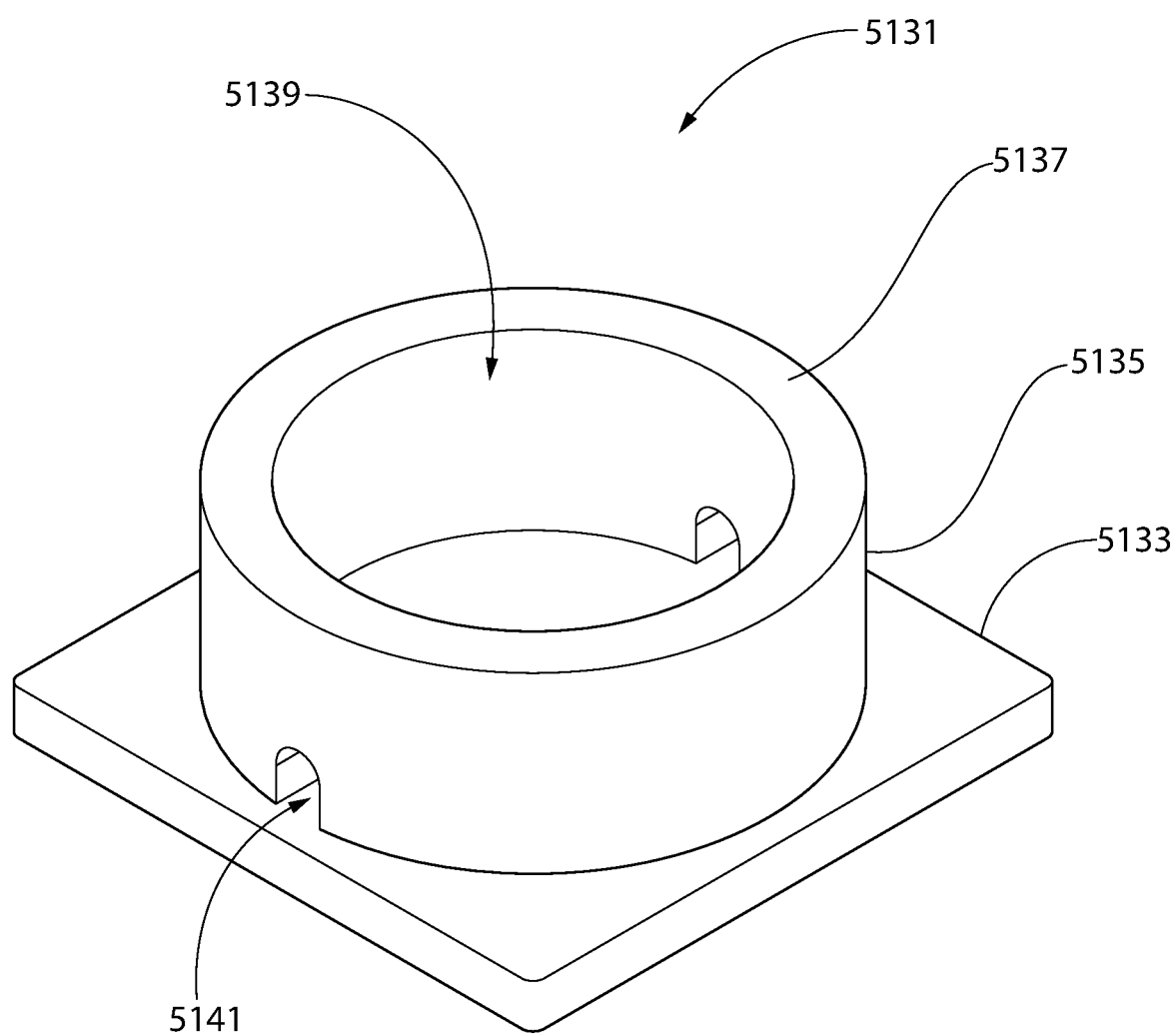
FIG. 55 is a perspective view of the bottom support of the fuel rack of FIG. 50.

A support pedestal 5131 for the fuel rack 5101 is shown in FIG. 55. The support pedestals 5131 affixed to the bottom surface 5113 of the base plate 5111 ensure that a space exists between the floor of the pool 5103 and the bottom surface 5113 of the base plate 5111, thereby creating an inlet plenum for water to flow through the flow holes 5117. The support pedestal 5131 includes a base portion 5133 and a riser portion 5135 formed about an interior flow space 5139. The riser portion 5135 includes flow apertures 5141 through which water from the pool 5103 may pass from a space external to the support pedestal 5131 into the interior flow space 5139. Water passing into the interior flow space 5139 may then pass up through a flow hole 5117 in the base plate 5111 to enable the cooling process described above. Although the riser portion 5135 is depicted as being annular, in certain embodiments the riser portion 5135 may have any geometrical configuration which supports the base plate 5111 above the floor of the pool 5103 and permits water from the pool 5103 to flow into any flow holes 5117 in the base plate 5111 near which the support pedestal 5131 may be affixed.

The fuel rack 5101 described above with reference to FIGS. 50-55 is intended to be placed free standing in a pool 5103, without being coupled to sides or the bottom of the pool. However, in certain embodiments, a coupler may be used to aid in securing the position of the fuel rack 5101 within the pool 5103 during a seismic or other rattling event. Other than the neutron absorbing material described above, the fuel rack may be formed entirely from austenitic stainless steel. Although other materials may be used, some materials, such as borated stainless steel, are not preferred for a free standing fuel rack 5101 within a pool 5103, as the greater weight of materials such as borated steel aggravate the seismic response of the fuel rack 5101, thus forcing the fuel rack 5101 to be anchored.

Figure 56:
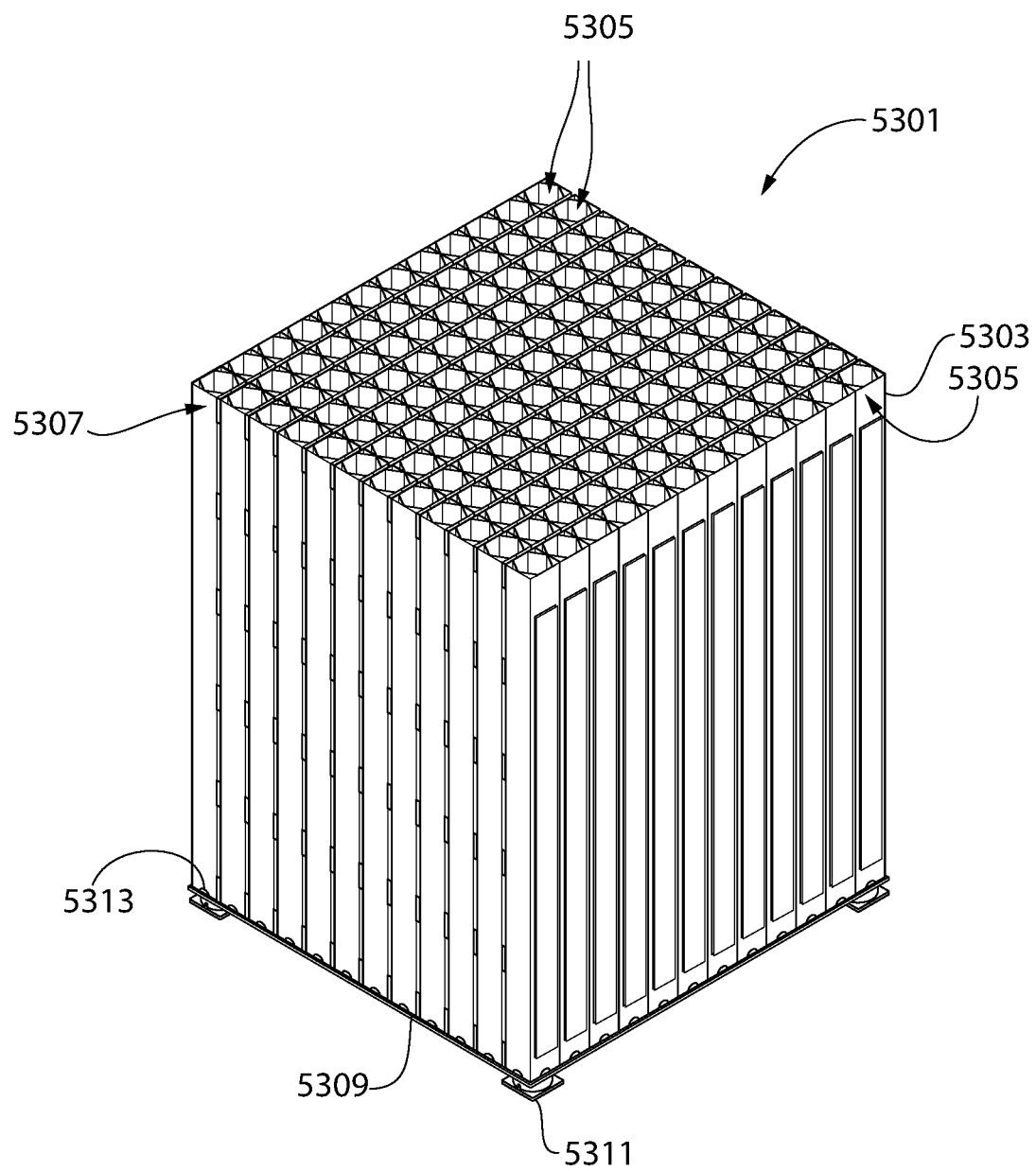
FIG. 56 is a perspective view of a second embodiment of a fuel rack for storing fuel assemblies.
Figure 57:
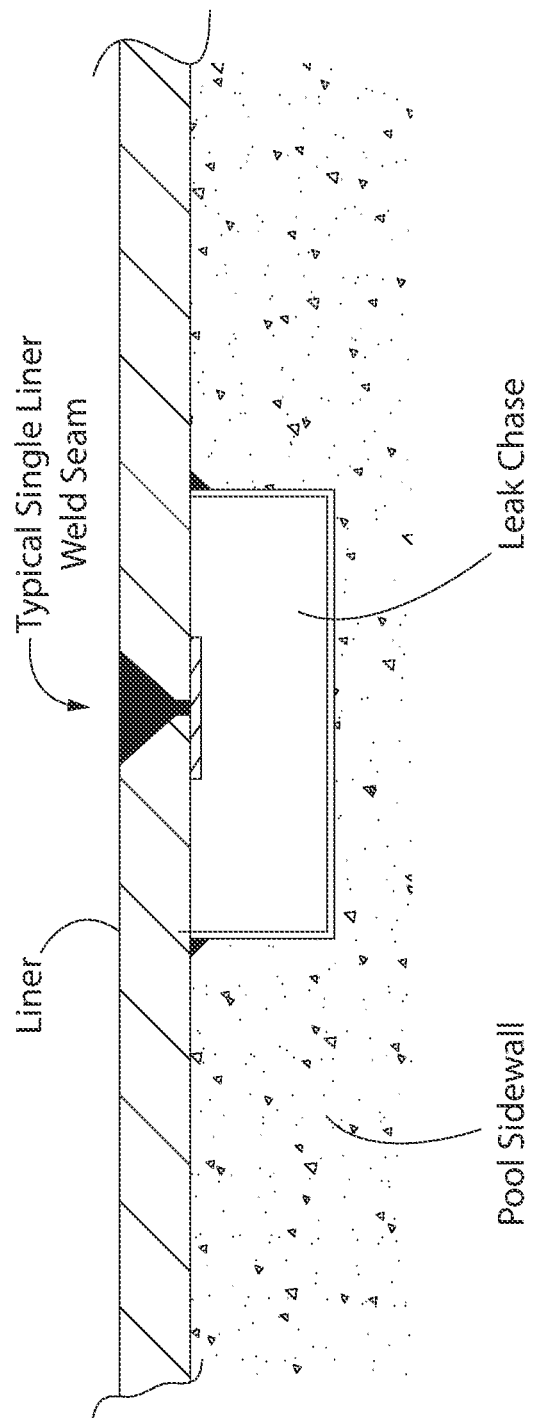
FIG. 57 is a cross sectional diagram of a known approach used to monitor the integrity of weld seams for leakage in a single spent fuel pool liner system.

An alternative embodiment of a fuel rack 5301 is shown in FIG. 56. This fuel rack 5301 includes a plurality of storage tubes 5303 affixed to the top surface of a base plate 5309, and support pedestals 5311 affixed to the bottom surface of the base plate 5309. The storage tubes 5303 each include a fuel storage cell 5305, and they are placed together in a side-by-side arrangement to form a plurality of rows 5305 and a plurality of columns 5307 as part of a rectilinear array, in the manner described above. A plurality of auxiliary flow apertures 5313 are included in the storage tubes 5303 at or near their bottom edges. In certain embodiments, at least one auxiliary flow aperture 5313 is included in each face of the storage tubes 5303, even those faces of storage tubes 5303 that are placed in surface contact with the face of an adjacent storage tube 5303. The auxiliary flow apertures 5313 act as additional inlet openings (when combined with flow holes in the base plate 5309) for incoming pool water to facilitate the thermosiphon flow during the cooling process. While an auxiliary flow aperture 5313 is shown in each face of each and every storage tube 5303 in the fuel rack 5301, in certain embodiments the auxiliary flow aperture 5313 may be omitted from a select subset of faces for select storage tubes 5303.

VI. Inventive Concept 6

With reference to FIGS. 57-63, a sixth inventive concept will be described.

Referring to FIGS. 58-62, an environmentally sequestered spent fuel pool system includes a spent fuel pool 6040 comprising a plurality of vertical sidewalls 6041 rising upwards from an adjoining substantially horizontal base wall or slab 6042 (recognizing that some slope may intentionally be provided in the upper surface of the bottom wall for drainage toward a low point if the pool is to be emptied and rinsed/decontaminated at some time and due to installation tolerances). The base slab 6042 and sidewalls 6041 may be formed of reinforced concrete in one non-limiting embodiment. The fuel pool base slab 6042 may be formed in and rest on the soil sub-grade 6026 the top surface of which defines grade G. In this embodiment illustrated in the present application, the sidewalls are elevated above grade. In other possible embodiments contemplated, the base slab 6042 and sidewalls 6041 may alternatively be buried in sub-grade 6026 which surrounds the outer surfaces of the sidewalls. Either arrangement may be used and does not limit of the invention.

In one embodiment, the spent fuel pool 6040 may have a rectilinear shape in top plan view. Four sidewalls 6041 may be provided in which the pool has an elongated rectangular shape (in top plan view) with two longer opposing sidewalls and two shorter opposing sidewalls (e.g. end walls). Other configurations of the fuel pool 6040 are possible such as square shapes, other polygonal shapes, and non-polygonal shapes.

The sidewalls 6041 and base slab 6042 of the spent fuel pool 6040 define a cavity 6043 configured to hold cooling pool water W and a plurality of submerged nuclear spent fuel assembly storage racks 6027 holding fuel bundles or assemblies 6028 each containing multiple individual nuclear spent fuel rods. The storage racks 6027 are disposed on the base slab 6042 in typical fashion. With continuing reference to FIGS. 58-62, the spent fuel pool 6040 extends from an operating deck 6022 surrounding the spent fuel pool 6040 downwards to a sufficient depth D1 to submerge the fuel assemblies 6028 (see, e.g. FIG. 62) beneath the surface level S of the pool water W for proper radiation shielding purposes. In one implementation, the fuel pool may have a depth such that at least 10 feet of water is present above the top of the fuel assembly.

Figure 58:
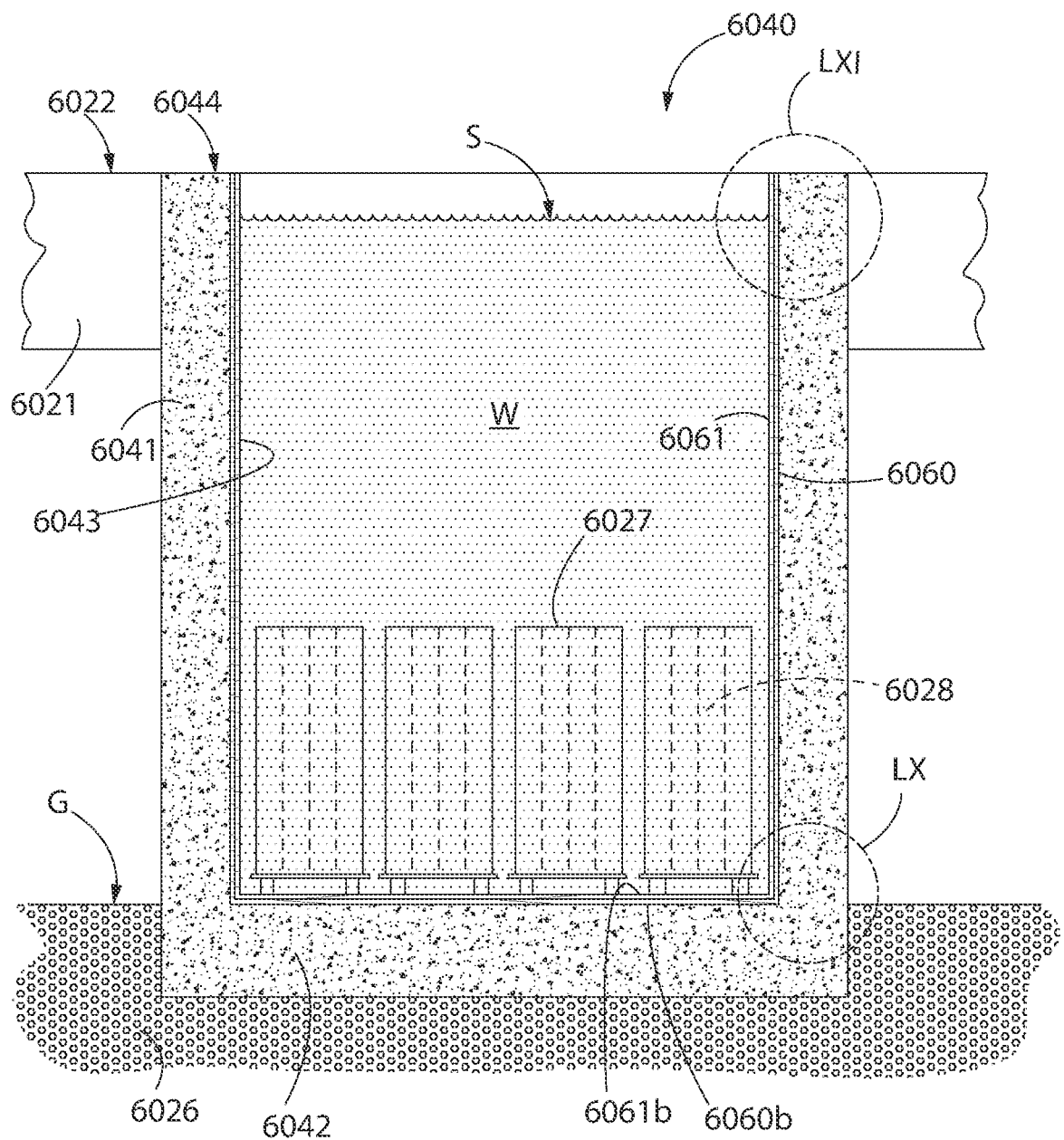
FIG. 58 is a side cross-sectional view of an environmentally sequestered nuclear spent fuel pool having a dual liner and leakage collection and monitoring system according to the present disclosure.
Figure 59:
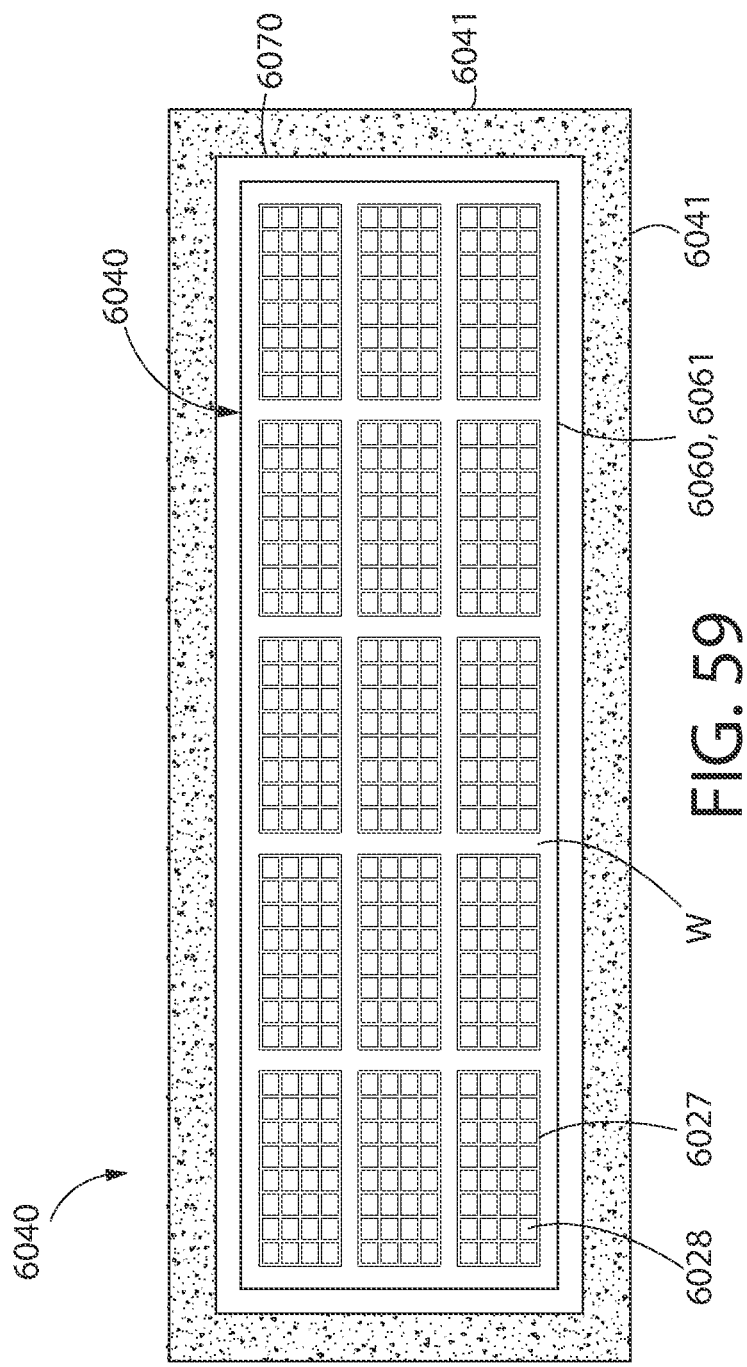
FIG. 59 is a top plan view of the fuel pool with liner and leakage collection/monitoring system of FIG. 58.
Figure 62:
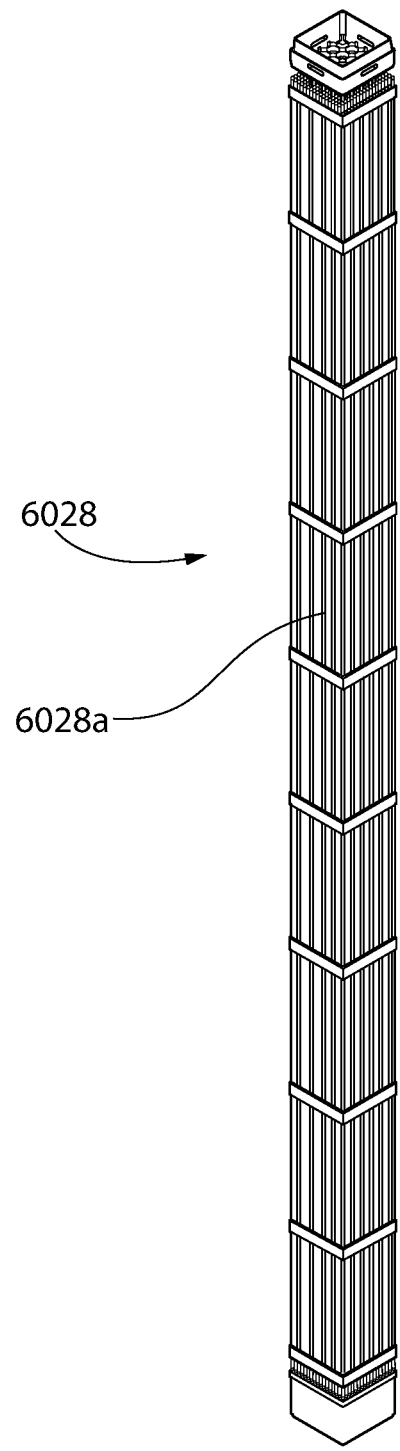
FIG. 62 is a perspective view of an example nuclear fuel assembly containing spent nuclear fuel rods.

A nuclear fuel assembly storage rack 6027 is shown in FIGS. 58 and 59, and further described in commonly assigned U.S. patent application Ser. No. 14/367,705 filed Jun. 20, 2014, which is incorporated herein by reference in its entirety. The storage rack 6027 contains a plurality of vertically elongated individual cells as shown each configured for holding a fuel assembly 6028 comprising a plurality of individual nuclear fuel rods. An elongated fuel assembly 6028 is shown in FIG. 62 holding multiple fuel rods 6028a and further described in commonly assigned U.S. patent application Ser. No. 14/413,807 filed Jul. 9, 2013, which is incorporated herein by reference in its entirety. Typical fuel assemblies 6028 for a pressurized water reactor (PWR) may each hold over 150 fuel rods in 10×10 to 17×17 fuel rod grid arrays per assembly. The assemblies may typically be on the order of approximately 14 feet high weighing about 1400-1500 pounds each.

The substantially horizontal operating deck 6022 that circumscribes the sidewalls 6041 and pool 6040 on all sides in one embodiment may be formed of steel and/or reinforced concrete. The surface level of pool water W (i.e. liquid coolant) in the pool 6040 may be spaced below the operating deck 6022 by a sufficient amount to prevent spillage onto the deck during fuel assembly loading or unloading operations and to account to seismic event. In one non-limiting embodiment, for example, the surface of the operating deck 6022 may be at least 5 feet above the maximum 100 year flood level for the site in one embodiment. The spent fuel pool 6040 extending below the operating deck level may be approximately 40 feet or more deep (e.g. 42 feet in one embodiment). The fuel pool is long enough to accommodate as many spent fuel assemblies as required. In one embodiment, the fuel pool 6040 may be about 60 feet wide. There is sufficient operating deck space around the pool to provide space for the work crew and for staging necessary tools and equipment for the facility's maintenance. There may be no penetrations in the spent fuel pool 6040 within the bottom 30 feet of depth to prevent accidental draining of water and uncovering of the spent fuel.

According to one aspect of the invention, a spent fuel pool liner system comprising a double liner is provided to minimize the risk of pool water leakage to the environment. The liner system is further designed to accommodate cooling water leakage collection and detection/monitoring to indicate a leakage condition caused by a breach in the integrity of the liner system.

The liner system comprises a first outer liner 6060 separated from a second inner liner 6061 by an interstitial space 6062 formed between the liners. An outside surface of liner 6060 is disposed against or at least proximate to the inner surface 6063 of the fuel pool sidewalls 6041 and opposing inside surface is disposed proximate to the interstitial space 6062 and outside surface of liner 6061. The inside surface of liner 6061 is contacted and wetted by the fuel pool water W. It bears noting that placement of liner 6060 against liner 6061 without spacers therebetween provides a natural interstitial space of sufficient width to allow the space and any pool leakage there-into to be evacuated by a vacuum system, as further described herein. The natural surface roughness of the materials used to construct the liners and slight variations in flatness provides the needed space or gap between the liners. In other embodiments contemplated, however, metallic or non-metallic spacers may be provided which are distributed in the interstitial space 6062 between the liners if desired.

The liners 6060, 6061 may be made of any suitable metal which is preferably resistant to corrosion, including without limitation stainless steel, aluminum, or other. In some embodiments, each liner may be comprised of multiple substantially flat metal plates which are seal welded together along their peripheral edges to form a continuous liner system encapsulating the sidewalls 6041 and base slab 6042 of the spent fuel pool 6040.

The inner and outer liners 6061, 6060 may have the same or different thicknesses (measured horizontally or vertically between major opposing surfaces of the liners depending on the position of the liners). In one embodiment, the thicknesses may be the same. In some instances, however, it may be preferable that the inner liner 6061 be thicker than the outer liner 6060 for potential impact resistant when initially loading empty fuel storage racks 6027 into the spent fuel pool 6040.

Figure 60:
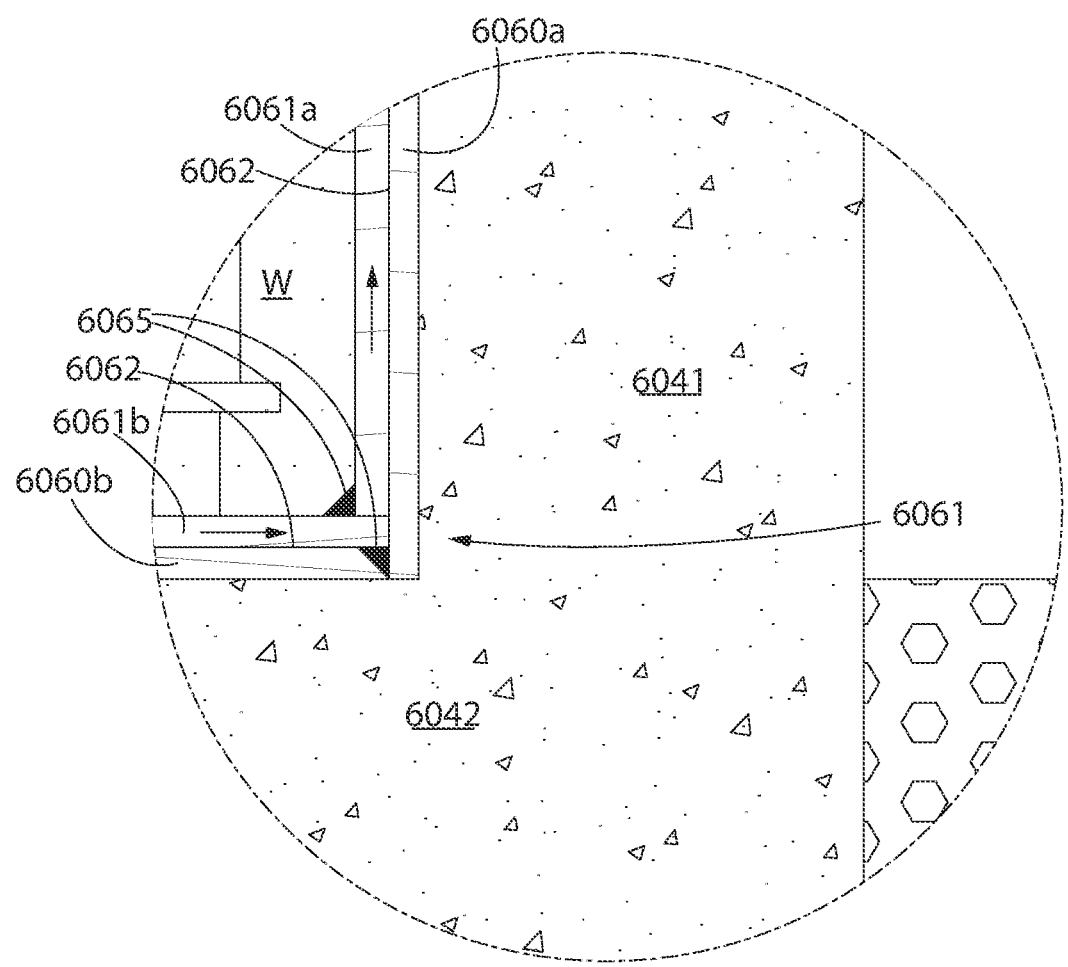
FIG. 60 is a detail taken from FIG. 58 showing a bottom joint of the liner system at the intersection of liners from the sidewalls and base slab of the fuel pool.

The outer and inner liners 6060, 6061 (with interstitial space therebetween) extend along the vertical sidewalls 6041 of the spent fuel pool 6040 and completely across the horizontal base slab 6042 in one embodiment to completely cover the wetted surface area of the pool. This forms horizontal sections 6060b, 6061b and vertical sections 6060a, 6061a of the liners 6060, 6061 to provide an impervious barrier to out-leakage of pool water W from spent fuel pool 6040. The horizontal sections of liners 6060b, 6061b on the base slab 6042 may be joined to the vertical sections 6060a, 6061a along the sidewalls 6041 of the pool 6040 by welding. The detail in FIG. 60 shows one or many possible constructions of the bottom liner joint 6064 comprising the use of seal welds 6065 (e.g. illustrated fillet welds or other) to seal sections 6060a to 6060b along their respective terminal edges and sections 6061a to 6061b along their respective terminal edges as shown. Preferably, the joint 6064 is configured and arranged to fluidly connect the horizontal interstitial space 6064 between horizontal liner sections 6060b, 6061b to the vertical interstitial space 6064 between vertical liner sections 6060a, 6061a for reasons explained elsewhere herein.

Figure 61:
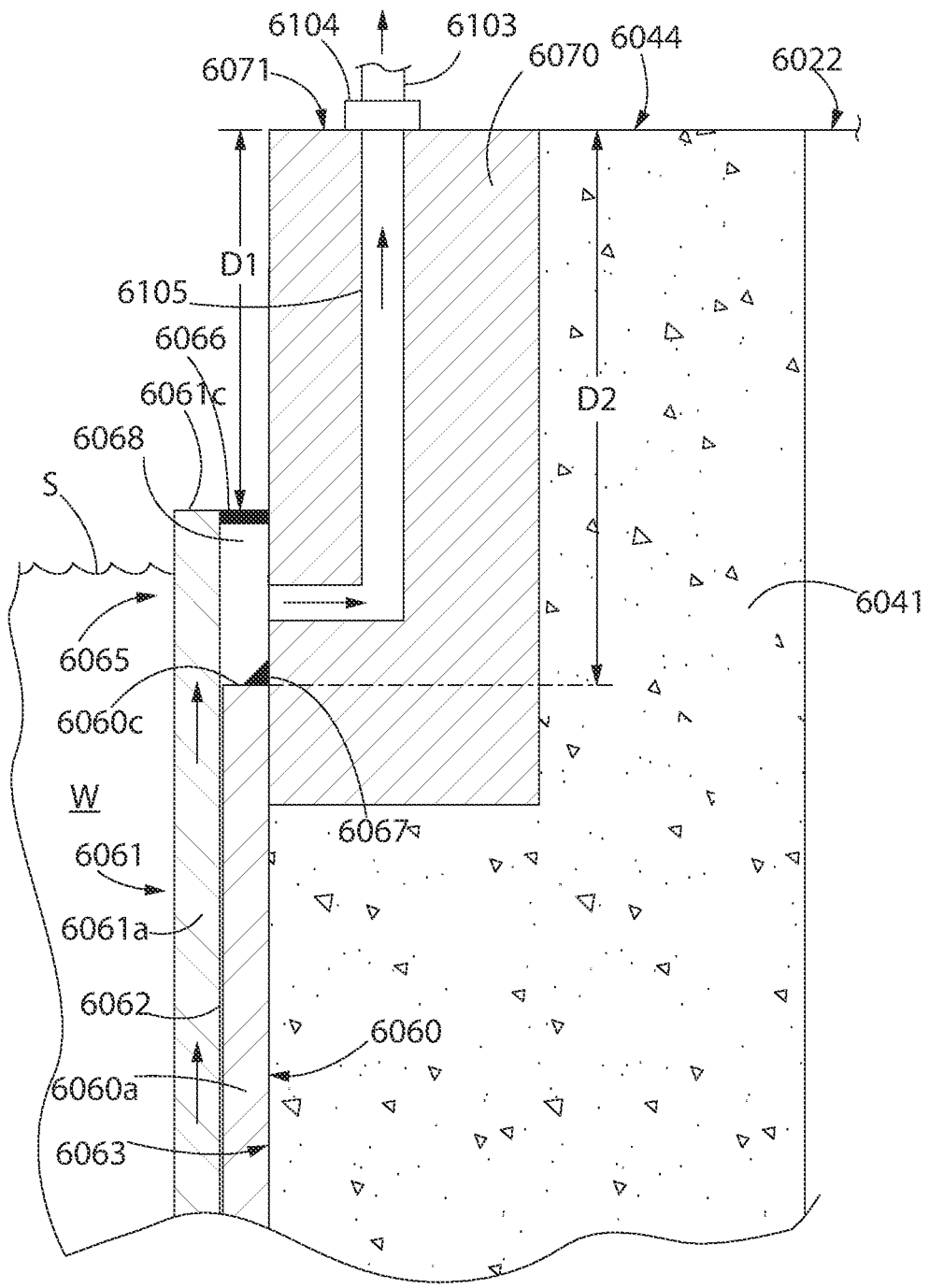
FIG. 61 is a detail taken from FIG. 58 showing a top joint of the liner system at the terminal top ends of the sidewall liners.

The top liner joint 6065 in one non-limiting embodiment between the top terminal edges 6060c, 6061c of the vertical liner sections 6060*a*, 6061*a* is shown in the detail of FIG. 61. The top of the spent fuel pool 6040 is equipped with a substantially thick metal embedment plate 6070 which circumscribes the entire perimeter of the fuel pool. The embedment plate 6070 may be continuous in one embodiment and extends horizontally along the entire inner surface 6063 of the sidewalls 6041 at the top portion of the sidewalls. The embedment plate 6070 has an exposed portion of the inner vertical side facing the pool which extends above the top terminal ends 6060*c*, 6061*c* of the inner and outer liners 6060, 6061. The opposing outer vertical side of the plate 6070 is embedded entirely into the sidewalls 6041. A top surface 6071 of the embedment plate 6070 that faces upwards may be substantially flush with the top surface 6044 of the sidewalls 6041 to form a smooth transition therebetween. In other possible implementations, the top surface 6071 may extend above the top surface 6044 of the sidewalls. The embedment plate 6070 extends horizontal outward from the fuel pool 6040 for a distance into and less than the lateral width of the sidewalls 6041 as shown.

The embedment plate 6070 has a horizontal thickness greater than the horizontal thickness of the inner liner 6061, outer liner 6060, and in some embodiments both the inner and outer liners combined.

The top embedment plate 6070 is embedded into the top surface 6044 of the concrete sidewalls 6041 has a sufficient vertical depth or height to allow the top terminal edges 6060*c*, 6061*c* of liners 6060, 6061 (i.e. sections 6060*a* and 6061*a* respectively) to be permanently joined to the plate. The top terminal edges of liners 6060, 6061 terminate at distances D2 and D1 respectively below a top surface 6071 of the embedment plate 6070 (which in one embodiment may be flush with the top surface of the pool sidewalls 6041 as shown). Distance D1 is less than D2 such that the outer liner 6060 is vertical shorter in height than the inner liner 6061. In one embodiment, the embedment plate 6070 has a bottom end which terminates below the top terminal edges 6060*c*, 6061*c* of the liners 6060, 6061 to facilitate for welding the liners to the plate.

In various embodiments, the embedment plate 6070 may be formed of a suitable corrosion resistant metal such as stainless steel, aluminum, or another metal which preferably is compatible for welding to the metal used to construct the outer and inner pool liners 6060, 6061 without requiring dissimilar metal welding.

As best shown in FIG. 61, the top terminal edges 6060*c*, 6061*c* of inner and outer liners 6060, 6061 may have a vertically staggered arranged and be separately seal welded to the top embedment plate 6070 independently of each other. A seal weld 6066 couples the top terminal edge 6061*c* of liner 6061 to the exposed portion of the inner vertical side of the embedment plate 6070. A second seal weld 6067 couples the top terminal edge 6060*c* of liner 6060 also to the exposed portion of the inner vertical side of the embedment plate 6070 at a location below and spaced vertical apart from seal weld 6066. This defines a completely and hermetically sealed enclosed flow plenum 6068 that horizontal circumscribes the entire perimeter of the spent fuel pool 6040 in one embodiment. The flow plenum 6068 is in fluid communication with the interstitial space 6062 as shown. One vertical side of the flow plenum is bounded by a portion of inner liner 6061 and the opposing vertical side of the plenum is bounded by the inner vertical side of the top embedment plate 6070.

The top flow plenum 6068 may be continuous or discontinuous in some embodiments. Where discontinuous, it is preferable that a flow passageway 6105 in the top embedment plate 6070 be provided for each section of the separate passageways.

Seal welds 6066 and 6067 may be any type of suitable weld needed to seal the liners 6060, 6061 to the top embedment plate 6070. Backer plates, bars, or other similar welding accessories may be used to make the welds as needed depending on the configuration and dimensions of the welds used. The invention is not limited by the type of weld.

In one embodiment, the outer and inner liners 6060, 6061 are sealably attached to the spent fuel pool 6040 only at top embedment plate 6070. The remaining portions of the liners below the embedment plate may be in abutting contact with the sidewalls 6041 and base slab 6042 without means for fixing the liners to these portions.

It bears noting that at least the inner liner 6061 has a height which preferably is higher than the anticipated highest water level (surface S) of the pool water W in one embodiment. If the water level happens to exceed that for some reason, the top embedment plate 6070 will be wetted directly by the pool water and contain the fluid to prevent overflowing the pool onto the operating deck 6022.

Figure 63:
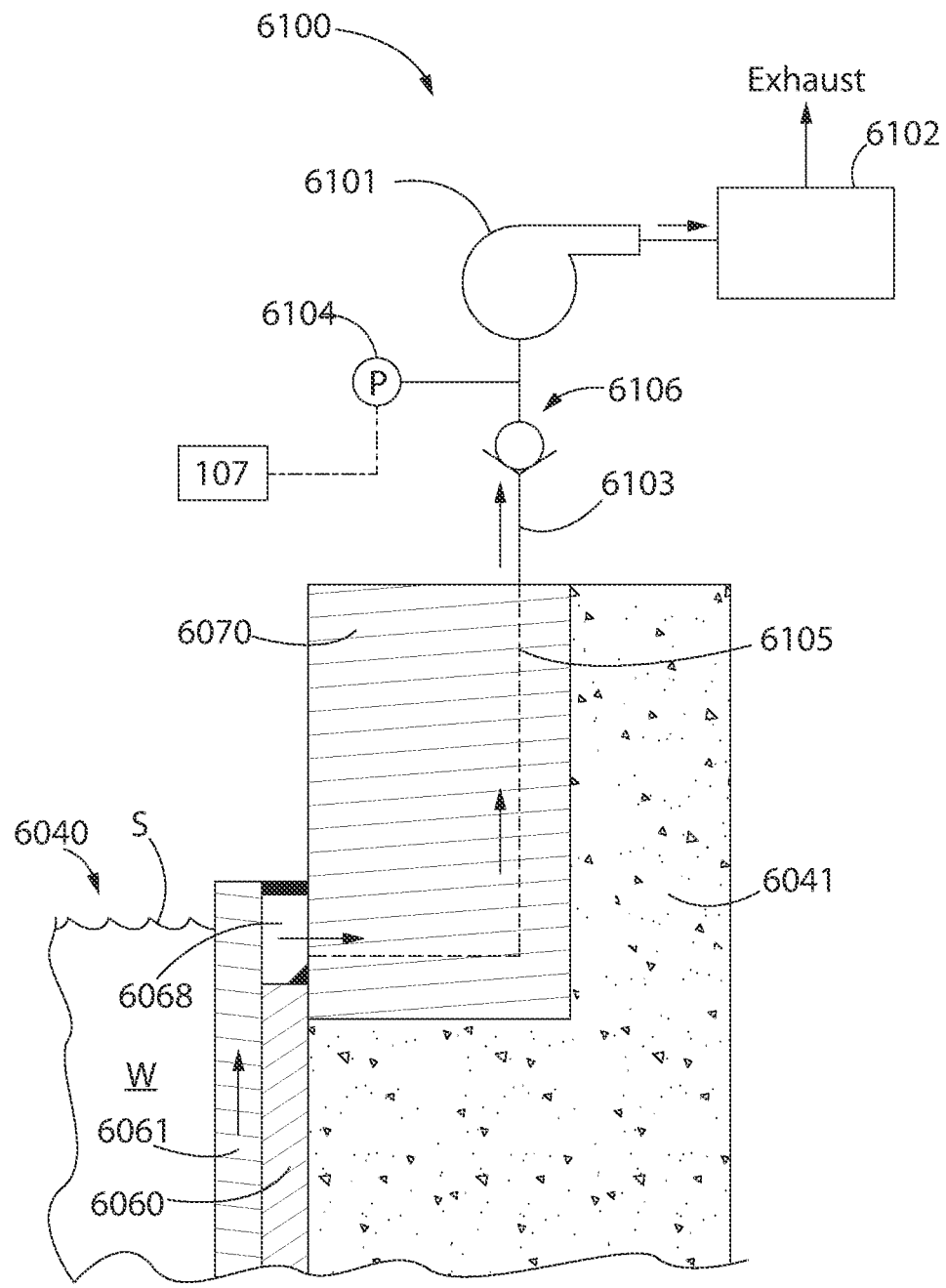
FIG. 63 is a schematic diagram of a vacuum leakage collection and monitoring system according to the present disclosure.

According to another aspect of the invention, a vapor extraction or vacuum system 6100 is provided that is used to draw down the air pressure in the interstitial space between the outer and inner liners 6060, 6061 to a relatively high state of vacuum for leakage control and/or detection. FIG. 63 is a schematic diagram of one embodiment of a vacuum system 6100.

Referring to FIGS. 61 and 63, vacuum system 6100 generally includes a vacuum pump 6101 and a charcoal filter 6102. Vacuum pump 6101 may be any suitable commercially-available electric-driven vacuum pump capable of creating a vacuum or negative pressure within the interstitial space 6062 between the pool liners 6060 and 6061. The vacuum pump 6101 is fluidly connected to the interstitial space 6068 via a suitable flow conduit 6103 which is fluidly coupled to a telltale or flow passageway 6105 extending from the top surface 6071 of the top embedment plate 6070 to the top flow plenum 6068 formed between the pool liners 6060 and 6061. Flow conduit 6103 may be formed of any suitable metallic or non-metallic tubing or piping capable of withstanding a vacuum. A suitably-configured fluid coupling 6104 may be provided and sealed to the outlet end of the flow passageway 6105 for connecting the flow conduit 6103. The inlet end of the flow passageway penetrates the inner vertical side of top embedment plate 6070 within the flow plenum 6068. The flow passageway 6105 and external flow conduit 6103 provides a contiguous flow conduit that fluidly couples the flow plenum 6068 to the vacuum pump 6101. A one-way check valve is disposed between the flow plenum 6105 and the suction inlet of the vacuum pump 6101 to permit air and/or vapor to flow in a single direction from the liner system to the pump.

The absolute pressure maintained by the vacuum system 6100 in the interstitial space 6062 between the liners 6060, 6061 (i.e. "set pressure") preferably should be such that the bulk water temperature of the spent fuel pool 6040 which is heated by waste decay heat generated from the fuel rods/assemblies is above the boiling temperature of water at the set pressure. The table below provides the boiling temperature of water at the level of vacuum in inches of mercury (Hg) which represent some examples of set pressures that may be used.

| Pressure in inch, HgA | Boiling Temp, deg F. |
|---|---|
| 1 | 79 |
| 2 | 101 |
| 3 | 115 |
| 4 | 125 |
| 5 | 133 |

Any significant rise in pressure would indicate potential leakage of water in the interstitial space 6062 between the liners 6060, 6061. Because of sub-atmospheric conditions maintained by the vacuum pump 6101 in the interstitial space, any water that may leak from the pool into this space through the inner liner 6061 would evaporate, causing the pressure to rise which may be monitored and detected by a pressure sensor 6104. The vacuum pump 6101 preferably should be set to run and drive down the pressure in the interstitial space 6062 to the "set pressure."

In operation as one non-limiting example, if the vacuum pump 6101 is operated to create a negative pressure (vacuum) in the interstitial space 6062 of 2 inches of Hg, the corresponding boiling point of water at that negative pressure is 101 degrees Fahrenheit (degrees F.) from the above Table. If the bulk water temperature of pool water W in the spent fuel pool 6040 were at any temperature above 101 degrees F. and leakage occurred through the inner pool liner 6061 into the interstitial space 6062, the liquid leakage would immediately evaporate therein creating steam or vapor. The vacuum pump 6101 withdraws the vapor through the flow plenum 6068, flow passageway 6105 in the top embedment plate 6070, and flow conduit 6103 (see, e.g. directional flow arrows of the water vapor in FIGS. 61 and 63). Pressure sensor 6104 disposed on the suction side of the pump 6101 would detect a corresponding rise in pressure indicative of a potential leak in the liner system. In some embodiments, the pressure sensor 6104 may be operably linked to a control panel of a properly configured computer processor based plant monitoring system 6107 which monitors and detects the pressure measured in the interstitial space 6062 between the liners on a continuous or intermittent basis to alert operators of a potential pool leakage condition. Such plant monitoring systems are well known in the art without further elaboration.

The extracted vapor in the exhaust or discharge from the vacuum pump 6101 is routed through a suitable filtration device 6102 such as a charcoal filter or other type of filter media before discharge to the atmosphere, thereby preventing release of any particulate contaminants to the environment.

Advantageously, it bears noting that if leakage is detected from the spent fuel pool 6040 via the vacuum system 6100, the second outer liner 6060 encapsulating the fuel pool provides a secondary barrier and line of defense to prevent direct leaking of pool water W into the environment.

It bears noting that there is no limit to the number of vapor extraction systems including a telltale passageway, vacuum pump, and filter combination with leakage monitoring/detection capabilities that may be provided. In some instances, four independent systems may provide adequate redundancy. In addition, it is also recognized that a third or even fourth layer of liner may be added to increase the number of barriers against leakage of pool water to the environment. A third layer in some instances may be used as a palliative measure if the leak tightness of the first interliner space could not, for whatever reason, be demonstrated by a high fidelity examination in the field such as helium spectroscopy.

VII. Inventive Concept 7

With reference to FIGS. 64-73, a seventh inventive concept will be described.

Figure 64:
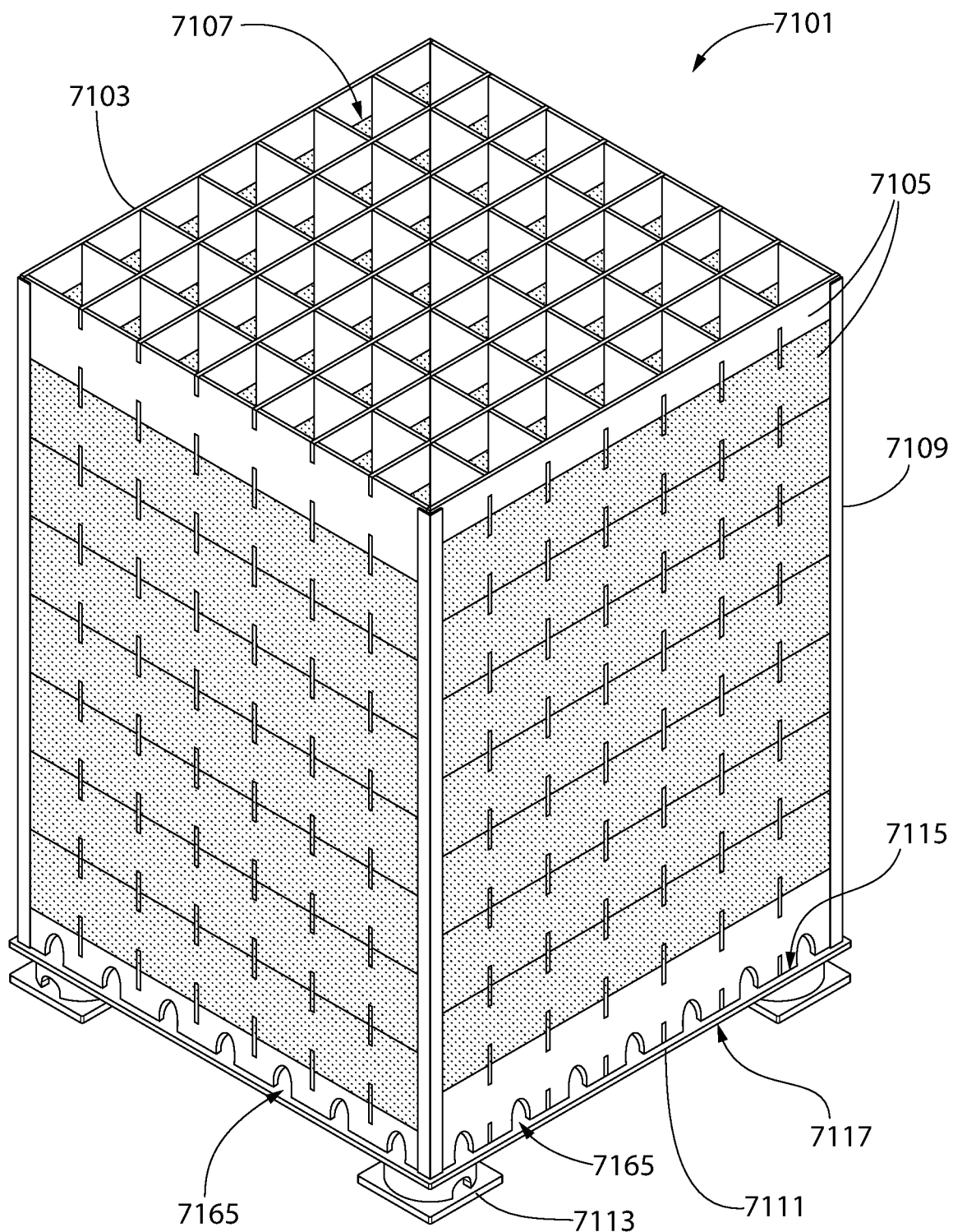
FIG. 64 is a perspective view of a first fuel rack for nuclear fuel assemblies.

Referring to FIG. 64, a fuel rack 7101 including an array of cells 7103 is shown. The array of cells 7103 is formed by slotted plates 7105 arranged in interlocking arrangement. In the embodiment shown, each storage cell 7107 in the array of cells 7103 has a square profile in plan view, with all the cells having the same dimensions. However, in certain embodiments, each storage cell 7107 in the array of cells 7103 may have an alternative profile shape, including a rectangular profile shape and a hexagonal profile shape, among others. In certain embodiments, the storage cells 7107 in the array of cells 7103 may vary in size. The fuel rack 7101 also includes tie members 7109 affixed to the array of cells 7103 to extend along the external surface of the array of cells 7103. The tie members extend substantially the entire height of the array of cells 7103 to provide vertical stiffness to the interlocking slotted plates 7105. In certain embodiments, the tie members 7109 may be located within the storage cells 7107 and affixed to the array of cells 7103. In still other embodiments, smaller coupling elements may be used which couple adjacent ones of the slotted plates 7105 together instead of the tie members 7109. The fuel rack 7101 also includes a base plate 7111, and the array of cells 7103 is connected to a top surface 7115 of the base plate 7111.

Support pedestals 7113 are coupled to the bottom surface 7117 of the base plate 7111. The support pedestals 7113 provide space underneath the base plate 7111 for the circulation of fluid up and through the array of cells 7103.

Figure 65:
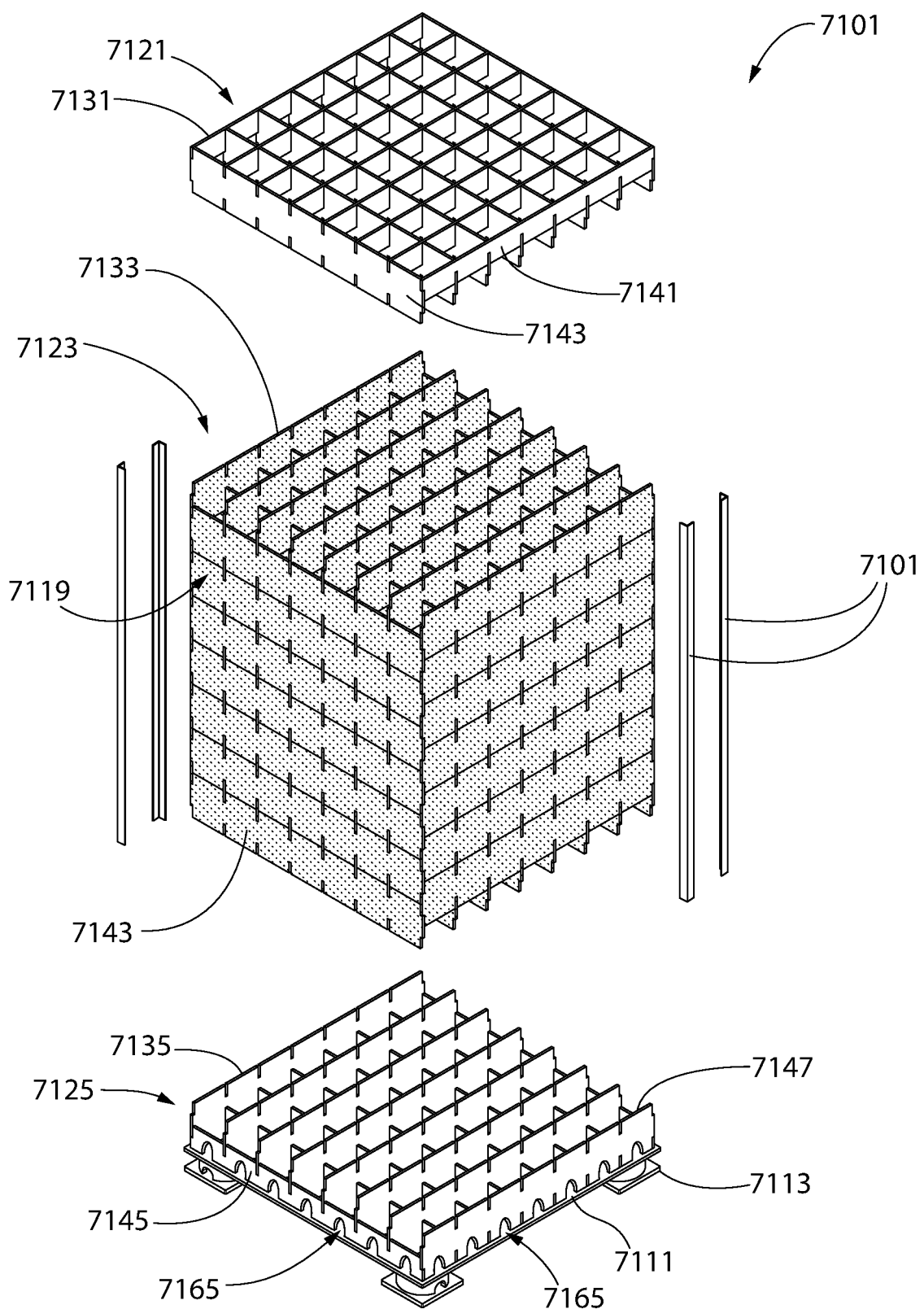
FIG. 65 is a partial exploded view of the fuel rack of FIG. 64.
Figure 67A:
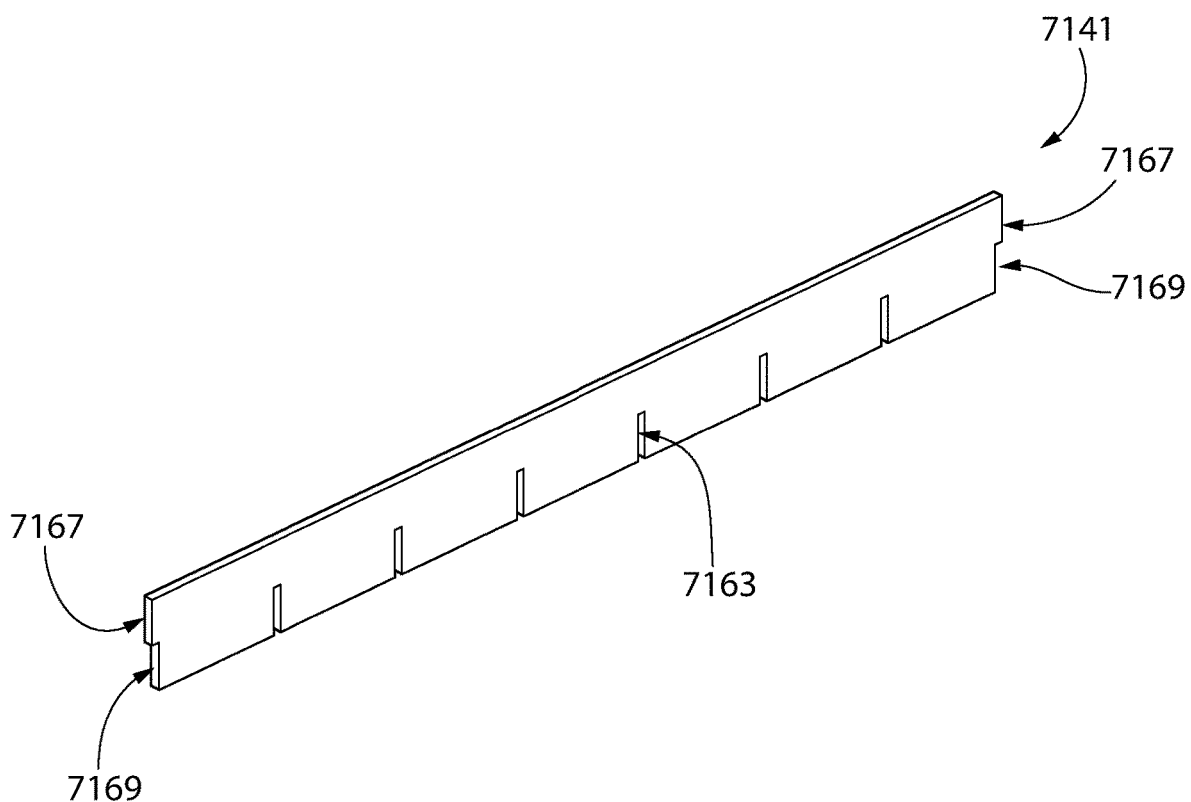
FIG. 67A-D are slotted plates for the fuel rack of FIG. 64.
Figure 67B:
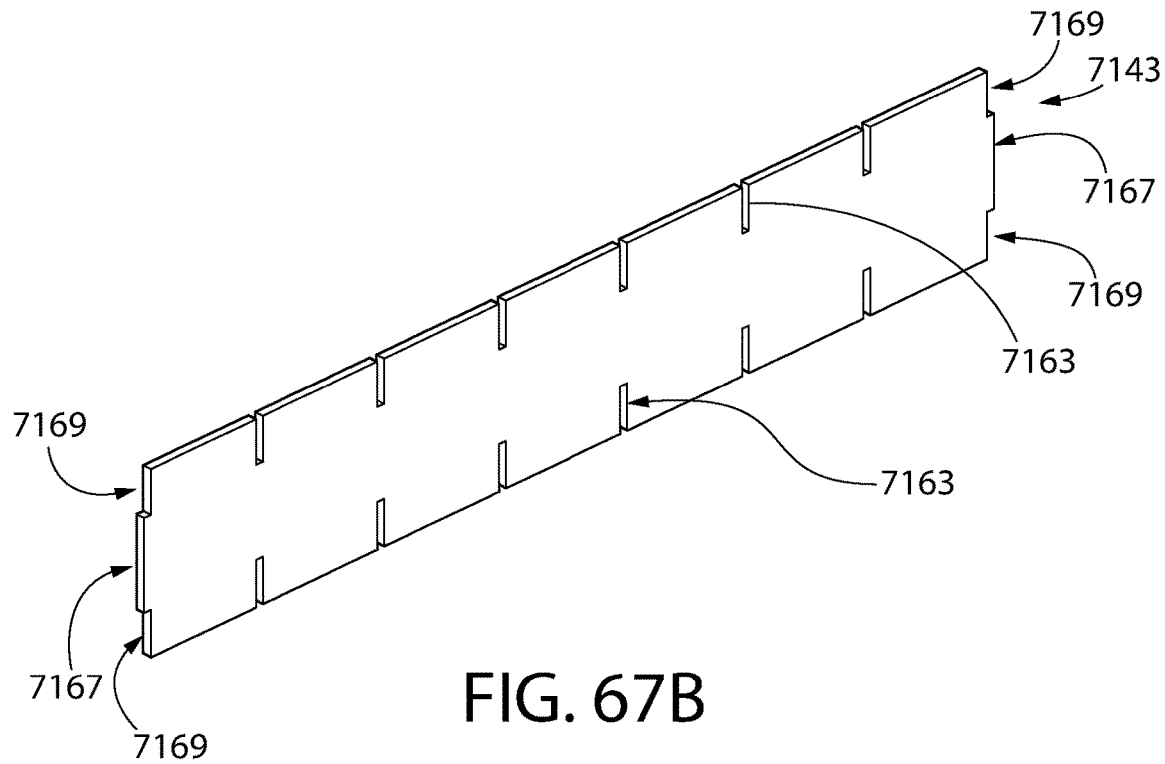
Figure 67C:
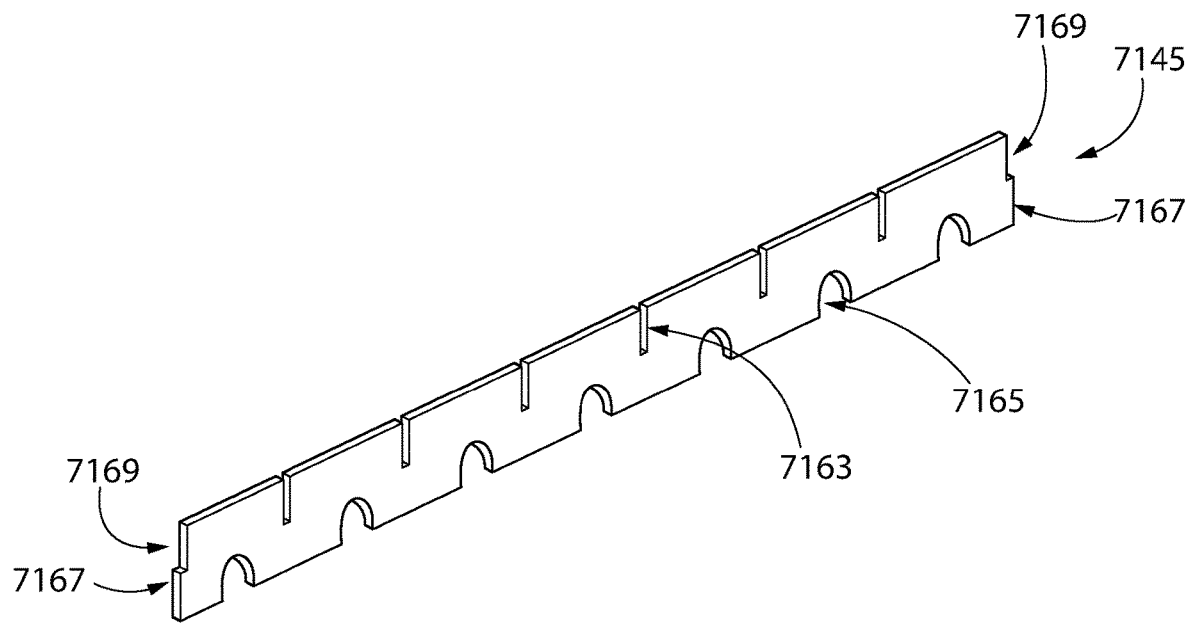
Figure 67D:
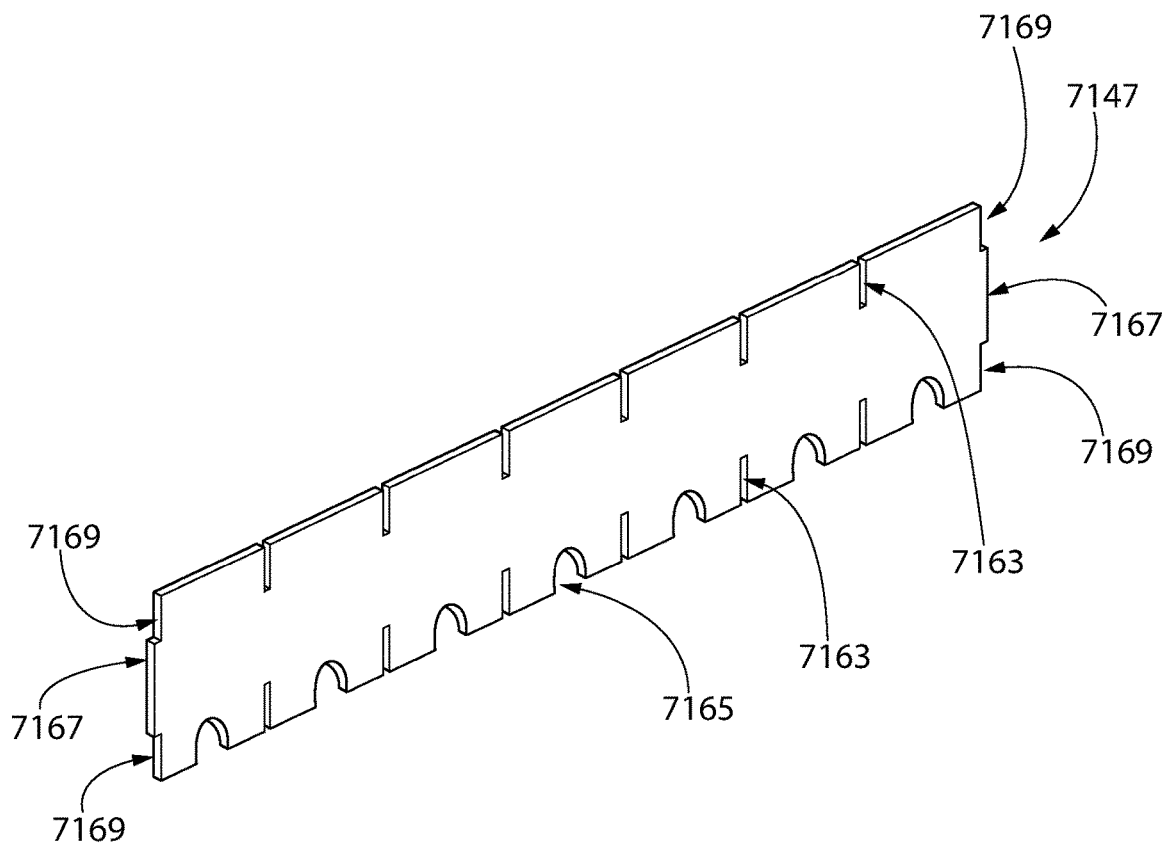

An exploded version of the fuel rack 7101 is shown in FIG. 65. The array of cells 7103 is shown separated into a top portion 7121, a middle portion 7123, and a bottom portion 7125. The entire array of cells 7103 may be formed out of four different types of slotted plates. A plurality of first slotted plates 7131 are slidably interlocked with one another to form the top portion 7121 of the array of cells 7103; a plurality of second slotted plates 7133 are slidably interlocked with one another to form the middle portion 7123 of the array of cells 7103; and a plurality of third slotted plates 7135 are slidably interlocked with one another to form the top portion 7125 of the array of cells 7103. Each of the plurality of first, second, and third slotted plates 7131, 7133, 7135 include one or more of the types of slotted plates shown in FIGS. 67A-D. As shown, in the top portion 7121, the plurality of first slotted plates 7131 includes a plurality of top slotted plates 7141 (FIG. 67A) and a plurality of middle slotted plates 7143 (FIG. 67B); in the middle portion 7123, the plurality of second slotted plates 7133 includes a plurality of the middle slotted plates 7143 (FIG. 67B); and in the bottom portion 7125, the plurality of third slotted plates 7135 includes a plurality of bottom half slotted plates 7145 (FIG. 67C) and a plurality of bottom full slotted plates 7147 (FIG. 67D).

The plurality of first slotted plates 7131 and the plurality of third slotted plates 7135 are constructed from a first material, and the plurality of second slotted plates 7133 are constructed from a second material which is metallurgically incompatible with the first material. As used herein, the term "metallurgically incompatible" means that the two materials are not compatible to the extent that they cannot be joined by a weld. The inability to join two materials by a weld arises from the state of the art of welding, in which no weld material and/or no technique are known to exist that could be used to weld the two materials together. In certain embodiments, the first material may be stainless steel and the second material may be a metal matrix composite material. The metal matrix composite material may be, in certain embodiments, an aluminum/boron carbide metal matrix composite material, an non-limiting example of which is a boron impregnated aluminum. One such suitable material for the metal matrix composite material is sold under the tradename Metamic®. The tie members 7109, the base plate 7111, and the pedestals 7113, in certain embodiments, are also formed from the first material.

The plurality of first slotted plates 7131 of the top portion 7121 are welded together along adjacent edges. Welding the plurality of first slotted plates 7131 provides overall structure to the top portion 7121 of the array of cells 7103. The plurality of third slotted plates 7135 of the bottom portion 7125 are coupled to the base plate 7111. In certain embodiments, the plurality of third slotted plates 7135 may be welded to the base plate 7111. By welding the plurality of third slotted plates 7135 to the base plate 7111, the base plate 7111 is provided with additional flexural strength, which may be needed when the storage rack 7101 is loaded with fuel assemblies. In certain embodiments, the plurality of third slotted plates 7135 may also be welded together along adjacent edges. Conventional welding materials and processes may be used for these welds when the first material is stainless steel.

The plurality of second slotted plates 7133 may be welded together at intersecting slots, insofar as a welding process is known for the second material. When the second material is one such as Metamic®, welding may be performed as taught in WO2014106044, published Jul. 3, 2014 and entitled "Joining process for neutron absorbing materials."

The tie members 7109 extend along an external surface 7119 of the array of cells 7103 and are affixed to the top portion 7121 and the bottom portion 7125 of the array of cells 7103. Particularly, the tie members 7109 are affixed to one or more of the plurality of first slotted plates 7131 and to one or more of the plurality of first slotted plates 7135 that are outward-facing. The tie members 7109 may be affixed to the top portion 7121 and the bottom portion 7125 by welding. The tie members 7109 therefore need not be directly affixed to any of the plurality of second slotted plates 7133 in the middle portion 7123 of the array of cells 7103 to stabilize the entire array of cells 7103. In certain embodiments, fasteners such as screws and/or brackets may couple the tie members 7109 to the top portion 7121 and/or the bottom portion 7125 of the array of cells 7103.

The tie members 7109 serve to provide vertical stiffness to the array of cells 7103. As indicated above, because the second plurality of slotted plates 7133 is made from a second material that is metallurgically incompatible with the first material of the first and third plurality of slotted plates 7131, 7135, the middle portion 7123 cannot be welded to the top or bottom portions 7121, 7125 of the array of cells 7103. Thus, by using the tie members 7109 to tie the top and bottom portions 7121, 7125 of the array of cells 7103 together, the second plurality of slotted plates 7133 in the middle portion 7123 of the array of cells 7103 may be securely held in place, and additional stiffness is thereby provided to the entire array of cells 7103 and to the fuel rack 7101 itself.

As shown, the tie members 7109 are affixed to corners of the array of cells 7103, and only four tie members 7109 are shown in the depicted embodiment. In certain embodiments, the tie members 7109 may be affixed at different locations on the array of cells 7103. And in certain embodiments, more or fewer tie members 7109 may be used.

Figure 66:
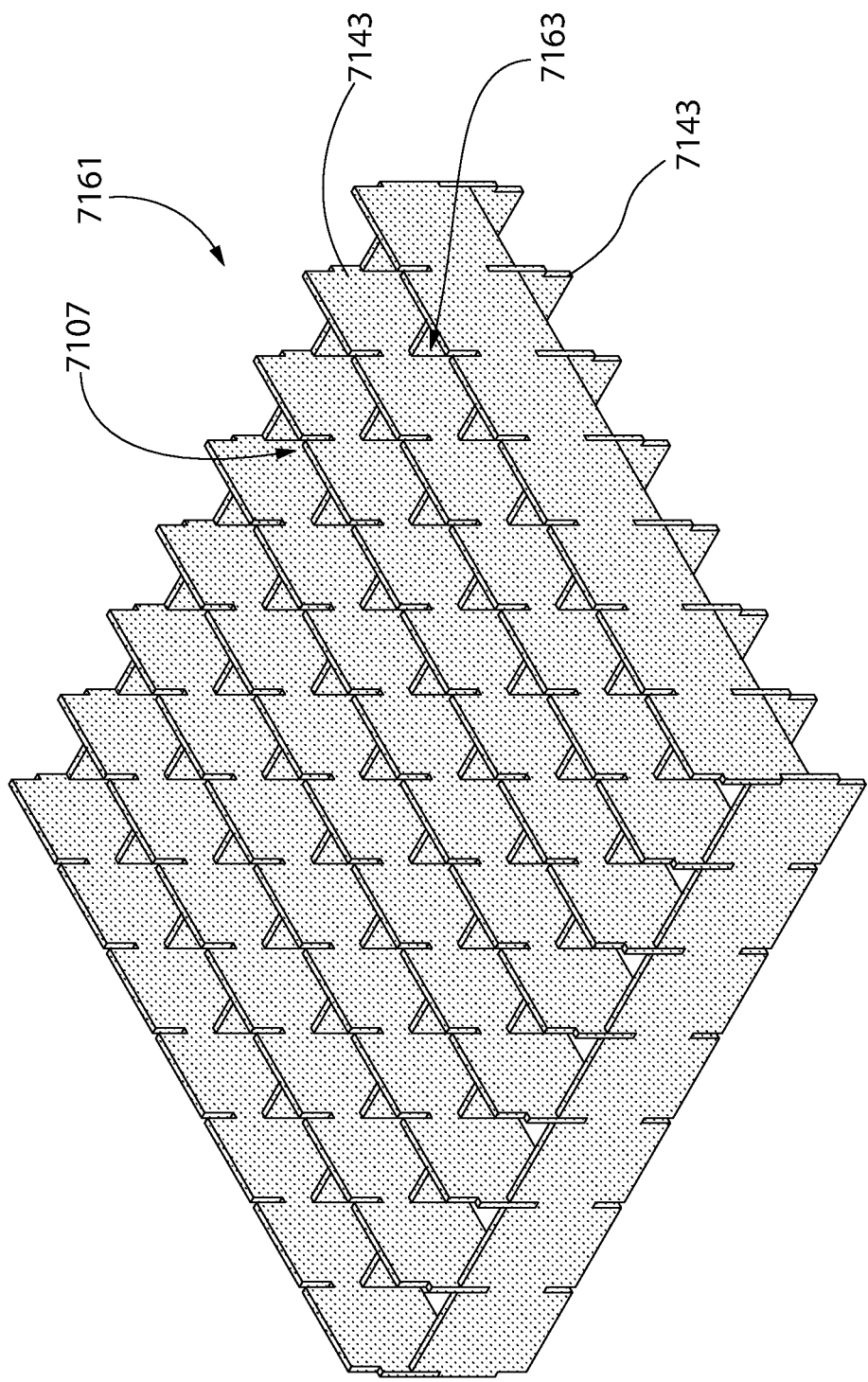
FIG. 66 is a perspective view of interlocked slotted plates for the fuel rack of FIG. 64.

A middle segment 7161 of the middle portion 7123 of the array of cells 7103 is shown in FIG. 66. Each middle segment 7161 of the array of cells 7103 comprises a gridwork of the middle slotted plates 7143 arranged in a rectilinear configuration so as to form a vertical portion of the storage cells 7107. In creating the middle segment 7161, a first middle slotted plate 7143 is arranged vertically. A second middle slotted plate 7143 is then arranged above and at a generally 90 degree angle to the first middle slotted plate 7143 so that the corresponding slots 7163 of the two middle slotted plates 7143 are aligned. The second middle slotted plate 7143 is then lowered onto the first middle slotted plate 7143, thereby causing the slots 7163 to interlock as illustrated. This is repeated with all middle slotted plate 7143 until the desired rectilinear configuration is created, thereby creating the middle segment 7161.

The entire fuel rack body is formed out of three types of slotted plates, a top slotted plate 7141, a middle slotted plate 7143, a bottom half slotted plate 7145, and a bottom full slotted plate 7147, which are respectively shown in FIGS. 67A-D. The top slotted plate 7141 is formed as half of the middle slotted plate 7143. Similarly, the bottom half slotted plate 7145 is formed as half of the middle slotted plate 7143 with the cut outs 7165 added along the remaining slotted edge. The bottom full slotted plate 7147 is formed the same as the middle slotted plate 7143, but with the cut outs 7165 added along one slotted edge. The cut outs 7165 serve as auxiliary flow holes for facilitating thermosiphon flow into the storage cells 7107 as discussed above. The top slotted plate 7141 and the bottom half slotted plate 7145 are only used at the top and bottom, respectively, of the array of cells 7103 to cap the middle segments 7161 (FIG. 66) so that the array of cells 7103 has level top and bottom edges.

Each of the slotted plates 7141-7147 includes a plurality of slots 7163, end tabs 7167, and indentations 7169 adjacent the end tabs 7167, all of which are strategically arranged to facilitate sliding assembly to create the array of cells 7103. The slots 7163 are provided in one or both of the top and bottom edges of the plates 7141-7147. The slots 7163 included on the top edges of the plates 7141-7147 are aligned with the slots 7163 included on the bottom edges of that same plate 7141-7147. The slots 7163 extend through the plates 7141-7147 for about one-fourth of the height of the plates 7141-7147. The end tabs 7167 extend from lateral edges of the plates 7141-7147 and are about one-half of the height of the plates 7141-7147. The end tabs 7167 slidably mate with the indentations 7169 in the lateral edges of adjacent plates 7141-7147 that naturally result from the existence of the tabs 7167.

By way of example, in creating a middle segment 7161 of the array of cells 7103, the slots 7163 and end tabs 7167 of the middle segment 7161 interlock with adjacent middle segments 7161 so as to prohibit relative horizontal and rotational movement between the adjacent middle segments 7161. The middle segments 7161 intersect and interlock with one another to form a stacked assembly that is the array of cells 7103. The array of cells 7103 may include any number of the middle segments 7161, with the height of the middle segments 7161 in the middle portion 7123 of the array of cells 7103 being constructed so that the fuel storage section of a fuel assembly may be entirely located within the middle portion 7123 of the array of cells 7103.

The entire array of cells 7103 may thus be formed of slotted plates 7141-7147 having base configuration, which is the configuration of the middle slotted plate 7143, with the top slotted plate 7141, the bottom half slotted plate 7145, and the bottom full slotted plate 7147 being formed by additional minor modifications of the base configuration.

Figure 68:
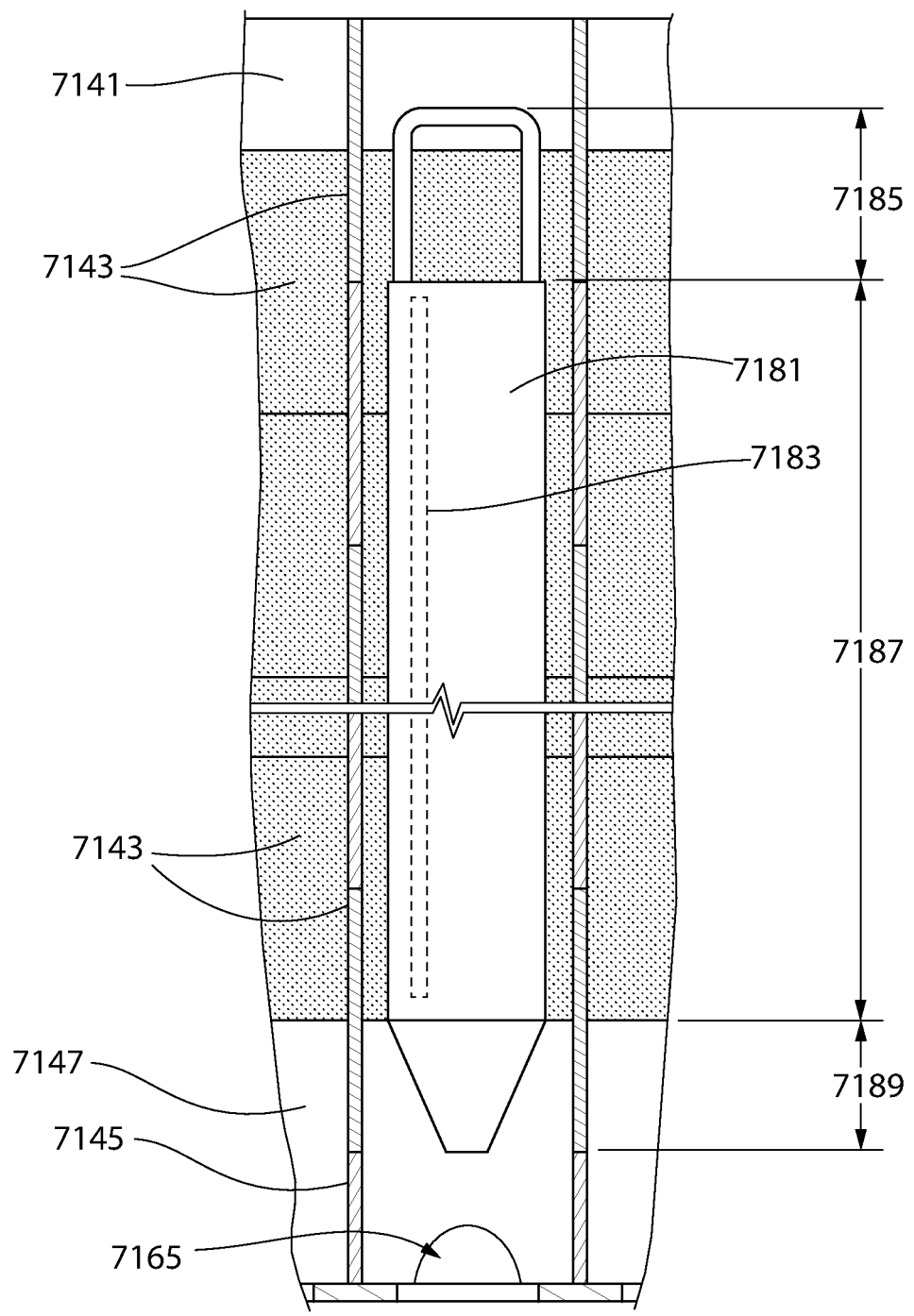
FIG. 68 is a profile of a fuel assembly used for nuclear fuel storage.

The profile of a fuel assembly 7181, used for the storage of nuclear fuel 7183, is shown in FIG. 68 positioned within a storage cell 7107 of the array of cells 7103. The fuel assembly 7181 includes a top section 7185, a middle section 7187, and a bottom section 7189. The nuclear fuel 7183 is only stored within the middle section 7187 of the fuel assembly 7181. The top and bottom sections 7185, 7189 do not have any nuclear fuel storage capabilities, and thus no nuclear fuel is stored within the top or bottom sections 7185, 7189. As shown, the middle section 7187 of the fuel assembly 7181 is stored entirely within the middle portion 7123 of the storage cell 7107. Thus, the middle section 7187 and the nuclear fuel 7183 are entirely surrounded on 4 sides with the neutron absorbing material from which the slotted plates 7143 of the middle portion 7123 are constructed.

Figure 69:
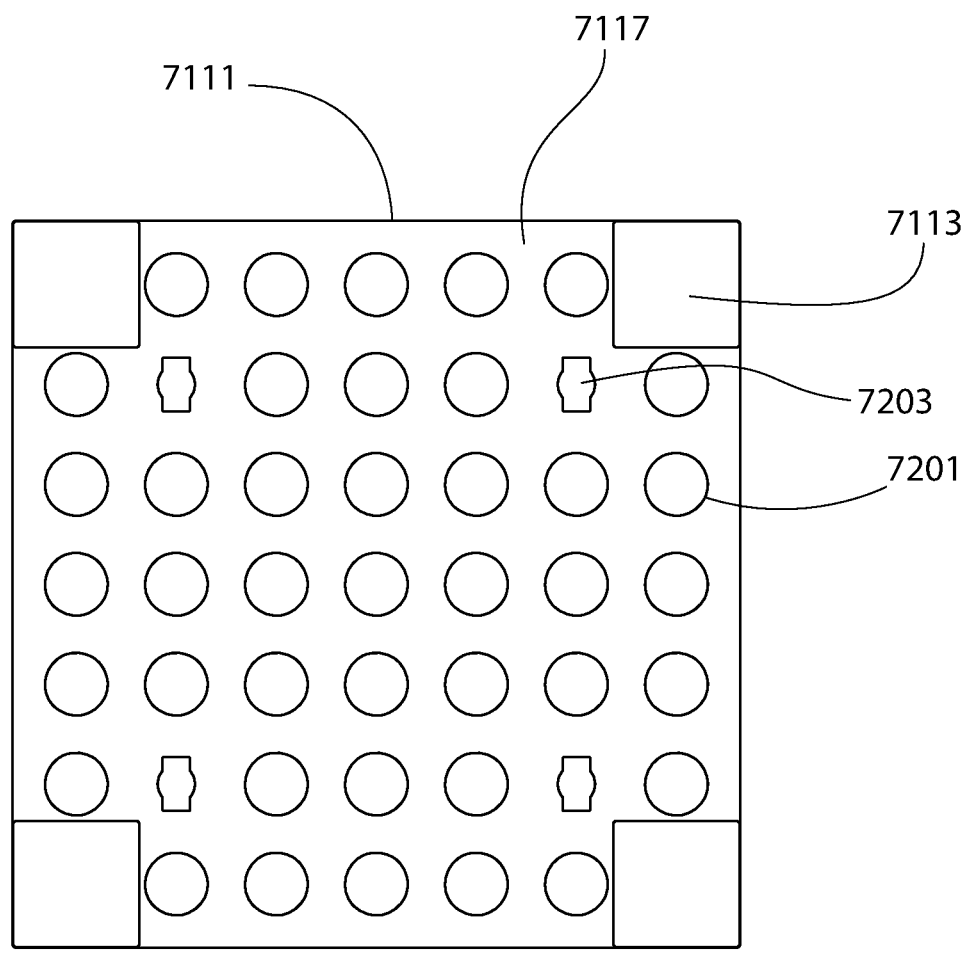
FIG. 69 is a bottom plan view of the fuel rack of FIG. 64.

The base plate 7111, which is shown in FIG. 69, includes a plurality of flow holes 7201 extending through the base plate 7111 from the bottom surface 7117 to the top surface 7115. The base plate 7111 also includes four oblong holes 7203 (second row in from the corners) for lifting and installing the fuel rack 7101 within the storage pool. Typically, a special lifting beam with four long reach rods is used to interact with the oblong holes 7203 to grapple the fuel rack 7101 for transfer into or out of, or movement within, the storage pool.

The flow holes 7201 (and oblong holes 7203) create passageways from below the base plate 7111 into the bottom ends of the storage cells 7107. As shown, a single flow hole 7201 is provided for each storage cell 7107. In certain embodiments, multiple flow holes 7201 may be provided for each storage cell 7107 to provide cooling fluid to the storage cell 7107. The flow holes 7201 serve as fluid inlets to facilitate natural thermosiphon flow of pool water through the storage cells 7107 when fuel assemblies having a heat load are positioned therein. More specifically, when heated fuel assemblies are positioned in the storage cells 7107 in a submerged environment, the water within the storage cells 7107 surrounding the fuel assemblies becomes heated, thereby rising due to increased buoyancy. As this heated water rises and exits the storage cells 7107 via their open top ends, cool water is drawn into the bottom of the storage cells 7107 via the flow holes 7201. This heat induced water flow along the fuel assemblies then continues naturally.

Figure 70:
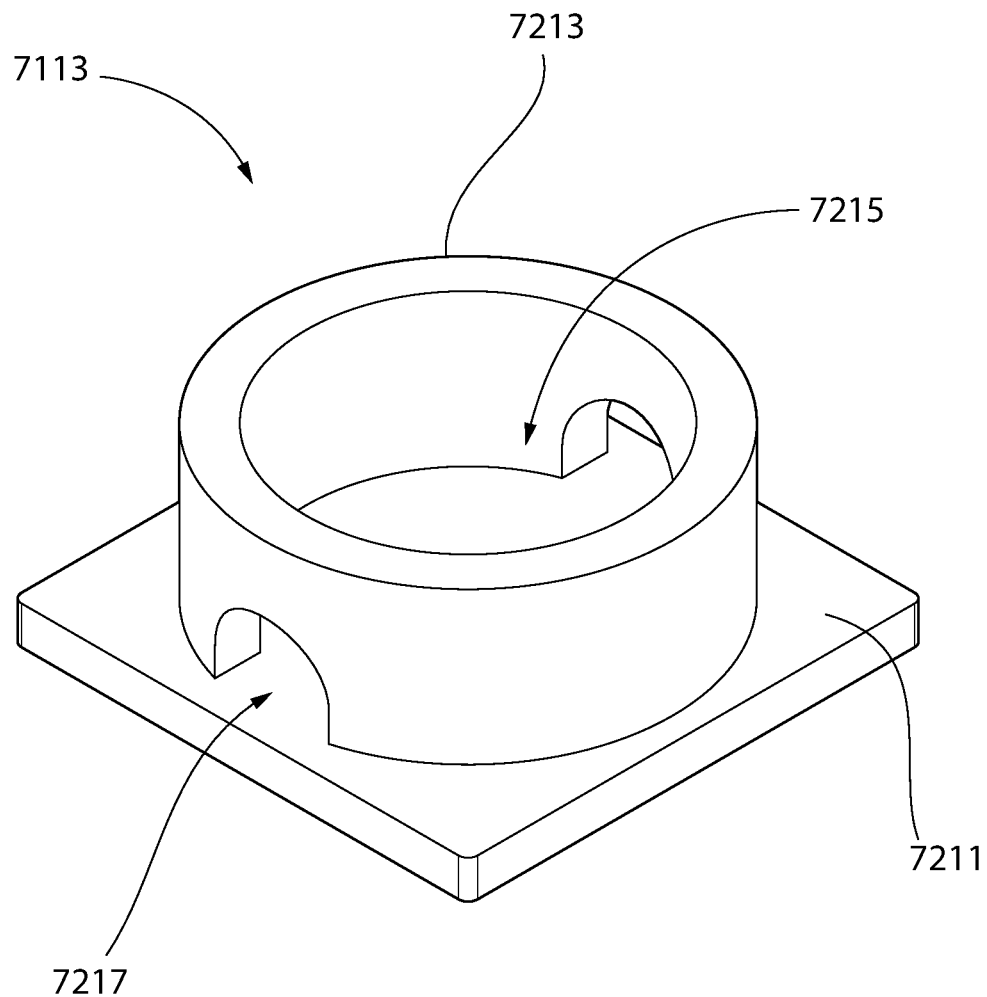
FIG. 70 is a perspective view of a support pedestal of the fuel rack of FIG. 64.

A support pedestal 7113 for the fuel rack 7101 is shown in FIG. 70. The support pedestals 7113 affixed to the bottom surface 7115 of the base plate 7111 ensure that a space exists between a floor of a storage pool and the bottom surface 7115 of the base plate 7111, thereby creating an inlet plenum for water to flow through the flow holes 7201. The support pedestal 7113 includes a base portion 7211 and a riser portion 7213 formed about an interior flow space 7215. The riser portion 7213 includes flow apertures 7217 through which water from the storage pool may pass from a space external to the support pedestal 7113 into the interior flow space 7215. Water passing into the interior flow space 7215 may then pass up through a flow hole 7201 in the base plate 7111 to enable the cooling process described above. Although the riser portion 7213 is depicted as being annular, in certain embodiments the riser portion 7213 may have any geometrical configuration which supports the base plate 7111 above the floor of the storage pool and permits water from the storage pool to flow into any flow holes 7201 in the base plate 7111 near which the support pedestal 7113 may be affixed.

Figure 71:
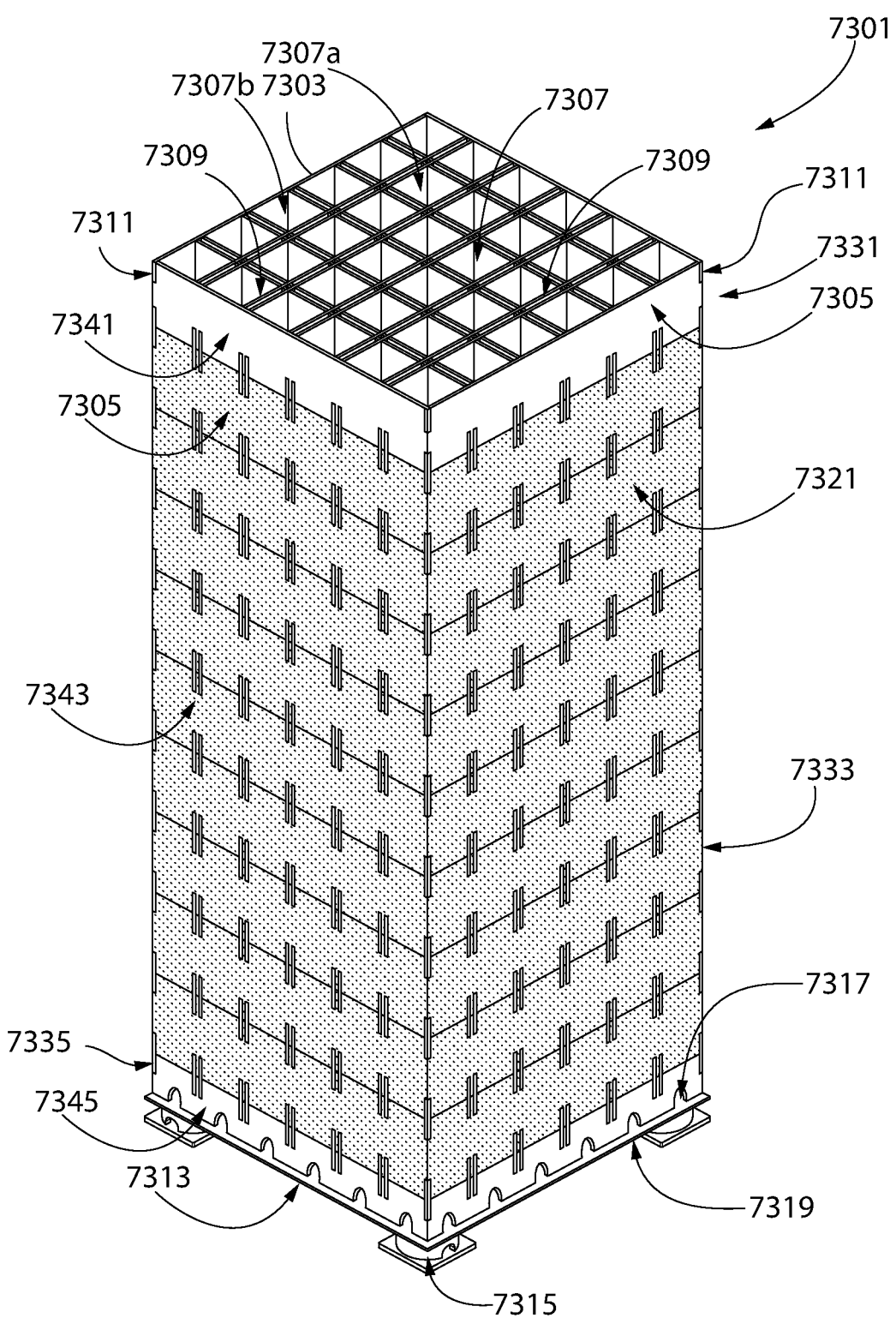
FIG. 71 is perspective view of a second fuel rack for nuclear fuel assemblies.

Another embodiment of a fuel rack 7301 including an array of cells 7303 is shown in FIG. 71. The array of cells 7303 is formed by slotted plates 7305 arranged in interlocking arrangement. In the embodiment shown, each storage cell 7307 in the array of cells 7303 has a square profile in plan view, with all the cells having the same dimensions. However, in certain embodiments, each storage cell 7307 in the array of cells 7303 may have an alternative profile shape, including a rectangular profile shape and a hexagonal profile shape, among others. In certain embodiments, the storage cells 7307 in the array of cells 7303 may vary in size. The slotted plates 7305 are also arranged so that flux traps 7309 are formed around the entire profile of each interior storage cell 7307*a*. The external walls of each exterior storage cell 7307*b* does not include flux traps.

The fuel rack 7301 also includes tie members 7311 affixed to the array of cells 7303 to extend along the external surface of the array of cells 7303. The tie members extend substantially the entire height of the array of cells 7303 to provide vertical stiffness to the interlocking slotted plates 7305. In certain embodiments, the tie members 7311 may be located within the storage cells 7307 and affixed to the array of cells 7303. In still other embodiments, smaller coupling elements may be used which couple adjacent ones of the slotted plates 7305 together instead of the tie members 7311. The fuel rack 7301 also includes a base plate 7313, and the array of cells 7303 is connected to a top surface 7317 of the base plate 7313.

Support pedestals 7315 are coupled to the bottom surface 7319 of the base plate 7313. The support pedestals 7315 provide space underneath the base plate 7313 for the circulation of fluid up and through the array of cells 7303.

Figure 73A:
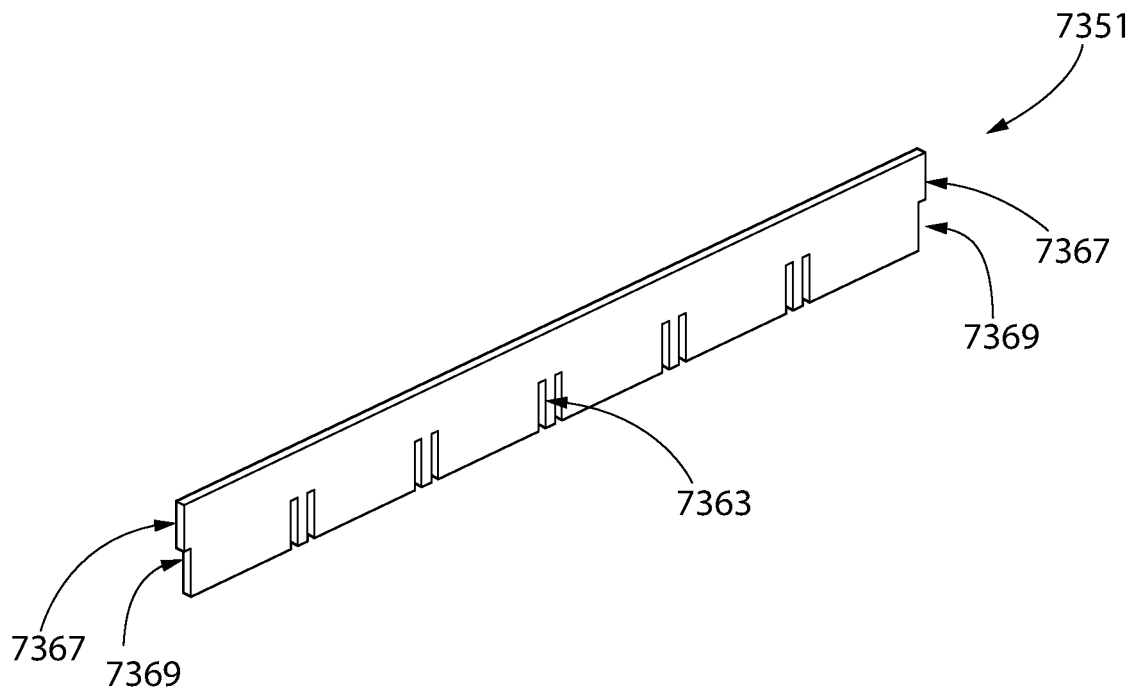
FIG. 73A-D are slotted plates for the fuel rack of FIG. 71.
Figure 73B:
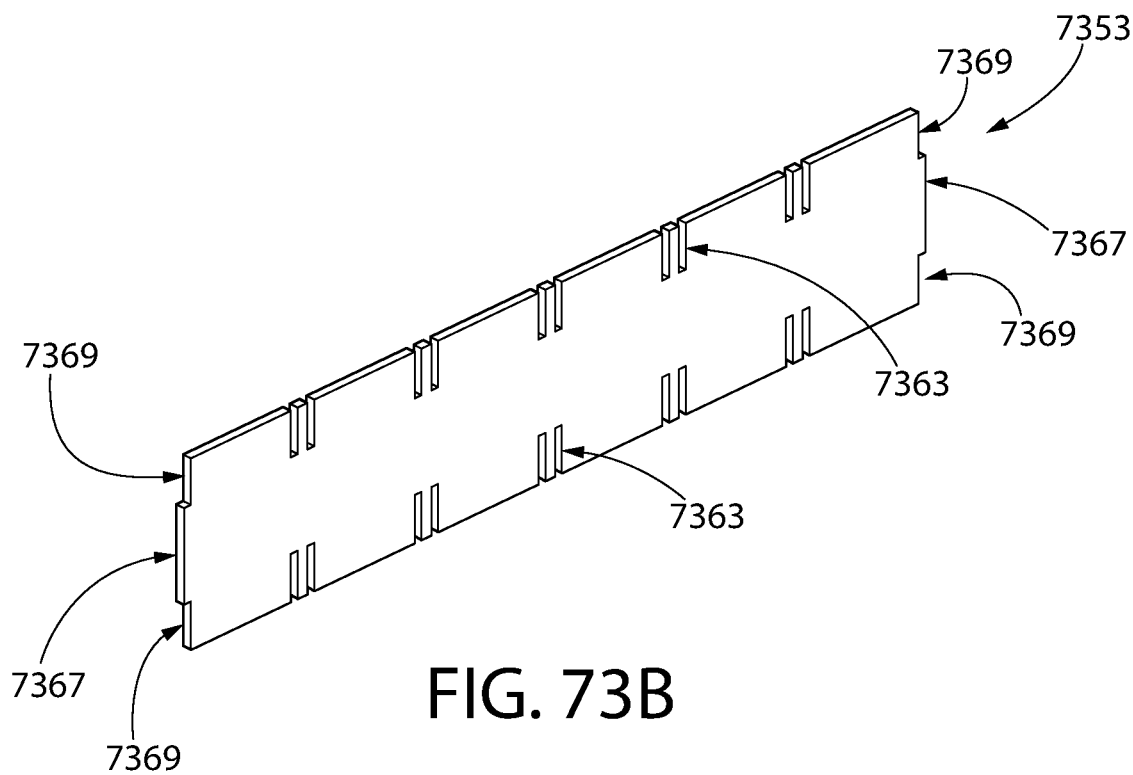
Figure 73C:
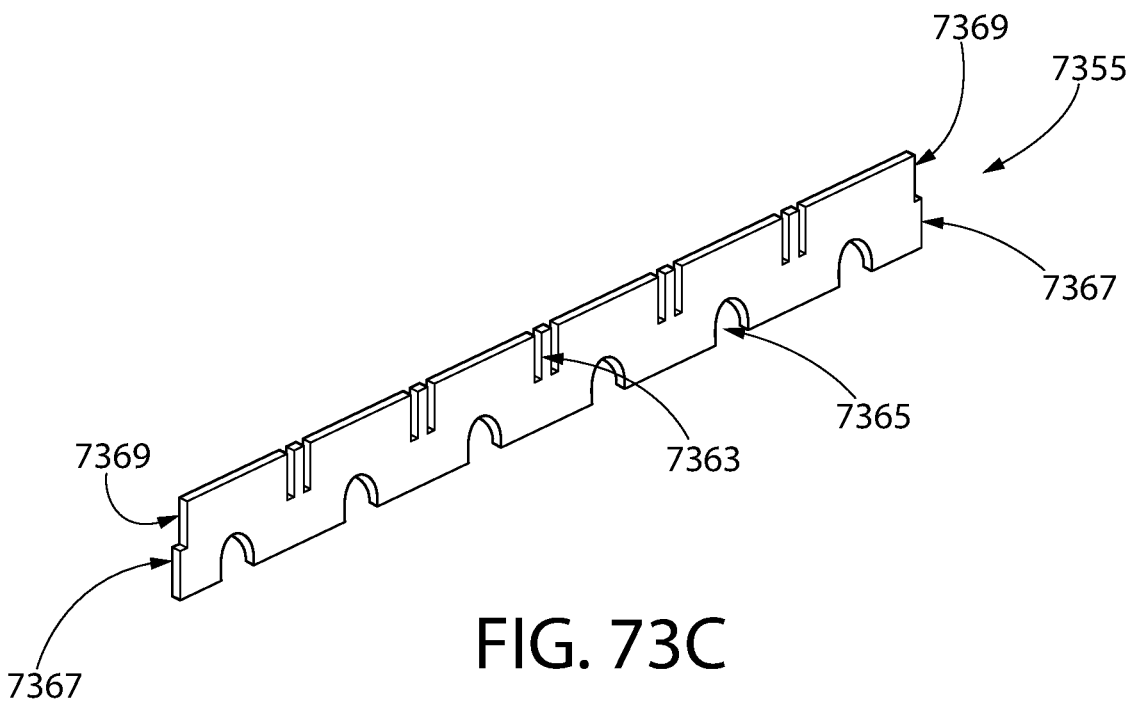
Figure 73D:
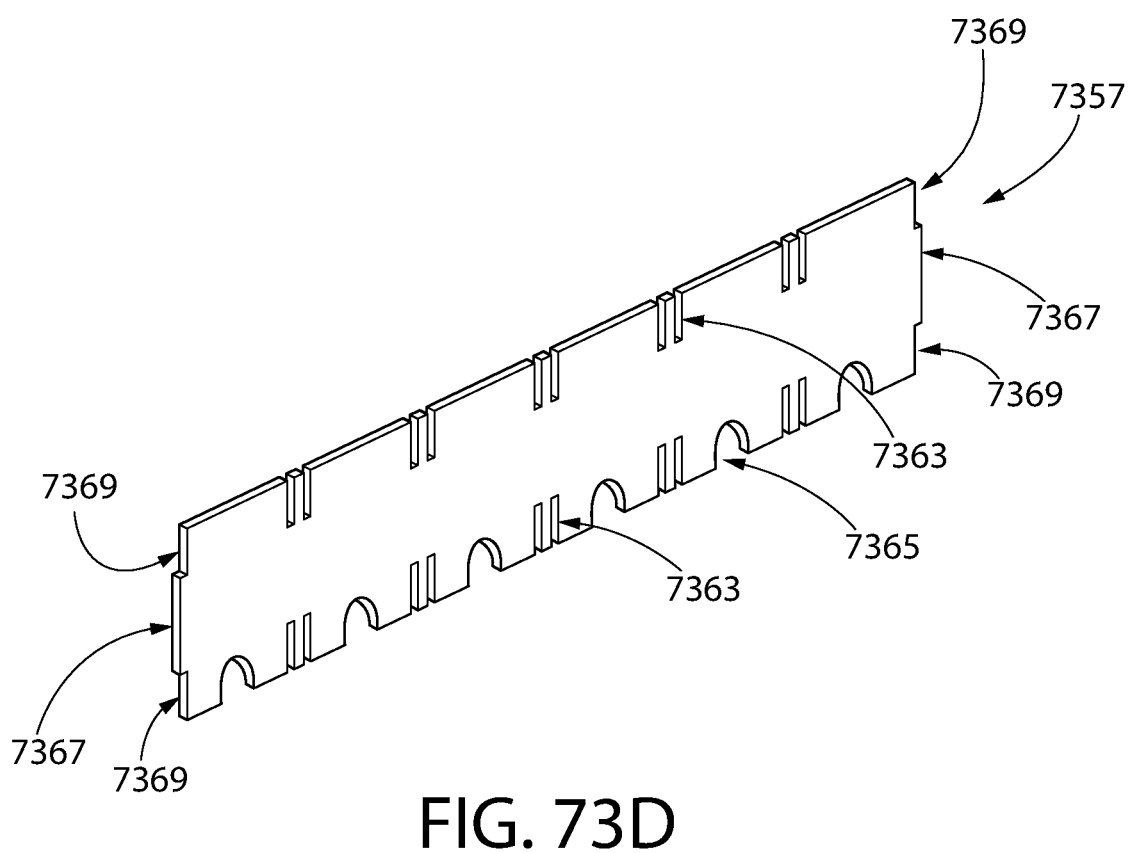
Figure 74:
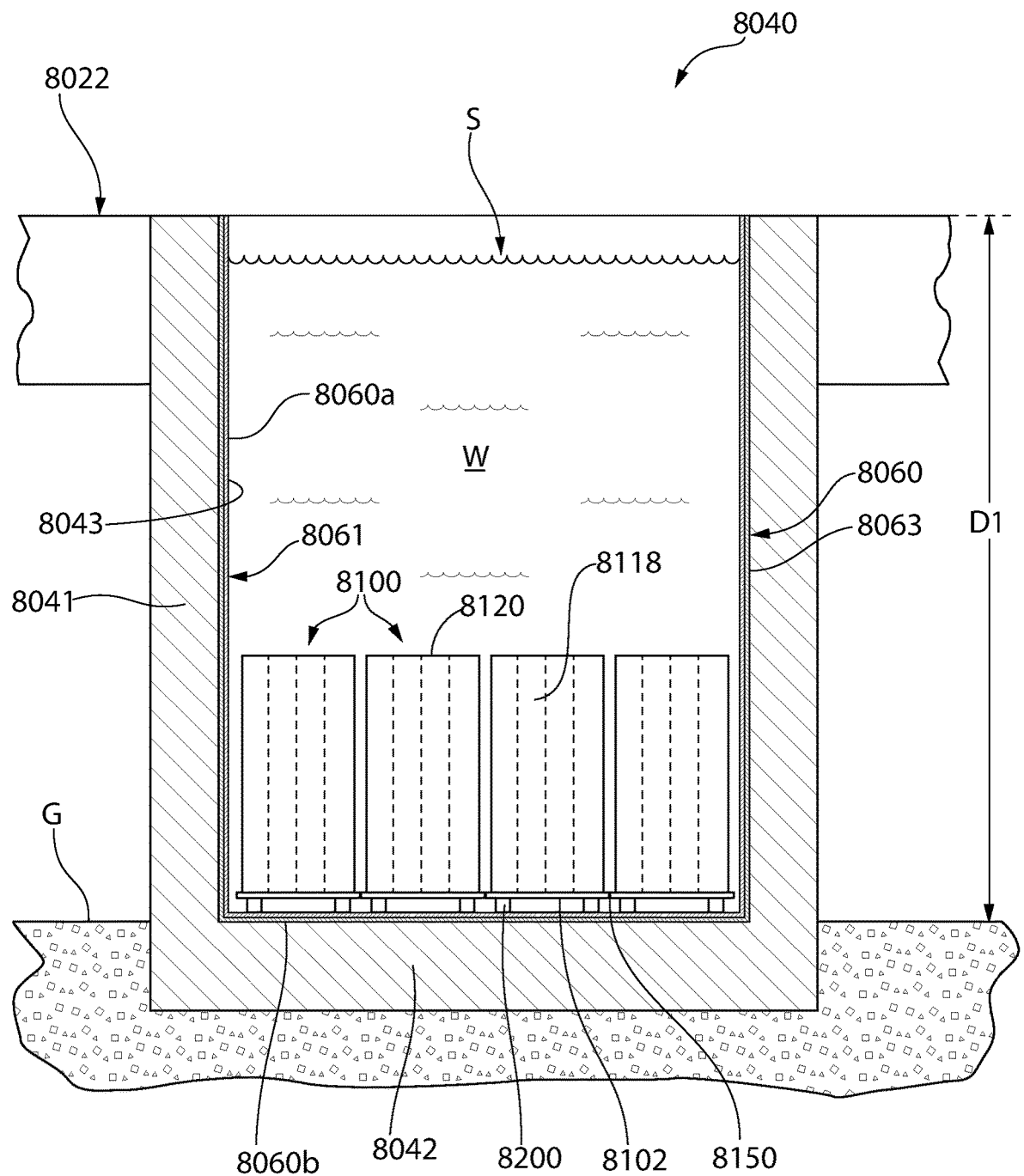
FIG. 74 is a side elevation view of a conventional nuclear fuel storage system including a fuel pool and fuel racks.

The array of cells 7303 is shown separated into a top portion 7331, a middle portion 7333, and a bottom portion 7335. The entire array of cells 7303 may be formed out of four different types of slotted plates. A plurality of first slotted plates 7341 are slidably interlocked with one another to form the top portion 7331 of the array of cells 7303; a plurality of second slotted plates 7343 are slidably interlocked with one another to form the middle portion 7333 of the array of cells 7303; and a plurality of third slotted plates 7345 are slidably interlocked with one another to form the top portion 7335 of the array of cells 7303. Each of the plurality of first, second, and third slotted plates 7341, 7343, 7345 include one or more of the types of slotted plates shown in FIGS. 73A-D. In the top portion 7331, the plurality of first slotted plates 7341 includes a plurality of top slotted plates 7351 (FIG. 73A) and a plurality of middle slotted plates 7353 (FIG. 73B); in the middle portion 7333, the plurality of second slotted plates 7343 includes a plurality of the middle slotted plates 7353 (FIG. 73B); and in the bottom portion 7335, the plurality of third slotted plates 7345 includes a plurality of bottom half slotted plates 7355 (FIG. 73C) and a plurality of bottom full slotted plates 7357 (FIG. 73D).

The plurality of first slotted plates 7341 and the plurality of third slotted plates 7345 are constructed from a first material, and the plurality of second slotted plates 7343 are constructed from a second material which is metallurgically incompatible with the first material. In certain embodiments, the first material may be stainless steel and the second material may be a metal matrix composite material. The metal matrix composite material may be, in certain embodiments, an aluminum/boron carbide metal matrix composite material, an non-limiting example of which is a boron impregnated aluminum, such as the metal matrix composite material sold under the tradename Metamic®. The tie members 7311, the base plate 7313, and the pedestals 7315, in certain embodiments, are also formed from the first material.

The plurality of first slotted plates 7341 of the top portion 7331 are welded together along adjacent edges. Welding the plurality of first slotted plates 7341 provides overall structure to the top portion 7331 of the array of cells 7303. The plurality of third slotted plates 7345 of the bottom portion 7335 are coupled to the base plate 7313. In certain embodiments, the plurality of third slotted plates 7345 may be welded to the base plate 7313. By welding the plurality of third slotted plates 7345 to the base plate 7313, the base plate 7313 is provided with additional flexural strength, which may be needed when the storage rack 7301 is loaded with fuel assemblies. In certain embodiments, the plurality of third slotted plates 7345 may also be welded together along adjacent edges. Conventional welding materials and processes may be used for these welds when the first material is stainless steel. The plurality of second slotted plates 7343 may be welded together at intersecting slots, insofar as a welding process is known for the second material.

The tie members 7311 extend along an external surface 7321 of the array of cells 7303 and are affixed to the top portion 7331 and the bottom portion 7335 of the array of cells 7303. Particularly, the tie members 7311 are affixed to one or more of the plurality of first slotted plates 7341 and to one or more of the plurality of first slotted plates 7345 that are outward-facing. The tie members 7311 may be affixed to the top portion 7331 and the bottom portion 7335 by welding. The tie members 7311 therefore need not be directly affixed to any of the plurality of second slotted plates 7343 in the middle portion 7333 of the array of cells 7303 to stabilize the entire array of cells 7303. In certain embodiments, fasteners such as screws and/or brackets may couple the tie members 7311 to the top portion 7331 and/or the bottom portion 7335 of the array of cells 7303.

As shown, the tie members 7311 are affixed to corners of the array of cells 7303, and only four tie members 7311 are shown in the depicted embodiment. In certain embodiments, the tie members 7311 may be affixed at different locations on the array of cells 7303. And in certain embodiments, more or fewer tie members 7311 may be used.

Figure 72:
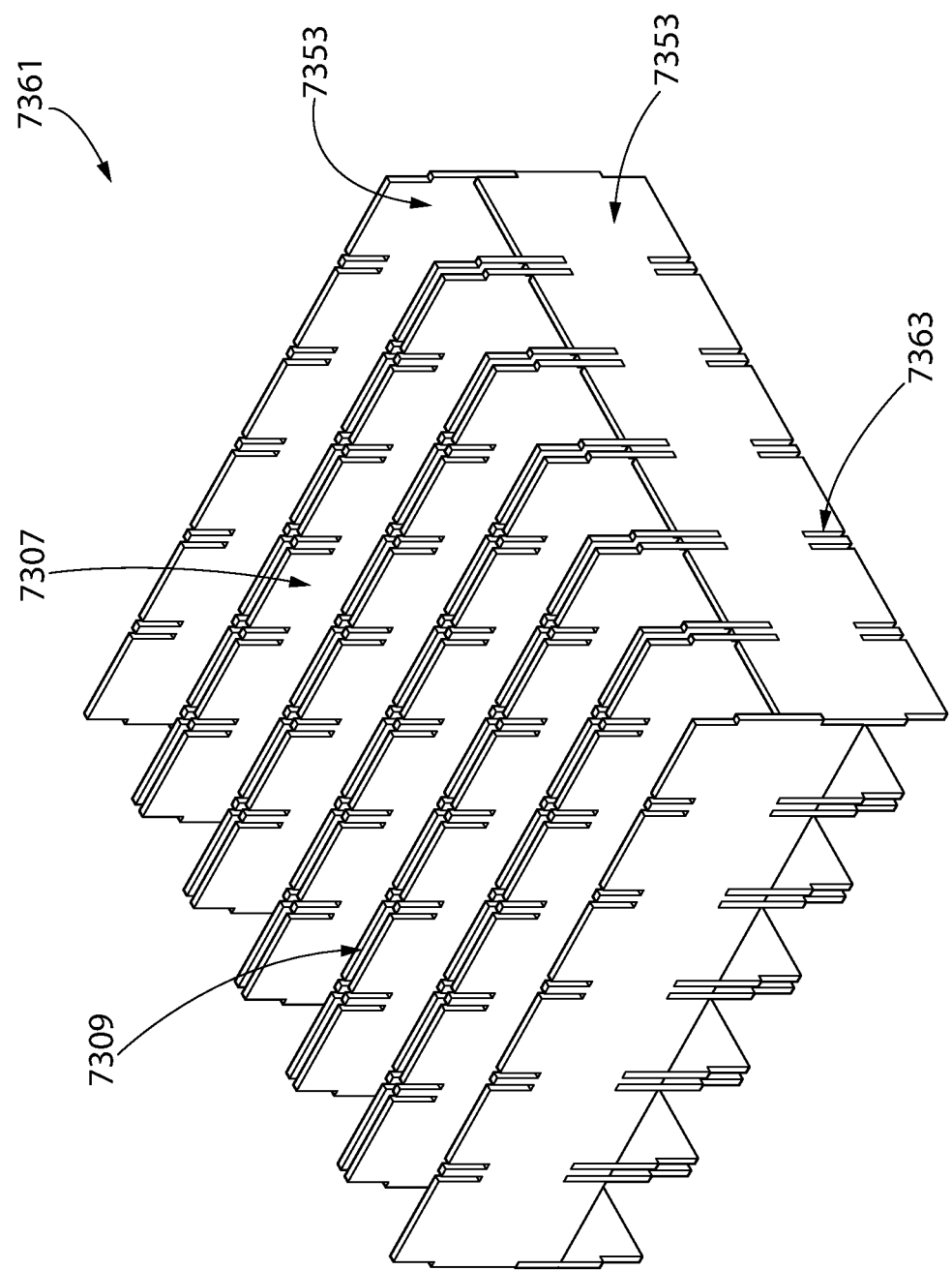
FIG. 72 is a perspective view of interlocked slotted plates for the fuel rack of FIG. 71.

A middle segment 7361 of the middle portion 7333 of the array of cells 7303 is shown in FIG. 72. Each middle segment 7361 of the array of cells 7303 comprises a gridwork of the middle slotted plates 7353 arranged in a rectilinear configuration so as to form a vertical portion of the storage cells 7307 and the flux traps 7309. In creating the middle segment 7361, a first middle slotted plate 7353 is arranged vertically. A second middle slotted plate 7353 is then arranged above and at a generally 90 degree angle to the first middle slotted plate 7353 so that the corresponding slots 7363 of the two middle slotted plates 7353 are aligned. The second middle slotted plate 7353 is then lowered onto the first middle slotted plate 7353, thereby causing the slots 7363 to interlock. This is repeated with all middle slotted plate 7353 until the desired rectilinear configuration is created, thereby creating the middle segment 7361 having the storage cells 7307 and the flux traps 7309.

The entire fuel rack body is formed out of three types of slotted plates, a top slotted plate 7351, a middle slotted plate 7353, a bottom half slotted plate 7355, and a bottom full slotted plate 7357, which are respectively shown in FIGS. 73A-D. The top slotted plate 7351 is formed as half of the middle slotted plate 7353. Similarly, the bottom half slotted plate 7355 is formed as half of the middle slotted plate 7353 with the cut outs 7365 added along the remaining slotted edge. The bottom full slotted plate 7357 is formed the same as the middle slotted plate 7353, but with the cut outs 7365 added along one slotted edge. The cut outs 7365 serve as auxiliary flow holes for facilitating thermosiphon flow into the storage cells 7307 as discussed above. The top slotted plate 7351 and the bottom half slotted plate 7355 are only used at the top and bottom, respectively, of the array of cells 7303 to cap the middle segments 7361 (FIG. 72) so that the array of cells 7303 has level top and bottom edges.

Each of the slotted plates 7351-7357 includes a plurality of slots 7363, end tabs 7367, and indentations 7369 adjacent the end tabs 7367, all of which are strategically arranged to facilitate sliding assembly to create the array of cells 7303. The slots 7363 are provided in one or both of the top and bottom edges of the plates 7351-7357. The slots 7363 included on the top edges of the plates 7351-7357 are aligned with the slots 7363 included on the bottom edges of that same plate 7351-7357. The slots 7363 extend through the plates 7351-7357 for about one-fourth of the height of the plates 7351-7357. The end tabs 7367 extend from lateral edges of the plates 7351-7357 and are about one-half of the height of the plates 7351-7357. The end tabs 7367 slidably mate with the indentations 7369 in the lateral edges of adjacent plates 7351-7357 that naturally result from the existence of the tabs 7367.

By way of example, in creating a middle segment 7361 of the array of cells 7303, the slots 7363 and end tabs 7367 of the middle segment 7361 interlock with adjacent middle segments 7361 so as to prohibit relative horizontal and rotational movement between the adjacent middle segments 7361. The middle segments 7361 intersect and interlock with one another to form a stacked assembly that is the array of cells 7303. The array of cells 7303 may include any number of the middle segments 7361, with the height of the middle segments 7361 in the middle portion 7333 of the array of cells 7303 being constructed so that the fuel storage section of a fuel assembly may be entirely located within the middle portion 7333 of the array of cells 7303.

The entire array of cells 7303 may thus be formed of slotted plates 7351-7357 having base configuration, which is the configuration of the middle slotted plate 7353, with the top slotted plate 7351, the bottom half slotted plate 7355, and the bottom full slotted plate 7357 being formed by additional minor modifications of the base configuration. Furthermore, as a result of the interlocking nature of the slotted plates 7351-7357, spacers are not needed to maintain the flux traps 7309. Thus, in certain embodiments, the array of cells 7303 may be free of spacers in the flux traps 7309.

VIII. Inventive Concept 8

With reference to FIGS. 74-85, an eighth inventive concept will be described.

Referring to FIGS. 74-78, a nuclear facility which may be a nuclear generating plant includes a fuel pool 8040 according to the present disclosure configured for storing a plurality of nuclear fuel racks 8100. The fuel pool 8040 may comprise a plurality of vertical sidewalls 8041 rising upwards from an adjoining substantially horizontal bottom base wall or slab 8042 (recognizing that some slope may intentionally be provided in the upper surface of the base slab for drainage toward a low point if the pool is to be emptied and rinsed/decontaminated at some time and due to installation tolerances). The base slab 8042 and sidewalls 8041 may be formed of reinforced concrete in one non-limiting embodiment. The fuel pool base slab 8042 may be formed in and rest on the soil sub-grade 8026, the top surface of which defines grade G. In this embodiment illustrated in the present application, the sidewalls are elevated above grade. The base slab 8042 may be located at grade G as illustrated, below grade, or elevated above grade. In other possible embodiments contemplated, the base slab 8042 and sidewalls 8041 may alternatively be buried in sub-grade 8026 which surrounds the outer surfaces of the sidewalls. Any of the foregoing arrangements or others may be used depending on the layout of the nuclear facility and does not limit of the invention.

In one embodiment, the fuel pool 8040 may have a rectilinear shape in top plan view. Four sidewalls 8041 may be provided in which the pool has an elongated rectangular shape (in top plan view) with two longer opposing sidewalls and two shorter opposing sidewalls (e.g. end walls). Other configurations of the fuel pool 8040 are possible such as square shapes, other polygonal shapes, and non-polygonal shapes.

Figure 78:
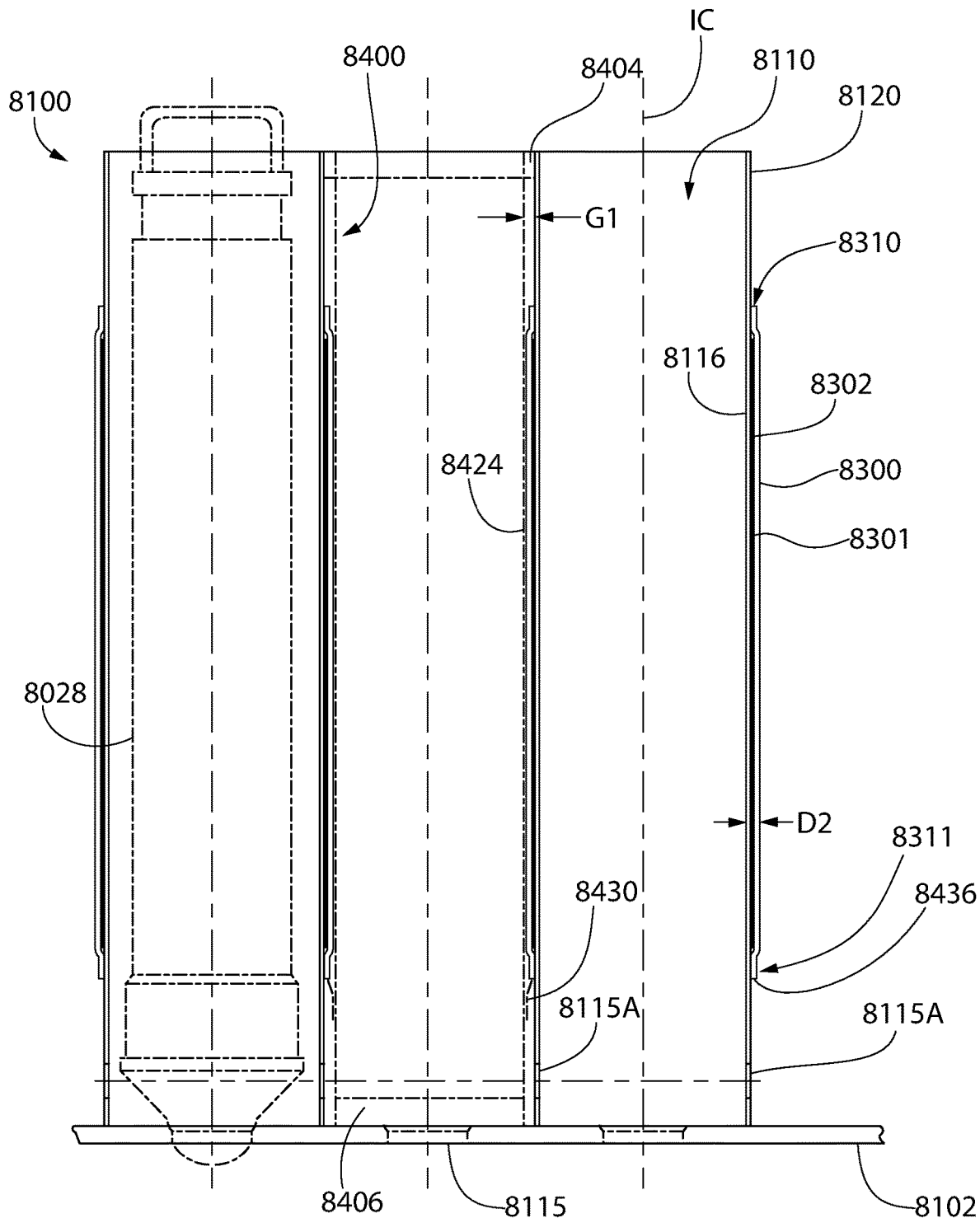
FIG. 78 is a side longitudinal cross-sectional view of a portion of the fuel rack.

The sidewalls 8041 and base slab 8042 of the fuel pool 8040 define an upwardly open well or cavity 8043 configured to hold cooling pool water W and the plurality of submerged nuclear fuel racks 8100 each holding multiple nuclear fuel bundles or assemblies 8028 (a typical one shown in phantom view seated in a fuel rack cell in FIG. 78). Each fuel assembly 8028 contains multiple individual new or spent uranium fuel rods. Fuel assemblies are further described in commonly assigned U.S. patent application Ser. No. 14/413,807 filed Jul. 9, 2013, which is incorporated herein by reference in its entirety. Typical fuel assemblies 8028 for a pressurized water reactor (PWR) may each hold over 150 fuel rods in 10×10 to 17×17 fuel rod grid arrays per assembly. The assemblies may typically be on the order of approximately 14 feet high weighing about 1400-1500 pounds each. The fuel racks 8100 storing the fuel assemblies are emplaced on the base slab 8042 in a high-density arrangement in the horizontally-abutting manner as further described herein.

The fuel pool 8040 extends from an operating deck 8022 surrounding the fuel pool 8040 downwards to a sufficient vertical depth D1 to submerge the fuel assemblies 8028 in the fuel rack (see, e.g. FIG. 79) beneath the surface level S of the pool water W for proper radiation shielding purposes. The substantially horizontal operating deck 8022 that circumscribes the sidewalls 8041 and pool 8040 on all sides in one embodiment may be formed of steel and/or reinforced concrete. In one implementation, the fuel pool may have a depth such that at least 8010 feet of water is present above the top of the fuel assembly. Other suitable depths for the pool and water may be used of course. The surface level of pool water W (i.e. liquid coolant) in the pool 8040 may be spaced below the operating deck 8022 by a sufficient amount to prevent spillage onto the deck during fuel assembly loading or unloading operations and to account to seismic event. In one non-limiting embodiment, for example, the surface of the operating deck 8022 may be at least 5 feet above the maximum 100 year flood level for the site in one embodiment. The fuel pool 8040 extending below the operating deck level may be approximately 8040 feet or more deep (e.g. 42 feet in one embodiment). The fuel pool is long and wide enough to accommodate as many fuel racks 8100 and fuel assemblies 8028 stored therein as required. There is sufficient operating deck space around the pool to provide space for the work crew and for staging necessary tools and equipment for the facility's maintenance. There may be no penetrations in the fuel pool 8040 within the bottom 30 feet of depth to prevent accidental draining of water and uncovering of the fuel.

In some embodiments, a nuclear fuel pool liner system may be provided to minimize the risk of pool water leakage to the environment. The liner system may include cooling water leakage collection and detection/monitoring to indicate a leakage condition caused by a breach in the integrity of the liner system. Liner systems are further described in commonly owned U.S. patent application Ser. No. 14/877,217 filed Oct. 7, 2015, which is incorporated herein by reference in its entirety.

The liner system in one embodiment may comprise one or more liners 8060 attached to the inner surfaces 8063 of the fuel pool sidewalls 8041 and the base slab 8042. The inside surface 8061 of liner is contacted and wetted by the fuel pool water W. The liner 8060 may be made of any suitable metal of suitable thickness T2 which is preferably resistant to corrosion, including for example without limitation stainless steel, aluminum, or other. Typical liner thicknesses T2 may range from about and including 3/16 inch to 5/16 inch thick. Typical stainless steel liner plates include ASTM 240-304 or 304L.

In some embodiments, the liner 8060 may be comprised of multiple substantially flat metal plates or sections which are hermetically seal welded together via seal welds along their contiguous peripheral edges to form a continuous liner system completely encapsulating the sidewalls 8041 and base slab 8042 of the fuel pool 8040 and impervious to the egress of pool water W. The liner 8060 extends around and along the vertical sidewalls 8041 of the fuel pool 8040 and completely across the horizontal base slab 8042 to completely cover the wetted surface area of the pool. This forms horizontal sections 8060*b* and vertical sections 8060*a* of the liner to provide an impervious barrier to out-leakage of pool water W from fuel pool 8040. The horizontal sections of liners 8060*b* on the base slab 8042 may be joined to the vertical sections 8060*a* along perimeter corner seams therebetween by hermetic seal welding. The liner 8060 may be fixedly secured to the base slab 8042 and sidewalls 8041 of the fuel pool 8040 by any suitable method such as fasteners.

With continuing reference to FIGS. 74-78, the fuel rack 8100 is a cellular upright module or unit. Fuel rack 8100 may be a high density, tightly packed non-flux type rack as illustrated which is designed to be used with fuel assemblies that do not require the presence of a neutron flux trap between adjacent cells 8110. Thus, the inclusion of neutron flux traps (e.g. gaps) in fuel racks when not needed is undesirable because valuable fuel pool floor area is unnecessarily wasted. Of course, both non-flux and flux fuel rack types may be stored side by side in the same pool using the seismic-resistant fuel storage system according to the present disclosure. The invention is therefore not limited to use of any particular type of rack.

Fuel rack 8100 defines a vertical longitudinal axis LA and comprises a grid array of closely packed open cells 8110 formed by a plurality of adjacent elongated storage tubes 8120 arranged in parallel axial relationship to each other. The rack comprises peripherally arranged outboard tubes 8120A which define a perimeter of the fuel rack and inboard tubes 8120B located between the outboard tubes. Tubes 8120 are coupled at their bottom ends 8114 to a planar top surface of a baseplate 8102 and extend upwards in a substantially vertical orientation therefrom. In this embodiment, the vertical or central axis of each tube 8120 is not only substantially vertical, but also substantially perpendicular to the top surface of the baseplate 8102. In one embodiment, tubes 8120 may be fastened to baseplate 8102 by welding and/or mechanical coupling such as bolting, clamping, threading, etc.

Tubes 8120 include an open top end 8112 for insertion of fuel assemblies, bottom end 8114, and a plurality of longitudinally extending vertical sidewalls 8116 ("cell walls") between the ends and defining a tube or cell height H1. Each tube 8120 defines an internal cell cavity 8118 extending longitudinally between the top and bottom ends 8112, 8114. In the embodiment shown in FIG. 75, four tube sidewalls 8116 arranged in rectilinear polygonal relationship are provided forming either a square or rectangular tube 8120 in lateral or transverse cross section (i.e. transverse or orthogonal to longitudinal axis LA) in plan or horizontal view (see also FIG. 76). Cells 8110 and internal cavities 8118 accordingly have a corresponding rectangular configuration in lateral cross section. The top ends of the tubes 8120 are open so that a fuel assembly can be slid down into the internal cavity 8118 formed by the inner surfaces of the tube sidewalls 8116. Each cell 8110 and its cavity 8118 are configured for holding only a single nuclear fuel assembly 8028. Tubes 8120 may be made of any suitable preferably corrosion resistant metal, such as without limitation stainless steel or others. Baseplate 8102 may be made of a similar or different corrosion resistant metal.

It will be appreciated that each tube 8120 can be formed as a single unitary structural component that extends the entire desired height H1 or can be constructed of multiple partial height tubes that are vertically stacked and connected together such as by welding or mechanical means which collectively add up to the desired height H1. It is preferred that the height H1 of the tubes 8120 be sufficient so that the entire height of a fuel assembly may be contained within the tube when the fuel assembly is inserted into the tube. The top ends 8112 of tubes 8120 may preferably but not necessarily terminate in substantially the same horizontal plane (defined perpendicular to longitudinal axis LA) so that the tops of the tube are level with each other. The baseplate 8102 at the bottom ends 8114 of the tubes defines a second horizontal reference plane HR.

Figure 75:
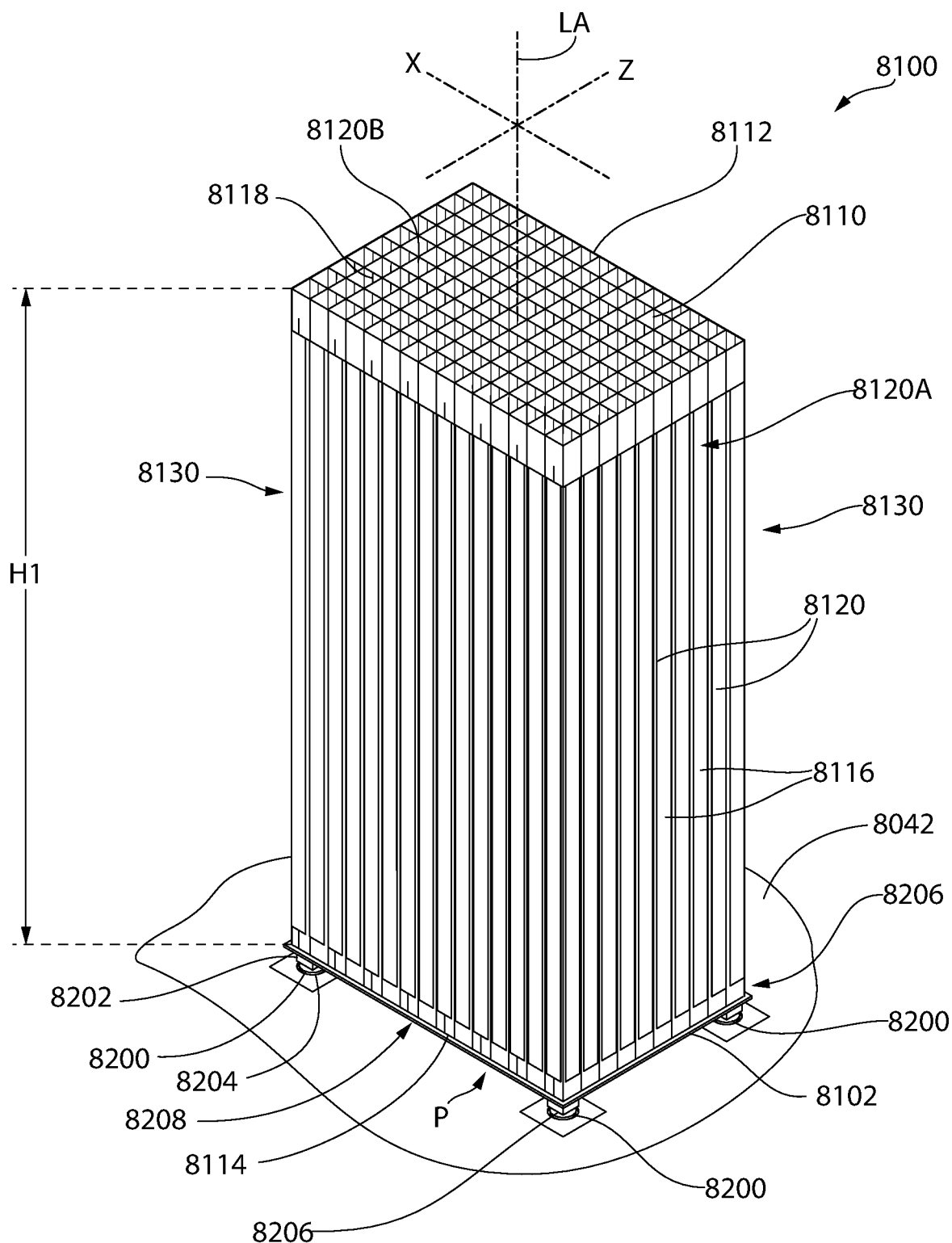
FIG. 75 is a perspective view of a fuel rack.

As best shown in FIG. 75, tubes 8120 are geometrically arranged atop the baseplate 8102 in rows and columns along the Z-axis and X-axis, respectively. Any suitable array size including equal or unequal numbers of tubes in each row and column may be provided depending on the horizontal length and width of the pool base slab 8042 and number of fuel racks 8100 to be provided. In some arrangements, some or all of the fuel racks 8100 may have unequal lateral width and lateral length as to best make use of a maximum amount of available slab surface area as possible for each installation.

For convenience of reference, the outward facing sidewalls 8116 of the outboard tubes 8120A may be considered to collectively define a plurality of lateral sides 8130 of the fuel rack 8100 extending around the rack's perimeter as shown in FIG. 75.

Referring to FIGS. 74-78, each fuel rack 8100 comprises a plurality of legs or pedestals 8200 which support rack from the base slab 8042 of the fuel pool 8040. Pedestals 8200 each have a preferably flat bottom end 8204 to engage the pool base slab 8042 and a top end 8202 fixedly attached to the bottom of the baseplate 8102. The pedestals 8200 protrude downwards from baseplate 8102. This elevates the baseplates 8102 of the rack off the base slab 8042, thereby forming a gap therebetween which defines a bottom flow plenum P beneath rack 8100. The plenum P allows cooling water W in the pool to create a natural convective circulation flow path through each of the fuel storage tubes 8120 (see e.g. flow directional arrows in FIG. 78). A plurality of flow holes 8115 are formed in the rack through baseplate 8102 in a conventional manner to allow cooling water to flow upwards through the cavity 8118 of each tube 8120 and outward through the open top ends 8112 of the tubes. Commonly owned U.S. patent application Ser. No. 14/367,705 filed Jun. 20, 2014 shows fuel rack baseplates with flow holes, and is incorporated herein by reference in its entirety. The pool water W flowing through the tubes is heated by the nuclear fuel in fuel assemblies, thereby creating the motive force driving the natural thermal convective flow scheme.

Figure 76:
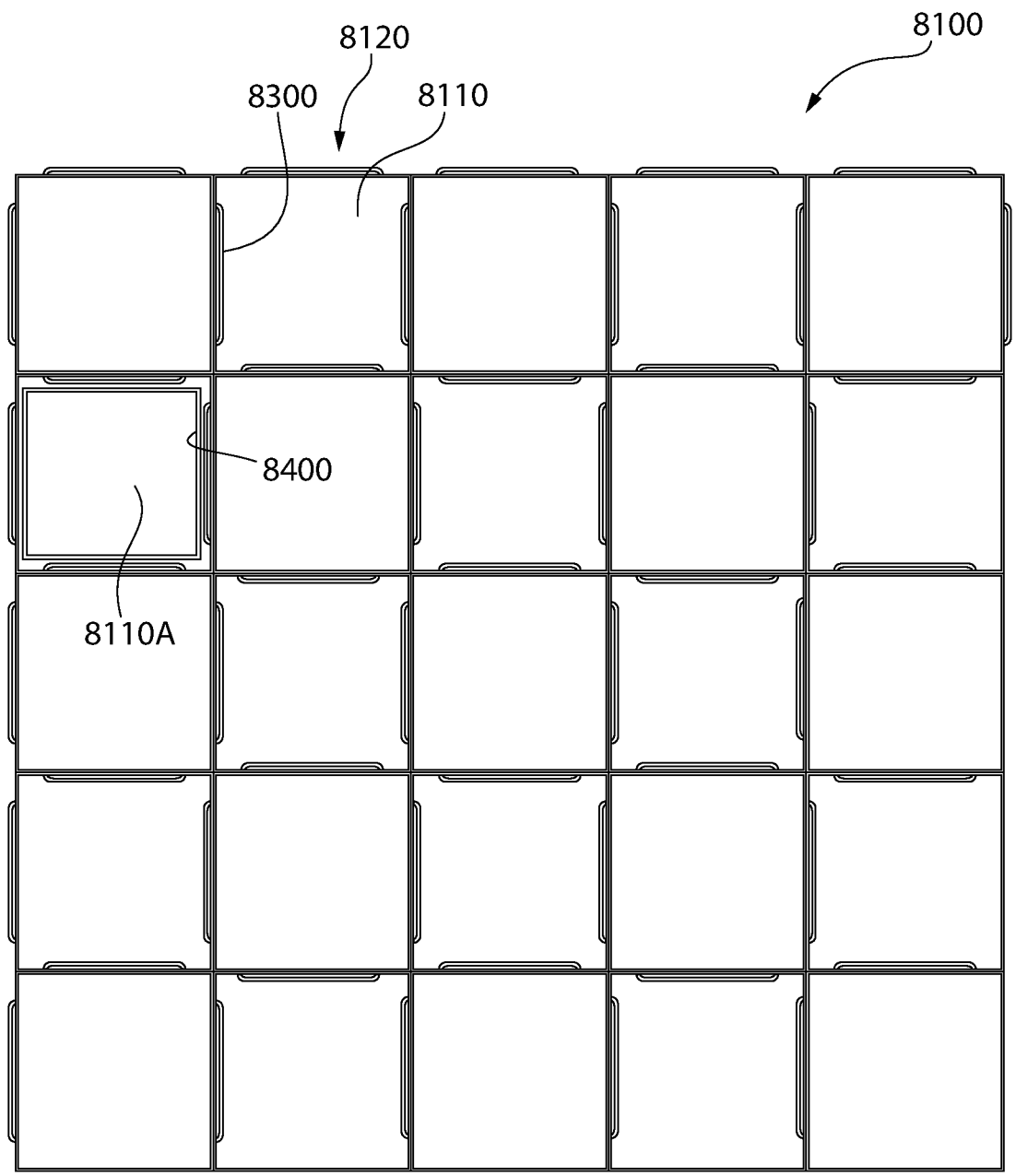
FIG. 76 is transverse cross-sectional view of the fuel rack.

Referring now then to FIGS. 76 and 78, flow holes 8115 create passageways from below the base plate 8102 into the cells 8110 formed by the tubes 8120. Preferably, a single flow hole 8115 is provided for each cell 8110, however, more may be used as needed to create sufficient flow through the tubes. The flow holes 8115 are provided as inlets to facilitate natural thermosiphon flow of pool water through the cells 8110 when fuel assemblies having a heat load are positioned therein. More specifically, when heated fuel assemblies are positioned in the cells 8110 in a submerged environment, the water within the cells 8110 surrounding the fuel assemblies becomes heated, thereby rising due to decrease in density and increased buoyancy creating a natural upflow pattern. As this heated water rises and exits the cells 8110 via the tube open top ends 8112 (see FIG. 74), cooler water is drawn into the bottom of the cells through the flow holes 8115. This heat induced water flow and circulation pattern along the fuel assemblies then continues naturally to dissipate heat generated by the fuel assemblies. Pedestals 8200 may therefore have a height selected to form a bottom flow plenum P of generally commensurate height to ensure that sufficient thermally-induced circulation is created to adequately cool the fuel assembly. In one non-limiting example, the height of the plenum P may be about 2 to 2.5 inches (including the listed values and those therebetween of this range).

Figure 77:
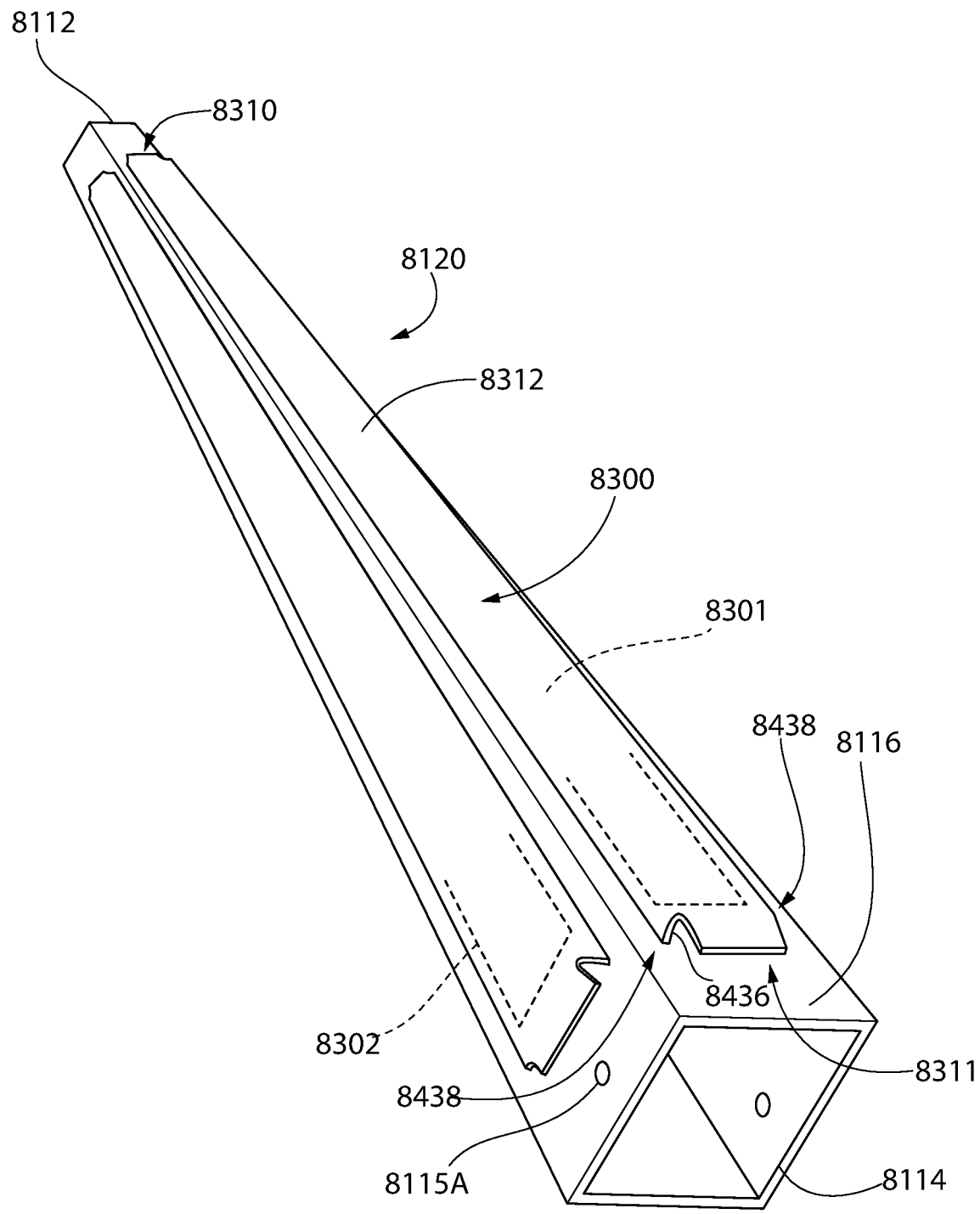
FIG. 77 is a perspective view of a fuel storage tube of the fuel rack showing neutron absorber sheaths.

To facilitate lateral cross flow of cooling water between cells 8110 in the fuel rack 8100, a minimum of two lateral flow holes 8115A may be provided proximate to the lower or bottom end 8114 of each tube 8120 (see, e.g. FIGS. 77 and 78). Each hole defines top, bottom, and side edges in tube material. In one embodiment, the flow holes 8115A may be formed by a punching operation.

Pedestals 8200 may have any suitable configuration or shape and be of any suitable type. Each fuel rack 8100 may include a plurality of peripheral pedestals 8200 spaced apart and arranged along the peripheral edges and perimeter of the baseplate 8102, and optionally one or more interior pedestals if required to provide supplemental support for the inboard fuel assemblies and tubes 8120B. In one non-limiting embodiment, four peripheral pedestals 8200 may be provided each of which is located proximate to one of the four corners 8206 of the baseplate. Additional peripheral pedestals may of course be provided as necessary between the corner pedestals on the perimeter of the baseplate. The pedestals are preferably located as outboard as possible proximate to the peripheral edges 8208 of the baseplates 8102 of each fuel rack or module to give maximum rotational stability to the modules.

With continuing reference to FIGS. 74-78, each fuel rack storage tube 8120 in some embodiments may include a longitudinally-extending absorber sheath 8300 disposed on one or more tube sidewalls 8116. The sheath 8300 extends at least over the active zone or height of the fuel rack tubes 8120 where the fuel is positioned in the fuel rack 8100 (see, e.g. FIG. 78). Sheath 8300 has a raised profile or projection from the tube sidewall 8116. Sheath 8300 has a vertically elongated and generally flat body including top end 8310 defining a top lip or edge, bottom end 8311 defining a bottom lip or edge 8436, and a sidewall 8312 extending axially between the top and bottom ends. The top and bottom ends 8310, 8311 terminate at a point spaced apart from the top and bottom ends 8112, 8114 of the storage tube 8120 as shown. The sheath 8300 may be attached to the tube sidewall 8116 via welding or another suitable technique. Sheath sidewall 8312 is spaced laterally apart from the sidewall 8116 of the tube 8120 such that each "picture frame" sheath 8300 forms an envelope defining a sheathing cavity 8301 between the sheath and tube sidewall which is configured for receiving neutron absorber material 8302 therein (e.g. in sheet or panel form as represented in FIGS. 77 and 78). The sheath body is therefore configured and laterally offset from the tube sidewall 8116 by a distance commensurate with the dimensions and thickness of the absorber sheet or panel inserted therein. The boron-containing material or "poison" may be Boraflex, Tetrabor, (both previously mentioned) or another. In some existing used fuel rack installations, the absorber material 8302 may be in a degraded condition thereby requiring augmentation with a neutron absorber apparatus disclosed herein to restore fuel neutron reactivity control to the fuel rack.

FIGS. 79-85 show a neutron absorber apparatus according to the present disclosure. The apparatus may be in the form of a shaped neutron absorber insert 8400 configured to be slidably insertable into one of the tubes 8120 and cells 8110 of the fuel rack 8110 shown in FIGS. 74-78 discussed above. Absorber insert 8400 includes a plurality of longitudinally-extending neutron absorber walls or plates 8402 each comprising a neutron absorber material operable to control reactivity of the fuel stored in the fuel rack cells. The absorber plates 8402 may be made of a suitable boron-containing metallic poison material such as without limitation borated aluminum. In some embodiments, without limitation, the absorber plates 8402 may be formed of a metal-matrix composite material, and preferably a discontinuously reinforced aluminum/boron carbide metal matrix composite material, and more preferably a boron impregnated aluminum. One such suitable material is sold under the tradename METAMIC™. Other suitable borated metallic materials however may be used. The boron carbide aluminum matrix composite material of which the absorption plates 8402 are constructed includes a sufficient amount of boron carbide so that the absorption sheets can effectively absorb neutron radiation emitted from a spent fuel assembly, and thereby shield adjacent spent fuel assemblies in a fuel rack from one another. The absorption plates may be constructed of an aluminum boron carbide metal matrix composite material that is about 20% to about 40% by volume boron carbide. Of course, other percentages may also be used. The exact percentage of neutron absorbing particulate reinforcement, which is in the metal matrix composite material, in order to make an effective neutron absorber for an intended application, will depend on a number of factors, including the thickness (i.e., gauge) of the absorption plates 8402, the spacing between adjacent cells within the fuel rack, and the radiation levels of the spent fuel assemblies.

In one configuration, absorber insert 8400 may comprise an assembly formed by two bent and chevron-shaped angled plates (designated 8402A and 8402B for convenience of reference), which are held together by metallic upper and lower stiffening bands 8404, 8406. Each plate 8402A, 8402B has the shape of a common structural angle sized to fit within the interior dimensions of each fuel rack storage tube 8120/cell 8110. Absorber plates 8402A, 8402B may each be formed of a generally flat or planar plate or sheet of neutron absorber material which is mechanically bent along a linear longitudinal bend line BL extending the plate's length L2 to form first and second half-sections 8408, 8410. The bend line BL may be located midway between the two side edges 8412 of the plates 8402A or 8402B so that each half-section 8408, 8410 has an equal width W2. In other possible embodiments, the half-sections may have unequal widths. Half-sections 8408 and 8410 may be arranged mutually perpendicular to each other at a 90-degree angle around the bend line BL in one embodiment as shown.

When the absorber plates 8402A, 8402B are fastened together via the stiffening bands 8404, 8406, they collectively form a tubular box frame comprising a four-sided rectilinear absorber tube 8424 having a vertical centerline IC and defining an exterior surface 8418 and interior surface 8420. Interior surface 8420 in turn defines a longitudinally-extending and completely open central cavity 8422 configured for insertably receiving and holding a nuclear fuel assembly 8028 therein (typical fuel assembly shown in FIG. 78). Cavity 8422 extends from upper end 8414 to lower end 8416 of the absorber tube 8424. The ends 8414 and 8416 of the tube are open. Absorber tube 8424 and concomitantly cavity 8422 may have a square cross sectional shape in one embodiment as shown. Rectangular or other cross sectional tube and cavity shapes may be used in some embodiments depending on the cross sectional shape of the fuel storage tubes 8120.

Figure 79:
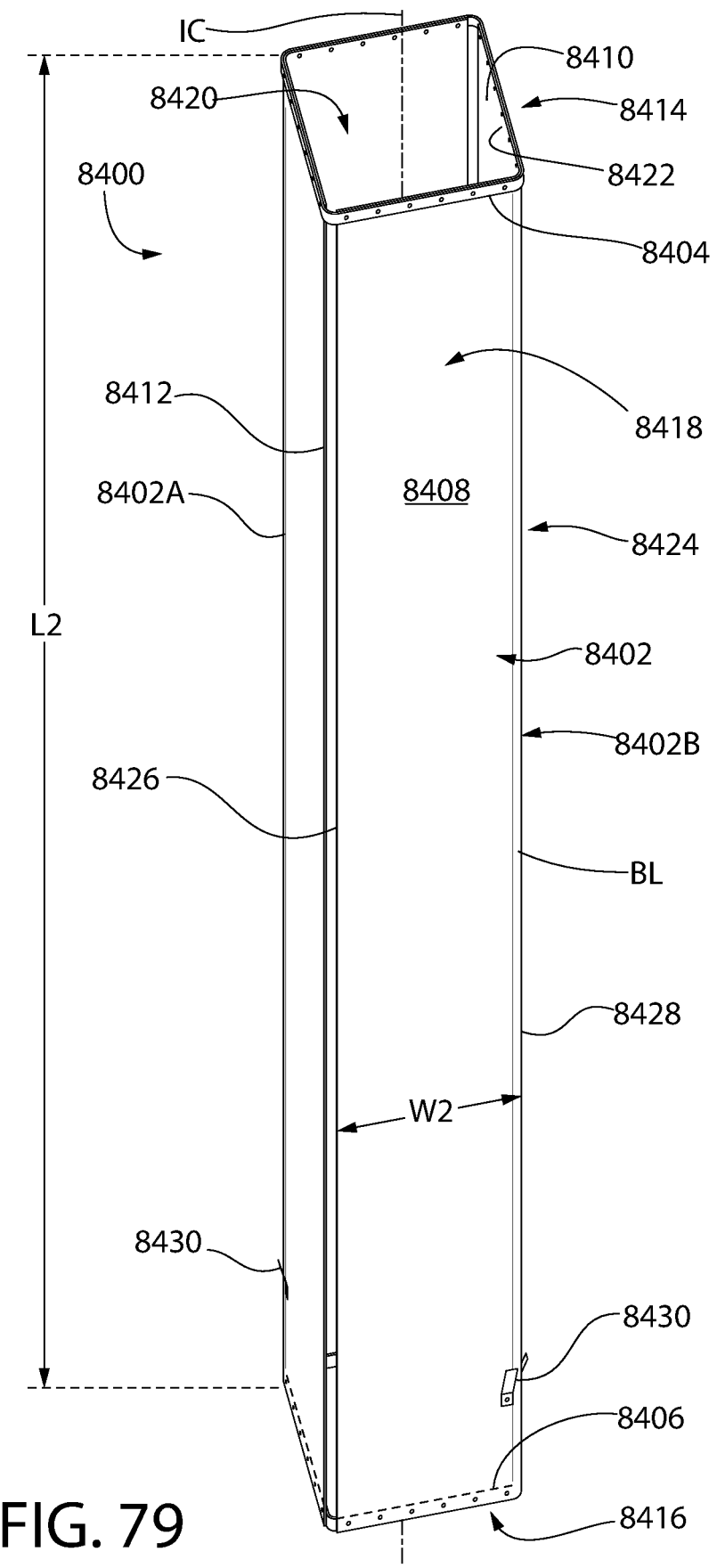
FIG. 79 is perspective view of a neutron absorber insert according to the present disclosure.
Figure 80:
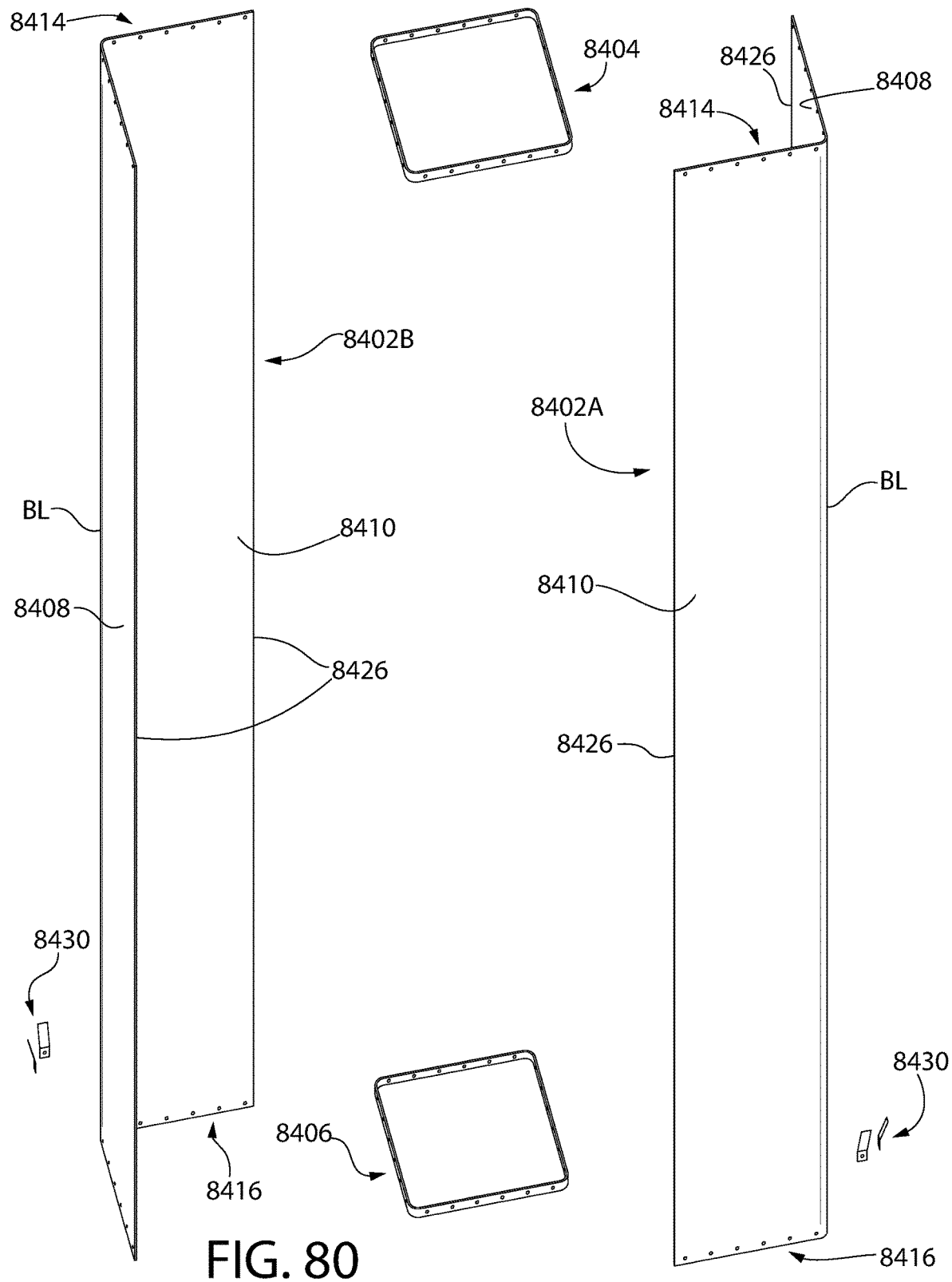
FIG. 80 is an exploded perspective view thereof.
Figure 81:
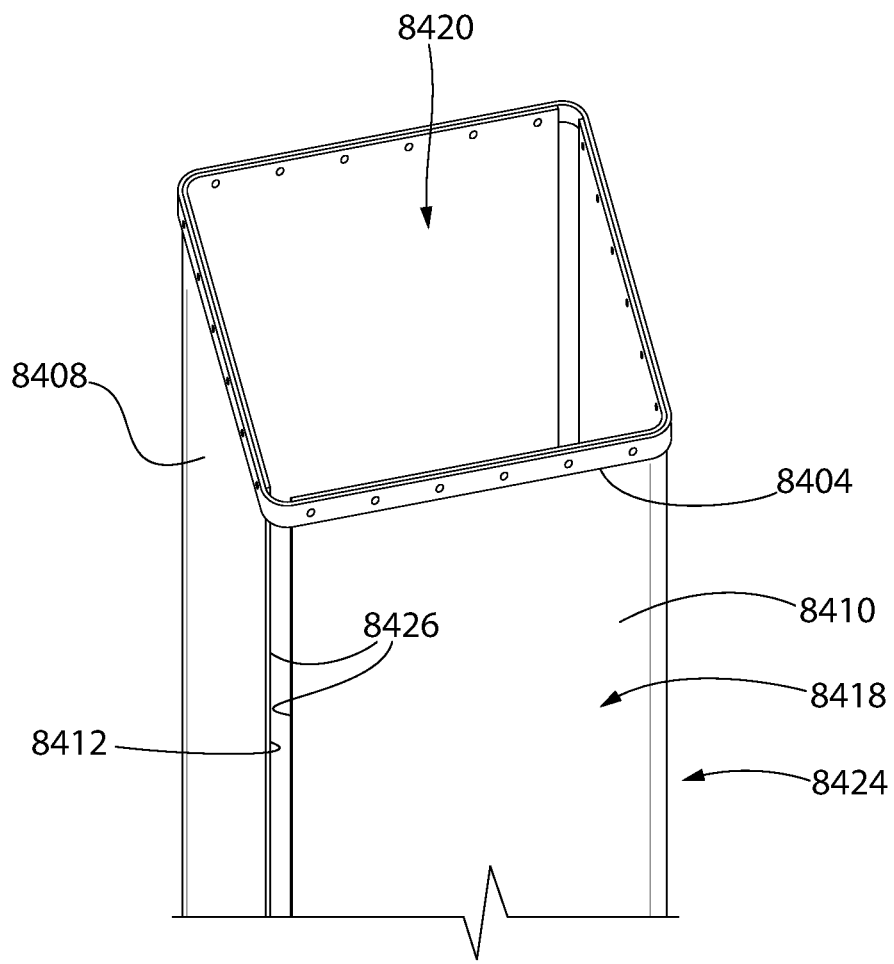
FIG. 81 is a perspective view of a top end of the absorber insert.
Figure 82:
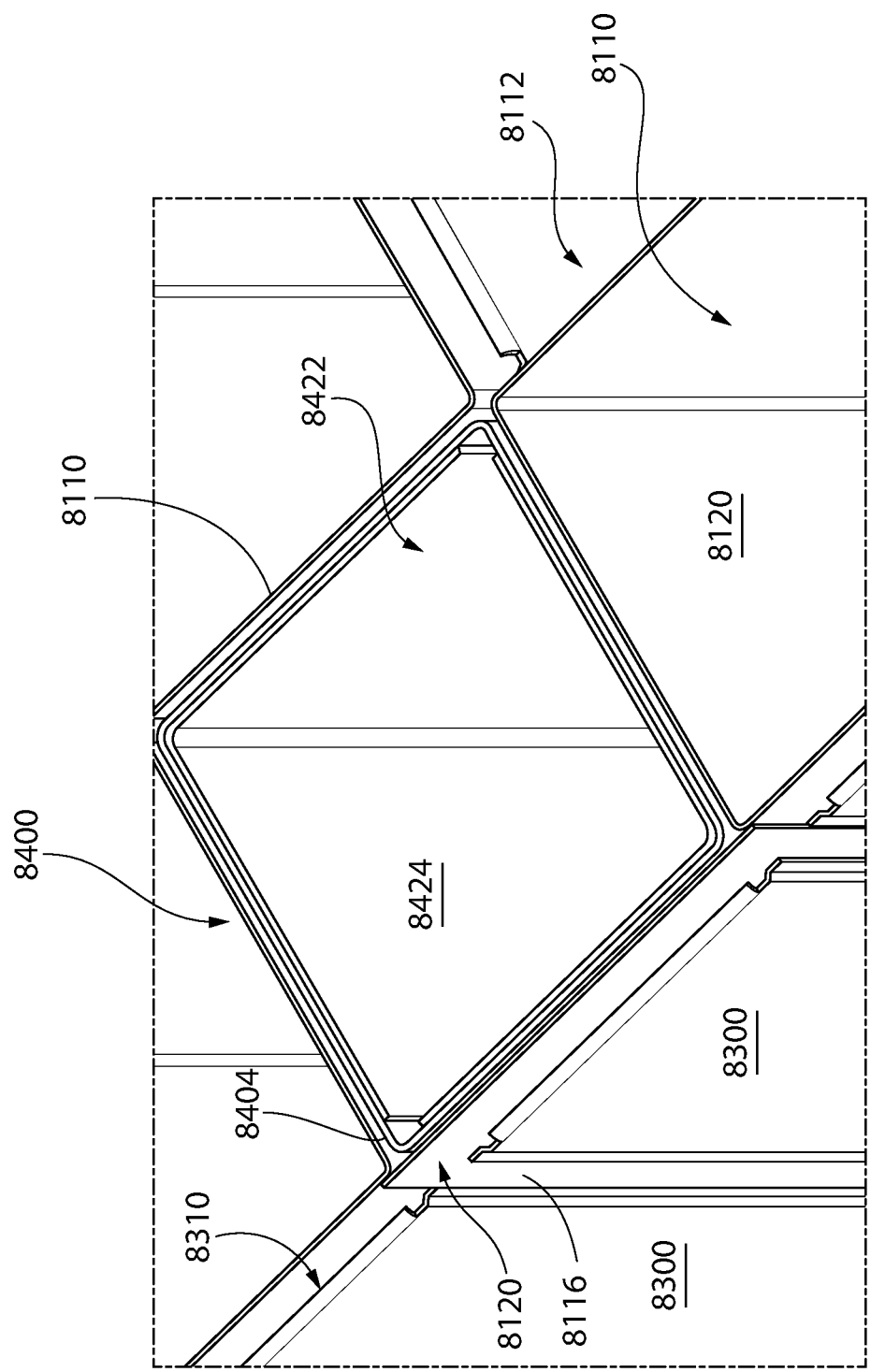
FIG. 82 is a perspective view of the top end of the fuel rack showing the absorber insert installed in one of the storage tubes.

The mating longitudinal edges 8426 of the absorber tube plates 8402A and 8402B may be laterally spaced apart in some embodiments forming an axially extending slot 8412 for the entire length of the absorber tube assembly (see, e.g. FIG. 79). The slot width is fixed by the upper and lower stiffening bands 8404, 8406 to which the absorber plates are fastened. In other embodiments, the longitudinal edges 8426 of the absorber plates 8402A, 8402B may be abutted without any appreciable gap.

Upper and lower stiffening bands 8404, 8406 may be annular ring-like structures having a complementary configuration to the absorber tube 8424. Stiffening bands 8404, 8406 may have a square configuration in the non-limiting illustrated embodiment. The upper and lower bands are attached to the upper and lower extremities of the absorber tube plates 8402A, 8402B, respectively. Methods used to secure the bands 8404, 8406 to the upper and lower ends 8414, 8416 of the plates include for example without limitation welding, riveting, threaded fasteners, or other techniques. The stiffening bands may be made of a corrosion resistant metal, such as stainless steel in one embodiment.

Referring to FIGS. 79-83, the upper stiffening band 8404 extends perimetrically around the upper end 8414 of the absorber tube 8424. The upper stiffening band 8404 is sized to closely fit inside the upper region of the fuel storage cell 8110/tube 8120 with a very small clearance between interior surfaces of the fuel rack storage tube sidewalls 8116 and the band, thereby giving the absorber tube 8424 structural rigidity and rotational fixity of position in the storage cell at the upper end of the absorber tube. In one embodiment, the upper stiffening band is preferably attached to the exterior surfaces 8418 of the absorber tube plates 8402A, 8402B at the upper end 8414 of absorber tube 8424. The upper stiffening band may be disposed precisely at the upper end 8414 of absorber tube 8424 as illustrated, or in other embodiments may be proximate to but spaced vertically downwards apart from the upper end 8414. In either case, upper stiffening band 8404 is preferably located at an elevation at least above the top end 8310 of the absorber sheath 8300 on storage tube 8120 to prevent interference with the sheath when inserting the absorber tube into the fuel storage cell 8110.

Upper stiffening band 8404 projects laterally and transversely outwards from and beyond the exterior of the absorber tube 8424 to engage the sidewalls 8116 of the storage tube. When the absorber tube 8424 is installed in one of the fuel rack cells 8110 as shown in FIG. 78, the outwards projection of upper stiffening band 8404 laterally spaces the absorber tube 8424 apart from the interior cell side walls 8116. This creates a clearance gap G1 between the exterior surfaces 8418 of the absorber tube 8424 (formed by tube absorber plates 8402A, 8402B) and interior surfaces of the cells 8110 (formed by the sidewalls 8116 of the fuel storage tubes 8120). Gap G1 is preferably sized commensurate to the lateral projection depth D2 of the sheaths 8300 on the fuel storage tubes 8120 to receive the sheaths in the gap when installing the absorber tube 8424 in the fuel storage cell 8110. This allows the absorber tube 8424 to be slideably inserted into the fuel storage cell 8110 without interference from the projection of the sheaths 8300 outwards from the sidewalls 8116 of the storage tube 8120 (see, e.g. FIG. 78). Because the sheaths 8300 have a longitudinal length which terminates short of the upper and lower ends of the fuel storage tubes 8120 as shown in FIG. 77, the upper stiffening band 8404 may be fully seated inside the upper end of the storage tube without interference from the sheath (see, e.g. FIG. 82).

Figure 83:
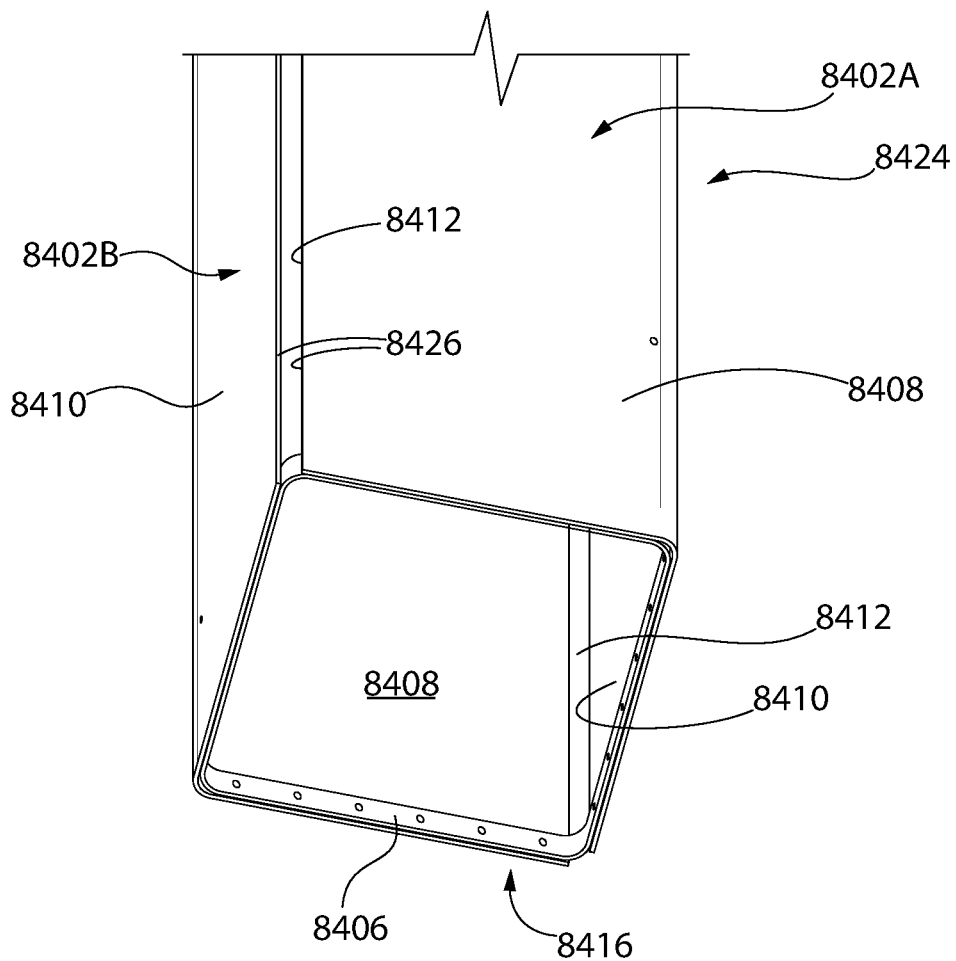
FIG. 83 is a perspective view of the bottom end of the absorber insert.
Figure 84:
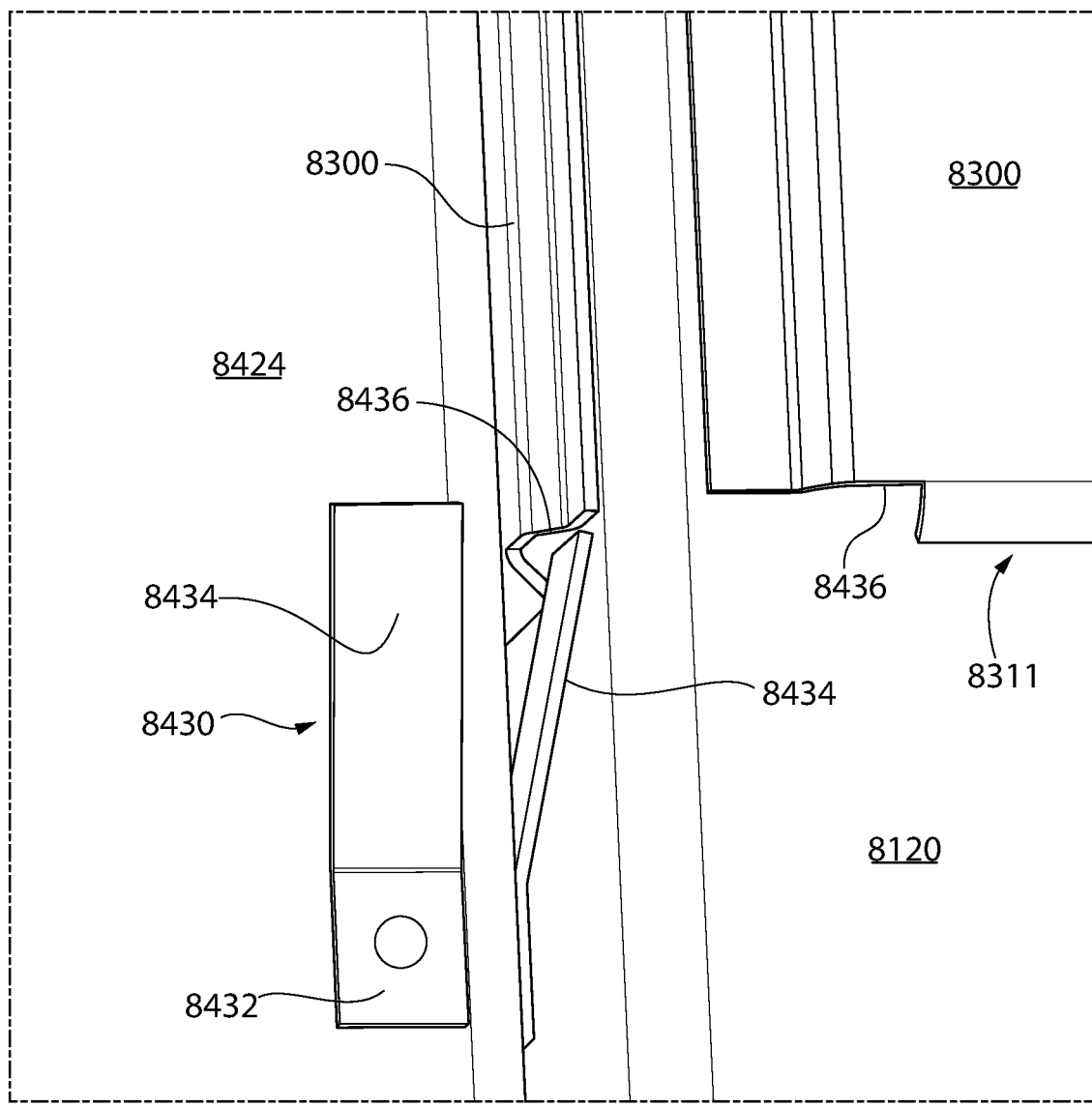
FIG. 84 is a detail perspective view showing locking protrusions of the absorber insert engaging the sheath of a storage tube.

To further avoid interference with the sheaths 8300 when the absorber tube 8424 is slid into the fuel storage tube 8120 through the open top end 8112 of the storage tube, the lower stiffening band 8406 is instead mounted in the interior or cavity 8422 of the absorber tube in one embodiment as best shown in FIG. 83. Lower stiffening band 8406 extends perimetrically around the lower end 8416 of the absorber tube 8424 in cavity 8422. The lower stiffening band provides structure rigidity and rotationally fixity in position to the lower end portion of the absorber tube 8424 when seated in the fuel storage cell 8110.

Lower stiffening band 8406 may be completely recessed inside the absorber tube 8424 within central cavity 8422 wherein the lower end of the tube 8424 engages the baseplate 8102 of the fuel rack when the absorber insert is fully inserted therein. In alternative embodiments, the lower stiffening band may have an extended length and protrude downwards beyond the lower end 8416 of the absorber tube 8424 to engage the baseplate 8102. If the storage tube 8120 has optional lateral flow holes 8115A as shown in FIGS. 77 and 78, matching flow holes (not shown) may be provided at corresponding locations in the lower stiffening band 8406. When the absorber tube 8424 is fully seated in the storage tube 8120, the flow holes in absorber tube would become concentrically aligned with the lateral flow holes 8115A of the storage tube to preserve fuel pool cooling water cross flow between cells 8110.

According to another aspect, the absorber tube 8424 may include one or more axial restraints to lock and axially fixate the tube in longitudinal position within the storage cell 8110 of the fuel rack 8100. Referring to FIGS. 79-84, the axial restraints in one non-limiting embodiment may be formed by elastically deformable locking protrusions comprised of metal leaf spring clips 8430. Spring clips 8430 each have an elongated body formed of corrosion resistant spring steel. Clips 8430 include a lower fixed end portion 8432 rigidly attached to the exterior surface 8418 of the absorber tube 8424 and an opposite resiliently movable cantilevered upper free-end locking portion 8434. Fixed end portion 8432 may be substantially flat and fixedly attached to absorber tube plates 8402A, 8402B by any suitable means, such as without limitation welding, riveting, or fasteners in some embodiments. Locking portion 8434 extends upwardly from fixed end portion 8432 and is obliquely angled thereto forming a space between the locking portion and the absorber tube 8424. Locking portion 8434 thus projects laterally outwards from the absorber tube 8424 (i.e. absorber plates 8402A, 8402B). When the absorber tube 8424 is installed in the fuel rack storage tube 8120, locking portion 8434 is also obliquely angled to the vertical longitudinal axis LA of the fuel rack (identified in FIG. 75).

The locking spring clips 8430 are positioned on the lower half of absorber tube 8424 and arranged to engage an available edge disposed on the lower half of the fuel storage tubes 8120. In one embodiment, the spring clips may be positioned to engage a free bottom edge 8436 of the sheaths 8300 which is laterally spaced away from sidewall 8116 of the storage tube 8120, (see, e.g. FIGS. 77, 78, and 84). The free bottom edges 8436 are often formed near the lateral end portions 8438 of the bottom end 8430 of the sheath 8330 where the sheath is not welded or otherwise attached to the storage tube 8120. In such configurations, the spring clips 8430 may be disposed proximate to the corners 8428 of the lower half of the absorber tubes 8424 to engage the bottom edges 8436 of the sheaths 8300. Any suitable number of spring clips 8430 may be provided. In one embodiment, at least two spring clips 8430 may be provided preferably on different sides of the absorber tube 8424. In other embodiments, each of the four sides of the absorber tube may have at least one spring clip. Preferably, at least one spring clip 8430 is located to engage one available bottom edge 8436 of a sheath 8300 of the storage cell 8110 in which the absorber tube is installed to lock the absorber tube axially in place in the cell.

It bears noting that at least one of the four storage tube sidewalls 8116 inside of each fuel storage cell 8110 includes a sheath 8300 for engagement by a locking spring clip 8430. This single engagement is sufficient to lock the absorber tube 8424 in position within the storage cell.

The locking protrusion or spring clip 8430 is resiliently movable between an outward an inward deflected and retracted position for sliding the absorber tube 8424 into the fuel storage tube 8120 or cell 8110, and an outward undeflected and extended position for engaging the sheath 8300 and locking the absorber tube in position in the fuel rack 8100.

Operation of the locking protrusion or spring clip 8430 will become evident by describing a method for installing a tubular neutron absorber insert 8400 in a storage cell 8110 of a fuel rack. A suitable cell 8110 may first be selected having at least one available absorber sheath 8300 for locking the insert in the fuel rack 8100. In one example, cell 8110A identified in FIG. 76 may be selected. The fuel rack 8100 may be still submerged in the fuel pool 40 and radioactively active. Preferably, a fuel assembly 8028 if already present in cell 8110A may be removed first.

An absorber insert 8400 which may be in the form of absorber tube 8424 described above is then positioned over and axially aligned with cell 8110A. The locking spring clip or clips 8430 are initially in their outward undeflected and extended position (see, e.g. FIG. 84). An overhead hoist or crane may be used to deploy the absorber insert 8400. The insert 8400 is then slowly lowered into the cell 8110A through open top end 8112 of the cell. After the lower end 8416 of the absorber insert 8400 passes through the cell top end 8112, at least one of the locking spring clips 8430 slideably engages the top end 8310 of at least one absorber sheath 8300. The spring clip 8430 compresses and folds inward to the deflected and retracted position against the absorber tube 8424. As the absorber insert 8400 continues to be lowered farther into the cell 8110A, the locking portion 8434 of the spring clip 8430 slides along the sidewall 8312 of the sheath 8300 and remains in the compressed retracted position. When the spring clip 8430 eventually passes beneath and reaches a lower elevation in cell 8110A below the bottom end 8311 of the sheath, the spring clip 8430 will snap open via its elastic memory returning to the initial extended position of the spring clip thereby catching and lockingly engaging the bottom edge 8436 of sheath 8300 (see, e.g. FIGS. 78 and 11). This locking engagement between the sheath 8300 and locking portion 8434 of spring clip 8430 prevents the absorber insert 8400 from being axially withdrawn from the fuel rack cell 8110A, thereby locking the insert in axial position in the fuel rack. Advantageously, reactivity control to cell 8110A is fully restored despite the degraded original boron-containing neutron absorber material which may still be present in the sheath. The open cavity 8422 of the low profile absorber insert 8400 is configured to allow a fuel assembly 8028 to be inserted into cell 8110A following the absorber restoration process, and to be removed from the storage cell without requiring removal of the insert.

It bears noting that while the upper stiffening band 8404 rotationally and laterally stabilizes the upper portion of the absorber insert 8400 in the storage tube 8120, the sheath 8300 on the tube sidewall and the spring clips 8430 act to rotationally and laterally stabilize lower portions of the insert by preventing excessive movement even during a seismic event.

The absorber insert 8400 may also be used in some embodiments with a fuel storage tube 8120 that does not include an absorber sheath 8300 on at least one sidewall 8116 for engagement by the spring clip 8430, but instead includes an optional flow hole 8115A as shown in FIG. 77. In such a case, the spring clip 8430 may be configured and arranged on the absorber insert 8400 to engage a top edge of the flow hole 8115A for locking the insert axially in place in the tube. The insertion process and action of the spring clip 8430 is the same as described above, except that the surface of the storage tube sidewall 8116 engages the spring clip 8430 to fold the clip inwards in the retracted position until it passes below the flow hole 8115A. At that elevation, the clip springs or snaps back to the outward undeflected and extended position to lockingly engage the hole.

Figure 85:
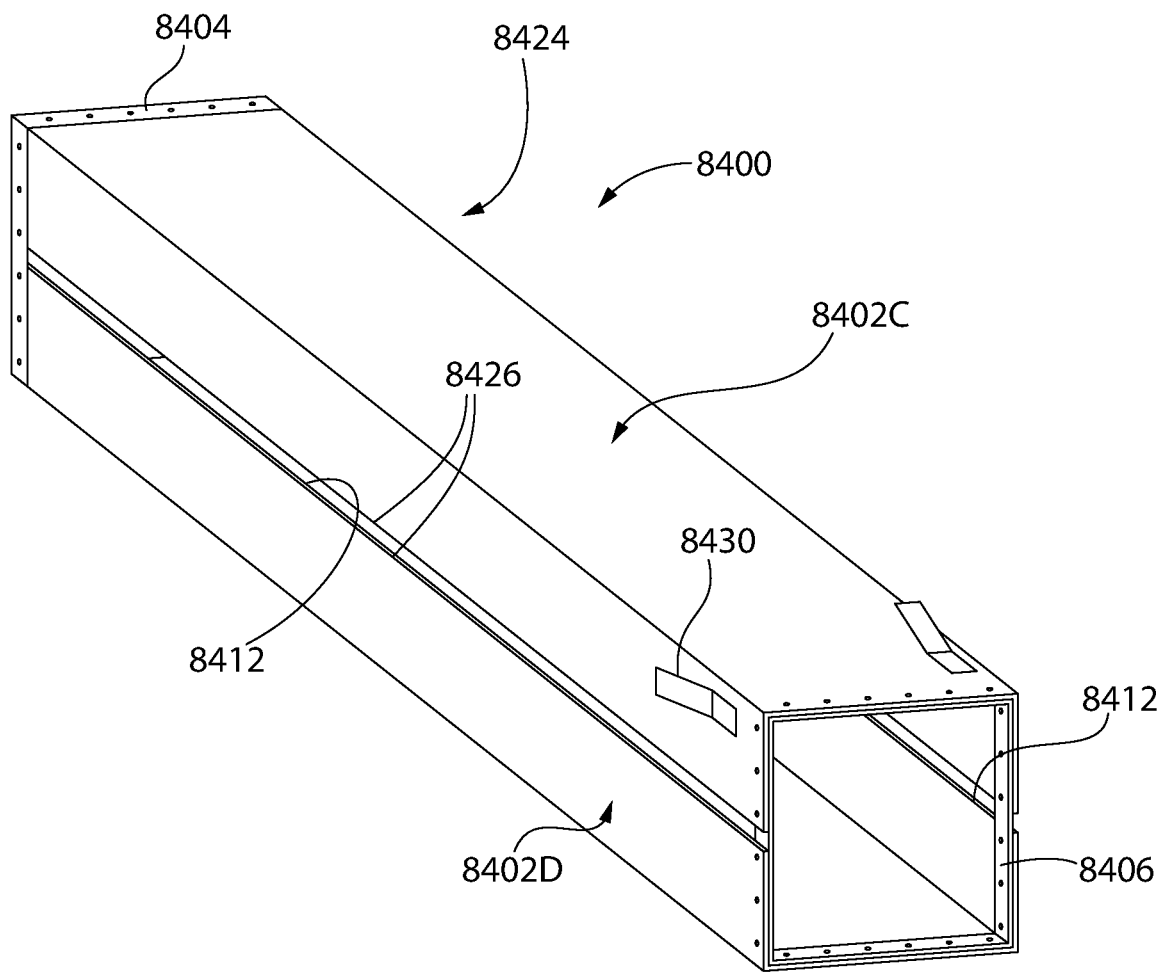
FIG. 85 is a perspective view of an alternative construction of the absorber insert.

FIG. 85 shows an alternative construction of an absorber insert 8400 according to the present disclosure. In lieu of the upper and lower stiffening bands 8404, 8406 coupling two chevron-shaped or angled absorber plates 8402A, 8402B together as shown in FIG. 79, each absorber plate 8402C, 8402D may be shaped as a structural channel. A longitudinal slot 8412 may be formed between mating edges 8426 of the plates 8402C and 8402D as shown in FIG. 85. All other element of construction including spring clips 8430 and stiffening bands 8404, 8406 may otherwise be the same as absorber plates 8402A, 8402B described herein.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A fuel rack apparatus for storing spent nuclear fuel, the fuel rack apparatus comprising:
  a base plate having an upper surface and a lower surface;
  a plurality of storage tubes coupled to and extending upward from the upper surface of the base plate, the storage tubes arranged in a side-by-side arrangement to form an array of the storage tubes, each of the storage tubes extending along a longitudinal axis and comprising:
    an outer tube of rectangular cross-sectional shape having an inner surface defining an inner cavity enclosed on all sides for a majority of a height of the outer tube, the outer tube defining a longitudinal axis; and
    an inner plate assemblage positioned within the outer tube that divides the inner cavity into a plurality of empty interior flux trap chambers and a fuel storage cell;
  the inner plate assemblage comprising a pair of spaced apart chevron plates each forming a separate angled structure disposed in the outer tube and having a height which extends vertically for a majority of a height of the outer tube;
  wherein the chevron plates in each outer tube are spaced apart from and do not contact each other;
  wherein each of the chevron plates comprises a pair of angled wall plates which meet along a longitudinally-extending apex edge, and the outer tube comprises a plurality of straight wall plates arranged orthogonally to each other, each of the angled wall plates of each chevron plate being arranged obliquely to the straight wall plates of the outer tube;
  wherein the pair of angled wall plates of each of the chevron plates comprises a first angled wall plate, a first neutron absorbing plate coupled to an outer surface of the first angled wall plate, a first outer sheath enclosing the first neutron absorbing plate, a second angled wall plate oriented at an oblique angle to the first angled wall plate, a second neutron absorbing plate coupled to an outer surface of the second angled wall plate, and a second outer sheath enclosing the first second neutron absorbing plate;
  wherein the pair of chevron plates are arranged in each outer tube such that the fuel storage cell has a hexagonal cross-sectional shape which is collectively defined by the pair of chevron plates and a first opposing pair of the straight wall plates of the outer tube.

2. The fuel rack apparatus according to claim 1, wherein the array of the storage tubes is a rectilinear array comprising a plurality of rows of the storage tubes and a plurality of columns of the storage tubes; wherein for each of the rows of the storage tubes, the longitudinal axes of adjacent ones of the storage tubes in the row are separated from one another by a first distance; and wherein for each of the columns of the storage tubes, the longitudinal axes of adjacent ones of the storage tubes in the column are separated from one another by a second distance, the second distance being greater than the first distance.

3. The fuel rack apparatus according to claim 2, wherein for each of the rows of the storage tubes, adjacent ones of the storage tubes in the row are spaced apart from one another by an empty exterior flux trap formed between the outer tubes of the adjacent ones of the storage tubes in the row.

4. The fuel rack apparatus according to claim 3, wherein for each of the columns, the outer tubes of adjacent ones of the storage tubes in the column are in surface contact with one another.

5. The fuel rack apparatus according to claim 2, wherein for each of the columns, the fuel storage cells of adjacent ones of the storage tubes in the column are separated from one another by a first subset of the interior flux trap chambers of a first one of the adjacent ones of the storage tubes in the column and a second subset of the interior flux trap chambers of a second one of the adjacent ones of the storage tubes in the column.

6. The fuel rack apparatus according to claim 1, wherein for each of the storage tubes, the interior flux trap chambers have a triangular transverse cross-section.

7. The fuel rack apparatus according to claim 1, wherein each of the chevron plates includes a first vertical edge welded to a first one of the straight wall plates of the first opposing pair of straight walls plates of the outer tube, and a second vertical edge welded to a second one of the straight wall plates of the first opposing pair of straight wall plates.

8. The fuel rack apparatus according to claim 7, wherein the first and second ones of the straight wall plates are parallel to each other.

9. The fuel rack apparatus according to claim 1, wherein each interior flux trap chamber is isolated from an adjoining flux trap chamber by the chevron plates.

10. The fuel rack apparatus according to claim 1, wherein the angled wall plates of each of the chevron plates include an outwardly flared guide plate extending upwards from top ends of the first and second angled wall plates at an oblique angle thereto.

11. The fuel rack apparatus according to claim 10, wherein the guide plates are integrally formed as a unitary structural part of the first and second angled wall plates.

12. The fuel rack apparatus according to claim 11, wherein the guide plates are obliquely angled to the longitudinal axis.

13. The fuel rack apparatus according to claim 1, wherein for each of the chevron plates, the first and second angled wall plates are disposed at an angle greater than 90 degrees to each other.

14. A fuel rack for underwater storage of spent nuclear fuel, the fuel rack comprising:
a base plate having an upper surface and a lower surface configured to be positioned on a floor of a fuel pool;
a plurality of fuel storage tubes coupled to and extending vertically upward from the upper surface of the base plate, the storage tubes arranged in a side-by-side arrangement to form an array of the storage tubes, each of the storage tubes extending along a longitudinal axis and comprising:
an outer tube of rectangular cross-sectional shape and comprising a plurality of orthogonally intersecting straight walls defining an internal cavity enclosed on all sides for a majority of a height of the outer tube, the outer tube defining a longitudinal axis;
a longitudinally elongated first chevron plate comprising a first angled wall, a first neutron absorbing plate coupled to an outer surface of the first angled wall, a second angled wall oriented at an obtuse angle to the first angled wall, and a second neutron absorbing plate coupled to an outer surface of the second angled wall, the first angled wall and the second angled wall adjoined at a first apex edge, the first chevron plate inserted in the internal cavity such that the first apex edge engages a first one of the straight walls of the outer tube;
a longitudinally elongated second chevron plate comprising a third angled wall, a third neutron absorbing plate coupled to an outer surface of the third angled wall, a fourth angled wall oriented at an obtuse angle to the third angled wall, and a fourth neutron absorbing plate coupled to an outer surface of the fourth angled wall, the third angled wall and the fourth angled wall adjoined at a second apex edge, the second chevron plate inserted in the internal cavity such that the second apex edge engages a second one of the straight walls of the outer tube which is parallel to the first one of the straight walls;
the first chevron plate being spaced horizontally apart from the second chevron plate such that the first and second chevron plates do not contact each other;
wherein a plurality of flux trap spaces are defined in the internal cavity of each outer tube by the the first and second chevron plates, and wherein the first neutron absorbing plate, the second neutron absorbing plate, the third neutron absorbing plate and the fourth neutron absorbing plate are each disposed within one of the plurality of flux trap spaces.

15. The fuel rack according to claim 14, wherein a third one of the straight walls is parallel to a fourth one of the straight walls.

16. The fuel rack according to claim 15, wherein the third and fourth ones of the straight walls are each perpendicular to the first and second ones of the straight walls.

17. The fuel rack according to claim 14, wherein each of the plurality of flux trap spaces are triangle-shaped.

18. The fuel rack apparatus according to claim 14, wherein the first and second angled walls of the first chevron plate are disposed at an angle greater than 90 degrees to each other, and the third and fourth angled walls of the second chevron plate are disposed at an angle greater than 90 degrees to each other.

19. A fuel rack apparatus for storing spent nuclear fuel, the fuel rack apparatus comprising:
a base plate having an upper surface;
a plurality of fuel storage tubes coupled to and extending vertically upward from the upper surface of the base plate, the storage tubes arranged in a side-by-side arrangement to form an array of the storage tubes, each of the storage tubes extending along a longitudinal axis and comprising:
an outer tube of rectangular cross-sectional shape and comprising a plurality of orthogonally intersecting straight walls defining an internal cavity enclosed on all sides for a majority of a height of the outer tube, the outer tube defining a longitudinal axis;
a first chevron plate comprising a first angled wall, a first neutron absorbing plate coupled to an outer surface of the first angled wall, a second angled wall oriented at an obtuse angle to the first angled wall, and a second neutron absorbing plate coupled to an outer surface of the second angled wall, the first angled wall and the second angled wall adjoined at a first apex edge, the first chevron plate inserted in the internal cavity such that the first apex edge engages a first one of the straight walls of the outer tube;
a second chevron plate comprising a third angled wall, a third neutron absorbing plate coupled to an outer surface of the third angled wall, a fourth angled wall oriented at an obtuse angle to the third angled wall, a fourth neutron absorbing plate coupled to an outer surface of the fourth angled wall, the third angled wall and the fourth angled wall adjoined at a second apex edge, the second chevron plate inserted in the internal cavity such that the second apex edge engages a second one of the straight walls of the outer tube which is parallel to the first one of the straight walls;

a fifth neutron absorbing plate coupled to an outer surface of a first straight wall of the plurality of orthogonally intersecting straight walls;

a sixth neutron absorbing plate coupled to an outer surface of a second straight wall of the plurality of orthogonally intersecting straight walls, the second straight wall plate opposing the first straight wall;

wherein the first neutron absorbing plate extends along a first reference plane, the second neutron absorbing plate extends along a second reference plane, the third neutron absorbing plate extends along a third reference plane, and the fourth neutron absorbing plate extends along a fourth reference plane, the first and second reference planes intersecting the fifth neutron absorbing plate, and the third and fourth reference planes intersecting the sixth neutron absorbing plate.

20. The fuel apparatus according to claim 19 further comprising a plurality of flux trap spaces defined by the internal cavity of each outer tube by the first and second chevron plates, wherein the first neutron absorbing plate, the second neutron absorbing plate, the third neutron absorbing plate and the fourth neutron absorbing plate are each disposed within one of the plurality of flux trap spaces.

* * * * *